United States Patent
Shah

(10) Patent No.: US 12,527,821 B2
(45) Date of Patent: Jan. 20, 2026

(54) COMPOSITIONS AND METHODS RELATED TO TUMOR CELL KILLERS AND VACCINES

(71) Applicant: THE BRIGHAM AND WOMEN'S HOSPITAL, INC., Boston, MA (US)

(72) Inventor: Khalid Shah, Andover, MA (US)

(73) Assignee: THE BRIGHAM AND WOMEN'S HOSPITAL, INC., Boston, MA (US)

( * ) Notice: Subject to any disclaimer, the term of this patent is extended or adjusted under 35 U.S.C. 154(b) by 327 days.

(21) Appl. No.: 17/055,011

(22) PCT Filed: May 15, 2019

(86) PCT No.: PCT/US2019/032521
§ 371 (c)(1),
(2) Date: Nov. 12, 2020

(87) PCT Pub. No.: WO2019/222423
PCT Pub. Date: Nov. 21, 2019

(65) Prior Publication Data
US 2022/0023338 A1    Jan. 27, 2022

Related U.S. Application Data

(60) Provisional application No. 62/685,611, filed on Jun. 15, 2018, provisional application No. 62/671,729, filed on May 15, 2018.

(51) Int. Cl.
| | | |
|---|---|---|
| *A61K 35/13* | (2015.01) | |
| *A61K 38/17* | (2006.01) | |
| *A61K 38/19* | (2006.01) | |
| *A61K 38/21* | (2006.01) | |
| *A61K 39/00* | (2006.01) | |
| *A61K 45/06* | (2006.01) | |
| *A61P 35/00* | (2006.01) | |
| *A61P 35/04* | (2006.01) | |
| *C07K 14/535* | (2006.01) | |
| *C07K 14/565* | (2006.01) | |
| *C07K 14/705* | (2006.01) | |
| *C12N 5/09* | (2010.01) | |

(52) U.S. Cl.
CPC ............ *A61K 35/13* (2013.01); *A61K 38/177* (2013.01); *A61K 38/193* (2013.01); *A61K 38/215* (2013.01); *A61K 39/0011* (2013.01); *A61K 45/06* (2013.01); *A61P 35/00* (2018.01); *A61P 35/04* (2018.01); *C07K 14/535* (2013.01); *C07K 14/565* (2013.01); *C07K 14/70575* (2013.01); *C12N 5/0693* (2013.01); *A61K 2039/5152* (2013.01); *A61K 2039/5156* (2013.01); *C12N 2510/00* (2013.01)

(58) Field of Classification Search
CPC .................. C12N 5/16; C12N 2510/00; A61K 2039/5156; A61K 35/13; A61K 39/463; A61K 39/4635; A61K 39/4637; A61K 39/464438; A61K 39/464439; A61K 39/46444; A61K 39/46441; A61K 2039/5152
See application file for complete search history.

(56) References Cited

U.S. PATENT DOCUMENTS

| | | |
|---|---|---|
| 2012/0034242 A1 | 2/2012 | Jooss et al. |
| 2017/0087185 A1 | 3/2017 | Crane et al. |

FOREIGN PATENT DOCUMENTS

| | | | |
|---|---|---|---|
| EP | 3105317 A1 | 12/2016 | |
| WO | 2014035474 A1 | 3/2014 | |
| WO | WO-2015013673 A1 * | 1/2015 | ............ A61K 39/39 |
| WO | 2015089280 A1 | 6/2015 | |
| WO | 2016205613 A1 | 12/2016 | |

OTHER PUBLICATIONS

Pitti et al (Journal of Biological Chemistry, 1996, vol. 271, pp. 12687-12690) (Year: 1996).*
Van Geelen et al (BMC Cancer, 2011, vol. 11, No. 39, 13 pages) (Year: 2011).*
Shlyakhtina ("Role of Trail-receptors in apoptosis and nonapoptotic signaling in cancer cell populations undergoing fractional killing", Genomics, University de Strasbourg, 2016, 192 pages) (Year: 2016).*
Thomas et al (Author Manuscript: "Immunotherapy for the Treatment of Glioblastoma", Pub-Med Central, 2013, 24 pages) (Year: 2013).*
Narusawa et al (Cancer Immunology Research, 2014, vol. 2, pp. 568-580) (Year: 2014).*
Dong et al (Cancer Immunol Immunother, 1998, vol. 46, pp. 137-146) (Year: 1998).*
Tai et al (Journal of Biomedical Science, 2004, vol. 11, pp. 228-238) (Year: 2004).*
Finocchiaro et al (Research in Veterinary Science, 2011, vol. 91, pp. 230-234) (Year: 2011).*
Guimaraes et al. "Nanoparticles for Immune Cytokine TRAIL-Based Cancer Therapy" American Chemical Society Nano. 12(2): 912-931 (2018).
Chang et al. "Antigen-specific cancer immunotherapy using a GM-CSF secreting allogeneic tumor cell-based vaccine." International Journal of Cancer 86(5): 725-730 (2000).
Dondossola et al. "Self-targeting of TNF-releasing cancer cells in preclinical models of primary and metastatic tumors." Proceedings of the National Academy of Sciences 113(8): 2223-2228 (2016).
Eager et al. "GM-CSF gene-transduced tumor vaccines." Molecular Therapy 12(1): 18-27 (2005).

(Continued)

Primary Examiner — Karen A. Canella
(74) Attorney, Agent, or Firm — Nixon Peabody LLP; David S. Resnick; Mark J. FitzGerald

(57) ABSTRACT

Described herein are methods and compositions for treating cancer. Various embodiments use engineered autologous or syngeneic cancer cells that home to tumors in vivo and deliver therapeutic polypeptides. Various embodiments further promote an anti-tumor immune response that can assist in treating existing tumors and provide protection against recurrent cancer.

10 Claims, 62 Drawing Sheets
Specification includes a Sequence Listing.

(56) References Cited

OTHER PUBLICATIONS

Freeman et al. "The "bystander effect": tumor regression when a fraction of the tumor mass is genetically modified." Cancer Research 53(21): 5274-5283 (1993).

Garcia-Castro et al. "Tumor cells as cellular vehicles to deliver gene therapies to metastatic tumors." Cancer Gene Therapy 12(4): 341-349 (2005).

Lee et al. "Herpes simplex virus thymidine kinase and granulocyte macrophage colony-stimulating factor combination gene therapy in a murine CT26 cell colon cancer model." Cancer Gene Therapy 11(8): 570-576 (2004).

Martinez-Quintanilla et al. "Therapeutic efficacy and fate of bimodal engineered stem cells in malignant brain tumors." Stem Cells 31(8): 1706-1714 (2013).

Power et al. "Carrier cell-based delivery of an oncolytic virus circumvents antiviral immunity." Molecular Therapy 15 (1): 123-130 (2007).

Raykov et al. "Carrier cell-mediated delivery of oncolytic parvoviruses for targeting metastases." International Journal of Cancer 109(5): 742-749 (2004).

Yang et al. "Increased Anti-tumor Effect by a Combination of HSV Thymidine Kinase Suicide Gene Therapy and Interferon-γ/GM-CSF Cytokine Gene Therapy in CT26 Tumor Model." Journal of Korean Medical Science 20(6): 932-937 (2005).

* cited by examiner

Allogeneic - "off-the-shelf"

Allogeneic model - "off-the-shelf"

5% sGBMn-GFP                    5% rGBMn^DR4/5-ST

25% sGBMi-GFP                   25% rGBMi^DR4/5-ST-TK

COMPOSITIONS AND METHODS RELATED TO TUMOR CELL KILLERS AND VACCINES

CROSS-REFERENCE TO RELATED APPLICATIONS

This application is a 35 U.S.C. § 371 National Phase Entry Application of International Application No. PCT/US2019/032521 filed May 15, 2019, which designates the U.S. and claims benefit under 35 U.S.C. § 119(e) of U.S. Provisional Application No. 62/671,729 filed May 15, 2018 and U.S. Provisional Application No. 62/685,611 filed Jun. 15, 2018, the contents of which are incorporated herein by reference in their entirety.

SEQUENCE LISTING

The instant application contains a Sequence Listing which has been submitted electronically in ASCII format and is hereby incorporated by reference in its entirety. Said ASCII copy, created on May 2, 2024, is named 043214-091830US-PX_SL.txt and is 72,208 bytes in size.

TECHNICAL FIELD

The present disclosure relates to the treatment of cancer.

BACKGROUND

Cancer is an often fatal disease caused by abnormal cell growth that invades and spreads, or metastasizes, throughout the body. While chemotherapeutic agents have been developed to combat various types of cancers, numerous local and systemic cancer types, as well as many forms of metastatic disease, still remain ultimately fatal. Treatment regimes in end-stage disease, especially in the recurrent setting, often lack evidence-based guidelines.

One of the major treatment hurdles of advanced-stage cancer is localized and distant tumor cell metastasis, following vascular infiltration or penetration of anatomic boundaries. A growing body of evidence suggests that tumor progression at this stage may be enhanced by circulating cancer cells ability of "self-seeding", a process involving cell dissemination into the vascular system away from a primary or metastatic tumor, followed by the cells re-homing to the site of origin.

There is a need to develop engineered cell therapies that kill or prevent further growth of tumors or establishment of metastatic tumors.

SUMMARY

Described herein are methods and compositions that take advantage of the innate homing activity of cancer cells. It is demonstrated herein that using engineered cancer cells, either from the patient's own (so called "autologous" tumor cells), or from another patient's (so called "syngeneic" tumor cells) tumor, one can deliver anti-tumor therapeutic agents to both primary and metastatic tumors. The engineered tumor cells as described herein seek out tumors in the patient, such that one can effectively use cancer to treat cancer. As an added benefit, it is also demonstrated herein that in certain embodiments, the engineered cells provoke, stimulate or enhance an immune response against such tumors that can both assist in clearance of tumor cells wherever they occur, and also provide protection from recurrence of the cancer. That is, in some embodiments, the engineered cancer cells as described herein can provide an effective vaccine effect that protects the patient from return of the cancer.

Engineered cancer cells as described herein are modified not only to express one or more anti-tumor or anti-cancer therapeutic agents, preferably receptor-mediated cell death-inducing agents, but importantly, are modified so as to be insensitive to such agent or agents. In this way, the engineered cancer cells can survive to home to and deliver the anti-cancer agent(s) to tumors located throughout the body, without being killed in an autocrine fashion by the therapeutic agent(s). The modification(s) that provide(s) insensitivity to the anti-cancer agent(s) preferably involve targeted mutation of the gene(s) encoding the receptor(s) for the therapeutic agent(s). Targeted mutations are readily introduced using RNA-guided endonuclease-medated mutagenesis. A number of different enzyme/guide RNA systems are known and applicable to the methods and compositions as described herein, but perhaps the best known is the Cas9-mediated CRISPR methodology.

Finally, the methods and compositions described herein include modification of the engineered cancer cells to include a heterologous inducible cell suicide system. This modification permits the selective killing or eradication of the engineered tumor cells after thay have delivered their anti-tumor or anti-cancer products to tumor cells and/or provoked, stimulated or enhanced an anti-tumor immune response. Various inducible cell suicide systems are known to those of skill in the art and/or described herein. Non-limiting examples include introduction of an expression construct encoding an enzyme that catalyzes conversion of a non-toxic pro-drug to a cytotoxic factor, and introduction of a gene construct encoding expression of a cytotoxic factor under control of an inducible control element. In these examples, introduction of the pro-drug or an appropriate inducer of the inducible control element activates the cell suicide system and selectively kills the engineered cancer cell.

Put simply, the methods and compositions described herein harness cancer cells, either autologous or syngeneic to the cancer patient, to kill the patient's cancer and/or inhibit the growth or establishment of metastases. Where the methods provide engineered autologous cancer cells, there is a highly effective personalized medicine approach. Where the methods provide engineered syngeneic cancer cells, e.g., populations or preparations of cells derived from various tumor types, it is contemplated that the methods and compositions described herein can provide an "off-the-shelf" approach to cancer treatment.

In one aspect, described herein is a tumor cell engineered to express heterologous polypeptides including: (i) a receptor-mediated cell death-inducing polypeptide; (ii) an immunomodulatory polypeptide; and (iii) a heterologous inducible cell suicide system, wherein the cell is further engineered to inactivate endogenous receptor for the receptor-mediated cell death-inducing polypeptide.

In one embodiment, the tumor cell is a human tumor cell.

In another embodiment, the receptor-mediated cell death-inducing polypeptide is selected from the group consisting of TNF-related apoptosis-inducing ligand (TRAIL) or a polypeptide comprising an extracellular domain of TRAIL that binds a TRAIL receptor, interferon (IFN) α, IFN β, and first apoptosis signal (FAS) ligand.

In another embodiment, the immunomodulatory polypeptide promotes an immune response. In another embodiment, the immunomodulatory polypeptide is granulocyte-macrophage colony stimulating factor (GMCSF). In another embodiment, the immunomodulatory polypeptide is GMCSF and the receptor-mediated cell death-inducing polypeptide is IFNβ.

In another embodiment, the heterologous inducible cell suicide system comprises an enzyme that converts a non-toxic pro-drug to a cytotoxic agent.

In another embodiment, the enzyme that converts a non-toxic pro-drug to a cytotoxic agent comprises the thymidine kinase domain of HSV-thymidine kinase.

In another embodiment, the heterologous inducible cell suicide system comprises inducible expression of an apoptosis-inducing factor. In another embodiment, the apoptosis-inducing factor comprises the catalytic domain of a caspase 9 enzyme.

In another embodiment, the endogenous receptor for the receptor-mediated cell death-inducing polypeptide is inactivated by an RNA-guided endonuclease targeted to the coding sequence for the endogenous receptor. In another embodiment, the endogenous receptor is inactivated by CRISPR-mediated mutagenesis.

In another aspect, described herein is a method of treating cancer in an individual in need thereof, the method comprising administering an engineered tumor cell as described above and elsewhere herein to the individual. In one embodiment, the tumor cell is autologous to the individual.

In another embodiment, the tumor cell is syngeneic to the individual. In one embodiment, a syngeneic tumor cell is of the same or similar tumor type as the cancer of the individual being treated.

In another embodiment, administration of an engineered tumor cell as described herein permits homing of the administered cell to one or more tumors in the individual, and cells of one or more tumors in the individual are induced to undergo apoptosis by the receptor-mediated cell death-inducing polypeptide.

In another embodiment, the administering promotes an anti-tumor immune response.

In another embodiment, the administering inhibits metastasis of the individual's cancer.

In another embodiment, the administering promotes apoptosis of cells of one or more tumors in the individual and promotes an anti-tumor immune response that either kills tumor cells, inhibits metastasis or both.

In another embodiment, the tumor cell is administered systemically.

In another embodiment, the tumor cell is administered via implantation into a tumor resection cavity.

In another embodiment, the tumor cell is a melanoma cell, a lung cancer cell, a breast cancer cell or a glioblastoma cell.

In another embodiment, the method further comprises, after administering the tumor cell, the step of administering an inducer of the heterologous inducible cell suicide system, thereby killing the administered tumor cell.

In another aspect, described herein is a method of inhibiting metastasis of an individual's tumor, the method comprising administering a tumor cell of an aspect described above or elsewhere herein to the individual. In one embodiment, the administered tumor cell is autologous to the individual.

In another embodiment, the administered tumor cell is syngeneic to the individual. In one embodiment, a syngeneic tumor cell is of the same or similar tumor type as the cancer of the individual being treated.

In another embodiment, the method of inhibiting metastases further comprises, after administering the tumor cell, the step of administering an inducer of the heterologous inducible cell suicide system, thereby killing the administered tumor cell.

In another aspect, described herein is a pharmaceutical composition comprising a tumor cell of any aspect described above or elsewhere herein. A pharmaceutical composition includes a pharmaceutically acceptable carrier and engineered tumor cells as described herein. In one embodiment, a pharmaceutical composition comprises engineered tumor cells as described herein in an amount effective to treat cancer in an individual in need thereof, e.g., an amount effective to home to and deliver a therapeutically effective amount of one or more therapeutic polypeptides, and/or an amount effective to inhibit the growth and/or establishment of metastases in the individual in need thereof, and/or an amount effective to promote an anti-tumor immune response effective to assist in treating the individual's cancer and/or effective to protect against recurrence of the cancer or against development of new cancer.

In one aspect, described herein is the use of an engineered tumor cell as described for any aspect herein for the treatment of cancer or inhibition of metastasis in an individual in need thereof.

In another aspect, described herein is a method of inducing an anti-tumor immune response in an individual with cancer, the method comprising administering an engineered tumor cell as described above or elsewhere herein to an individual in need thereof. In one embodiment, the tumor cell is autologous to the individual. In another embodiment, the tumor cell is syngeneic to the individual. In one embodiment, a syngeneic tumor cell is of the same or similar tumor type as the cancer of the individual being treated. In a syngeneic setting, it can be beneficial to cure engineered tumor cells that substantially match the patient's HLA phenotype.

In another embodiment, the receptor-mediated cell death-inducing polypeptide is IFNβ and the immunomodulatory polypeptide is GMCSF.

In another embodiment, the tumor cell is administered systemically. In another embodiment, the tumor cell is administered via implantation into a tumor resection cavity.

In another embodiment, the tumor cell is a melanoma cell, a lung cancer cell, a breast cancer cell or a glioblastoma cell.

In another embodiment, the administering inhibits the establishment or growth of tumor metastases. In another embodiment, the administering provokes an anti-tumor immune response that inhibits the establishment or growth of metastases of the cancer.

In another aspect, described herein is a tumor cell autologous to a cancer patient, the tumor cell engineered so as to: a) encode and express a heterologous ligand effective to kill cells of the patient's tumor(s) when re-introduced to the patient; b) be insensitive to killing by the ligand; and c) encode and express a heterologous inducible cell suicide system.

In one embodiment, the cell comprises a targeted inactivating mutation of a gene encoding a receptor for the ligand, such that the cell is rendered insensitive to killing by the ligand.

In another embodiment, the ligand comprises a polypeptide selected from the group consisting of the extracellular domain of a TNF-related apoptosis-inducing ligand (TRAIL), FAS ligand, IFNα and IFNβ.

In another embodiment, the ligand comprises sTRAIL.

In another embodiment, the cell comprises a targeted inactivating mutation of a TRAIL receptor gene. In another embodiment, the cell comprises a targeted inactivating mutation of DR4, DR5 or both.

In another embodiment, the heterologous inducible cell suicide system comprises an enzyme that converts a non-toxic pro-drug to a cytotoxic agent.

In another embodiment, the heterologous inducible cell suicide system comprises the thymidine kinase domain of HSV-thymidine kinase.

In another embodiment, the heterologous inducible cell suicide system comprises inducible expression of an apoptosis-inducing factor.

In another embodiment, the apoptosis-inducing factor comprises the catalytic domain of a caspase 9 enzyme.

In another aspect, described herein is a method of treating cancer in a patient in need thereof, the method comprising administering an autologous tumor cell as described above or elsewhere herein to the patient. In one embodiment, the method further comprises administering an inducer of the heterologous inducible cell suicide system to the patient after the autologous tumor cell is administered.

In another embodiment, the method further comprises, after administering the cell and before administering the inducer, detecting one or more of tumor size, tumor load, and tumor apoptosis.

In another aspect, described herein is a method of treating cancer in a patient, comprising: a) engineering a cancer cell from the patient to: i) encode and express a heterologous ligand effective to kill cells of the patient's tumor(s) when re-introduced to the patient; ii) be insensitive to killing by the ligand; and iii) encode and express a heterologous inducible cell suicide system; and b) administering the engineered cancer cell to the patient, wherein the engineered cancer cell homes to the patient's tumor, and the heterologous ligand promotes tumor cell death.

In one embodiment, the method further comprises administering an inducer of the heterologous inducible cell suicide system to the patient to eradicate the engineered cancer cells.

In another embodiment, the method further comprises, after administering the cell and before administering the pro-drug, detecting one or more of tumor size, tumor load, and tumor apoptosis.

In another embodiment, the cell comprises a targeted inactivating mutation of a gene encoding a receptor for the ligand, such that the cell is rendered insensitive to killing by the ligand.

In another embodiment, the ligand comprises the extracellular domain of TRAIL. In another embodiment, the ligand comprises sTRAIL. In another embodiment, the cell comprises a targeted inactivating mutation of a gene encoding a TRAIL receptor. In another embodiment, the cell comprises a targeted inactivating mutation of a gene encoding DR4, DR5 or both.

In another embodiment, the heterologous inducible cell suicide system comprises an enzyme that converts a non-toxic pro-drug to a cytotoxic agent. In another embodiment, the enzyme that converts a non-toxic pro-drug to a cytotoxic agent comprises the thymidine kinase domain of HSV-thymidine kinase.

In another embodiment, the heterologous inducible cell suicide system comprises inducible expression of an apoptosis-inducing factor. In another embodiment, the apoptosis-inducing factor comprises the catalytic domain of a caspase 9 enzyme.

In another embodiment, the engineering of the cancer cell to be insensitive to killing by the ligand is performed using an RNA-guided endonuclease.

In another embodiment, the engineered cancer cell is administered directly to a tumor or to a tumor resection cavity.

In another embodiment, the engineered cancer cell is administered systemically.

In another embodiment of this or any other aspect described herein, the cancer is a carcinoma, lymphoma, blastoma, sarcoma, or leukemia.

In one aspect of any of the embodiments, an "autologous" approach is used wherein CRISPR technology is utilized.

In one embodiment, the method further comprises CRISPR edited cell surface receptor engineered tumor cells to treat tumors of their own type.

Cell surface receptors that are inactivated by CRISPR-mediated mutagenesis for the receptor-mediated cell death-inducing polypeptide include but are not limited to Death receptor 4, Death Receptor 5, or both.

DEFINITIONS

Unless otherwise defined herein, scientific and technical terms used in connection with the present application shall have the meanings that are commonly understood by those of ordinary skill in the art to which this disclosure belongs. It should be understood that this invention is not limited to the particular methodology, protocols, and reagents, etc., described herein and as such can vary. The terminology used herein is for the purpose of describing particular embodiments only, and is not intended to limit the scope of the present invention, which is defined solely by the claims. Definitions of common terms in immunology and molecular biology can be found in The Merck Manual of Diagnosis and Therapy, 20th Edition, published by Merck Sharp & Dohme Corp., 2018 (ISBN 0911910190, 978-0911910421); Robert S. Porter et al. (eds.), The Encyclopedia of Molecular Cell Biology and Molecular Medicine, published by Blackwell Science Ltd., 1999-2012 (ISBN 9783527600908); and Robert A. Meyers (ed.), Molecular Biology and Biotechnology: a Comprehensive Desk Reference, published by VCH Publishers, Inc., 1995 (ISBN 1-56081-569-8); Immunology by Werner Luttmann, published by Elsevier, 2006; Janeway's Immunobiology, Kenneth Murphy, Allan Mowat, Casey Weaver (eds.), W. W. Norton & Company, 2016 (ISBN 0815345054, 978-0815345053); Lewin's Genes XI, published by Jones & Bartlett Publishers, 2014 (ISBN-1449659055); Michael Richard Green and Joseph Sambrook, Molecular Cloning: A Laboratory Manual, 4th ed., Cold Spring Harbor Laboratory Press, Cold Spring Harbor, N.Y., USA (2012) (ISBN 1936113414); Davis et al., Basic Methods in Molecular Biology, Elsevier Science Publishing, Inc., New York, USA (2012) (ISBN 044460149X); Laboratory Methods in Enzymology: DNA, Jon Lorsch (ed.) Elsevier, 2013 (ISBN 0124199542); Current Protocols in Molecular Biology (CPMB), Frederick M. Ausubel (ed.), John Wiley and Sons, 2014 (ISBN 047150338X, 9780471503385), Current Protocols in Protein Science (CPPS), John E. Coligan (ed.), John Wiley and Sons, Inc., 2005; and Current Protocols in Immunology (CPI) (John E. Coligan, ADA M Kruisbeek, David H Margulies, Ethan M Shevach, Warren Strobe, (eds.) John Wiley and Sons, Inc., 2003 (ISBN 0471142735, 9780471142737), the contents of which are all incorporated by reference herein in their entireties.

All references cited herein are incorporated by reference in their entirety as though fully set forth.

The terms 'individual' and 'patient' are used interchangeably in reference to subjects with cancer.

The singular terms "a," "an," and "the" include plural referents unless context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The abbreviation, "e.g." is derived from the Latin exempli gratia, and is used herein to indicate a non-limiting example. Thus, the abbreviation "e.g." is synonymous with the term "for example."

Amino acids can be grouped according to similarities in the properties of their side chains (in A. L. Lehninger, in Biochemistry, second ed., pp. 73-75, Worth Publishers, New York (1975)): (1) non-polar: Ala (A), Val (V), Leu (L), Ile (I), Pro (P), Phe (F), Trp (W), Met (M); (2) uncharged polar: Gly (G), Ser(S), Thr (T), Cys (C), Tyr (Y), Asn (N), Gln (Q); (3) acidic: Asp (D), Glu (E); (4) basic: Lys (K), Arg (R), His (H). Alternatively, naturally occurring residues can be divided into groups based on common side-chain properties: (1) hydrophobic: Norleucine, Met, Ala, Val, Leu, Ile; (2) neutral hydrophilic: Cys, Ser, Thr, Asn, Gln; (3) acidic: Asp, Glu; (4) basic: His, Lys, Arg; (5) residues that influence chain orientation: Gly, Pro; (6) aromatic: Trp, Tyr, Phe. Non-conservative substitutions will entail exchanging a member of one of these classes for another class. Particular conservative substitutions include, for example; Ala into Gly or into Ser; Arg into Lys; Asn into Gln or into His; Asp into Glu; Cys into Ser; Gln into Asn; Glu into Asp; Gly into Ala or into Pro; His into Asn or into Gln; Ile into Leu or into Val; Leu into Ile or into Val; Lys into Arg, into Gln or into Glu; Met into Leu, into Tyr or into Ile; Phe into Met, into Leu or into Tyr; Ser into Thr; Thr into Ser; Trp into Tyr; Tyr into Trp; and/or Phe into Val, into Ile or into Leu.

The terms "decrease", "reduce", "inhibit", or other grammatical forms thereof are used herein to mean a decrease by a statistically significant amount. In some embodiments, "reduce" or "decrease" or "inhibit" typically means a decrease by at least 10% as compared to a reference level (e.g. the absence of a given treatment or agent) and can include, for example, a decrease by at least about 10%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 98%, at least about 99%, or more. As used herein, "inhibition" does not encompass a complete inhibition as compared to a reference level. "Complete inhibition" is a 100% inhibition as compared to a reference level. Where applicable, a decrease can be preferably down to a level accepted as within the range of normal for an subject without a given disease (e.g., cancer).

The terms "increased", "increase", "enhance", or grammatical forms thereof are used herein to mean an increase by a statically significant amount. In some embodiments, the terms "increased", "increase", or "enhance", can mean an increase of at least 10% as compared to a reference level, for example an increase of at least about 20%, or at least about 30%, or at least about 40%, or at least about 50%, or at least about 60%, or at least about 70%, or at least about 80%, or at least about 90% or up to and including a 100% increase or any increase between 10-100% as compared to a reference level, or at least about a 2-fold, or at least about a 3-fold, or at least about a 4-fold, or at least about a 5-fold or at least about a 10-fold increase, or any increase between 2-fold and 10-fold or greater as compared to a reference level.

As used herein, a "subject" means a human or animal. Usually the animal is a vertebrate such as a primate, rodent, domestic animal or game animal. Primates include, for example, chimpanzees, cynomolgus monkeys, spider monkeys, and macaques, e.g., Rhesus. Rodents include, for example, mice, rats, woodchucks, ferrets, rabbits and hamsters. Domestic and game animals include, for example, cows, horses, pigs, deer, bison, feline species, e.g., domestic cat, canine species, e.g., dog, fox, wolf, avian species, e.g., chicken, emu, ostrich, and fish, e.g., trout, catfish and salmon. In some embodiments, the subject is a mammal, e.g., a primate, e.g., a human.

Preferably, the subject is a mammal. The mammal can be a human, non-human primate, mouse, rat, dog, cat, horse, or cow, but is not limited to these examples. Mammals other than humans can be advantageously used as subjects that represent animal models of disease e.g., cancer. A subject can be male or female.

A subject can be one who has been previously diagnosed with or identified as suffering from or having a condition in need of treatment (e.g. glioblastoma or another type of cancer, among others) or one or more complications related to such a condition, and optionally, have already undergone treatment for the condition or the one or more complications related to the condition. Alternatively, a subject can also be one who has not been previously diagnosed as having such condition or related complications. For example, a subject can be one who exhibits one or more risk factors for the condition or one or more complications related to the condition or a subject who does not exhibit risk factors.

As used herein, the term "pharmaceutical composition" refers to one or more active agents in combination with a pharmaceutically acceptable carrier e.g., a carrier commonly used in the pharmaceutical industry. The phrase "pharmaceutically acceptable" is employed herein to refer to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio. "Pharmaceutically acceptable" also means that the carrier is compatible with the active agent(s). That is, a pharmaceutically acceptable carrier will not interfere with the active agent's activity, stability or other parameters required for efficacy.

As used herein, a "reference level" can refer to one or more parameters or markers as measured for a a normal, otherwise unaffected cell population or tissue (e.g., a biological sample obtained from a healthy subject, or a biological sample obtained from the subject at a prior time point, or a biological sample that has not yet been contacted with an agent as described herein). For measuring or monitoring therapeutic efficacy, a level determined prior to treatment or earlier in treatment can also provide a reference level for a given parameter or value.

As used herein, an "appropriate negative control" refers to an untreated, substantially identical cell or population (e.g., a patient or the subject to be treated who was not administered an agent described herein, as compared to a non-control cell).

As used herein the term "comprising" or "comprises" is used in reference to compositions, methods, and respective component(s) thereof, that are essential to the method or composition, yet open to the inclusion of unspecified elements, whether essential or not.

As used herein the term "consisting essentially of" refers to those elements required for a given embodiment. The term permits the presence of additional elements that do not materially affect the basic and novel or functional characteristic(s) of that embodiment of the invention.

The term "consisting of" refers to compositions, methods, and respective components thereof as described herein, which are exclusive of any element not recited in that description of the embodiment.

Other than in the operating examples, or where otherwise indicated, all numbers expressing quantities of ingredients or reaction conditions used herein should be understood as modified in all instances by the term "about." The term "about" when used in connection with percentages can mean±1%.

As used herein, "genetically modified" refers to a cell (e.g., tumor cell) that has been altered to introduce changes to its genetic composition. A cell can be genetically modified to contain and/or express a gene product from one or more exogenous nucleic acid sequences not found in its genome (e.g., a tumor cell genetically modified to express a gene product from a heterologous nucleic acid sequence, e.g. a heterologous nucleic acid sequence encoding a receptor-mediated cell death-inducing polypeptide, an immunomodulatory polypeptide and/or a gene of a heterologous inducible cell suicide system). Alternatively, or in addition, a cell can be genetically modified to either overexpress or inactivate or disrupt the expression of one or more genes or polypeptides. One skilled in the art will know how to introduce changes to the cell's genome using standard gene editing approaches.

As used herein, the term "specifically binds" refer to a physical interaction between two molecules, compounds, cells and/or particles wherein the first entity binds to the second, target, entity with greater specificity and affinity than it binds to a third entity which is a non-target. In some embodiments, specific binding can refer to an affinity of the first entity for the second target, entity, which is at least 10 times, at least 50 times, at least 100 times, at least 500 times, at least 1000 times or more, greater than the affinity for the third non-target entity under the same conditions. A reagent specific for a given target is one that exhibits specific binding for that target under the conditions of the assay being utilized. A non-limiting example includes an antibody, or a ligand, which recognizes and binds with a cognate binding partner (for example, a tumor antigen or a checkpoint polypeptide) protein. For the avoidance of doubt, as used herein, "specifically binds" also requires the ability of a binding factor, such as a polypeptide or antibody binding domain to bind to a target, such as a molecule present on the cell surface, with a $K_D$ of $10^{-5}$ M (10000 nM) or less, e.g., $10^{-6}$ M or less, $10^{-7}$ M or less, $10^{-8}$ M or less, $10^{-9}$ M or less, $10^{-10}$ M or less, $10^{-11}$ M or less, or $10^{-12}$ M or less. Specific binding can be influenced by, for example, the affinity and avidity of the polypeptide agent and the concentration of polypeptide agent. The person of ordinary skill in the art can determine appropriate conditions under which binding agents described herein selectively bind the targets using any suitable methods, such as titration of a polypeptide agent in a suitable cell binding assay.

In one embodiment, the term "engineered" and its grammatical equivalents as used herein in reference to a cell or its progeny can refer to one or more human-designed alterations of a cell's genome or genetic composition. The term can refer to alterations, additions, and/or deletion of genes or genetic sequences. The term "cell" or "engineered cell" and their grammatical equivalents as used herein can refer to a cell of human or non-human animal origin. An engineered cancer cell as described herein will be either autologous or syngeneic relative to an individual with cancer to whom the cell is administered.

The term "polypeptide" as used herein refers to a polymer of amino acids. The terms "protein" and "polypeptide" are used interchangeably herein. A peptide is a relatively short polypeptide, typically between about 2 and 60 amino acids in length. Polypeptides used herein typically contain amino acids such as the 20 L-amino acids that are most commonly found in proteins. However, other amino acids and/or amino acid analogs known in the art can be used. One or more of the amino acids in a polypeptide may be modified, for example, by the addition of a chemical entity such as a carbohydrate group, a phosphate group, a fatty acid group, a linker for conjugation, functionalization, etc. A polypeptide that has a nonpolypeptide moiety covalently or noncovalently associated therewith is still considered a "polypeptide." Exemplary modifications include glycosylation and palmitoylation. Polypeptides can be purified from natural sources, produced using recombinant DNA technology or synthesized through chemical means such as conventional solid phase peptide synthesis, etc. The term "polypeptide sequence" or "amino acid sequence" as used herein can refer to the polypeptide material itself and/or to the sequence information (i.e., the succession of letters or three letter codes used as abbreviations for amino acid names) that biochemically characterizes a polypeptide. A polypeptide sequence presented herein is presented in an N-terminal to C-terminal direction unless otherwise indicated.

As used herein, "heterologous" refers to a genetic element or polypeptide that is not naturally found or expressed in a given cell, tissue or organism. A genetic element that encodes a gene or polypeptide that is naturally found in a given cell, but that places the expression of the polypeptide under control of different regulatory elements, e.g., to make it inducible or to overexpress it, is also considered heterologous as the term is used herein.

In some embodiments, a nucleic acid encoding a polypeptide as described herein (e.g. a receptor-mediated cell death-inducing polypeptide, an immunomodulatory polypeptide and/or a polypeptide of a heterologous, inducible cell suicide system) is comprised by a vector. In some of the aspects described herein, a nucleic acid sequence encoding a given polypeptide as described herein, or any module thereof, is operably linked to a vector. The term "vector", as used herein, refers to a nucleic acid construct designed for delivery to a host cell or for transfer between different host cells. As used herein, a vector can be viral or non-viral. The term "vector" encompasses any genetic element that is capable of replication when associated with the proper control elements and that can transfer gene sequences to cells. A vector can include, but is not limited to, a cloning vector, an expression vector, a plasmid, phage, transposon, cosmid, artificial chromosome, virus, virion, etc.

As used herein, the term "expression vector" refers to a vector that directs expression of an RNA or polypeptide from sequences linked to transcriptional regulatory sequences on the vector. The sequences expressed will often, but not necessarily, be heterologous to the cell. An expression vector may comprise additional elements, for example, the expression vector may have two replication systems, thus allowing it to be maintained in two organisms, for example in human cells for expression and in a prokaryotic host for cloning and amplification. The term "expression" refers to the cellular processes involved in producing RNA and proteins and as appropriate, secreting proteins, including where applicable, but not limited to, for example, transcription, transcript processing, translation and protein folding, modification and processing. "Expression products" include RNA transcribed from a gene, and polypeptides obtained by translation of mRNA transcribed from a gene. The term "gene" means the nucleic acid sequence which is transcribed (DNA) to RNA in vitro or in vivo when operably linked to appropriate regulatory sequences. The gene may or may not include regions preceding and following the coding region, e.g. 5' untranslated (5'UTR) or "leader" sequences and 3' UTR or "trailer" sequences, as well as intervening sequences (introns) between individual coding segments (exons).

As used herein, the term "viral vector" refers to a nucleic acid vector construct that includes at least one element of viral origin and has the capacity to be packaged into a viral vector particle. The viral vector can contain a nucleic acid encoding a polypeptide as described herein in place of non-essential viral genes. The vector and/or particle may be utilized for the purpose of transferring nucleic acids into cells either in vitro or in vivo. Numerous forms of viral vectors are known in the art.

By "recombinant vector" is meant a vector that includes a heterologous nucleic acid sequence, or "transgene" that is capable of expression in vivo. It should be understood that the vectors described herein can, in some embodiments, be combined with other suitable compositions and therapies. In some embodiments, the vector is episomal. The use of a suitable episomal vector provides a means of maintaining the nucleotide of interest in a cell in high copy number extra-chromosomal DNA, thereby eliminating potential effects of chromosomal integration.

As used herein, the terms "treat," "treatment," "treating," or "amelioration" refer to therapeutic treatments, wherein the object is to reverse, alleviate, ameliorate, inhibit, slow down or stop the progression or severity of a condition associated with a disease or disorder, e.g. glioblastoma or other solid tumor cancer. The term "treating" includes reducing or alleviating at least one adverse effect or symptom of a condition, disease or disorder. Treatment is generally "effective" if one or more symptoms or clinical markers are reduced. Alternatively, treatment is "effective" if the progression of a disease is reduced or halted. That is, "treatment" includes not just the improvement of symptoms or markers, but also a cessation of, or at least slowing of, progress or worsening of symptoms compared to what would be expected in the absence of treatment. Beneficial or desired clinical results include, but are not limited to, alleviation of one or more symptom(s), diminishment of extent of disease, stabilized (i.e., not worsening) state of disease, delay or slowing of disease progression, amelioration or palliation of the disease state, remission (whether partial or total), and/or decreased mortality, whether detectable or undetectable. The term "treatment" of a disease also includes providing relief from the symptoms or side-effects of the disease (including palliative treatment).

As used herein, the term "administering," refers to the placement of a therapeutic or pharmaceutical composition as disclosed herein into a subject by a method or route which results in at least partial delivery of the agent at a desired site. Pharmaceutical compositions comprising agents as disclosed herein can be administered by any appropriate route which results in an effective treatment in the subject.

As used herein, the term "cancer" refers to a hyperproliferation of cells that exhibit a loss of normal cellular control that results in unregulated growth, lack of differentiation, local tissue invasion, and metastasis. Methods and compositions described herein are mainly directed at the treatment of solid tumors formed by cancer cells. These include carcinomas, sarcomas, lymphomas and myelomas, and brain and spinal cord cancers. Leukemias, or cancers of blood cells, do not form solid tumors.

The terms "chemotherapeutic agent" or "chemotherapy agent" are used interchangeably herein and refer to a chemical agent (e.g., a small molecule or other chemical agent) used in or useful for the treatment of cancers and neoplasms. In some embodiments, a chemotherapeutic agent can be in the form of a prodrug which can be activated to a cytotoxic form. Chemotherapeutic agents are commonly known by persons of ordinary skill in the art and are contemplated for use with the compositions and methods described herein, e.g., as combination therapeutics.

As used herein, the term "immunomodulatory" refers to an agent that modulates (increases, decreases, suppresses or potentiates) one or more activities or functions or cells of the immune system. An immunomodulator can modulate the activity of the innate immune system, the adaptive immune system, or both.

An "immunomodulatory polypeptide" is a polypeptide that has immunomodulatory activity. Non-limiting examples include cytokines, immune checkpoint molecules (checkpoint receptors and ligands therefor), antibodies or other polypeptides that specifically bind to and, for example, interfere with receptor: ligand interactions, mimic a ligand (e.g., activating antibodies), bind a ligand (e.g., a soluble receptor, an antibody), etc. to modulate activities or functions or cells of the immune system. In some embodiments, an immunomodulatory polypeptide acts via binding to a receptor—that is, a receptor-mediated immunomodulatory polypeptide.

It is acknowledged that some factors, such as IFNβ, among others, can have both receptor-mediated cell death-inducing activity and immunomodulatory activity, e.g., by affecting activities of cells of the immune system. In some embodiments of the methods and compositions described herein, the receptor-mediated cell death-inducing polypeptide and the immunomodulatory polypeptide are different factors.

A "receptor-mediated cell-death-inducing polypeptide" as used herein refers to a polypeptide that binds to and activates signaling by a receptor in or on a cell that induces a cell death program in the cell. In one embodiment, the cell death program is an apoptotic cell death program. Non-limiting examples include: tumor necrosis factor-related apoptosis-inducing ligand (TRAIL), which binds death receptors DR4 and DR5 to activate FADD (Fas-associated protein with death domain)-dependent apoptosis; and Interferon β (IFNβ), which binds and signals through the Interferon α/β receptor (IFNAR).

As used herein, a "heterologous inducible cell suicide system" is a system for selectively killing engineered cancer cells as described herein. Such systems involve the introduction of one or more heterologous nucleic acid sequences to the cancer cell that render the cell responsive to a cell death-inducing agent. The system is maintained in an inactive state until the inducing agent, e.g., a small molecule or other drug, is administered to the patient. Different configurations of heterologous inducible cell suicide systems include, but are not limited to one in which the cell is modified to express an enzyme that converts a non-toxic pro-drug to a toxic form, and one in which the cell is modified to contain a nucleic acid construct encoding a cell death inducing polypeptide under control of a genetic element inducible by a small molecule or other drug. Various embodiments of such systems are known in the art and/or described further herein below.

As used herein, the term "inducible" refers to a system that is substantially inactive until an inducing agent is provided. The term can refer, for example, to a gene or genetic element the expression of which is inducible by addition of a drug, such as a tetracycline- or doxycycline-inducible construct, or to a heterologous cell suicide system in which cell suicide is induced by the addition of a drug. By "substantially inactive" in the context of a heterologous inducible cell suicide system is meant that in the absence of the inducing drug, the inducible system maintains expression of the cell killing machinery at a level that permits the cell to remain viable, home to a tumor, and produce one or more therapeutic agents or polypeptides.

As used herein, the term "pro-drug" refers to a drug, e.g., a small molecule drug, that is not active for its intended indication until acted upon by one or more systems in the cell or body of a patient. For example, the 2'-deoxyguanosine analogue ganciclovir is not efficiently metabolized to its active DNA synthesis-inhibiting form in cells lacking certain viral thymidine kinase (TK) enzymes (e.g., HSV-TK, CMV-TK), but in cells expressing such thymidine kinase enzymes, the ganciclovir pro-drug is efficiently metabolized to ganciclovir triphosphate, which is a competitive inhibitor of dGTP incorporation into DNA, leading to cell death. Thus, cells engineered to express a thymidine kinase that promotes the conversion of ganciclovir to ganciclovir triphosphate (e.g., HSV-TK) will be susceptible to selective killing by administering or contacting with the ganciclovir oro-drug. Other pro-drugs and agents or enzymes that promote their conversion to active form are known in the art.

As used herein, the term "small molecule" refers to a chemical agent which can include, but is not limited to, a peptide, a peptidomimetic, an amino acid, an amino acid analog, a polynucleotide, a polynucleotide analog, an aptamer, a nucleotide, a nucleotide analog, an organic or inorganic compound (e.g., including heterorganic and organometallic compounds) having a molecular weight less than about 10,000 grams per mole, organic or inorganic compounds having a molecular weight less than about 5,000 grams per mole, organic or inorganic compounds having a molecular weight less than about 1,000 grams per mole, organic or inorganic compounds having a molecular weight less than about 500 grams per mole, and salts, esters, and other pharmaceutically acceptable forms of such compounds.

As used herein, the term "promotes an anti-tumor immune response" means that a given treatment induces one or more activities of the innate or adaptive immune system that either directly or indirectly kills or suppresses the establishment or growth of a tumor, including but not limited to a metastatic tumor. In methods and compositions as described herein, an anti-tumor immune response can be in addition to an anti-tumor effect mediated by a receptor-mediated cell death inducing polypeptide. In one embodiment, anti-tumor immune response can include killing or suppression of the growth or establishment of new tumors, including metastases. In another embodiment, an anti-tumor immune response and can include killing or suppression of the growth or establishment of new primary tumors. An anti-tumor immune response can be detected or measured in a manner as known in the art or, for example, as described herein.

According to the methods described herein, including, without limitation, methods of treating cancer, methods of inhibiting metastases and methods of inducing an anti-tumor immune response, it should be understood that in one embodiment, the engineered tumor cells can be autologous to the individual to be treated. In another embodiment, the engineered tumor cells can be syngeneic to the individual to be treated. Where syngeneic cells are used, the methods can benefit from the use of engineered tumor cells that are of the same or substantially the same tumor type as the tumor(s) of the subject to be treated. Such cells tend to home to the sites of primary and metastatic tumors in the treated subjects, and thereby deliver tumor cell-death inducing/metastasis inhibiting factor(s) and/or factors that induce an anti-tumor immune response to the site of the tumor(s).

As used herein, the genetically modified tumor cells can be used "off the shelf" to treat individuals with e.g. melanoma with genetically modified cells autologous to the individual. Similarly, genetically modified tumor cells can be used that are non autologous to the individual.

The singular terms "a," "an," and "the" include plural referents unless context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The abbreviation, "e.g." is derived from the Latin exempli gratia, and is used herein to indicate a non-limiting example. Thus, the abbreviation "e.g." is synonymous with the term "for example."

Other terms are defined within the description of the various aspects and embodiments of the technology in the following.

BRIEF DESCRIPTION OF THE DRAWINGS

FIG. 1A describes glioblastoma (GBM) tumor cell lines for CT2a engineered to express GMCSF that were engineered with a Cas9 system. Western blots show Cas9 expression in comparison to non-Cas9 engineered controls labeled with Cas9-FLAG and a housekeeping control of β-actin. FIG. 1B represents gDNA analysis of CRISPR-engineered CT2a-GMCSF showing indel mutations in exonic part of IFNaR1 gene. FIG. 1B discloses SEQ ID NOS 48 and 49, respectively, in order of appearance. FIG. 1C shows that IFNaR1 knockout CT2a and G1261 clones are resistant to recombinant mouse IFNβ (left) and western blots of CT2a (wildtype) and mIFNaR1-KO CT2a after treatment with recombinant IFNβ (right). FIG. 1D represents a vector map of LV-IFNβ/zeo-HSV/TK (top) and 293 Ts engineered with LV-IFNβ/zeo-HSV/TK demonstrate dose-dependent reduction of cell-viability after GCV-treatment (bottom graph).

FIG. 2A details the concept to test if CT2a-IFNaR1-KO can be engineered with LV-IFNβ/zeo-HSV/TK. FIG. 2B shows the western blot of CT2a-IFNaR1-KO-GMCSF-mIFNb/TK supernatant in comparison to recombinant IFNβ (left) and CT2a-GMCSF-mIFNaR1KO engineered with LV-IFNβ/zeo-HSV/TK demonstrate dose-dependent reduction of cell-viability after GCV-treatment (right). FIG. 2C shows the autologous self-targeting efficacy of CT2a-GMCSF-mIFNb/TK against CT2a-FmC in vitro.

FIG. 3A represents the in vivo growth curves of CT2a-FmC and CT2a-GMCSFmIFNb/TK-FmC implanted in C57/BL6 mice FIG. 3B represents the in vivo growth curves of CT2a-GMCSF-mIFNb/TK-FmC implanted in SCID mice and treated with (GCV) or without (Control) GCV FIG. 3C represents the perecent survival of SCID mice up to 60 days post-implantation.

FIG. 4A describes the experimental design.

FIG. 4B shows the survival curve of CT2a-FmC implanted in C57BL/6 (control) or CT2a-GMCSF-mIFNb/TK implanted in SCID mice and treated with and without GCV. FIG. 4C shows the follow up of immunized mice from (A) demonstrating that mice that did not grow tumors after CT2a-GMCSF-mIFNb/TK-FmC implantation were resistant to Re-challenge with CT2a-FmC (n=5)

FIG. 5A represents the experimental design. FIG. 5B shows that mice bearing established CT2a-FmC tumors underwent fluorescence microscopy guided intracranial tumor resection followed by either implantation of sECM encapsulated $1\times10^6$ CT2a-IFNaR1-KO-GFP (Control, n=5) or CT2a-GMCSF-mIFNβ/TK (n=7) cells into the resection cavity. Mice were followed via BLI imaging. FIG. 5C shows the follow up of immunized mice from FIG. 5A demonstrating that mice that did not grow tumors after CT2a-GMCSF-mIFNβ/TK-FmC implantation were resistant to re-challenge with CT2a-FmC.

FIG. 6A. Allogeneic approach: Cancer cells, resistant to receptor-targeted therapies can be used "off-the-shelf" for delivery of receptor ligands towards allogeneic cancers with ligand-sensitive phenotypes in settings of primary treatment. Co-engineering with a prodrug-activatable suicide-system (HSV-TK, TK), therapeutic cancer cells can be timely eliminated post therapy using Ganciclovir (GCV). FIG. 6B. Autologous approach: Cancer cells, harvested from patients during first-time surgery and identified as sensitive to receptor-targeted therapies can be CRISPR-engineered to knockout target receptors. Receptor knockout leads to therapy resistance and allows engineering with receptor ligands and delivery towards autologous self-tumor sites in recurrent settings. Co-engineering with a prodrug-activatable suicide-system (HSV-TK, TK) allows timely elimination of therapeutic cancer cells post therapy. FIG. 6C. Panel of primary and metastatic cancer cell lines treated with different receptor-targeted molecules (n=3). FIG. 6D. Cancer cell lines were titrated with TRAIL to identify TRAIL-resistant and -sensitive lines. TRAIL-sensitive cancer lines are potentially suitable for autologous "self-targeting" (left panel), while TRAIL-resistant cancer lines could be used to create allogeneic "off-the-shelf" therapies for HLA-matched patients with primary TRAIL-sensitive tumors (right panel) (n=3 technical replicates). All in-vitro experiments were repeated at least twice. Means±SD are shown. P-values by unpaired t-test. P≤0.01, *P≤0.001 technical replicates).

FIG. 7A. Concept of "off-the-shelf" approach: receptor-ligand (RTL)-resistant tumor cells can be engineered to secrete RTL, which can induce cell death in RTL-sensitive allogeneic cancer cells. FIG. 7B. Cell viability of DRL-sensitive sGBMi-FmC cells during time-course coculture with DRL-resistant cancer cell lines (rGBMi1 or rGBMi2) expressing secretable DRL S-TRAIL (n=3 technical replicates). FIG. 7C. Caspase 3/7 activity of sGBMi-FmC 8 h after start of coculture with S-TRAIL expressing rGBMs (n=2 technical replicates). FIG. 7D. Western blot analysis of PARP and Caspase 8 cleavage and α-tubulin of DRL-sensitive sGBMi-FmC 8 h post start of coculture with either GFP or S-TRAIL expressing rGBMs. FIG. 7E-F. In vitro cell viability (E, n=3 technical replicates) and (F) in vivo growth of DRL-resistant cancer cells (rGBMi2) co-engineered with pro-drug converting enzyme HSV-TK and GFP-fluc (GF1) in the absence or presence of GCV over time (n=5 per group). FIG. 7G. PET-based monitoring of in vivo fate of rGBMi2 co-engineered with S-TRAIL and HSV-TK (rGBMi2-ST-TK) with and without GCV treatment (n=3 mice per group). FIG. 7H. Evaluation of bystander effect of rGBMi2-ST-TK cells on cocultured sGBMi-FmC cells over time (n=3 technical replicates). FIG. 7I. $5\times10^5$ sGBMi2-GFP cells were implanted at 1.5 mm distance from established sGBMi-FmC tumors. Representative fluorescence photomicrograph shows cells populations 2 weeks post injection of sGBMi2-GFP (n=2 mice). FIG. 7J. Experimental outline for testing efficacy of rGBMi2-ST-TK in mice bearing intracranial sGBMi-FmC tumors. Estimate of relative tumor volume in treatment groups based on Fluc signal of sGBMi-FmC bearing mice (left) and respective Kaplan-Meier survival curves (right); (n=3 for PBS, n=5 for rGBMi2-GFP and n=6 for rGBMi2-ST-TK+GCV). All in-vitro experiments were repeated at least twice. Scale bars, 200 µm. Means±SD are shown for in vitro and means±SEM are shown for in vivo experiments. P-values by unpaired t-test (B,C) or Mantel-Cox (log-rank) test (J), *P≤0.05, ***P≤0.001.

FIG. 8B. Western blot analysis of DRL-sensitive tumor lines transduced with doxycycline-inducible FLAG-Cas9 or constitutively expressed FLAG-Cas9 (sBCm) constructs blotted for FLAG and total ERK. FIG. 8C. Single clone western blot analysis of CRISPR-targeted DR4, DR5 and total ERK expression in sGBMn. FIG. 8D. Flow cytometry analysis of DR4 and DR5 surface expression of wild type and KO clones identified in FIG. 8C. FIG. 8E. FIG. 8E discloses SEQ ID NOS 50, 68, 51-54, 69 and 55-57, respectively, in order of appearance. Single clone sequencing of genomic DNA from wild type and KO sGBMn clones identified in FIG. 8C. FIG. 8E. Titration of DR KO clones with DRL TRAIL (n=3 technical replicates). FIG. 8G. Western blot analysis of PARP and Caspase 8 cleavage and total ERK of DR wild type (sGBMn-FmC, sGBMn-Cas9, sGBMnRec-FmC) and DR single or double KO clones identified in (C) 8 h after treatment with DRL TRAIL. FIG. 8H. Western blot analysis of DR4, DR5 and total ERK expression in other DR-KO CRISPR-engineered tumor cell lines.

FIG. 9A. Strategy for the establishment of autologous recurrent glioblastoma models using in vivo TMZ treatment. FIG. 9B. Effect of in vivo TMZ treatment on intracranial growth of nodular (sGBMnRec-FmC) and invasive (sGBMiRec-FmC) tumors as monitored by BLI imaging (n=1 each). FIG. 9C. Recurrent tumor lines established in FIG. 9B and their respective primary lines were titrated with TMZ (left panel) and DRL TRAIL (right panel) to identify differences in their sensitivity to TMZ and TRAIL treatment (n=3 technical replicates each). FIG. 9D. Representative photomicrographs (top panel) and assessment of viability (bottom panel) of DRL-sensitive sGBMnRec-FmC or sGBMiRec-FmC cocultured with their respective autologous TRAIL-secreting cell lines or autologous GFP-transduced controls (n=3 technical replicates). Scale bars, 200 µm. FIG. 9E. GCV titration of DR4/5 knockout cancer lines engineered with or without prodrug-converting suicide-system HSV-TK in vitro (n=3 technical replicates). All in-vitro experiments were repeated at least twice. Means±SD are shown. P-values by unpaired t-test. P≤0.01, *P≤0.001.

FIG. 10A. Photomicrograph time-course of synthetic extracellular matrix (sECM)-encapsulated S-TRAIL secreting rGBMnDR4/5-ST-TK cocultured with their autologous DR wild type parental cells (sGBMnRec-FmC). FIG. 10B. rGBMnDR4/5-ST-TK were engineered with GF1. Graph on the left shows in vitro correlation of Fluc-Signal with cell number. rGBMnDR4/5-ST-TK-GF1 were encapsulated in sECM followed by intracranial implantation into SCID mice. Graph on the right shows Fluc-Signal of rGBMnDR4/5-ST-TK-GF1 before and after GCV treatment (n=2 mice). FIG. 10C. Experimental outline for testing efficacy of sECM-encapsulated rGBMnDR4/5-ST-TK in mice with intracranially resected sGBMnRec-FmC tumors. Photomicrographs show light and fluorescence photos of intact and resected intracranial tumors after implantation of therapeutic cells. Bar graph on the right shows change of mean tumor volume estimated on the basis of Fluc signal pre and post resection (n=28). Estimate of relative tumor volume post resection in treatment groups based on Fluc signal intensity of sGBMnRec-FmC bearing mice (left). Kaplan-Meier survival curves (right), (Control n=4, Resection alone n=4, rGBMnDR4/5-ST-TK-GCV n=11, rGBMnDR4/5-ST-TK+GCV n=13). Representative HE stained sections and immunofluorescence microphotographs of non-resected control vs. resected sGBMnRec-FmC tumors treated with therapeutic rGBMnDR4/5-ST-TK with and without GCV. FIG. 10D. Experimental outline for testing efficacy of rGBMiDR4/5 (Control) or rGBMiDR4/5-ST-TK in mice bearing intracranial sGBMiRec-FmC tumors. Middle: Estimate of relative tumor volume in treatment groups based on Fluc signal of sGBMiRec-FmC bearing mice (left) and respective Kaplan-Meier survival curves (right), (rGBMiDR4/5 n=7; rGBMiDR4/5-ST-TK-GCV n=9, rGBMiDR4/5-ST-TK+GCV n=8). Immunofluorescence microphotograph of sGBMiRec-FmC bearing mice injected with rGBMiDR4/5-ST-TK (no GCV treatment). FIG. 10E. Top: Experimental outline for testing efficacy of rBCmDR4/5-ST-TK injected via the internal carotid artery in mice bearing intracranial sBCm-RmC tumors. Estimate of relative tumor volume increase based on Rluc signal intensity of sBCm-RmC bearing mice (left) and respective Kaplan-Meier survival curves (right; PBS: n=3, rBCmDR4/5-ST-TK-GCV n=3, rBCmDR4/5-ST-TK+CGV n=4). Scale bars, 200 µm. Means±SEM are shown. P-values by unpaired t-test (C, top) or Mantel-Cox (log-rank) test (survival curves), *P≤0.05, P≤0.01, **P≤0.0001.

FIG. 11A. Experimental outline: 5×105 sGBMiRec-FmC cells were implanted into the right hemisphere of SCID mice followed by injection of 5×105 rGBMiDR4/5-GFP cells at 1.5 mm distance laterally 3 days later. Mice were harvested at days 1, 7, 14 and 28 post rGBMiDR4/5-GFP implantation (n=2 each time point) to assess migration of CRISPR-engineered rGBMIDR4/5-GFP cells towards the sGBMiRec-FmC self-tumor site. FIG. 11B. Representative fluorescence microphotographs showing location of sGBMiRec-FmC (red) and rGBMiDR4/5-GFP (green) tumor cell populations at above outlined time-points. The dashed line was placed adjacent to the established rGBMiDR4/5-GFP implantation site in order to facilitate quantification of migration towards the established sGBMiRec-FmC tumor site. Red box marked in photomicrograph of day 28s magnified in (FIG. 11C). Magnified fluorescence microphotographs from day 28. Scale bar, 100 µm. FIG. 11D. Quantification of rGBMiDR4/5-GFP migration towards sGBMiRec-FmC tumor site at different time points based on rGBMiDR4/5-GFP cell count from left part of (FIG. 11B), excluding non-migratory established tumor site shown to the right of dashed line. Means±SD are shown.

FIG. 12A. RT-PCR for DR4 and DR5 expression of death receptor ligand (DRL) sensitive (sGBMi) and resistant (rGBMi1-3) cancer cell lines. GAPDH served as loading control (n=3 technical replicates). FIG. 12B. DRL-resistant cancer lines rGBMi1 and rGBMi2 engineered with a fusion variant of S-TRAIL with the optical reporter *Renilla* luciferase (Rluc(o), RI) demonstrate continued secretion of S-TRAIL into culturing medium over time (n=3 technical replicates). Scale bars, 200 µm. FIG. 12C. Coculture of rGBMi1-R1-ST or rGBMi2-R1-ST with sGBMi-FmC decreases cell viability of sGBMi-FmC over time (n=3 technical replicates).

FIG. 13A. Death receptor ligand (DRL)-sensitive tumor cell lines were engineered to express Cas9. RT-PCR of sGBMn-Cas9 treated with and without doxycycline for induction of Cas9 expression in comparison to GAPDH. FIG. 13B. DRL-sensitive cancer cell lines (sGBMn; sBCm) were engineered with Cas9 targeting DR. Populations of sGBMn and sBCm engineered with different Cas9-SgRNA targeting vectors were then screened for DR4 and DR5 expression relative to control using western blotting. Total ERK or α-tubulin served as loading controls. FIG. 13C. Cell populations engineered with Cas9-SgRNA targeting vectors that showed a marked reduction in DR4/5 expression in (B) were subcloned, and single clones were analyzed by sequencing of genomic DNA to identify indel mutations at targeted DNA sites (here showing rBCmDR4/5 double KO clone). As a result of DR4/5 knockout previously DRL-sensitive cells change their DRL-sensitivity phenotype, become resistant to DRL (rBCm) and can be engineered to secrete DRL TRAIL. FIG. 13C discloses SEQ ID NOS 50, 68, 70, 54, 69 and 71, respectively, in order of appearance.

FIG. 14A. Cancer cell lines were engineered with lentiviral Fluc-mCherry (FmC) or Rluc-mCherry (RmC) constructs to allow simultaneous fluorescence and bioluminescence imaging. Graphs show correlation of Fluc signal intensity with number of cells plated per well (n=3 technical replicates). Means±SD are shown. FIG. 14B. Western blot of cell lysates demonstrating S-TRAIL expression from DR4/5 double knockout cancer cell clones (rGBMnDR4/5-ST and rBCmDR4/5-ST) in comparison to GFP-transduced controls (sGBMn-GFP, sBCm-GFP). Total ERK served as loading control. FIG. 14C. Dot blot analysis of conditioned medium harvested 48 hours after plating and immunoprobed with anti-TRAIL.

FIG. 16A. Concept of autologous cancer cell self-targeting and prodrug-induced elimination/bystander effect in various scenarios of self-targeted treatments. FIG. 16B. In vitro assay reflecting the right part of the cartoon shown in FIG. 16A. Therapeutic DR4/5 knockout cancer line rGBMnDR4/5 engineered with S-TRAIL and HSV-TK demonstrates self-targeting efficacy against DRL-resistant self-cells only via bystander, but not via TRAIL effect (n=3 technical replicates). Scale bar indicates 200 μm.

DETAILED DESCRIPTION

Figure 1A:
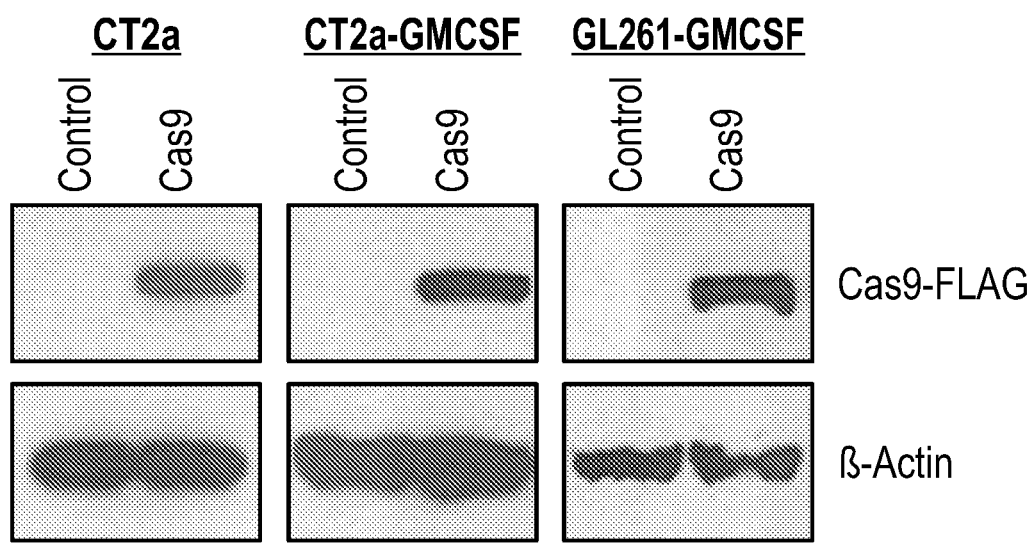
FIGS. 1A-1D describes CRISPR gene editing approaches that make tumor cells resistant to IFNβ.
Figure 1B:
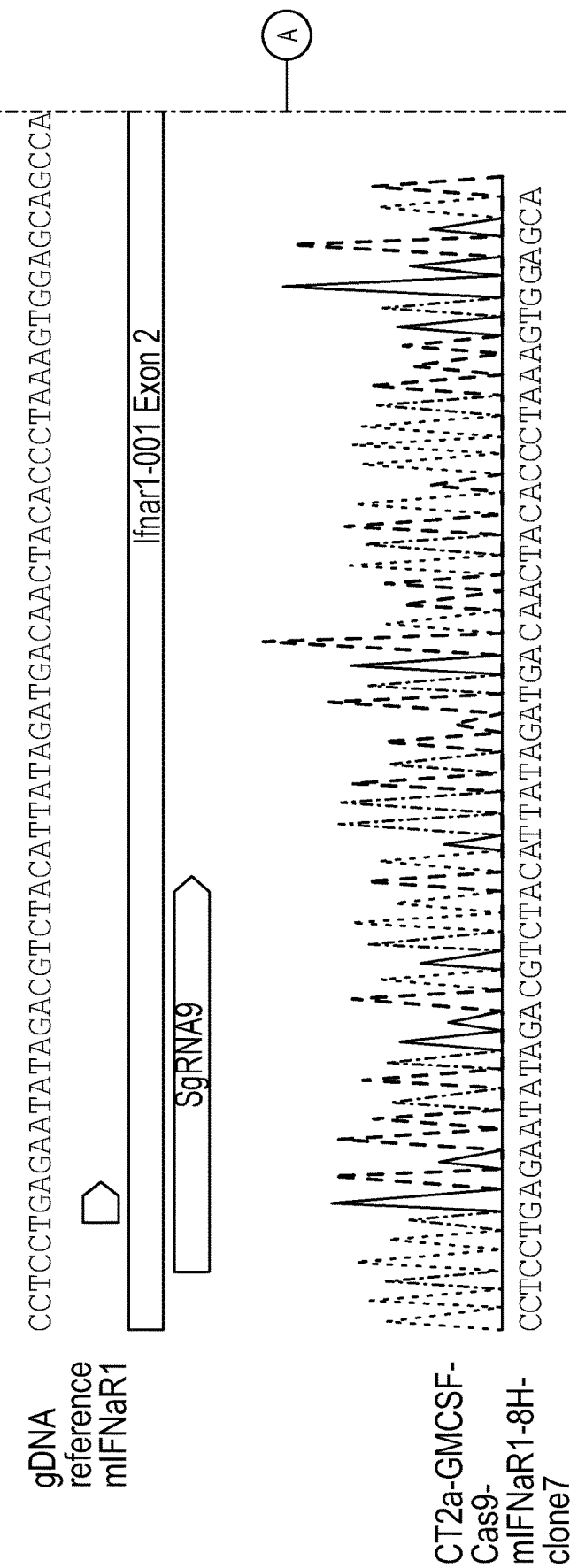
Figure 1B:
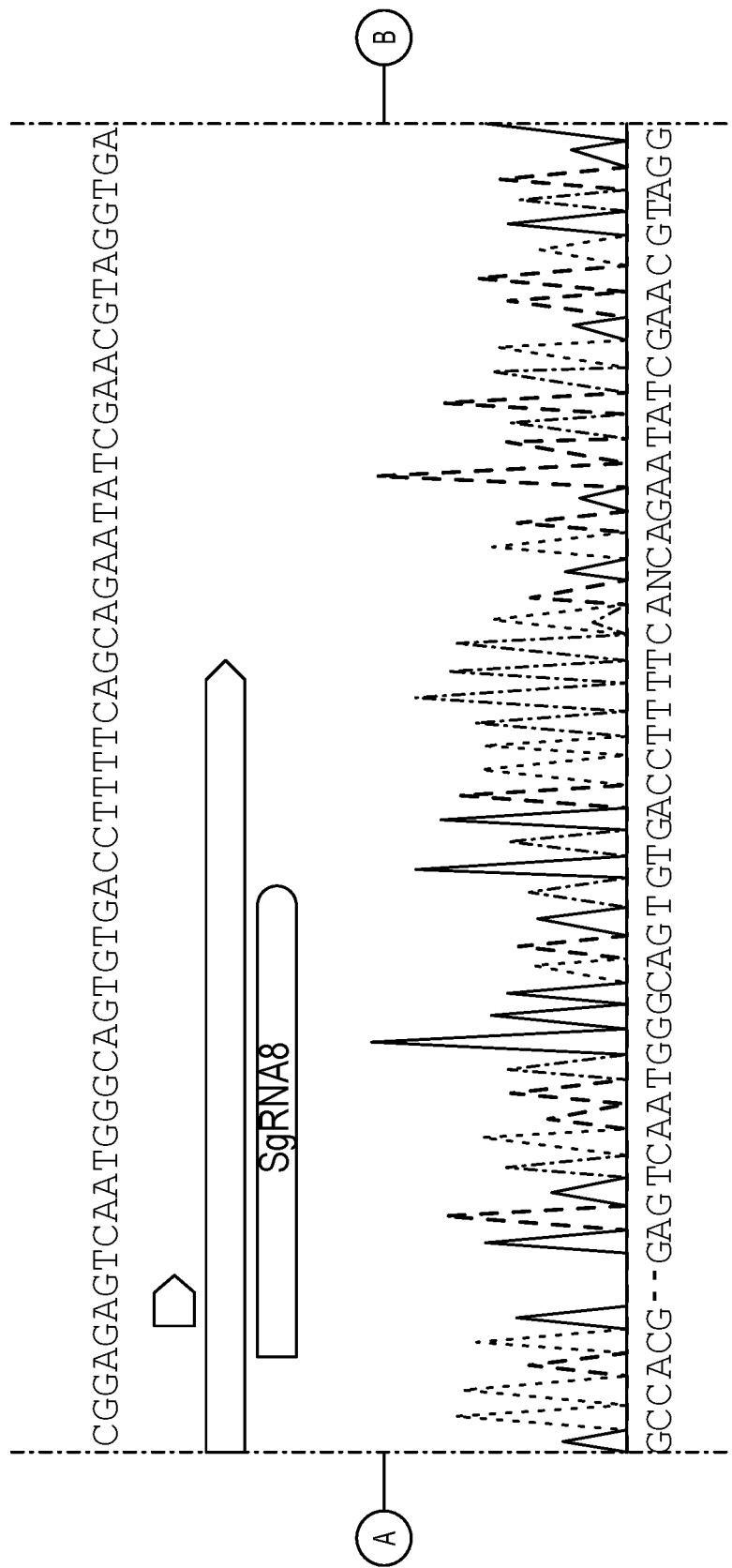
Figure 1B:
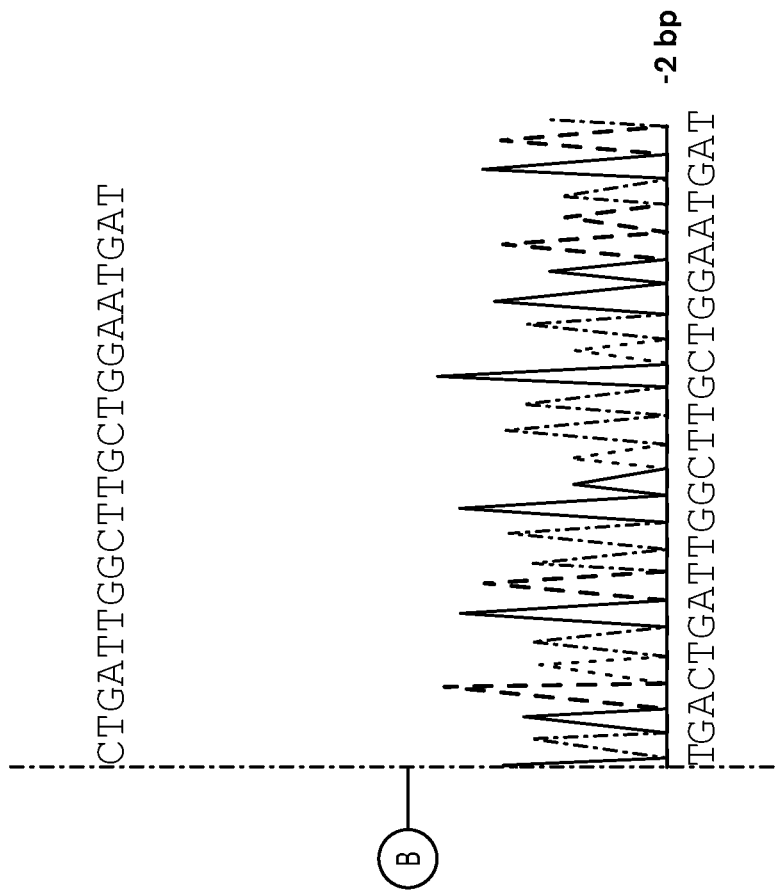
Figure 1C:
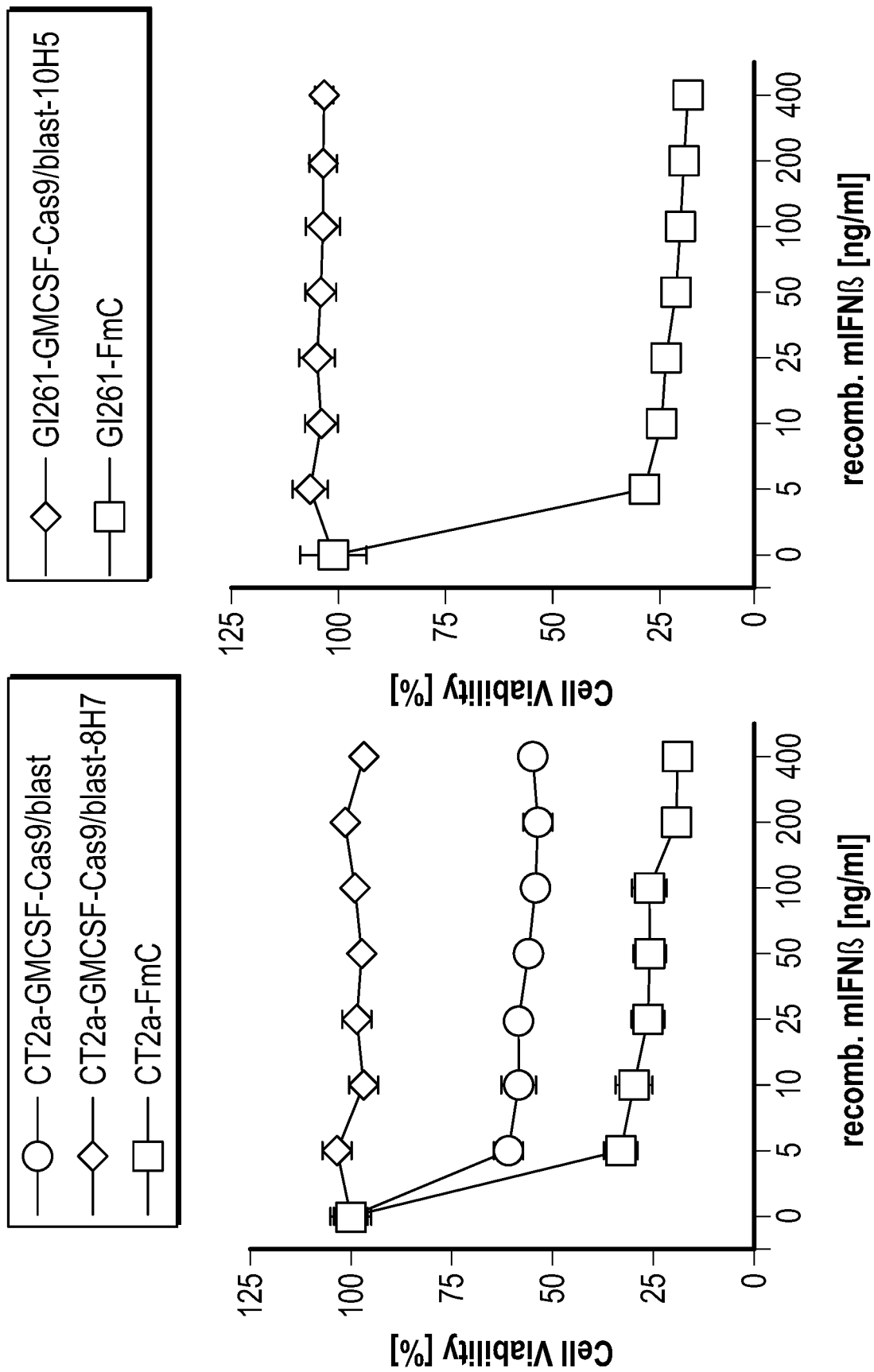
Figure 1D:
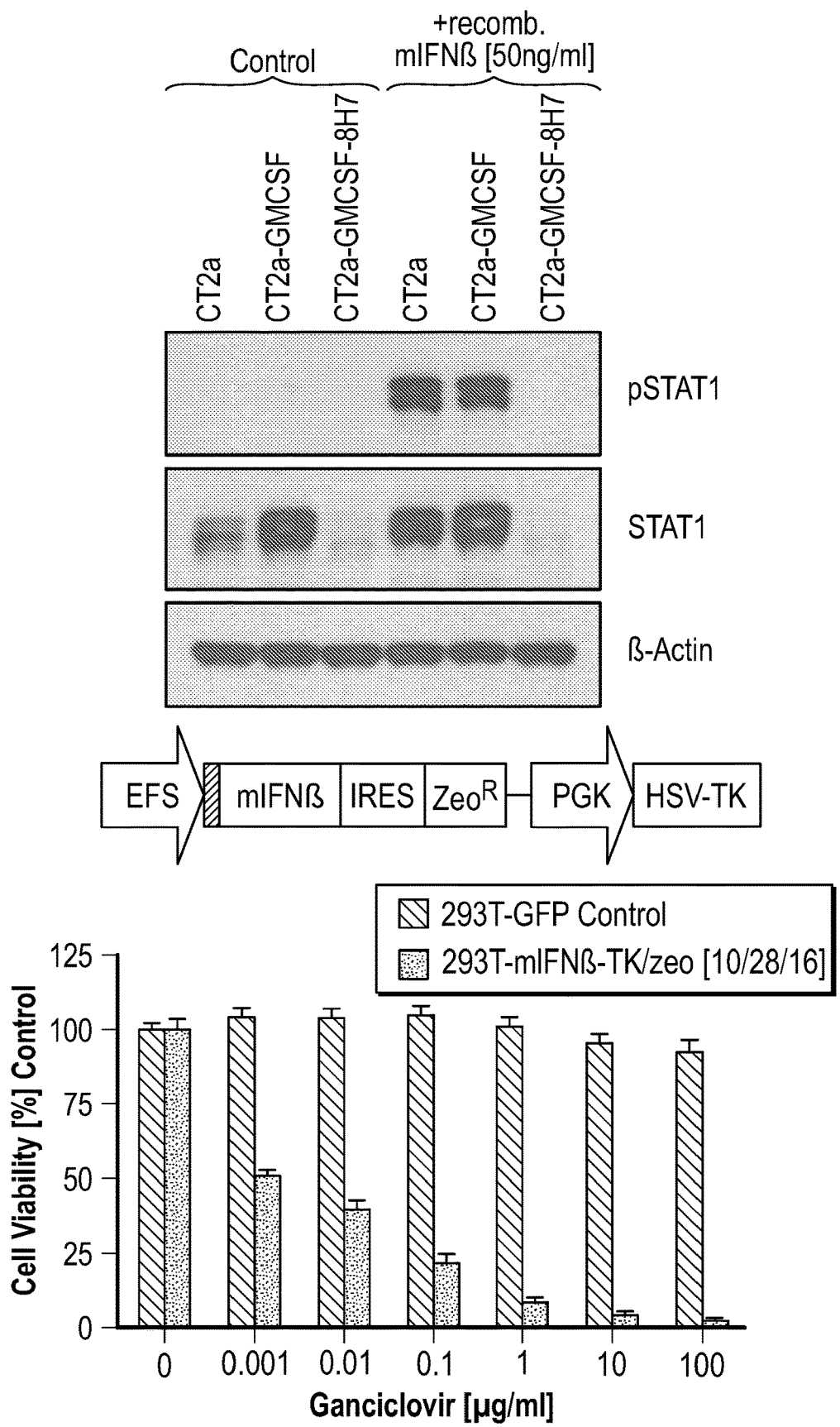

Combined advances in the fields of biomedical research, drug development, medical imaging, and surgical techniques have translated into considerably improved outcomes of cancer therapies over the last few decades. The resulting impact of therapy improvement on even highly malignant tumors, which had previously been considered "untreatable," including lung cancer and melanoma, has recently led to excitement in the medical and scientific oncology fields. Nevertheless, numerous local and systemic cancer types, as well as many forms of metastatic disease, remain ultimately fatal, and treatment regimes in end-stage disease, especially in the recurrent setting, often lack evidence-based guidelines. One of the major treatment hurdles of advanced-stage cancer is localized and distant tumor cell metastasis, following vascular infiltration or penetration of anatomic boundaries.

The technology described herein is based, in part, on the surprising discoveries that tumor cells can be engineered to kill tumor cells and to provide a tumor or cancer vaccine effect. Where it can be difficult, for example, to find and target small metastases, this approach provides a seek- and -destroy aspect that exploits the innate homing of administered tumor cells to the sites of tumors in vivo. Traditionally, metastatic models describe metastasis as a unidirectional process, whereby cancer cells leave a primary tumor and unidirectionally seed metastasis in regional lymph nodes or distant sites. By contrast, recent data indicate that metastasis is a multidirectional process whereby cancer cells can seed distant sites as well as the primary tumor itself, a capacity referred to as "self-seeding." This process involves cell dissemination into the vascular system away from the primary or metastatic tumor, followed by the cells rehoming to the site of origin. In one sense, this would appear to be a function of metastatic cells essentially "recognizing" that the primary tumor is a good environment for further growth—clearly, the conditions that permitted the primary tumor to grow are conducive for the growth of the metasttic cells too. The exact factors involved in the re-seeding or homing process have not yet been elucidated, but studies suggest that in addition to leaky primary tumor vasculature with impaired barrier function, cytokine-receptor interactions between the primary tumor and circulating cancer cells may play a major role.

Tumor cells from a cancer patient can be modified ex vivo to produce one or more factors that promote cell death in tumors in vivo when the engineered tumor cells are introduced to that patient or to another who has cancer. The observed vaccine effect, which involves promotion of an anti-tumor immune response that can help to prevent the recurrence of a cancer and/or help to eradicate tumors present at the time treatment with the engineered cells is begun, provides an additional benefit. As a further feature of engineered cancer cells as described herein, the therapeutic cells carry a heterologous inducible cell suicide system that permits the eradication of the engineered cells themselves after they have performed their service.

Accordingly, in one aspect, described herein are compositions and methods relating to the genetic modification of tumor cells to both express a receptor-mediated cell death-inducing polypeptide and to knock out or inactivate the engineered cell's receptor(s) for the receptor-mediated cell death inducing polypeptide. Such cells are not killed in an autocrine manner by the cell death-inducing polypeptide, and can home to the sites of tumors in vivo, where the receptor-mediated cell death-inducing polypeptide kills such tumors. In another aspect, described herein are compositions and methods relating to the genetic modification of tumor cells to express a receptor-mediated cell death-inducing polypeptide, knock out or inactivate the engineered cell's receptor(s) for the receptor-mediated cell death inducing polypeptide, and to express an immunomodulatory polypeptide that acts to promote an anti-tumor immune response. Because the methods described herein involve the introduction of cancer cells that are, despite the genetic modifications, still nonetheless cancer cells, the engineered cells according to both of these aspects are further engineered to have a "kill switch," i.e., a heterologous inducible cell suicide system that permits targeted killing of the modified cells by administering an agent that induces the cell suicide system.

The ability of such genetically modified tumor cells to home to and specifically kill tumor cells, and the ability to immunize the host against recurrence provides a powerful tool that can be used to treat autologous as well as syngeneic tumors. The following provides description of the various considerations involved in the preparation and use of genetically modified tumor cells for the treatment of cancer.

Tumor Cells

As a first matter, the compositions and methods rely upon cancerous tumor cells isolated from an individual with cancer. Such isolated tumor cells can be placed in culture to permit the genetic modifications necessary to subvert them to become hunter-killer cancer cells. Essentially all metastatic tumor types have the capacity for self-homing or re-seeding and are thus contemplated for treatment using the methods and compositions described herein.

It is contemplated that tumor cells from cancers including the following non-limiting types of cancer can be manipulated to treat cancer as described herein: basal cell carcinoma, biliary tract cancer; bladder cancer; bone cancer; brain and CNS cancer; breast cancer; cancer of the peritoneum; cervical cancer; choriocarcinoma; colon and rectum cancer; connective tissue cancer; cancer of the digestive system; endometrial cancer; esophageal cancer; eye cancer; cancer of the head and neck; gastric cancer (including gastrointestinal cancer); glioblastoma (GBM); hepatic carcinoma; hepatoma; intra-epithelial neoplasm; kidney or renal cancer; larynx cancer; liver cancer; lung cancer (e.g., small-cell lung cancer, non-small cell lung cancer, adenocarcinoma of the lung, and squamous carcinoma of the lung); lymphoma including Hodgkin's and non-Hodgkin's lymphoma; melanoma; myeloma; neuroblastoma; oral cavity cancer (e.g., lip, tongue, mouth, and pharynx); ovarian cancer; pancreatic cancer; prostate cancer; retinoblastoma; rhabdomyosarcoma; rectal cancer; cancer of the respiratory system; salivary gland carcinoma; sarcoma; skin cancer; squamous cell cancer; stomach cancer; testicular cancer; thyroid cancer; uterine or endometrial cancer; cancer of the urinary system; vulval cancer; as well as other carcinomas and sarcomas.

Solid tumors can be found in bones, muscles, the brain, or organs, and can be sarcomas or carinomas. Where the technology described herein can overcome barriers to solid tumor treatment, including, but not limited to barriers to treatment or inhibition of metastases, it is contemplated that aspects of the technology described herein can be used to treat all types of solid tumor cancers, including cancers not listed in the instant specification.

Methods that can be used to isolate tumor cells for use in the methods and compositions described herein are known in the art and/or described herein. In general, the methods include acquisition of the tumor tissue, whether from a biopsy or from resected tumor tissue, followed by dissociation of the tumor tissue to a suspension of cells and placement of the cells in culture. The process is described for a number of different tumor types by, e.g., Kodack et al., Cell Rep. 2017 Dec. 12; 21(11): 3298-3309, which is incorporated herein by reference in its entirety.

There are different approaches to isolate tumors in a tissue specific manner including, summarized in Table 1.

TABLE 1

Methodologies of tumor collection from different organs.

| Organ | Tumor specimen collection methods |
| --- | --- |
| Liver | Segmental or lobar Resection |
| Lung | Thoracotomy, Lobectomy, Pneumonectomy |
| Brain | Crainotomy |
| Breast | Lumpectomy, wide local excision, Mastectomy-subcutaneous, Halsted radical, extended radical |
| Bone | Amputation |
| Kidney | Radical nephrectomy |
| Prostate | Radical perineal prostatectomy, cystoprostatectomy, transurethral resection |
| Colon | Hemicolectomy- right or left and transverse colectomy |

Methods for Tumor Dissociation

Methods for dissociating tumors into separated or suspended cells include, but are not limited to enzymatic digestion, chemical dissociation, mechanical dissociation and combinations thereof.

Enzymatic Dissociation

In various embodiments, enzymatic dissociation can be used to isolate tumor cells from tumor tissue. Enzymatic digestion can be used to digest minced tumor tissue into a single-cell suspension. Various enzymes can be used for tumor dissociation including, for example, trypsin, papain, elastase, hyaluronidase, collagenase, pronase and deoxyribonuclease (see, e.g. Mitra et al., Trends Biotechnol. 2013 June; 31(6): 347-354). Combinations of such enzymes can also be used where beneficial.

TABLE 2

Examples of enzymes suitable for dissociating cells from solid tumors.

| Enzyme | Specificity | Organs |
| --- | --- | --- |
| Collagenase | Peptide bonds in collagen | Intestine, liver, colon and kidney. |
| DNase | Hydrolytic cleavage of phosphodiester bond of DNA | Liver, lung, colon and kidney. |
| Hyaluronidase | Hydrolysis of hyaluronan in extracellular matrix | Liver and kidney. |
| Trypsin | Cleaves carboxyl side of lysine or arginine | Brain, epidermis, kidney and lung. |
| Pronase | Contains 10 proteolytic enzymes with broad specificity | Liver, kidney, colon and heart. |
| Papain | Cleaves cysteine residues. | Muscle |
| Elastase | Cleaves carboxyl side of glycine, alanine and valine | Heart and lung |

Chemical Dissociation

In various embodiments, chemical dissociation can be used to isolate tumor cells from tumor tissue. Chemical dissociation sequesters ions that stabilize intercellular bonds, e.g., intercellular bonds between epithelial cells. For example, various cations (e.g. $Ca^{2+}$ and $Mg^{2+}$) help to maintain cell surface integrity and the intracellular structural matrix. Compounds that sequester or chelate such cations, such as EDTA, EGTA or complexes of tetraphenylboron plus potassium ions can be used, e.g., to dissociate liver tissue, intestinal crypt cells and solid mammary tissue. Such compounds can assist in dissociating tumor cells from tumor tissue as well. In addition to chelation, hypertonic solutions of disaccharides (e.g. sucrose, maltose, lactose, and cellobiose) can also be used to split gap junctions and zona occludentes.

Mechanical Dissociation

In various embodiments, mechanical dissociation can be used to isolate tumor cells from tumor tissue. Mechanical dissociation of tissue includes e.g. repeated mincing with scissors or sharp blades, scraping the tissue surface, homogenization, filtration through a nylon or steel mesh (50 to 100 μm opening), vortexing, repeated aspiration through pipettes or sequentially smaller needles (e.g., 16-, 20-, and 23-gage), application of abnormal osmolarity stress, or any combination of these techniques. Usually, tumor specimens are first minced into small pieces (~1 mm) and then washed in tissue-culture medium or buffered isotonic salt solution to remove loosely bound cells or non-specific debris by gentle agitation. Some form of mechanical dissociation is frequently employed in combination with enzymatic and/or chemical dissociation techniques.

Tumor Cell Culture

Isolated tumor cells, once separated from tumor tissue, are cultured using standard tissue culture techniques. Successful establishment can require addition of tissue-specific supplements, hormones and growth factors in the medium (see, e.g. those listed in Table 3). Such components are known to those of ordinary skill in the art. It is noted that where a hallmark of cancer is loss of certain tissue-specific growth restrictions, most cancer cells are easier to establish in culture than non-transformed primary cells. Further, one of the first steps to establishing a cell line from primary, non-transformed cells is immortalization, but cancer cells have generally already undergone an analogous process, such that they are often well adapted to growth in culture.

TABLE 3

Primary tumor cell culture supplements for tissues

| Organs | Essential supplements |
| --- | --- |
| Liver | HGF, EGF, FGF2, B27 dexamethasone and nicotinamide |
| Lung | EGF, Insulin, bFGF, apo- transferrin, sodium selenite, progesterone, glucose, HEPES and sodium bicrobonate |
| Brain | EGF, bFGF, LIF, NGF N-acetylcysteine |
| Breast | Bovine insulin, bFGF and EGF |
| Bone | Ascorbic acid, TGFβ1, β-glycerophosphate, dexamethasone |
| Kidney | EGF, Insulin, Transferrin, T3, Hydrocortisone, Epinephrine |
| Prostate | IL-6, FGF-6, IGFBP-2 |
| Colon | Glucose, putrescine, progesterone, insulin, sodium selenite, EGF, bFGF and transferrin. |

Genetically Modified Tumor Cells

The compositions and methods described herein provide genetically modified tumor cells. The modifications include introduction of an expression construct or sequences permitting expression of a receptor-mediated cell death-inducing polypeptide, with coordinate knock out of receptor(s) on the tumor cell for that death-inducing polypeptide, introduction of a heterologous inducible cell suicide system, and, in some embodiments, introduction of an expression construct permitting expression of an immunomodulatory polypeptide. The following describes receptor-mediated cell death-inducing polypeptides and their receptors, immunomodulatory polypeptides, heterologous inducible cell suicide systems and methods for introducing them to tumor cells. A further section describes approaches for knocking out or inactivating receptor expression so as to render modified tumor cells non-susceptible to the receptor-mediated cell death inducing polypeptide(s) they are modified to express. Regardless of the order of the other steps in the process, it should be clear that the step of knocking out or inactivating the receptor gene(s) should precede the step of introducing sequences that permit expression of the receptor-mediated cell death-inducing polypeptide Receptors and Receptor-Mediated Cell Death-Inducing Polypeptides Cell surface or other receptors that activate apoptotic pathways when engaged by ligand are known in the art, and any such receptor and their corresponding activating ligand can be adapted for use in the engineered tumor cells as described herein. Key considerations include that a patient's tumor must express the receptor for the cell death-inducing polypeptide that will be used to modify tumor cells into hunter-killers. That is, the tumor needs to express the receptor and be sensitive to the effects of receptor activation by a ligand. Expression of a receptor for a given factor can be determined, for example, via RT-PCR performed on the tumor's RNA using primers selected for the receptor(s) of interest. Alternatively, an immunoassay using antibodies that specifically recognize the receptor can be used to determine or demonstrate that the tumor expresses the receptor. The form of such assay can vary widely, such as Western Blotting, ELISA, or, for example, immunohistochemistry or contacting cultured tumor cells with fluorescently labeled receptor-specific antibodies and fluorescent detection of antibody binding. In one approach, a panel of receptor antibodies can be used to evaluate a given tumor for the expression of the appropriate receptor to target using engineered tumor cells as described herein.

A class of well-characterized receptors that trigger cell death when engaged includes members of the tumor necrosis factor (TNF) receptor superfamily (TNFRSF). The extrinsic apoptotic pathway classically begins with the binding of an appropriate ligand to a subset of TNFRSF members: the death receptors. See, e.g., Wilson et al., Nat Immunol. 10:348-355 (2009) and Haase et al., Curr. Opin. Neurobiol. 18:284-291 (2008). These transmembrane receptors, containing a conserved death domain, recruit the intracellular adaptor molecule FADD (Fas-associated protein with death domain), which in turn binds to and activates caspase-8, inducing the formation of DISC (death-inducing signaling complex), to initiate apoptosis. This pathway is regulated by cellular FLICE-like inhibitory protein (cFLIP), which is involved in the modulation of death signaling through interaction with procaspase-8 at DISC. Caspase activation is generally amplified by engagement of the mitochondrial intrinsic pathway through caspase-8 processing of Bid (BH3-interacting domain death agonist). Cleaved/truncated Bid (tBid) interacts with other Bcl-2 family members on the surface of the mitochondria, resulting in mitochondria outer membrane permeabilization, release of cytochrome c, and subsequent caspase-9 activation. Both caspase-8 and -9 cause downstream activation of the effector caspase-3. Members of the death receptor family include Fas, TNFR1 (tumor necrosis factor receptor 1), the TRAIL (TNF-related apoptosis-inducing ligand) death receptors 4 and 5 (DR4 and DR5), DR3 and DR6. Thus, while the examples described herein refer to particular receptor-mediated cell-death inducing factors or polypeptides, e.g., TRAIL, IFN-β, etc. it should be understood that the principles described herein for those factors are applicable to essentially any other receptor-mediated cell-death or apoptosis-inducing factors or polypeptides. That is, tumor cells can be engineered to express a cell death-inducing factor or polypeptide for which the tumor cell's own receptor is inactivated, e.g., by targeted mutation, e.g., by CRISPR or other RNA-guided endonuclease mutagenesis approaches. Non-limiting examples of such factors include, for example, Fas ligand, IFN-α, IFN-β, TNF-α and superfamily members, and apoptosis-associated tyrosine kinase (AATK). Receptors for these factors are known in the art and can be targeted for inactivation accordingly, and nucleic acid sequences encoding the factors (ligands) themselves are also known, permitting modification of the tumor cells to express the factor(s).

It is also contemplated that factors that do not directly induce tumor cell death, but that render tumors, for example, unable to respond to certain growth factors, e.g., epidermal growth factor (EGF), nerve growth factor (NGF), insulin-like growth factor 2 (IGF2), estrogen, vascular endothelial growth factor (VEGF), inducible T cell co-stimulator ligand (ICOSL), will also provide a therapeutic benefit. Thus, where a tumor overexpresses a growth-factor receptor, as is common for, e.g., EGF, it can be beneficial to knock out the receptor on the engineered tumor cells, and express an interfering antibody or fragment or derivative thereof (e.g., a nanobody, among others) that binds and inhibits function of the receptor from the engineered tumor cell. As but one example, tumor cells that overexpress EGFR can be modified to knock out EGFR expression and to express an anti-EGFR nanobody. When those cells home to tumors overexpressing EGFR, the nanobody will inhibit the function of the receptor on the tumor cells, rendering them less proliferative in response to EGF. Such inhibition can also render the tumor cells more susceptible to other anti-tumor approaches, including, but not limited to those that stimulate an immune response to the tumor, e.g., as described herein or as known in the art. Sequences for these and other growth factor receptors are known in the art.

It is also contemplated that an approach that targets more than one receptor on a tumor cell can provide benefit. For example, an engineered cancer cell can be modified to express a binding agent for a receptor that's overexpressed (or constitutively active) on a target tumor cell and to express a ligand for a receptor-mediated cell death inducing polypeptide (with concomitant knock-out of the receptor for the death-inducing ligand; the overexpressed receptor does not necessarily have to be knocked out, as its ligand does not necessarily kill the cell). Such a construct can, for example, more efficiently bind a tumor cell that expresses both receptors, but will only deliver a cell death-inducing agent to tumor cells that have the receptor for the cell death-inducing ligand. The binding agent for the overexpressed receptor can be, for example an antigen-binding domain of an antibody that specifically binds the receptor. Non-limiting examples include, e.g., an scFv or a nanobody. One example of such an engineered cell would express, for example, a nanobody that binds the EGF receptor and TRAIL. These and other combinations could be expressed as separate molecules or, for example, as a fusion protein.

It is also considered that tumor cells can be modified to knock out, e.g., receptors that activate the innate immune system, such as the toll-like receptors (TLRs), and engineered to express or secrete ligands that activate those receptors. Sequences for the TLRs are known in the art.

It is also considered that multiple receptors can be targeted on the surface of tumor cells, e.g. using tumor cells engineered to secrete a bi-functional molecule comprising of epidermal growth factor receptor (EGFR) targeted nanobody (ENb) and death receptor (DR) targeted ligand TRAIL (ENb-TRAIL).

Other tumor-expressed receptors that can be knocked out in tumor cells engineered as described herein to express their respective ligands include, as non-limiting examples, CD5, CD36, IL-32 receptor, IL-2 receptor, peroxisome proliferator activated receptor (PPAR), amyloid β receptor, thrombospondin (TSP-1) receptor, and IL-13 receptor (e.g., IL-13Ra2). Sequences encoding the receptors and their respective ligands are known in the art.

TNF-Related Apoptosis-Inducing Ligand (TRAIL)

In some embodiments, the tumor cells described herein are engineered to express the receptor-mediated cell death-inducing polypeptide TRAIL or a polypeptide comprising an extracellular domain of TRAIL (referred to as soluble TRAIL or sTRAIL) that binds and activates a TRAIL receptor (DR4, DR5). Such tumor cells will have the expression or activity of DR4 and/or DR5 knocked out by targeted mutagenesis.

TRAIL, also referred to in the literature as "TNF superfamily member 10" or "CD253," is encoded by the TNFSF10 gene. TRAIL preferentially induces apoptosis in transformed and tumor cells, but does not generally kill normal cells.

Sequences for TRAIL are known for a number of species, e.g., human TRAIL (NCBI Gene ID: 8743), mRNA (e.g., NCBI Ref Seq NM_001190942.1) and polypeptide (e.g., NCBI Ref Seq NP_001177871.1). The human TRAIL is encoded by, for example, the nucleic acid sequence of SEQ ID NO: 1 herein. The human TRAIL mRNA sequence includes the sequence at accession number NM_001190942.1 (SEQ ID NO: 2). The human TRAIL polypeptide includes the amino acid sequence at accession number NP_001177871.1 (SEQ ID NO: 3). TRAIL of this sequence or of a homolog or variant that binds and activates the death receptors DR4 and/or DR5 can be expressed from an engineered tumor cell modified to knock out or inactivate DR4 and/or DR5 as described herein.

Death Receptor 4 (DR4)

TNF-receptor family protein Death Receptor 4, also known as "TNF receptor superfamily member 10a" or "TRAILR1" is encoded by the TNFRSF10A gene. Sequences for DR4 are known for a number of species. The human sequence for DR4 has NCBI Gene ID: 8797; the mRNA sequence is available at, e.g., NCBI Ref Seq NM_003844.3; the polypeptide sequence is available at, e.g., NCBI Ref Seq NP_003835.3. Sequences for the DR4 gene, mRNA and polypeptide are provided herein as SEQ ID NOS: 4, 5 and 6.

In one embodiment, the cell surface receptor DR 4 is inactivated by CRISPR-mediated mutagenesis using e.g. gRNA sequences listed in Table 4.

TABLE 4 gRNA sequences (DNA targeting segments) that can be used to inactivate the cell surface receptor DR4.

| Name of gRNA | gRNA target sequence |
| --- | --- |
| TNFRSF10A CRISPR Guide RNA 1 | AGGTCAAGGATTGTACGCCC (SEQ ID NO: 24) |
| TNFRSF10A CRISPR Guide RNA 2 | GAAGTCCCTGCACCACGACC (SEQ ID NO: 25) |
| TNFRSF10A CRISPR Guide RNA 3 | TTTGGTTGTTCCGTTGCTGT (SEQ ID NO: 26) |
| TNFRSF10A CRISPR Guide RNA 4 | CAGGCAATGGACATAATATA (SEQ ID NO: 27) |
| TNFRSF10A CRISPR Guide RNA 5 | ACAGCATGTCAGTGCAAACC (SEQ ID NO: 28) |
| TNFRSF10A CRISPR Guide RNA 6 | ACACACTCGATGTCACTCCA (SEQ ID NO: 29) |

Death Receptor 5 (DR5)

TNF-receptor family protein Death Receptor 5, also known as "TNF receptor superfamily member 10b" or "TRAILR2" is encoded by the TNFRSF10B gene. Sequences for DR5 are known for a number of species. The human DR5 has been assigned NCBI Gene ID: 8795, and has NCBI Ref Seq NM_003842.5 (mRNA) and NCBI Ref Seq NP_003833.4 (polypeptide). Gene, mRNA and polypeptide sequences are provided herein as SEQ ID NOS: 7, 8 and 9.

In one embodiment, the cell surface receptor DR 5 is inactivated by CRISPR-mediated mutagenesis using e.g. gRNA sequences listed in Table 5.

TABLE 5 gRNA sequences (DNA targeting segments) that can be used to inactivate the cell surface receptor DR5.

| Name of gRNA | gRNA target sequence |
| --- | --- |
| TNFRSF10B CRISPR Guide RNA 1 | TTCCAGAGCTCACAACGACC (SEQ ID NO: 30) |
| TNFRSF10B CRISPR Guide RNA 2 | ATAGTCCTGTCCATATTTGC (SEQ ID NO: 31) |
| TNFRSF10B CRISPR Guide RNA 3 | ATAGTCCTGTCCATATTTGC (SEQ ID NO: 32) |
| TNFRSF10B CRISPR Guide RNA 4 | AGGTCGGTGATTGTACACCC (SEQ ID NO: 33) |

TABLE 5-continued gRNA sequences (DNA targeting segments) that can be used to inactivate the cell surface receptor DR5.

| Name of gRNA | gRNA target sequence |
|---|---|
| TNFRSF10B CRISPR Guide RNA 5 | TTCTGTACCTGAATCACACC (SEQ ID NO: 34) |
| TNFRSF10B CRISPR Guide RNA 6 | ACACATTCGATGTCACTCCA (SEQ ID NO: 35) |

Interferon β (IFNβ)

IFN-β, also referred to as IFN-beta and IFNB1 is encoded by the IFNB1 gene. This cytokine is a member of the interferon family of cytokines that are released as part of the innate immune response to pathogens. The IFN-β protein belongs to the type I class of interferons, which are important for defense against viral infections. In addition, type I interferons are involved in cell differentiation and anti-tumor defenses.

Sequences for IFN-β are known for a number of species; human IFNβ is assigned NCBI Gene ID: 3456; the human mRNA is assigned NCBI Ref Seq NM_002176.4; and the human polypeptide is assigned NCBI Ref Seq NP_002167.1. Sequences for the human IFNb gene, mRNA and polypeptide are provided as SEQ ID NOS: 10, 11 and 12 herein.

IFNβ of the polypeptide sequence provided herein or known in the art, or of a homolog or variant that binds and activates the IFNα/β receptor, IFNAR1, can be expressed from an engineered tumor cell modified to knock out or inactivate the receptor as described herein.

TABLE 6 gRNA sequences (DNA targeting segments) that can be used to inactivate the cell surface receptor IFN-β (IFNB1).

| Name of gRNA | gRNA target sequence |
|---|---|
| IFNB1 CRISPR Guide RNA 1 | TAGGAGATCTTCAGTTTCGG (SEQ ID NO: 36) |
| IFNB1 CRISPR Guide RNA 2 | TCCATGAGCTACAACTTGCT (SEQ ID NO: 37) |
| IFNB1 CRISPR Guide RNA 3 | GCCTCCCATTCAATTGCCAC (SEQ ID NO: 38) |
| IFNB1 CRISPR Guide RNA 4 | GACTATTGTTGAGAACCTCC (SEQ ID NO: 39) |
| IFNB1 CRISPR Guide RNA 5 | TTCCACTCTGACTATGGTCC (SEQ ID NO: 40) |
| IFNB1 CRISPR Guide RNA 6 | TCTGATGATAGACATTAGCC (SEQ ID NO: 41) |

IFN a/b Receptor (IFNAR1)

Tumor cells as described herein that are engineered to express IFNβ need to first be engineered to knock out or inactivate the IFN α/β receptor (IFNAR1) to avoid autocrine effects of the IFNβ. The protein encoded by the IFNAR1 gene is a type I membrane protein that forms one of the two chains of the receptor for interferons alpha and beta. Sequences for IFNAR1 are known for a number of species; the human IFN AR1 gene is assigned NCBI Gene ID 3454. The mRNA is assigned NM_000629.3, and the polypeptide is assigned NCBI Ref. Seq. NP_000620.2. Sequences for the human IFNAR1 gene, mRNA and polypeptide are provided as SEQ ID NOS: 13, 14 and 15 herein.

TABLE 7 gRNA sequences (DNA targeting segments) that can be used to inactivate the cell surface receptor IFN-β (IFNAR1).

| Name of gRNA | gRNA target sequence |
|---|---|
| IFNAR1 CRISPR Guide RNA 1 | GGCGTGTTTCCAGACTGTTT (SEQ ID NO: 42) |
| IFNAR1 CRISPR Guide RNA 2 | AACAGGAGCGATGAGTCTGT (SEQ ID NO: 43) |
| IFNAR1 CRISPR Guide RNA 3 | TCATTTACACCATTTCGCAA (SEQ ID NO: 44) |
| IFNAR1 CRISPR Guide RNA 4 | GATCTAATGTTAAAGACTGG (SEQ ID NO: 45) |
| IFNAR1 CRISPR Guide RNA 5 | TAGATGACAACTTTATCCTG (SEQ ID NO: 46) |
| IFNAR1 CRISPR Guide RNA 6 | CTGGAGCCACTGAACTTGAA (SEQ ID NO: 47) |

Receptor Knock Out/Inactivation

Engineered tumor cells as described herein not only express a receptor-mediated cell death-inducing polypeptide effective against tumor cells (e.g., cells of the tumor prior to engineering, or cells of the same or similar tumor type(s)). They are also first rendered insensitive to the effects of the receptor-mediated cell death-inducing polypeptide they will be modified to express. Receptor knock out or inactivation can be performed by any of a number of site-directed mutagenesis approaches known in the art. However, the advent of guide-RNA-mediated gene editing, of which perhaps the best characterized method is CRISPR-mediated gene editing, provides a straightforward approach for knocking out the desired receptor(s). The following provides description of various gene editing or mutagenesis approaches that can be used to knock out receptor expression or activity.

In one embodiment, the tumor cells are modified to knock out or inactivate one or more receptors using gene editing system such as CRISPR/Cas, Meganuclease, transcription activator-like effector nucleases (TALENs), or zinc-finger nucleases (ZFNs).

In one embodiment, the components of a gene editing system comprise a protein-based nuclease system.

Protein-Based Nuclease Systems

Nucleases used for gene editing include those that have DNA cleavage activity. Particular examples of nuclease systems for use in the methods described herein include the RNA-guided systems, sych as the CRISPR-Cas9 system, zinc finger proteins, meganucleases, TAL domains, and TALENs, among others. Nuclease agents can be selected or designed for specificity in cleaving at a given target site. For example, nuclease agents can be selected for cleavage at a target site that creates overlapping ends between the cleaved polynucleotide and a different polynucleotide. Nuclease agents having both protein and RNA elements as in CRISPR-Cas9 can be supplied with the agents already complexed as a nuclease agent, or can be supplied with the protein and RNA elements separate, in which case they complex to form a targeted nuclease agent when introduced to cells.

A recognition site for a nuclease agent is a DNA sequence at which a nick or double-strand break is induced by a nuclease agent. In preferred embodiments, the recognition site is present only once in the genome of the host cell (or once on each member of a pair of chromosomes). In specific embodiments, an endogenous or native site that occurs only once within the genome is identified. Such a site can then be used to design nuclease agents that will produce a nick or double-strand break at the endogenous recognition site.

The length of a recognition site can vary, and includes, for example, recognition sites that are about 30-36 bp for a zinc finger nuclease (ZFN) pair, about 36 bp for a Transcription Activator-Like Effector Nuclease (TALEN), or about 20 bp for a CRISPR/Cas9 guide RNA.

In some embodiments, the recognition site is positioned within the polynucleotide encoding a selection marker. Such a position can be located within the coding region of the selection marker or within the regulatory regions, which influence the expression of the selection marker. Thus, a recognition site of the nuclease agent can be located in an intron of the selection marker, a promoter, an enhancer, a regulatory region, or any non-protein-coding region of the polynucleotide encoding the selection marker. In some embodiments, a nick or double-strand break at the recognition site disrupts the activity of the selection marker. Methods to assay for the presence or absence of a functional selection marker are known to those skilled in the art.

Any nuclease agent that induces a nick or double-strand break into a desired recognition site can be used in the methods and compositions disclosed herein. A naturally-occurring or native nuclease agent can be employed so long as the nuclease agent induces a nick or double-strand break in a desired recognition site. Alternatively, a modified or engineered nuclease agent can be employed. An "engineered nuclease agent" comprises a nuclease that is engineered (modified or derived) from its native form to specifically recognize and induce a nick or double-strand break in the desired recognition site. Thus, an engineered nuclease agent can be derived from a native, naturally-occurring nuclease agent or it can be artificially created or synthesized. The modification of the nuclease agent can be as little as one amino acid in a protein cleavage agent or one nucleotide in a nucleic acid cleavage agent. In some embodiments, the engineered nuclease induces a nick or double-strand break in a recognition site, wherein the recognition site was not a sequence that would have been recognized by a native (non-engineered or non-modified) nuclease agent.

Nicks or double-stranded breaks at a targeted site can then be repaired by the cell in one of two ways: non-homologous end joining and homology-directed repair (homologous recombination). In non-homologous end joining (NHEJ), the double-strand breaks are repaired by direct ligation of the break ends to one another. As such, no new nucleic acid material is inserted into the site, although some nucleic acid material may be lost, resulting in a deletion. In homology-directed repair, a donor polynucleotide with homology to the cleaved target DNA sequence can be used as a template for repair of the cleaved target DNA sequence, resulting in the transfer of genetic information from the donor polynucleotide to the target DNA. Therefore, new nucleic acid material may be inserted/copied into the site. The modifications of the target DNA due to NHEJ and/or homology-directed repair can be used for gene correction, gene replacement, gene tagging, transgene insertion, nucleotide deletion, gene disruption, gene mutation, etc.

The nuclease agent employed in knocking out or inactivating a receptor can comprise an RNA-guided system, such as a CRISPR/Cas system.

CRISPR/Cas Systems

The present methods can employ a CRISPR/Cas system (e.g., gRNA-Cas complex) for site-directed cleavage of nucleic acids. Specifically, Cas cleavage of nucleic acids directed by a guide RNA (gRNA) to a receptor gene target site produces a digested nucleic acid in which repair of the cut introduces a deletion or interruption of the targeted sequence in a site-specific manner.

Such systems can employ a Cas endonuclease, frequently a Cas9 endonuclease, which in some instances, is codon-optimized for the desired cell type in which it is to be expressed. The following refers to Cas9 as the endonuclease, but it should be understood that other RNA-guided endonucleases can be used in an analogous manner. The CRISPR/Cas system further employs a fused crRNA-tracrRNA construct that functions with the codon-optimized Cas9. This single RNA is often referred to as a guide RNA or gRNA. Within a gRNA, the crRNA portion is identified as the 'target sequence' for the given recognition site and the tracrRNA is often referred to as the "scaffold." This system has been shown to function in a variety of eukaryotic and prokaryotic cells. Briefly, a short DNA fragment containing the target sequence is inserted into a guide RNA expression plasmid. The gRNA expression plasmid comprises the target sequence (in some embodiments around 20 nucleotides), a form of the tracrRNA sequence (the scaffold) as well as a suitable promoter that is active in the ceil and necessary' elements for proper processing in eukaryotic cells. Many of the systems rely on custom, complementary oligos that are annealed to form a double stranded DNA and then cloned into die gRNA expression plasmid. The gRNA expression cassette and the Cas9 expression cassette are then introduced into the cell. See, for example, Mali P et al. (2013) Science 2013 Feb. 15; 339 (6121): 823-6; Jinek M et al. Science 2012 Aug. 17; 337(6096):816-21; Hwang W Y et al. Nat Biotechnol 2013 March; 31(3):227-9; Jiang W et al. Nat Biotechnol 2013 March; 31(3):233-9; and, Cong L et al. Science 2013 Feb. 15; 339(6121):819-23, each of which is herein incorporated by reference. The methods and compositions disclosed herein can utilize Clustered A synthetic guide RNA that has "gRNA functionality" is one that has one or more of the functions of naturally occurring guide RNA, such as associating with an endonuclease, or a function performed by the guide RNA in association with an endonuclease. In certain embodiments, the functionality includes binding a target polynucleotide. In certain embodiments, the functionality includes targeting the endonuclease or a gRNA: endonuclease complex to a target polynucleotide. In certain embodiments, the functionality includes nicking a target polynucleotide. In certain embodiments, the functionality includes cleaving a target polynucleotide. In certain embodiments, the functionality includes associating with or binding to the endonuclease. In certain embodiments, the functionality is any other known function of a guide RNA in a CRISPR-associated nuclease system with an endonuclease, including an artificial CRISPR-associated nuclease system with an engineered endonuclease, for example, an engineered Cas protein. In certain embodiments, the functionality is any other function of natural guide RNA. The synthetic guide RNA may have gRNA functionality to a greater or lesser extent than a naturally occurring guide RNA. In certain embodiments, a synthetic guide RNA may have greater functionality as to one property and lesser functionality as to another property in comparison to a similar naturally occurring guide RNA.

Guide RNAs, e.g., for use with the system described herein as listed in Table 4, Table 5, Table 6 and/or Table 7 are known in the art and are further described in U.S. Pat. No. 9,834,791; and Patent Application No. US2013'0254304. Guide RNAs, e.g., for use with ZFN system are known in the art and are further described in and International Patent Application No. WO2014,186,585. Patents cited herein are incorporated herein by reference in their entirety.

Guide RNA sequences can be readily generated for a given target sequence using prediction software, for example, CRISPRdirect (available on the world wide web at http://crispr.dbels.jp/), see Natio, et al. Bioinformatics. (2015) April 1; 31(7): 1120-1123; ATUM gRNA Design Tool (available on the world wide web at www.atum.bio:ecommerce/cas9/input); an CRISPR-ERA (available on the world wide web at http://crispr-era.stanford.eduu/indexjsp), see Liu, et al. Bioinformatics, (2015) November 15; 31(22): 3676-3678. All references cited herein are incorporated herein by reference in their entireties. Non-limiting examples of publically available gRNA design software include; sgRNA Scorer 1.0, Quilt Universal guide RNA designer, Cas-OFFinder & Cas-Designer, CRISPR-ERA, CRISPR/Cas9 target online predictor, Off-Spotter—for designing gRNAs, CRISPR MultiTargeter, ZiFiT Targeter, CRISPRdirect, CRISPR design from crispr.mit.edu/, E-CRISP etc.

A guide RNA described herein can be modified, e.g., chemically modified. Exemplary chemical modifications of a guide RNA are described in, for example, Patent Application WO2016 089,433, which is incorporated herein by reference in its entirety.

In any of the methods described herein, the oligonucleotide that binds the regulatory sequence and/or small molecule and/or other compound can be introduced into a cell comprising components of the gene editing system described herein and such a cell can be in an animal, which can be a human, non-human mammal (dog, cat, horse, cow, etc.) or other animal.

When a nucleic acid encoding one or more single-guide RNAs and a nucleic acid encoding an RNA-guided endonuclease each need to be introduced to a cell, the use of an adenovirus associated vector (AAV) is specifically contemplated. Other vectors for simultaneously delivering nucleic acids for components of the genome editing/fragmentation system (e.g., sgRNAs, RNA-guided endonuclease) include lentiviral vectors, such as Epstein Barr, Human immunodeficiency virus (HIV), and hepatitis B virus (HBV). Each of the components of the RNA-guided genome editing system (e.g., sgRNA and endonuclease) can alternatively be delivered in a separate vector (viral or non-viral) as known in the art or as described herein. In addition, an oligonucleotide component of a gene editing system that binds to regulatory sequence and prevents splicing resulting in expression of functional nuclease can be delivered by naked DNA, a non-viral vector, or by using a viral vector.

High dosage of a nuclease, for example, Cas9 can exacerbate indel frequencies at off-target sequences which exhibit few mismatches to the guide strand. Such sequences are especially susceptible, if mismatches are non-consecutive and/or outside of the seed region of the guide. Approaches to mitigate off-target effects include specific regulation of nuclease activity, both temporal control and local control of CRISPR associated nuclease activity. Such regulated expression can result in reduced off-target indels compared to the use of constitutively active CRISPR associated nuclease, e.g. Cas9. In some embodiments, additional methods to minimize the level of toxicity and off-target effect are used and include for example, use of Cas nickase mRNA (for example S. pyogenes Cas9 with a D10A mutation) and a pair of guide RNAs targeting a site of interest; See also WO 2014/093622 which is incorporated herein by reference in its entirety.

A "gRNA-Cas complex" includes a complex of a Cas protein with a gRNA. The gRNA can be designed or selected to direct Cas cleavage to a target site that creates overlapping ends between the cleaved nucleic acid and a different nucleic acid. The gRNA-Cas complex can be supplied with the agents already complexed, or can be supplied with the protein and RNA elements separate, in which case they complex to form a gRNA-Cas complex in the methods and reaction mixtures described herein.

Cas RNA-Guided Endonucleases

Cas proteins generally comprise at least one RNA recognition or binding domain. Such domains can interact with guide RNAs (gRNAs, described in more detail below). Cas proteins can also comprise nuclease domains (e.g., DNase or RNase domains), DNA binding domains, helicase domains, protein-protein interaction domains, dimerization domains, and other domains. A nuclease domain possesses catalytic activity for nucleic acid cleavage. Cleavage includes the breakage of the covalent bonds of a nucleic acid molecule.

Examples of Cas proteins include Cast, CasIB, Cas2, Cas3, Cas4, Cas5, Cas5e (CasD), Cas6, Cashe, Cas6f, Cas7, Cas8a1, Cas8a2, Cas8b, Cas8c, Cas9 (Csn1 or Csx12), Cas1O, Cas1Od, CasF, CasG, CasH, Csy1, Csy2, Csy3, Cse1 (CasA), Cse2 (CasB), Cse3 (CasE), Cse4 (CasC), Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, CsxIO, Csx16, CsaX, Csx3, Csx1, Csx15, Csf1, Csf2, Csf3, Csf4, and Cul966, among others, and homologs or modified versions thereof.

Any Cas protein that induces a nick or double-strand break into a desired recognition site can be used in the methods and compositions disclosed herein. A naturally-occurring or native Cas protein can be employed so long as the Cas protein induces a double-strand break at a desired recognition site. Alternatively, a modified or engineered Cas protein can be employed. An "engineered Cas protein" comprises a Cas protein that is engineered (modified or derived) from its native form to specifically recognize and induce a nick or double-strand break in the desired recognition site. Thus, an engineered Cas protein can be derived from a native, naturally-occurring Cas protein or it can be artificially created or synthesized.

In particular embodiments, the Cas protein is Cas9. Cas9 proteins typically share four key motifs with a conserved architecture. Motifs 1, 2, and 4 are RuvC-like motifs, and motif 3 is an HNH motif. The nuclease activity of Cas9 cleaves target DNA to produce double strand breaks. These breaks can then be repaired by the cell in one of two ways: non-homologous end joining and homology-directed repair (homologous recombination). In non-homologous end joining (NHEJ), the double-strand breaks are repaired by direct ligation of the break ends to one another. As such, no new nucleic acid material is inserted into the site, although some nucleic acid material may be lost, resulting in a deletion. In homology-directed repair, a donor polynucleotide with homology to the cleaved target DNA sequence can be used as a template for repair of the cleaved target DNA sequence, resulting in the transfer of genetic information from the donor polynucleotide to the target DNA. Therefore, new nucleic acid material may be inserted/copied into the site. The modifications of the target DNA due to NHEJ and/or homology-directed repair can be used for gene correction, gene replacement, gene tagging, transgene insertion, nucleotide deletion, gene disruption, gene mutation, etc.

Cas proteins can be from a type II CRISPR/Cas system. The Cas9 protein can be from, for example, *Streptococcus pyogenes, Streptococcus thermophilus, Streptococcus* sp., *Staphylococcus aureus, Nocardiopsis dassonvillei, Streptomyces pristinaespiralis, Streptomyces viridochromogenes, Streptomyces viridochromogenes, Streptosporangium roseum, Streptosporangium roseum,* AlicyclobacHlus *acidocaldarius, Bacillus pseudomycoides, Bacillus selenitireducens, Exiguobacterium sibiricum, Lactobacillus delbrueckii, Lactobacillus salivarius, Microscilla marina, Burkholderiales bacterium, Polaromonas naphthalenivorans, Polaromonas* sp., *Crocosphaera watsonii, Cyanothece* sp., *Microcystis aeruginosa, Synechococcus* sp., *Acetohalobium arabaticum, Ammonifex degensii, Caldicelulosiruptor becscii, Candidatus Desulforudis, Clostridium botulinum, Clostridium difficile, Finegoldia magna, Natranaerobius thermophilus, Pelotomaculum thermopropionicum, Acidithiobacillus caldus, Acidithiobacillus ferrooxidans, Allochromatium vinosum, Marinobacter* sp., *Nitrosococcus halophilus, Nitrosococcus watsoni, Pseudoalteromonas haloplanktis, Ktedonobacter racemifer, Methanohalobium evestigatum, Anabaena variabilis, Nodularia spumigena, Nostoc* sp., *Arthrospira maxima, Arthrospiraplatensis, Arthrospira* sp., *Lyngbya* sp., *Microcoleus chthonoplastes, Oscillatoria* sp., *Petrotoga mobilis, Thermosipho africanus,* or *Acaryochloris marina.* Additional examples of the Cas9 family members are described in WO 2014/131833, herein incorporated by reference in its entirety. Cas9 protein from *S. pyogenes* or derived therefrom is a preferred enzyme. Cas9 protein from *S. pyogenes* is assigned SwissProt accession number Q99ZW2.

Cas proteins can also be linked to a cell-penetrating domain. For example, the cell-penetrating domain can be derived from the HIV-1 TAT protein, the TLM cellpenetrating motif from human hepatitis B virus, MPG, Pep-1, VP22, a cell penetrating peptide from Herpes simplex virus, or a polyarginine peptide sequence. See, for example, WO 2014/089290, herein incorporated by reference in its entirety. The cell-penetrating domain can be located at the N-terminus, the C-terminus, or anywhere within the Cas protein.

Cas proteins can also comprise a heterologous polypeptide for ease of tracking or purification, such as a fluorescent protein, a purification tag, or an epitope tag. Examples of fluorescent proteins include green fluorescent proteins (e.g., GFP, GFP-2, tagGFP, turboGFP, eGFP, Emerald, Azami Green, Monomeric Azami Green, CopGFP, AceGFP, ZsGreen1), yellow fluorescent proteins (e.g., YFP, eYFP, Citrine, Venus, YPet, PhiYFP, ZsYellow1), blue fluorescent proteins (e.g. eBFP, eBFP2, Azurite, mKalama1, GFPuv, Sapphire, T-sapphire), cyan fluorescent proteins (e.g. eCFP, Cerulean, CyPet, AmCyan1, Midoriishi-Cyan), red fluorescent proteins (mKate, mKate2, mPlum, DsRed monomer, mCherry, mRFPI, DsRed-Express, DsRed2, DsRed-Monomer, HcRed-Tandem, HcRed1, AsRed2, eqFP611, mRaspberry, mStrawherry, Jred), orange fluorescent proteins (mOrange, mKO, Kusabira-Orange, Monomeric Kusabira-Orange, mTangerine, tdTomato), and any other suitable fluorescent protein. Examples of tags include glutathione-S-transferase (GST), chitin binding protein (CBP), maltose binding protein, thioredoxin (TRX), poly (NANP), tandem affinity purification (TAP) tag, myc, AcV5, AU1, AU5, E, ECS, E2, FLAG, hemagglutinin (HA), nus, Softag 1, Softag 3, Strep, SBP, Glu-Glu, HSV, KT3, S, SI, T7, V5, VSV-G, histidine (His), biotin carboxyl carrier protein (BCCP), and calmodulin.

The Cas protein may cleave the nucleic acid at a site within the target sequence or outside of the target sequence. The "cleavage site" includes the position of a nucleic acid wherein a Cas protein produces a single-strand break or a double-strand break. If the Cas protein produces a double-strand break, the cleavage site can be at the same position on both strands of the nucleic acid (producing blunt ends) or can be at different sites on each strand (producing sticky or cohesive ends). Sticky ends can also be produced by using two Cas proteins which produce a single-strand break at cleavage sites on each strand. Site specific cleavage of target DNA by Cas9 can occur at locations determined by both (i) basepairing complementarity between the guide RNA and the target DNA; and (ii) a short motif, referred to as the protospacer adjacent motif (PAM), in the target DNA. For example, the cleavage site of Cas9 can be about 1 to about 10 or about 2 to about 5 base pairs (e.g., 3 base pairs) upstream of the PAM sequence. In some embodiments (e.g., when Cas9 from *S. pyogenes,* or a closely related Cas9, is used), the PAM sequence of the non-complementary strand can be 5'-XGG-3', where X is any DNA nucleotide and X is immediately 3' of the target sequence of the non-complementary strand of the target DNA. As such, the PAM sequence of the complementary strand would be 5'-CCY-3', where Y is any DNA nucleotide and Y is immediately 5' of the target sequence of the complementary strand of the target DNA. In some such embodiments, X and Y can be complementary and the X-Y base pair can be any basepair (e.g., X=C and Y=G; X=G and Y=C; X=A and Y=T, X=T and Y=A).

Cas proteins can be provided in any form. For example, a Cas protein can be provided in the form of a protein, such as a Cas protein complexed with a gRNA. Alternatively, a Cas protein can be provided in the form of a nucleic acid encoding the Cas protein, such as an RNA (e.g., messenger RNA (mRNA)) or DNA. Optionally, the nucleic acid encoding the Cas protein can be codon optimized for efficient translation into protein in a particular cell or organism. For example, the nucleic acid encoding the Cas protein can be modified to substitute codons having a higher frequency of usage in a bacterial cell, a yeast cell, a human cell, a non-human cell, a mammalian cell, a rodent cell, a mouse cell, a rat cell, or any other host cell of interest, as compared to the naturally occurring polynucleotide sequence. When a nucleic acid encoding the Cas protein is introduced into the cell, the Cas protein can be transiently, conditionally, or constitutively expressed in the cell.

Nucleic acids encoding Cas proteins can be stably integrated in the genome of the cell and operably linked to a promoter active in the cell. Alternatively, nucleic acids encoding Cas proteins can be operably linked to a promoter in an expression construct. Expression constructs include any nucleic acid constructs capable of directing expression of a gene or other nucleic acid sequence of interest (e.g., a Cas gene) and which can transfer such a nucleic acid sequence of interest to a target cell. For example, the nucleic acid encoding the Cas protein can be in the targeting vector comprising the nucleic acid insert and/or a vector comprising the DNA encoding the gRNA, or it can be in a vector or a plasmid that is separate from the targeting vector comprising the nucleic acid insert and/or separate from a vector comprising the DNA encoding the gRNA. Promoters that can be used in an expression construct include, for example, promoters active in a human cell. Such promoters can be, for example, conditional promoters, inducible promoters, constitutive promoters, or tissue specific promoters.

Guide RNAs (gRNAs)

A guide RNA or "gRNA" includes an RNA molecule that binds to a Cas protein and targets the Cas protein to a specific location within a target DNA. Guide RNAs (gRNA) generally comprise two segments, a "DNA-targeting segment" and a "protein-binding segment." "Segment" includes a segment, section, or region of a molecule, such as a contiguous stretch of nucleotides in an RNA. Some gRNAs comprise two separate RNA molecules: an "activator-RNA" and a "targeter-RNA". Other gRNAs are a single RNA molecule (single RNA polynucleotide), which can also be called a "single-molecule gRNA," a "single-guide RNA," or an "sgRNA." See, e.g., WO/2013/176772A1, WO/2014/065596A1, WO/2014/089290A1, WO/2014/093622A2, WO/2014/099750A2, WO/2013142578A1, and WO 2014/131833A1, each of which is herein incorporated by reference. gRNAs useful in the methods and compositions described herein include both double-molecule gRNAs and single-molecule gRNAs.

An exemplary two-molecule gRNA comprises a crRNA-like ("CRISPR RNA" or "targeter-RNA" or "crRNA" or "crRNA repeat") molecule and a corresponding tracrRNA-like ("trans-acting CRISPR RNA" or "activator-RNA" or "tracrRNA" or "scaffold") molecule. A crRNA comprises both the DNA-targeting segment (single-stranded) of the gRNA and a stretch of nucleotides that forms one half of the dsRNA duplex of the proteinbinding segment of the gRNA. A corresponding tracrRNA (activator-RNA) comprises a stretch of nucleotides that forms the other half of the dsRNA duplex of the protein-binding segment of the gRNA. A stretch of nucleotides of a crRNA are complementary to and hybridize with a stretch of nucleotides of a tracrRNA to form the dsRNA duplex of the protein-binding domain of the gRNA. As such, each crRNA can be said to have a corresponding tracrRNA. The crRNA additionally provides the single stranded DNA-targeting segment. Accordingly, a gRNA comprises a sequence that hybridizes to a target sequence, and a tracrRNA.

The crRNA and the corresponding tracrRNA (as a corresponding pair) hybridize to form a gRNA. The crRNA additionally provides the single-stranded DNA-targeting segment that hybridizes to a CRISPR RNA recognition sequence. When used for modification within a cell, the exact sequence of a given crRNA or tracrRNA molecule can be designed to be specific to the species in which the RNA molecules will be used. See, for example, Mali P et al. (2013) Science 2013 Feb. 15; 339(6121):823-6; Jinek M et al. Science 2012 Aug. 17; 337(6096):816-21; Hwang W Y et al. Nat Biotechnol 2013 March; 31(3):227-9; Jiang W et al. Nat Biotechnol 2013 March; 31(3):233-9; and, Cong L et al. Science 2013 Feb. 15; 339(6121):819-23, each of which is herein incorporated by reference.

The DNA-targeting segment (crRNA) of a given gRNA comprises a nucleotide sequence that is complementary to a sequence in a target DNA. The DNA-targeting segment of a gRNA interacts with a target DNA in a sequence-specific manner via hybridization (i.e., base pairing). As such, the nucleotide sequence of the DNA-targeting segment may vary and determines the location within the target DNA with which the gRNA and the target DNA will interact. The DNA-targeting segment of a subject gRNA can be modified to hybridize to any desired sequence within a target DNA. Naturally occurring crRNAs differ depending on the Cas9 system and organism but often contain a targeting segment of between 21 to 72 nucleotides length, flanked by two direct repeats (DR) of a length of between 21 to 46 nucleotides (see, e.g., WO2014/131833). In the case of S. pyogenes, the DRs are 36 nucleotides long and the targeting segment is 30 nucleotides long. The 3' located DR is complementary to and hybridizes with the corresponding tracrRNA, which in turn binds to the Cas9 protein.

The DNA-targeting segment can have a length of from about 12 nucleotides to about 100 nucleotides and lengths therebetween. Thus, the nucleotide sequence of the DNA-targeting segment that is complementary to a nucleotide sequence (CRISPR RNA recognition sequence) of the target DNA can have a length at least about 12 nt, but can be longer—a benefit of longer sequences can be improved specificity/reduced off-target effects.

TracrRNAs can be in any form (e.g., full-length tracrRNAs or active partial tracrRNAs) and of varying lengths. They can include primary transcripts or processed forms. For example, tracrRNAs (as part of a single-guide RNA or as a separate molecule as part of a two-molecule gRNA) may comprise or consist of all or a portion of a wild-type tracrRNA sequence (e.g., about or more than about 20, 26, 32, 45, 48, 54, 63, 67, 85, or more nucleotides of a wild-type tracrRNA sequence). Examples of wild-type tracrRNA sequences from S. pyogenes include 171-nucleotide, 89-nucleotide, 75-nucleotide, and 65-nucleotide versions. See, for example, Deltcheva et al. (2011) Nature 471:602-607; WO 2014/093661, each of which is incorporated herein by reference in their entirety. Examples of tracrRNAs within single-guide RNAs (sgRNAs) include the tracrRNA segments found within +48, +54, +67, and +85 versions of sgRNAs, where "+n" indicates that up to the +n nucleotide of wildtype tracrRNA is included in the sgRNA. See U.S. Pat. No. 8,697,359, incorporated herein by reference in its entirety.

The percent complementarity between the DNA-targeting sequence and the CRISPR RNA recognition sequence within the target DNA can be at least 60% (e.g., at least 65%, at least 70%, at least 75%, at least 80%, at least 85%, at least 90%, at least 95%, at least 97%, at least 98%, at least 99%, or 100%). The percent complementarity between the DNA-targeting sequence and the CRISPR RNA recognition sequence within the target DNA is 100% over the seven contiguous 5'-most nucleotides of the target sequence of the complementary strand of the target DNA. In certain embodiments, the percent complementarity between the DNA-targeting sequence and the CRISPR RNA recognition sequence within the target DNA can be at least 60% over about 20 contiguous nucleotides. As an example, the percent complementarity between the DNA-targeting sequence and the CRISPR RNA recognition sequence within the target DNA is 100% over the fourteen contiguous nucleotides at the 5'-most end of the CRISPR RNA recognition sequence within the complementary strand of the target DNA and as low as 0% over the remainder. In such a case, the DNA-targeting sequence can be considered to be 14 nucleotides in length. As another example, the percent complementarity between the DNA-targeting sequence and the CRISPR RNA recognition sequence within the target DNA is 100% over the seven contiguous nucleotides at the 5'-most end of the CRISPR RNA recognition sequence within the complementary strand of the target DNA and as low as 0% over the remainder. In such a case, the DNA-targeting sequence can be considered to be 7 nucleotides in length.

Complementarity of nucleic acids means that a nucleotide sequence in one strand of nucleic acid, due to orientation of its nucleobase groups, hydrogen bonds to another sequence on an opposing nucleic acid strand. The complementary bases typically are, in DNA: A with T and C with G, and, in RNA: C with G, and U with A. Complementarity can be perfect or substantial/sufficient. Perfect complementarity between two nucleic acids means that the two nucleic acids can form a duplex in which every base in the duplex is bonded to a complementary base by Watson-Crick pairing. "Substantial" or "sufficient" complementary means that a sequence in one strand is not completely and/or perfectly complementary to a sequence in an opposing strand, but that sufficient bonding occurs between bases on the two strands to form a stable hybrid complex in set of hybridization conditions (e.g., salt concentration and temperature). Such conditions can be predicted by using the sequences and standard mathematical calculations to predict the Tm of hybridized strands, or by empirical determination of Tm by using routine methods. Tm refers to the temperature at which a population of hybridization complexes formed between two nucleic acid strands are 50% denatured. At a temperature below the Tm, formation of a hybridization complex is favored, whereas at a temperature above the Tm, melting or separation of the strands in the hybridization complex is favored. Tm may be estimated for a nucleic acid having a known G+C content in an aqueous 1 M NaCl solution by using, e.g., Tm=81.5+0.41 (% G+C), although other known Tm computations take into account nucleic acid structural characteristics.

Immunomodulatory Polypeptides

In some aspects, the engineered tumor cells described herein are engineered to express one or more immunomodulatory polypeptides. Such polypeptides can assist, for example, in promoting an anti-tumor immune response, including a response that attacks the existing tumor(s) and/or, for example, a response that provides protection from recurrence of the cancer.

Such immunomodulatory polypeptides include, for example, granulocyte-macrophage colony stimulating factor (GMCSF). Other immunomodulatory polypeptides of potential benefit for expression from engineered tumor cells as described herein include, for example, immune checkpoint inhibitors, such as antibodies or binding domain constructs thereof that bind and inhibit the activity of checkpoint molecules including, but not limited to PD-1 or its ligand PD-L1, TIM-3, CTLA-4, LAG-3 and TIGIT. Inhibitors of these checkpoint molecules are known in the art, including, for example, scFvs and other antibody-derived constructs.

Granulocyte-Macrophage Colony Stimulating Factor (GMCSF)

In one embodiment, an immunomodulatory polypeptide expressed from an engineered tumor cell as described herein is GMCSF. This polypeptide factor, also referred to a CSF2 or CSF, is encoded by the CSF2 gene. The GMCSF cytokine modulates the production, differentiation, and function of granulocytes and macrophages and is demonstrated herein to influence anti-tumor immune responses. The active form of the protein is found extracellularly as a homodimer. The gene encoding GMCSF is located in a cluster of related genes at human chromosome region 5q31.

Sequences for GMCSF are known for a number of species, e.g., human GMCSF is assigned NCBI Gene ID: 1437; the human mRNA is assigned NCBI Ref Seq NM_000758.4; and the human polypeptide is assigned NCBI Ref Seq NP_000749.2. GMCSF nucleic acid and protein sequences are provided herein as SEQ ID NO: 16 (gene sequence), SEQ ID NO: 17 (mRNA sequence), and SEQ ID NO: 18 (polypeptide sequence).

GMCSF of the polypeptide sequence provided herein or known in the art, or of a homolog or variant that binds and activates the GMCSF receptor, CD116, can be expressed from an engineered tumor cell as described herein.

Heterologous Inducible Cell Suicide Systems

As discussed above, the engineered tumor cells as described herein are engineered not only to knock out expression of a receptor for a cell death-inducing polypeptide, to express such cell death-inducing polypeptide and, in some embodiments to express an immunomodulatory polypeptide, but also to include a heterologous inducible cell suicide system that permits eradication of the engineered tumor cells after they have performed their hunt and kill mission. This "kill switch" can be designed in several different ways, each responsive to the administration of a drug or agent that induces the cell suicide program.

In one embodiment, the heterologous cell-suicide system comprises an enzyme that converts a non-toxic or substantially non-toxic pro-drug to a toxic agent that kills cells expressing the enzyme. Sequence encoding the enzyme under control of constitutive regulatory sequences can be introduced to the engineered tumor cells, such that after the cells are administered and tumors have been effectively treated, the patient is administered the pro-drug to selectively kill the engineered tumor cells. A number of examples of exogenous enzymes that act upon pro-drug compounds to render them cytotoxic are known, including, for example, CMV- or HSV-thymidine kinase, which act upon ganciclovir and acyclovir to produce the DNA synthesis inhibitors ganciclovir triphosphate and acyclovir triphosphate, chimeric enzymes that activate 5-fluorocytosine and gemcitabine to cytotoxic antimetabolites, b-lactamase that acts upon cephalosporinyl-5-fluorouracil, and and recombinant carboxylesterase that acts on dipiperinyl-VP-16. See, e.g., Giang et al., AAPS J. 16:899-913 (2014), which is incorporated herein by reference, and literature cited therein. Additional examples include, e.g., cytosine deaminase (CD), which converts the prodrug 5-fluorocytosine (5-FC) to the active 5-fluorouracil (5-FU). Recombinant CD has been cloned from bacterial, yeast and fungal sources. A yeast cytosine deaminase/uracil phospho-ribosyltransferase fusion (CD/UPRT; encoded by the Fcy::Fur gene) has also been used as a more efficient alternative to generate 5-FU-based antimetabolites. See, e.g., Erbs et al., Cancer Res. 60:3813-3822 (2000) *E. coli* purine nucleoside phosphorylase converts 6-methyl-2'-deoxyriboside and 2-fluoro-2'-deoxyadenosine to 6'-methylpurine and 2-fluoroadenine, respectively. See, e.g., Parker et al., Biochem. Pharmacol. 55:1673-1681 (1998). Concerns with immunogenicity due to the non-human origin of the activating enzymes can be addressed by the use of engineered human deoxycytidine kinase (DCK) and thymidylate kinase (tmpk) capable of mono-phosphorylating a range of (non-physiologic) prodrugs such as gemcitabine (dFdC), bromovinyl-deoxyuridine (BVdU), cytarabine (AraC), and 3'-azido-3'-deoxythymidine (AZT) monophosphate (Hazra et al., Biochemistry 48:1256-1263 (2009); and Sato et al., Mol Ther. 15:962-970 (2007). A chimeric fusion of DCK with uridine monophosphate kinase (DCK::UMK) has also been described that directly activates gemcitabine to its cytotoxic diphosphate metabolite (Vernejoul et al., Mol. Ther. 14:758-767 (2006)). So-called "designer" prodrugs, in which a chemotherapeutic agent is derivatized to a substrate for a specific activating enzyme include phenoxyacetamide conjugates of doxorubicin and melphalan that are hydrolyzed by penicillin-V amidase (Kerr et al., Cancer Immunol. Immunother. 31:202-206 (1990)), a dipiperidinyl conjugate of etoposide (VP-16)

that is hydrolyzed by a recombinant carboxylesterase (Yoon et al., Mol. Cancer Ther. 5:1577-1584 (2006)), and a cephalosporin conjugate of 5-FU designed for hydrolysis by β-lactamase (Phelan et al., Bioorg. Med. Chem. Lett. 19:1261-1263 (2009)).

In one aspect of any of the embodiments, the compositions and methods described herein relate to a tumor cell engineered to express a kill switch including expression of HSV-TK under control of a constitutive promoter. Administration of acyclovir or ganciclovir permits the HSV-TK to convert the pro-drug to its DNA-synthesis-inhibiting form that kills the cells expressing the enzyme, i.e., the engineered tumor cells. HSV Tymidine Kinase is encoded by the TK gene of Herpes Simplex Virus. Sequences for HSV-TK are known, e.g., NCBI Gene ID: 24271467 and polypeptide sequence (e.g., NCBI Ref. Seq. YP_009137097.1 (SEQ ID No. 19). Ganciclovir is a synthetic guanine derivative with antiviral activity. The structure of Gancyclovir is as follows:

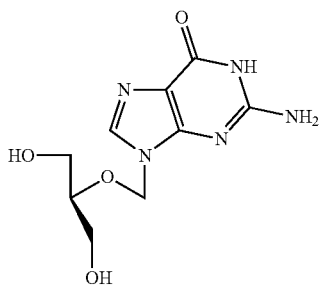

In another embodiment, the heterologous inducible cell suicide system comprises a nucleic acid construct encoding inducible expression of an enzyme that induces apoptosis. Following effective treatment of cancer with the engineered tumor cell, administration of the agent that induces the expression construct promotes the death of the engineered tumor cells. A representative example of an enzyme for this approach is the apoptotic enzyme caspase 9, which activates caspase 3 to kill the cell.

The cysteine-aspartic acid protease caspase 9, also known as "APAF-3," is encoded by the CASP-9 gene. Sequences for Caspase 9 are known for a number of species, e.g., human CASP9 is assigned NCBI Gene ID: 842 (SEQ ID No. 20), its mRNA is assigned NCBI Ref Seq NM_001229.5 (SEQ ID No. 21) and its polypeptide is assigned NCBI Ref Seq NP_001220.2 (SEQ ID No. 22).

Drug inducible nucleic acid constructs are known in the art, including, e.g., tetracycine- and/or doxycycline-inducible constructs.

A hybrid of the pro-drug and cytotoxic enzyme approaches is an inducible caspase 9 gene together with the small-molecule, bio-inert, chemical induction of dimerization (CID) drug, AP1903. The iCasp9 gene contains the intracellular portion of the human caspase 9 protein, fused to a drug-binding domain derived from human FK506-binding protein (see e.g. Clackson et al., Proc. Natl. Acad. Sci. U.S.A. 95:10437-10442 (1998); Straathof et al., Blood 105: 4247-4254 (2005)). Intravenous administration of AP1903 induces cross-linking of the drug-binding domains of the chimeric protein, which in turn dimerizes caspase 9 and activates the downstream caspase 3 molecule, resulting in cellular apoptosis.

In another embodiment, a rapamycin-activated Caspase 9-based suicide gene is contemplated for selectively killing the engineered cancer. Rapamycin, also known as sirolimus, binds FKBP12 and the FRB domain in the mTOR kinase to inhibit signal transduction in the mTOR pathway, a central regulator in metabolism and physiology in mammals. Rapamycin crosses the blood-brain barrier. The structure of Rapamycin is as follows:

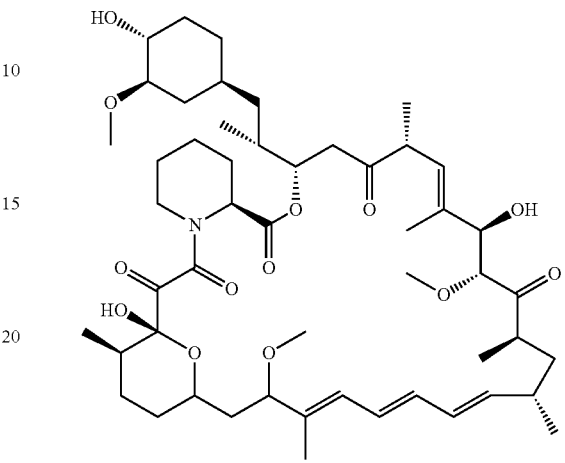

FRB-FKBP12 can be fused to the catalytic domain of caspase 9, with a short linker between FRB and FKBP12. Rapamycin can be used to dimerize co-expressed FRB-Casp9/FKBP-Casp9 which activates the downstream caspase 3 molecule, resulting in cellular apoptosis. Nucleotide Sequences for Rapamycin-activated Caspase 9 are provided herein (SEQ ID NO: 23).

Inducing an Anti-Tumor Immune Response in an Individual with Cancer/Tumor Cells as Anti-Tumor Vaccine In one aspect, the compositions and methods described herein relate to a method of inducing an anti-tumor immune response in an individual with cancer, the method comprising administering an autologous, genetically modified tumor cell as described herein to the individual. In one embodiment, the tumor cell is engineered to express heterologous polypeptides including a receptor-mediated cell death-inducing polypeptide, an immunomodulatory polypeptide, and a heterologous inducible cell suicide system. Such cell is further engineered to inactivate endogenous receptor for the receptor-mediated cell death-inducing polypeptide. Cells modified in this manner not only home to and kill tumor cells when administered to the patient from whom the engineered tumor cells were derived (i.e., autologous tumor cell treatment), but they can also promote or provoke an anti-tumor immune response. The immunomodulatory polypeptide can amplify the immune response acpect of this approach. As but one example, when the receptor-mediated cell-death inducing polypeptide is IFN-β, the use of GMCSF as an additional immunomodulatory polypeptide promotes a very effective anti-tumor immune response. In the animal model discussed in the Examples herein, the anti-tumor immune response is even effective to inhibit tumor formation when animals treated with the engineered tumor cells are subsequently challenged with non-engineered tumor cells.

An anti-tumor immune response in a human patient administered engineered tumor cells as described herein (autologous or syngeneic) can be detected or assayed, for example, in the following manner. The activities of T-lymphocytes can be assessed for evidence of a delayed-type hypersensitivity. Punch biopsies can be performed, followed by assessment for a delayed-type hypersensitivity using histological evaluation methods that are well known to those skilled in the art. An increased level of delayed-type hypersensitivity provides an indicator of an augmented systemic immune response against the patients' tumor cells. Examples for measurement of delayed-type hypersensitivity include, without limitation: immunohistochemistry, FACS, and RNAseq, as described e.g. in Wolfl, M., et al., Blood 110:201-210 (2007).

Efficacy for an anti-tumor immune response can also be assessed by using flow cytometry and enzyme-linked immunosorbent assay (ELISA) on the whole blood from the patients. Specific antibodies or ELISA panel can be designed to detect the efficacy of the cancer vaccines. Autologous tumor cells from the original tumor resection/cell isolation prior to engineering can also be co-cultured with blood-derived T cells from the patient after treatment. Assessment of tumor cell killing by the T cells and/or activation of the T cells by the non-engineered tumor cells (e.g., by assessing IFNγ, IL12 or granzymeB mRNA, protein or activity levels) provides an indication that an anti-tumor immune response was successfully developed by the treatment. Evidence of tumor cell killing in culture by T cells from the patient after treatment, or increased production or release of cytokines by co-cultured tumor cells demonstrates such a response.

Pharmaceutical Compositions and Administration
Pharmaceutical Compositions

Engineered tumor cells as described herein can be prepared for administration by expanding the cells in culture, isolating them, e.g., as a suspension in saline or an appropriate buffered medium in an amount and at a concentration appropriate for administration to a patient (e.g., the patient from whom the tumor cells were originally isolated-autologous administration, or another patient-syngeneic administration.)

Administration

Where administration autologous, the engineered tumor cells will necessarily be of the same tumor type as the tumors—primary and/or metastatic—treated.

Where administration is syngeneic, it is not absolutely necessary, but can be helpful that the engineered tumor cells administered be of the same or similar type of tumor as that being treated. Thus, it can be beneficial to treat a carcinoma with engineered syngeneic carcinoma cells, a sarcoma with engineered syngeneic sarcoma cells, etc. Similarly, while not absolutely necessary, it can also be beneficial, where possible in the syngeneic setting, to treat tumors with engineered syngeneic tumor cells from tumors of the same type as that being treated—as non-limiting examples, treatment of glioblastoma with engineered syngeneic glioblastoma cells, treatment of squamous cell carcinoma of the lung with engineered syngeneic squamous cell lung carcinoma cells, or treatment of melanoma with engineered syngeneic melanoma cells.

Administration can be localized, e.g., intratumor injection, or it can be systemic. Where the methods and compositions described herein take advantage of tumor cell homing that tends to deliver or re-seed tumor cells to the location of existing tumors, the methods are well adapted to systemic administration. Systemic, e.g., intravenous or intra-arterial (e.g., intra-carotid arterial) can permit improved chances of an engineered tumor cell locating and thereby attacking a distant or disseminated metastatic tumor. It is noted that in animal models, cells administered intravenously tend to localize to the lung. Where, for example, the lung is not the desired location, this can be minimized by administering cells via intracarotid injection or via other post-pulmonary circulation.

In another embodiment, engineered tumor cells as described herein can be administered via implantation into a tumor resection cavity. While there are benefits associated with systemic delivery, such local delivery of genetically modified tumor cells as described herein can also provide benefits for cancer therapy. In one aspect, local delivery can provide a high local concentration of the therapeutic polypeptide(s) or effector cells. While intracarotid delivery of cells can be particularly helpful in the context of, e.g., brain cancer, such as glioblastoma, which is behind the blood-brain barrier, local delivery to the site of a tumor, e.g., local delivery of therapeutic cells to the site of tumor resection, can be of particular benefit for the treatment of brain tumors, including but not limited to GBM, which are notoriously difficult to treat.

Where engineered tumor cells are administered locally, they can be, for example, encapsulated in a matrix. This can assist in retaining tumor cells in a given location, such as a tumor resection cavity. The matrix can minimize wash out of cells from the resection cavity, e.g., by CSF in the case of brain tumors.

A matrix useful in the methods and compositions described herein will permit tumor cells to migrate away from the matrix, rather than containing the cells within the matrix permanently. As used herein, "matrix" refers to a biological material that comprises a "biocompatible substrate" that can be used as a material that is suitable for implantation into a subject or into which a cell population can be deposited. A biocompatible substrate does not cause toxic or injurious effects once implanted in the subject. The biocompatible substrate can but need not necessarily provide the supportive framework that allows cells to attach to it, and grow on it. Cultured populations of cells (e.g., genetically modified tumor cells) can be prepared with the biocompatible substrate (i.e., the matrix), which provides the appropriate interstitial distances required, e.g., for cell-cell interaction. As used herein, "encapsulated" refers to a cell that is enclosed within the matrix.

A matrix can be designed or selected to provide environmental cues to control and direct the migration of cells to a site of injury or disease. In one embodiment, the matrix comprises a synthetic matrix. In one embodiment, the matrix comprises a thiol-modified hyaluronic acid and a thiol-reactive cross-linker molecule. In one embodiment, the thiol-reactive cross-linker molecule is polyethylene glycol diacrylate. Further description of components useful in constructing a matrix, as well as instruction for making a matrix, can be found in U.S. patent application Ser. No. 15/225,202, which is incorporated herein in its entirety by reference.

Methods of encapsulation of cells are described, for example, in Shah et al. Biomatter. 2013 and Kauer et al. Nature Neuroscience. 2013 (these references describe encapsulation of stem cells, but the approaches are applicable to encapsulation of engineered tumor cells, particularly to the extent that one wishes to permit migration of the engineered tumor cells from the matrix.

Synthetic extracellular matrix (ECM) components, such as those from Hystem and Extralink (Glycosan Hystem-C, Biotime Inc.), can be reconstituted according to the manufacturer's protocols. Engineered tumor cells (e.g. $1\times10^5$, $5\times10^5$, $1\times10^6$, $5\times10^6$, $1\times10^7$, $5\times10^7$, $1\times10^8$, $5\times10^8$, $1\times10^9$ cells or more) can be suspended in Hystem and the matrix cross-linked by adding Extralink. After about 20 minutes (gelation time) at 25° C., the engineered tumor cells in the ECM hydrogel can be used for implantation to a patient.

In one embodiment, the genetically modified tumor cells described herein are administered both directly into the cavity formed by resection of a tumor, and also administered systemically.

The engineered tumor cells described herein, and/or pharmaceutical compositions comprising them can be administered to a subject having or diagnosed as having cancer. In some embodiments, the methods described herein comprise administering an effective amount of engineered tumor cells as described herein to a subject in order to alleviate a symptom of the cancer. As used herein, "alleviating a symptom of the cancer" is ameliorating any condition or symptom associated with the cancer. As compared with an equivalent untreated control, such reduction is by at least 5%, 10%, 20%, 40%, 50%, 60%, 80%, 90%, 95%, 99% or more as measured by any standard technique. A variety of means for administering the compositions described herein to subjects are known to those of skill in the art. In one embodiment, the compositions described herein are administered systemically. In another embodiment, they are administered locally, e.g., via intra-tumor injection, or into a tumor resection cavity or into the area from which the tumor cells used to generate the engineered tumor cells was removed.

The term "effective amount" as used herein refers to the amount of engineered tumor cells needed to alleviate at least one or more symptom of the disease (e.g., glioblatoma or other cancer), and relates to a sufficient amount of the cell preparation or composition to provide the desired effect. The term "therapeutically effective amount" therefore refers to an amount of engineered tumor cells is sufficient to provide a particular anti-tumor, and/or anti-metastatic, and/or anti-tumor immune effect when administered to a typical subject. An effective amount as used herein, in various contexts, would also include an amount sufficient to delay the development of a symptom of the disease, alter the course of a symptom disease (for example but not limited to, slowing the progression of a condition), or reverse a symptom of the condition. Thus, it is not generally practicable to specify an exact "effective amount". However, for any given case, an appropriate "effective amount" can be determined by one of ordinary skill in the art using only routine experimentation.

Effective amounts, toxicity, and therapeutic efficacy can be evaluated by standard pharmaceutical procedures in cell cultures or experimental animals. The dosage can vary depending upon the dosage form employed and the route of administration utilized.

Pharmaceutically acceptable carriers for cell-based therapeutic formulation include, as non-limiting examples, saline and aqueous isotonic buffer solutions, Ringer's solution, and can include human serum components, such as serum albumin, e.g., as stabilizers. The terms such as "excipient", "carrier", "pharmaceutically acceptable carrier" or the like are used interchangeably herein.

In one embodiment, the methods described herein further encompass combination therapy in which the formulations and compositions as disclosed herein are used in combination with a chemotherapeutic agent such as Taxol, cyclophosphamide, cisplatin, ganciclovir and the like (note that in embodiments in which ganciclovir is used to induce a heterologous cell suicide system in an engineered tumor cell as described herein, ganciclovir should not be used as a combination agent, unless it is subsequent to effective treatment with the engineered tumor cell). The chemotherapeutic agent may also, for example, be administered at lower doses than normally used, e.g., as a monotherapy and at such doses may act as an antiangiogenic agent or vascular permeability-inhibiting agent. The second therapy can be administered to the subject before, during, after or as a combination thereof relative to the administration of the engineered tumor cell compositions as disclosed herein. It should be considered in such situations whether the combinatioin chemotherapeutic will adversely affect the activity of the engineered tumor cells; in these situations, a chemotherapeutic should be considered for use before or after administration of the engineered tumor cells, so as not to interfere with their activity. A non-limiting example of a combination regimen includes, e.g., tumor resection (combined with tumor cell isolation for engineering), chemotherapy to attack existing metastases and residual tumor cells, followed by administration of the engineered tumor cells, followed by administration of an inducer of the heterologous inducible cell suicide system, alone or together with further chemotherapy. Chemotherapeutic agents include, but are not limited to an alkylating agent, mitotic inhibitor, antibiotic, or antimetabolite, anti-angiogenic agents etc. The chemotherapy can comprise administration of CPT-11, temozolomide, or a platin compound. Further non-limiting examples of chemotherapeutic drugs for the treatment of include, but are not limited to: temozolomide (Temodar), procarbazine (Matulane), and lomustine (CCNU). Chemotherapy given intravenously includes vincristine (Oncovin or Vincasar PFS), cisplatin (Platinol), carmustine (BCNU, BICNU), and carboplatin (Paraplatin), Mexotrexate (Rheumatrex or Trexall), irinotecan (CPT-11); erlotinib; oxalipatin; anthracyclins-idarubicin and daunorubicin; doxorubicin; alkylating agents such as melphalan and chlorambucil; cis-platinum, methotrexate, and alkaloids such as vindesine and vinblastine, among others.

Radiotherapy can also be used in combination with (e.g., irradiation before or after administration of engineered tumor cells as described herein) the engineered cell-based methods as described herein, and can include, for example, the use of γ-irradiation, or microwaves.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Dosage

"Unit dosage form" as the term is used herein refers to a dosage suitable for one administration. By way of example a unit dosage form can be an amount of therapeutic disposed in a delivery device, e.g., a syringe or intravenous drip bag. In one embodiment, a unit dosage form is administered in a single administration. In another embodiment, more than one unit dosage form can be administered simultaneously or sequentially.

A pharmaceutical composition comprising the engineered tumor cells as described herein can generally be administered at a dosage of $10^4$ to $10^9$ cells/kg body weight, in some instances $10^5$ to $10^6$ cells/kg body weight, including all integer values within those ranges. If necessary, genetically modified tumor cells can also be administered multiple times at these dosages. The cells can be administered by using commonly-known infusion techniques (see, e.g., Rosenberg et al., New Eng. J. of Med. 319:1676, 1988).

Modes of administration can include, for example intravenous (i.v.) injection or infusion. The compositions described herein can be administered to a patient transarterially, intratumorally, intranodally, or intramedullary. In some embodiments, the compositions of tumor cells may be injected directly into a tumor, lymph node, or site of infection. In one embodiment, the compositions described herein are administered into a body cavity or body fluid (e.g., ascites, pleural fluid, peritoneal fluid, or cerebrospinal fluid).

The dosage of the above treatments to be administered to a patient will vary with the precise nature of the condition being treated and the recipient of the treatment. The scaling of dosages for human administration can be performed according to art-accepted practices.

In some embodiments, a single treatment regimen is required. In others, administration of one or more subsequent doses or treatment regimens can be performed. For example, after treatment biweekly for three months, treatment can be repeated once per month, for six months or a year or longer. In some embodiments, no additional treatments are administered following the initial treatment. In one embodiment, genetically modified tumor cells are administered once, and genetically modified tumor cells are administered at least one additional time. In one embodiment, genetically modified tumor cells are administered once, and genetically modified tumor cells are administered at least one additional time.

The dosage of a composition as described herein can be determined by a physician and adjusted, as necessary, to suit observed effects of the treatment. With respect to duration and frequency of treatment, it is typical for skilled clinicians to monitor subjects in order to determine when the treatment is providing therapeutic benefit, and to determine whether to administer further cells, discontinue treatment, resume treatment, or make other alterations to the treatment regimen. The dosage should not be so large as to cause adverse side effects, such as cytokine release syndrome. Generally, the dosage will vary with the age, condition, and sex of the patient and can be determined by one of skill in the art. The dosage can also be adjusted by the individual physician in the event of any complication.

All patents and other publications; including literature references, issued patents, published patent applications, and co-pending patent applications; cited throughout this application are expressly incorporated herein by reference for the purpose of describing and disclosing, for example, the methodologies described in such publications that might be used in connection with the technology described herein. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

The description of embodiments of the disclosure is not intended to be exhaustive or to limit the disclosure to the precise form disclosed. While specific embodiments of, and examples for, the disclosure are described herein for illustrative purposes, various equivalent modifications are possible within the scope of the disclosure, as those skilled in the relevant art will recognize. For example, while method steps or functions are presented in a given order, alternative embodiments may perform functions in a different order, or functions may be performed substantially concurrently. The teachings of the disclosure provided herein can be applied to other procedures or methods as appropriate. The various embodiments described herein can be combined to provide further embodiments. Aspects of the disclosure can be modified, if necessary, to employ the compositions, functions and concepts of the above references and application to provide yet further embodiments of the disclosure. Moreover, due to biological functional equivalency considerations, some changes can be made in protein structure without affecting the biological or chemical action in kind or amount. These and other changes can be made to the disclosure in light of the detailed description. All such modifications are intended to be included within the scope of the appended claims.

Specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

The technology described herein is further illustrated by the following examples which in no way should be construed as being further limiting.

Some embodiments of the technology described herein can be defined according to any of the following numbered paragraphs:

1. A tumor cell engineered to express heterologous polypeptides including:
    (i) a receptor-mediated cell death-inducing polypeptide;
    (ii) an immunomodulatory polypeptide;
    (iii) a heterologous inducible cell suicide system;
    (iv) wherein the cell is further engineered to inactivate endogenous receptor for the receptor-mediated cell death-inducing polypeptide.
2. The tumor cell of paragraph 1, which is a human tumor cell.
3. The tumor cell of paragraph 1, wherein the receptor-mediated cell death-inducing polypeptide is selected from the group consisting of TNF-related apoptosis-inducing ligand (TRAIL) or a polypeptide comprising an extracellular domain of TRAIL that binds a TRAIL receptor, interferon (IFN) α, IFN β, and first apoptosis signal (FAS) ligand.
4. The tumor cell of paragraph 1, wherein the immunomodulatory polypeptide promotes an immune response.
5. The tumor cell of paragraph 1, wherein the immunomodulatory polypeptide is granulocyte-macrophage colony stimulating factor (GMCSF).
6. The tumor cell of paragraph 1, wherein the immunomodulatory polypeptide is GMCSF and the receptor-mediated cell death-inducing polypeptide is IFNβ.
7. The tumor cell of paragraph 1, wherein the heterologous inducible cell suicide system comprises an enzyme that converts a non-toxic pro-drug to a cytotoxic agent.
8. The tumor cell of paragraph 7, wherein the enzyme that converts a non-toxic pro-drug to a cytotoxic agent comprises the thymidine kinase domain of HSV-thymidine kinase.

9. The tumor cell of paragraph 1, wherein the heterologous inducible cell suicide system comprises inducible expression of an apoptosis-inducing factor.

10. The tumor cell of paragraph 9, wherein the apoptosis-inducing factor comprises the catalytic domain of a caspase 9 enzyme.

11. The tumor cell of paragraph 1, wherein the endogenous receptor for the receptor-mediated cell death-inducing polypeptide is inactivated by an RNA-guided endonuclease targeted to the coding sequence for the endogenous receptor.

12. The tumor cell of paragraph 11, wherein the endogenous receptor is inactivated by CRISPR-mediated mutagenesis.

13. A method of treating cancer in an individual in need thereof, the method comprising administering a tumor cell of any one of paragraphs 1-12 to the individual.

14. The method of paragraph 13, wherein the tumor cell is autologous to the individual.

15. The method of paragraph 13, wherein the administering permits homing of the administered cell to one or more tumors in the individual, and wherein cells of one or more tumors in the individual are induced to undergo apoptosis by the receptor-mediated cell death-inducing polypeptide.

16. The method of paragraph 13, in which the administering promotes an anti-tumor immune response.

17. The method of paragraph 13, in which the administering inhibits metastasis of the individual's cancer.

18. The method of paragraph 13, wherein the administering promotes apoptosis of cells of one or more tumors in the individual and promotes an anti-tumor immune response that either kills tumor cells, inhibits metastasis or both.

19. The method of paragraph 13, wherein the tumor cell is administered systemically.

20. The method of paragraph 13, wherein the tumor cell is administered via implantation into a tumor resection cavity.

21. The method of paragraph 13, wherein the tumor cell is a melanoma cell, a lung cancer cell, a breast cancer cell or a glioblastoma cell.

22. The method of paragraphs 13, further comprising, after administering the tumor cell, the step of administering an inducer of the heterologous inducible cell suicide system, thereby killing the administered tumor cell.

23. A method of inhibiting metastasis of an individual's tumor, the method comprising administering a tumor cell of any one of paragraphs 1-12 to the individual.

24. The method of paragraph 23, wherein the administered tumor cell is autologous to the individual.

25. The method of paragraph 23, further comprising, after administering the tumor cell, the step of administering an inducer of the heterologous inducible cell suicide system, thereby killing the administered tumor cell.

26. A pharmaceutical composition comprising a tumor cell of any one of paragraphs 1-12.

27. Use of a tumor cell of any one of paragraphs 1-12 for the treatment of cancer or inhibition of metastasis in an individual in need thereof.

28. A method of inducing an anti-tumor immune response in an individual with cancer, the method comprising administering a tumor cell of any one of paragraphs 1-12 to an individual in need thereof.

29. The method of paragraph 28, wherein the tumor cell is autologous to the individual.

30. The method of paragraph 28, wherein the receptor-mediated cell death-inducing polypeptide is IFNβ and the immunomodulatory polypeptide is GMCSF.

31. The method of paragraph 28, wherein the tumor cell is administered systemically.

32. The method of paragraph 28, wherein the tumor cell is administered via implantation into a tumor resection cavity.

33. The method of paragraph 28, wherein the tumor cell is a melanoma cell, a lung cancer cell, a breast cancer cell or a glioblastoma cell.

34. The method of paragraph 23, wherein the administering inhibits the establishment or growth of tumor metastases.

35. The method of paragraph 23, wherein the administering provokes an anti-tumor immune response that inhibits the establishment or growth of metastases of the cancer.

36. The method of paragraph 23, wherein the tumor cell is administered systemically.

37. The method of paragraph 23, wherein the tumor cell is administered via implantation into a tumor resection cavity.

38. The method of paragraph 23, wherein the tumor cell is a melanoma cell, a lung cancer cell, a breast cancer cell or a glioblastoma cell.

39. A tumor cell autologous to a cancer patient, the tumor cell engineered so as to:
   a) encode and express a heterologous ligand effective to kill cells of the patient's tumor(s) when re-introduced to the patient;
   b) be insensitive to killing by the ligand; and
   c) encode and express a heterologous inducible cell suicide system.

40. The engineered tumor cell of paragraph 39, wherein the cell comprises a targeted inactivating mutation of a gene encoding a receptor for the ligand, such that the cell is rendered insensitive to killing by the ligand.

41. The engineered tumor cell of paragraph 31, wherein the ligand comprises a polypeptide selected from the group consisting of the extracellular domain of a TNF-related apoptosis-inducing ligand (TRAIL), FAS ligand, IFNα and IFNβ.

42. The engineered tumor cell of paragraph 39, wherein the ligand comprises sTRAIL.

43. The engineered tumor cell of paragraph 39, wherein the cell comprises a targeted inactivating mutation of a TRAIL receptor gene.

44. The engineered tumor cell of paragraph 43, wherein the cell comprises a targeted inactivating mutation of DR4, DR5 or both.

45. The engineered tumor cell of paragraph 39, wherein the heterologous inducible cell suicide system comprises an enzyme that converts a non-toxic pro-drug to a cytotoxic agent 46. The engineered tumor cell of paragraph 45, wherein the heterologous inducible cell suicide system comprises the thymidine kinase domain of HSV-thymidine kinase.

47. The engineered tumor cell of paragraph 39, wherein the heterologous inducible cell suicide system comprises inducible expression of an apoptosis-inducing factor.

48. The engineered tumor cell of paragraph 47, wherein the apoptosis-inducing factor comprises the catalytic domain of a caspase 9 enzyme.

49. A method of treating cancer in a patient in need thereof, the method comprising administering an autologous tumor cell of any one of paragraphs 39-48 to the patient.
50. The method of paragraph 49, further comprising administering an inducer of the heterologous inducible cell suicide system to the patient after the autologous tumor cell is administered.
51. The method of paragraph 50, further comprising, after administering the cell and before administering the inducer, detecting one or more of tumor size, tumor load, and tumor apoptosis.
52. A method of treating cancer in a patient, comprising:
    a) engineering a cancer cell from the patient to
        i) encode and express a heterologous ligand effective to kill cells of the patient's tumor(s) when re-introduced to the patient;
        ii) be insensitive to killing by the ligand; and
        iii) encode and express a heterologous inducible cell suicide system;
    b) administering the engineered cancer cell to the patient, wherein the engineered cancer cell homes to the patient's tumor, and the heterologous ligand promotes tumor cell death.
53. The method of paragraph 52, further comprising administering an inducer of the heterologous inducible cell suicide system to the patient to eradicate the engineered cancer cells.
54. The method of paragraph 53, further comprising, after administering the cell and before administering the pro-drug, detecting one or more of tumor size, tumor load, and tumor apoptosis.
55. The method of paragraph 52, wherein the cell comprises a targeted inactivating mutation of a gene encoding a receptor for the ligand, such that the cell is rendered insensitive to killing by the ligand.
56. The method of paragraph 52, wherein the ligand comprises the extracellular domain of TRAIL.
57. The method of paragraph 52, wherein the ligand comprises sTRAIL.
58. The method of paragraph 56, wherein the cell comprises a targeted inactivating mutation of a gene encoding a TRAIL receptor.
59. The method of paragraph 58, wherein the cell comprises a targeted inactivating mutation of a gene encoding DR4, DR5 or both.
60. The method of paragraph 52, wherein the heterologous inducible cell suicide system comprises an enzyme that converts a non-toxic pro-drug to a cytotoxic agent.
61. The method of paragraph 60, wherein the enzyme that converts a non-toxic pro-drug to a cytotoxic agent comprises the thymidine kinase domain of HSV-thymidine kinase.
62. The method of paragraph 52, wherein the heterologous inducible cell suicide system comprises inducible expression of an apoptosis-inducing factor.
63. The method of paragraph 62, wherein the apoptosis-inducing factor comprises the catalytic domain of a caspase 9 enzyme.
64. The method of paragraph 52, wherein engineering the cancer cell to be insensitive to killing by the ligand is performed using an RNA-guided endonuclease.
65. The method of paragraph 52, wherein the engineered cancer cell is administered directly to a tumor or to a tumor resection cavity.
66. The method of paragraph 52, wherein the engineered cancer cell is administered systemically.
67. The method of paragraph 52, wherein the cancer is a carcinoma, lymphoma, blastoma, sarcoma, or leukemia.

EXAMPLES

Example 1: Compositions and Methods Related to Bimodal Tumor Cell Killers and Vaccines Combined advances in the fields of biomedical research, drug development, medical imaging, and surgical techniques have translated into considerably improved outcomes of cancer patients over the last few decades. The resulting impact of therapy improvement on even highly malignant tumors, which have previously been considered "untreatable", including lung cancer and melanoma, has recently led to excitement in the medical and scientific oncology fields. Nevertheless, numerous local and systemic cancer types, as well as many forms of metastatic disease, remain ultimately fatal and treatment regimes in end-stage disease, especially in the recurrent setting, often lack evidence-based guidelines.

One of the major treatment hurdles of advanced-stage cancer is localized and distant tumor cell metastasis, following vascular infiltration or penetration of anatomic boundaries. Hereby, a growing body of evidence suggests that tumor progression at this stage may be enhanced by circulating cancer cells ability of "self-seeding", a process involving cell dissemination into the vascular system away from a primary or metastatic tumor, followed by the cells rehoming to the site of origin. It is considered that one could exploit the homing capacity of tumor cells to deliver a cytotoxic signal or payload back to the primary tumor and/or its metastases. Naturally, engineering tumor cells for self-targeted anticancer treatment is a double-edged sword: premature cell death due to self-toxicity of introduced transgenes may limit their antitumor efficacy, while long-term survival of therapeutic cells may potentially cause secondary tumor formation, even if they are initially efficacious in treating the targeted self-tumor site.

By utilizing recent advances in bioengineering, it is demonstrated in the experiments and data described in the figures provided herein that one can simultaneously prevent receptor-mediated autocrine toxicity and combine the self-homing properties of cancer cells with the benefits of receptor-targeted treatment and inducible suicide-system related-bystander effect/clearance. In order to test the clinical feasibility of this approach in first-line treatment of primary tumors as well as in the therapy of recurrent and metastatic disease, the approach for treatment in the recurrent setting was designed using CRISPR technology that switches the treatment-response-phenotype of the therapeutic tumor cells from therapy-sensitive to therapy-resistant prior to engineering with therapeutic molecules (data not shown). Demonstrated herein are approaches that allow high expression of pro-apoptotic molecules without inflicting autocrine toxicity, which in combination with self-homing and suicide-system-mediated bystander effect/clearance translates into marked survival benefits in mouse models in multiple cancer settings.

Figure 2A:
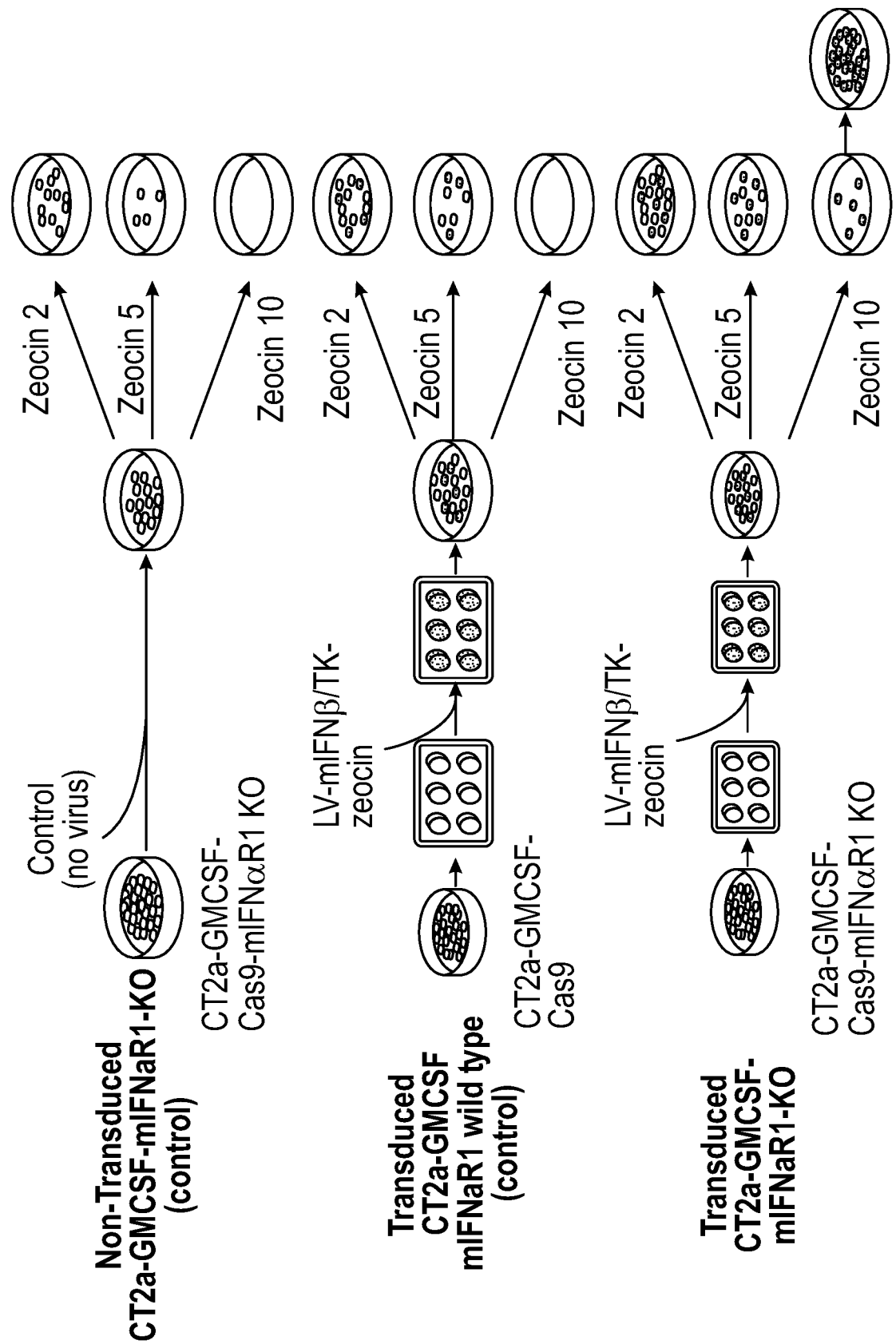
FIGS. 2A-2C demonstrates that engineered tumor cells have autologous self-targeting efficacy and can be eradicated post ganciclovir (GCV) treatment.
Figure 2B:
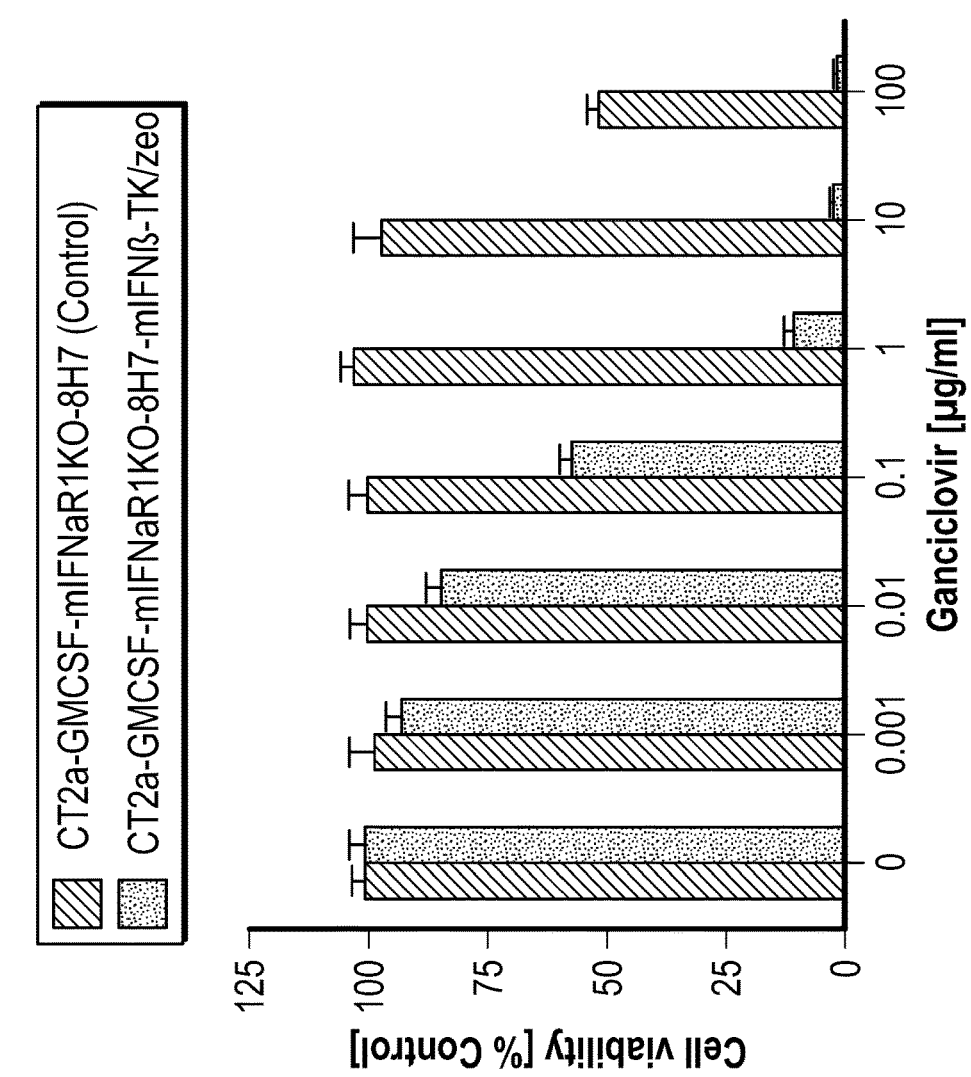
Figure 2B:
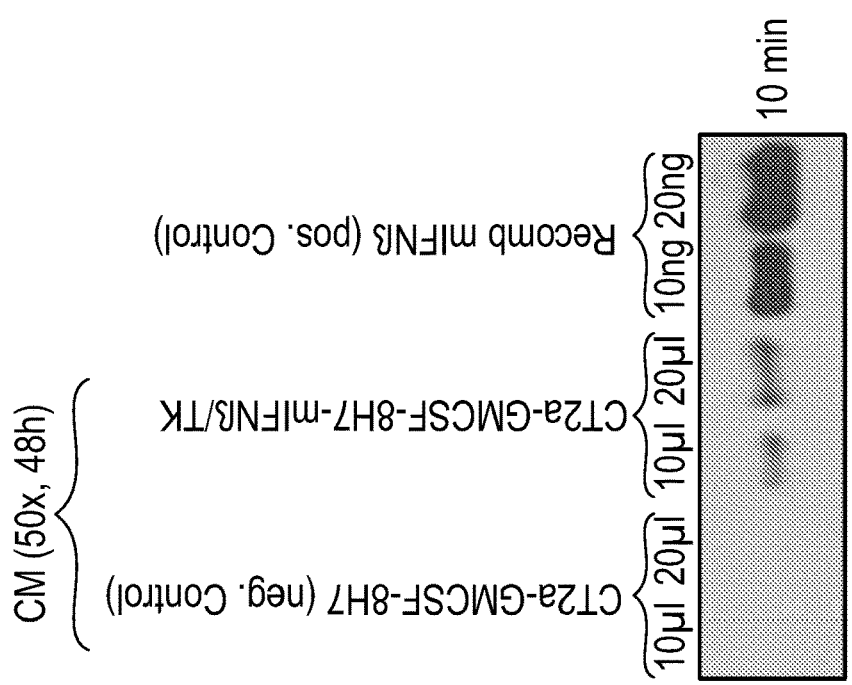
Figure 2C:
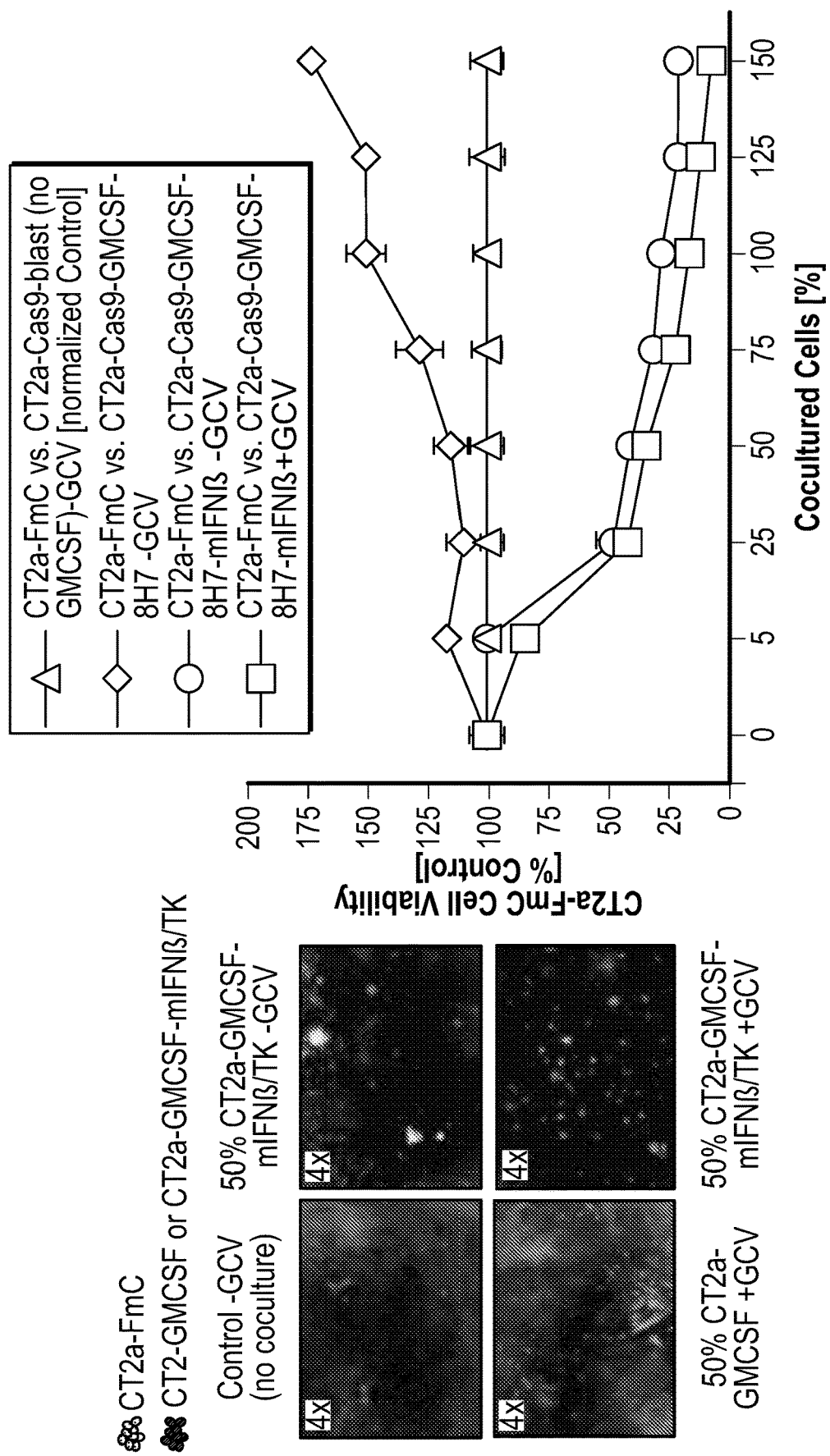

Thus in FIG. 1A-D, it is shown that CRISPR gene editing approaches make mouse tumor cells resistant to IFNβ. The data presented in FIG. 2A-C demonstrate that engineered tumor cells have autologous self-targeting efficacy and can be eradicated by post-administration of ganciclovir (GCV).

Figure 3A:
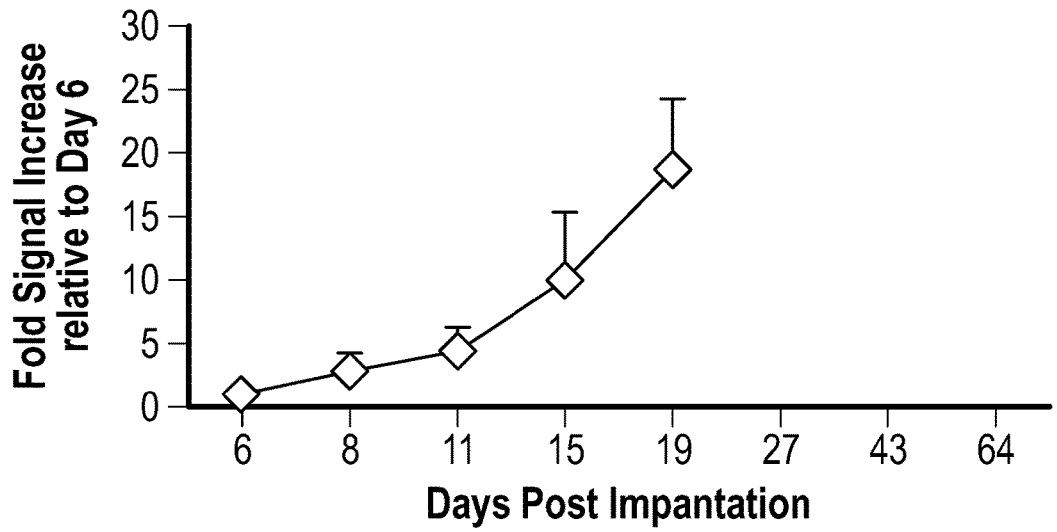
FIGS. 3A-3C shows that mouse tumor cells expressing IFNβ, GMCSF and HSV-TK grow in immune-compromised but not in immune-competent mice
Figure 3A:
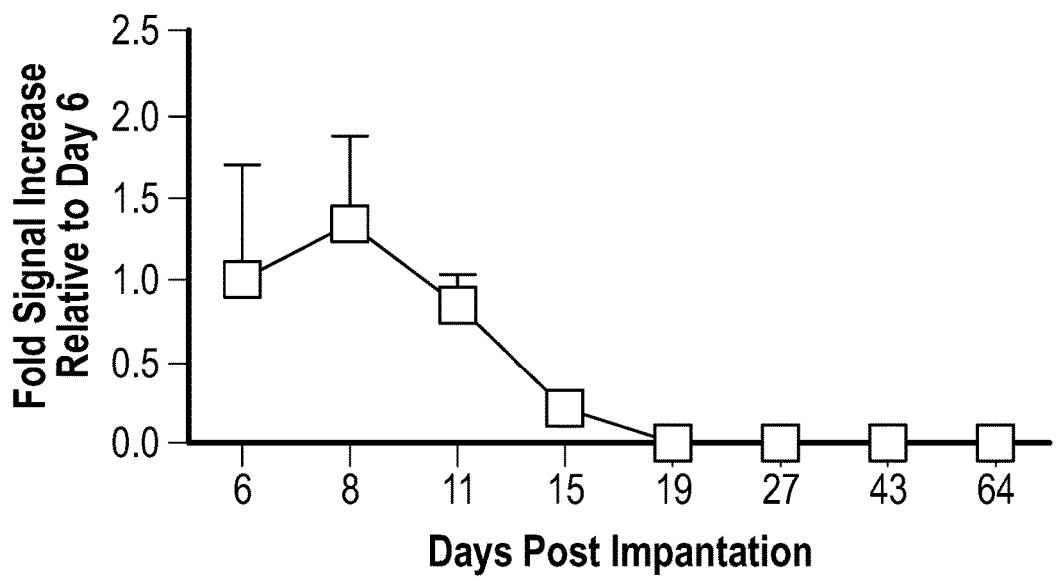
Figure 3A:
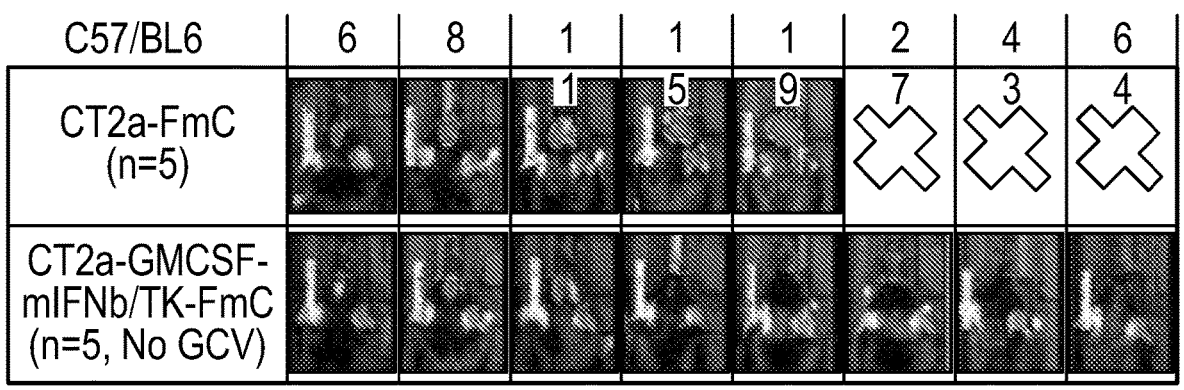
Figure 3B:
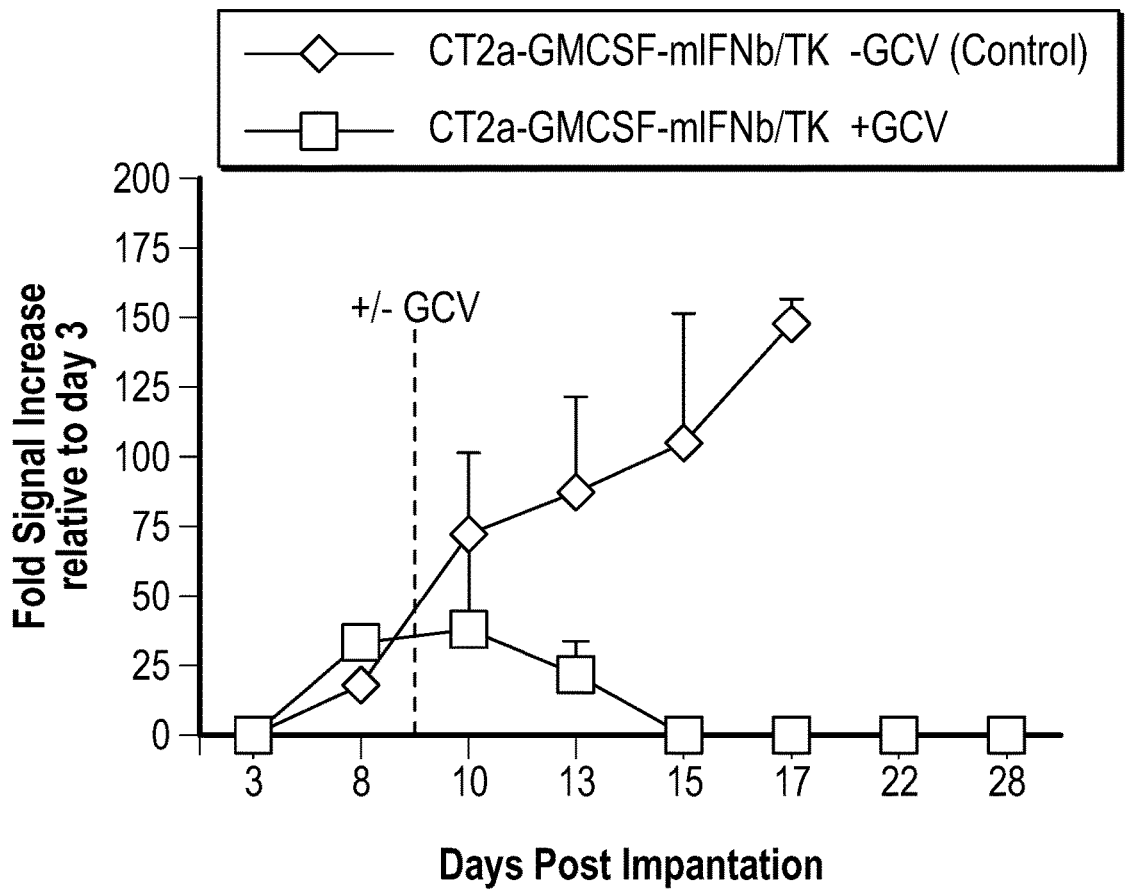
Figure 3B:
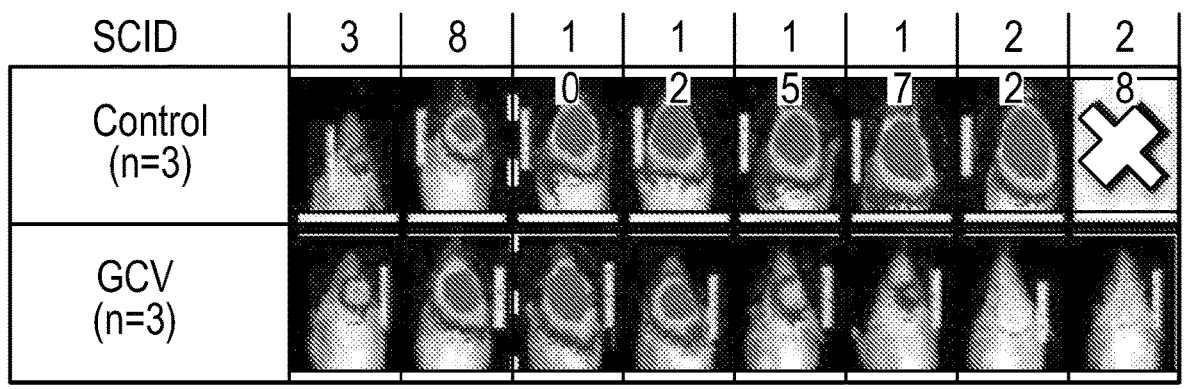
Figure 3C:
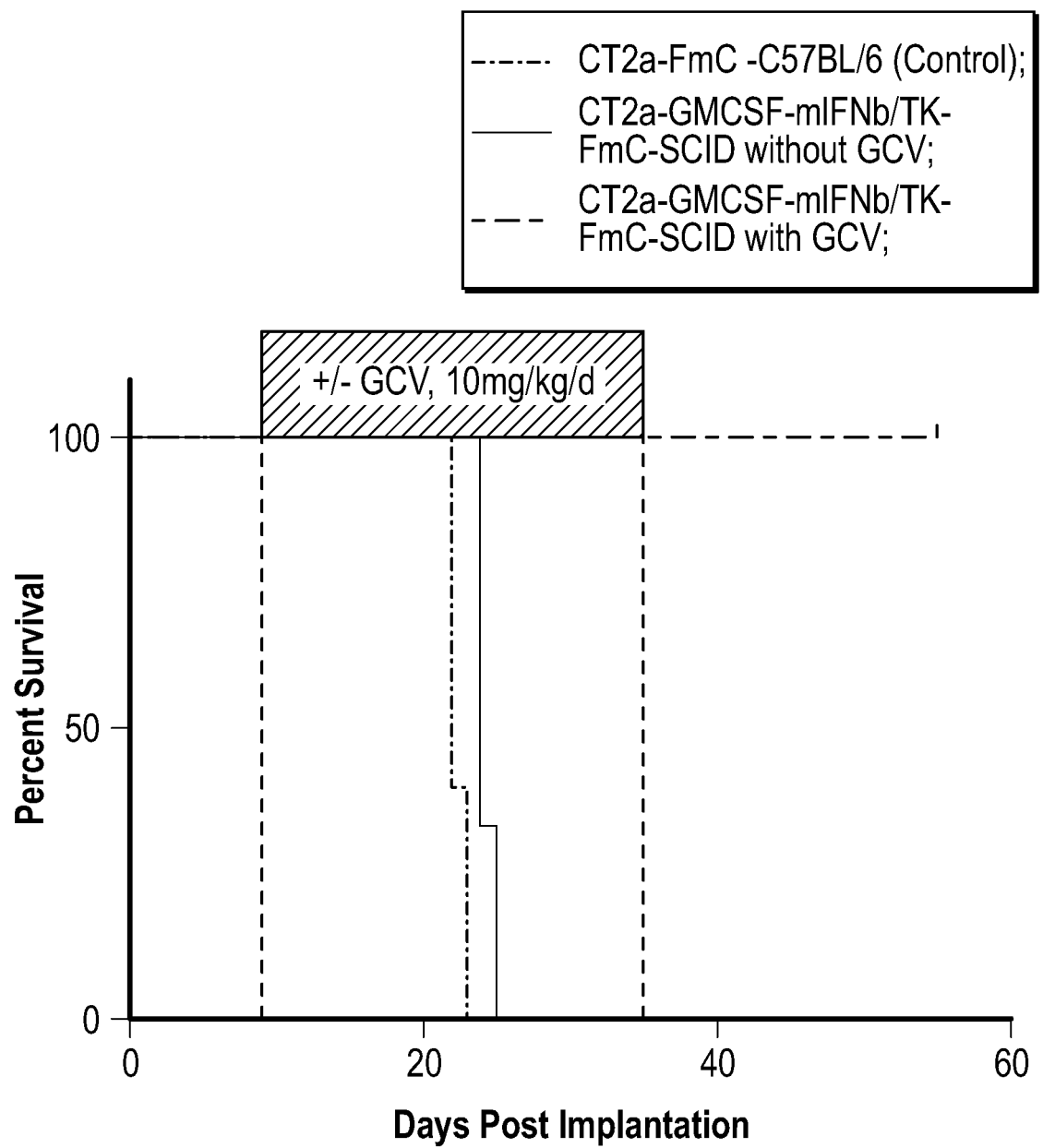
Figure 4A:
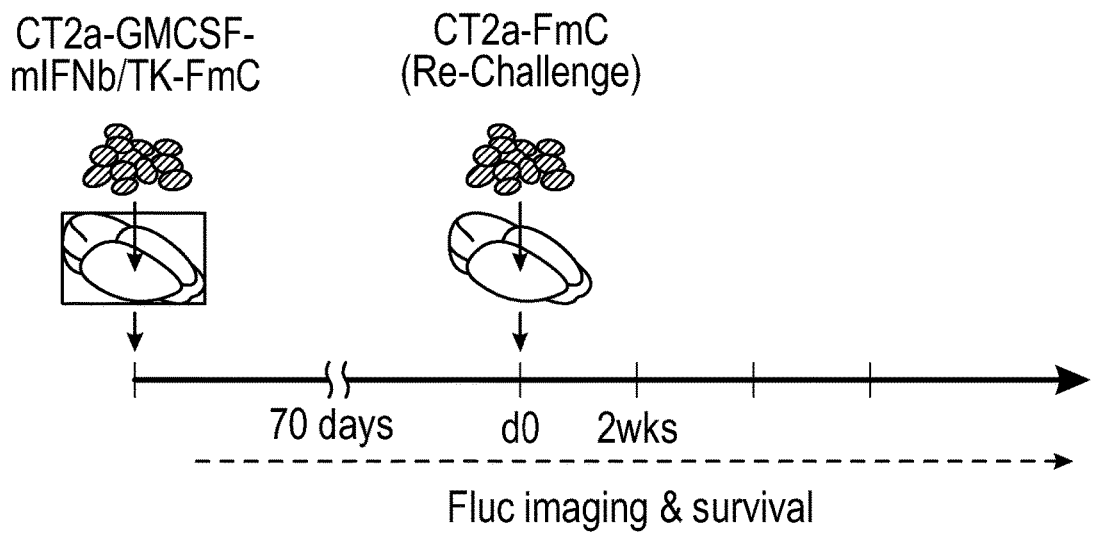
FIGS. 4A-4C shows that mice that did not develop tumors after CT2a-GMCSF-IFNβ/TK implantation are resistant to re-challenge with CT2a-FmC.
Figure 4B:
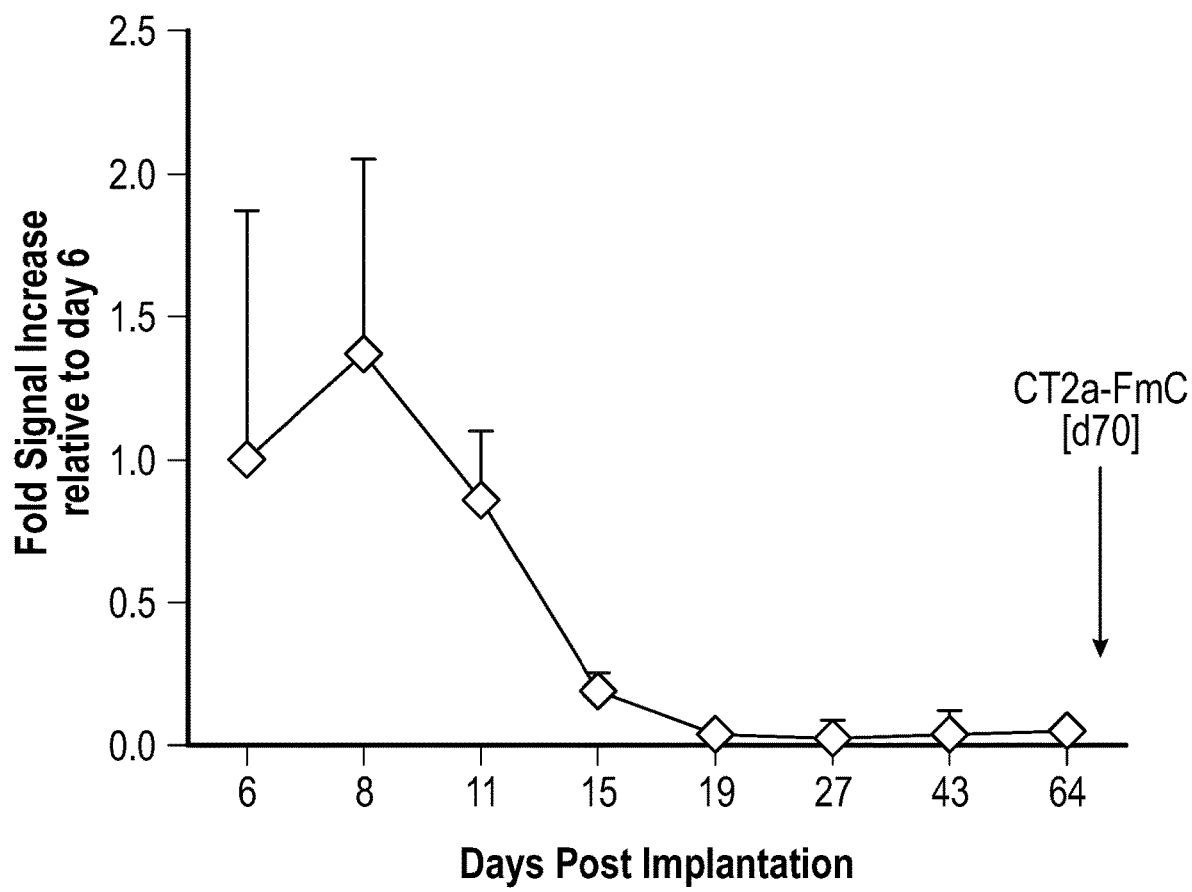
Figure 4C:
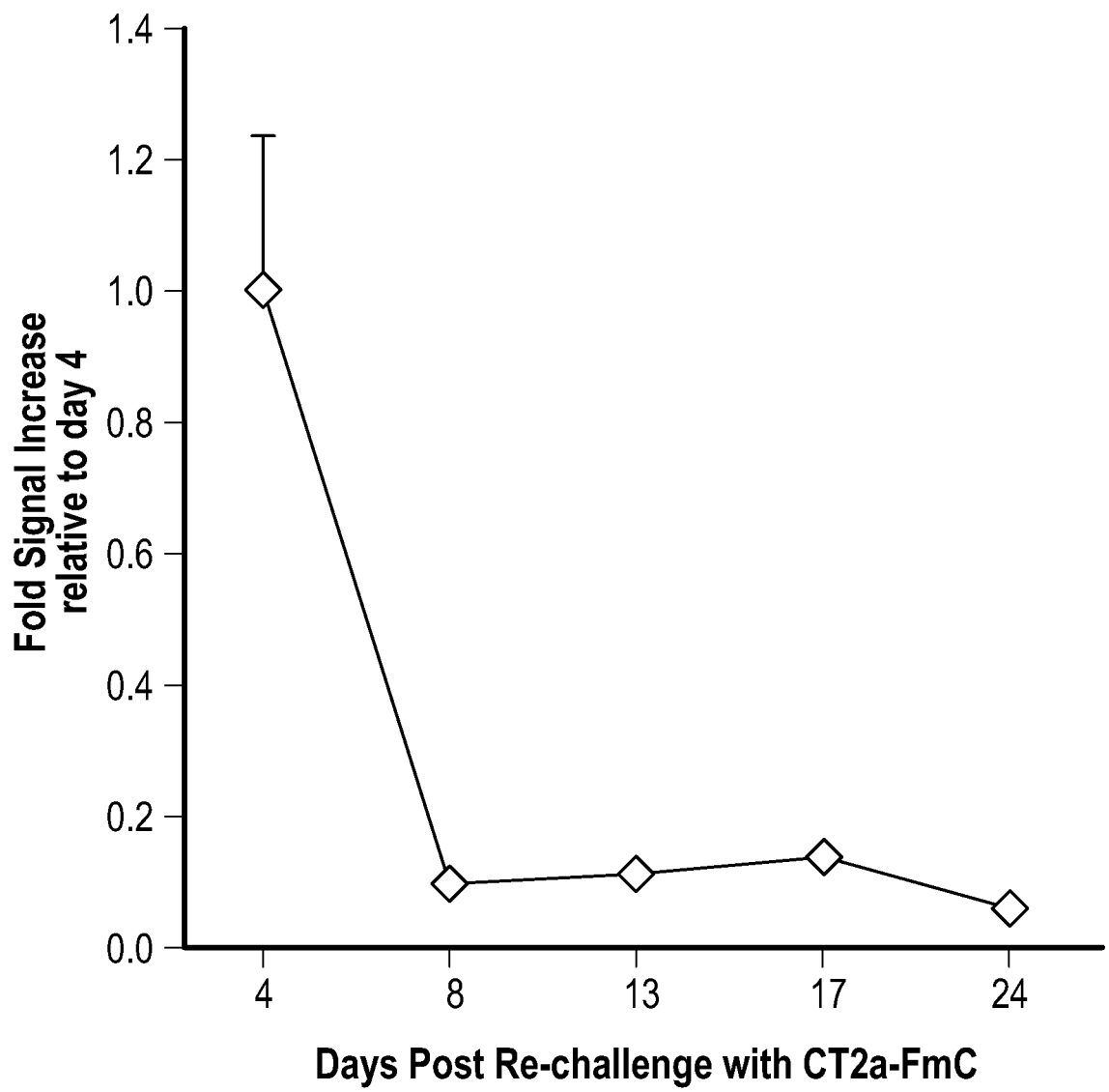
Figure 5A:
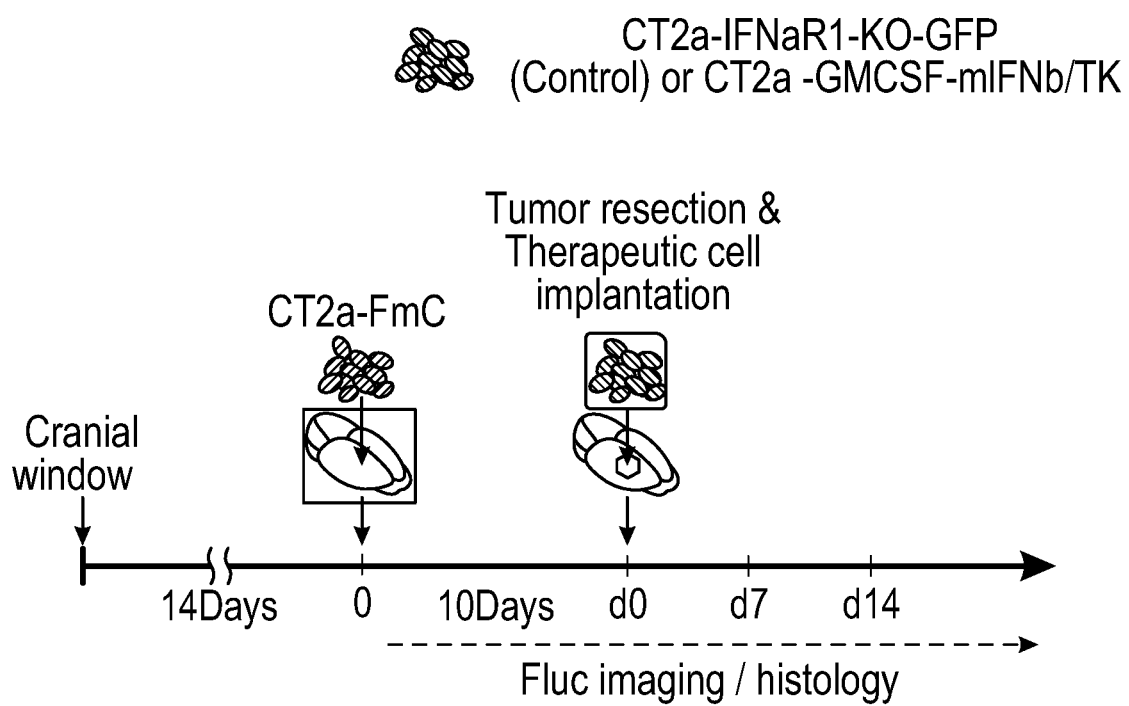
FIGS. 5A-5C demonstrates that encapsulated CT2a-GMCSF-IFNβ/TK placed in the CTA2a-FMC GBM tumor resection cavity results in increased mouse survival.
Figure 5B:
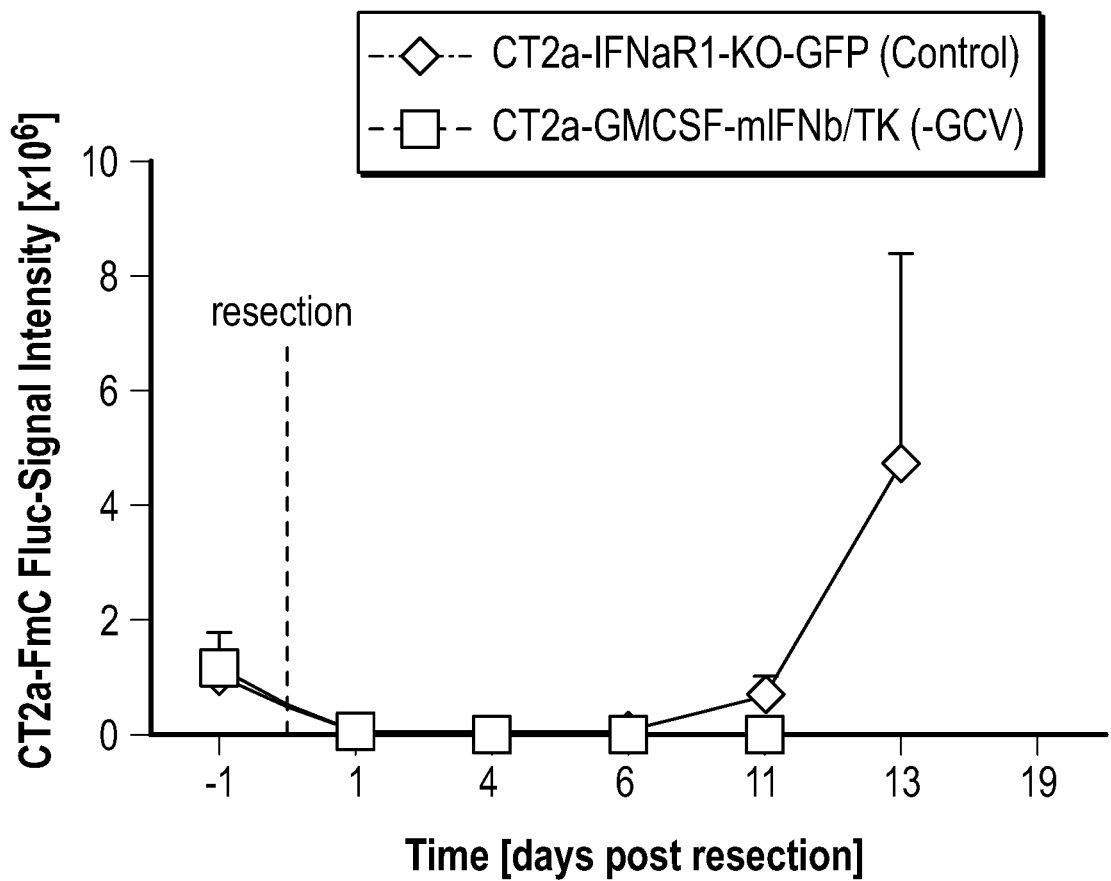
Figure 5B:
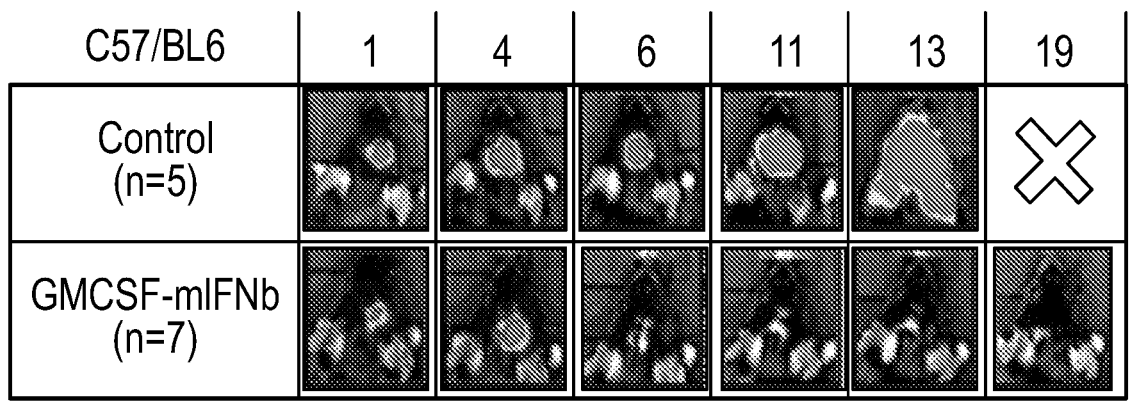
Figure 5C:
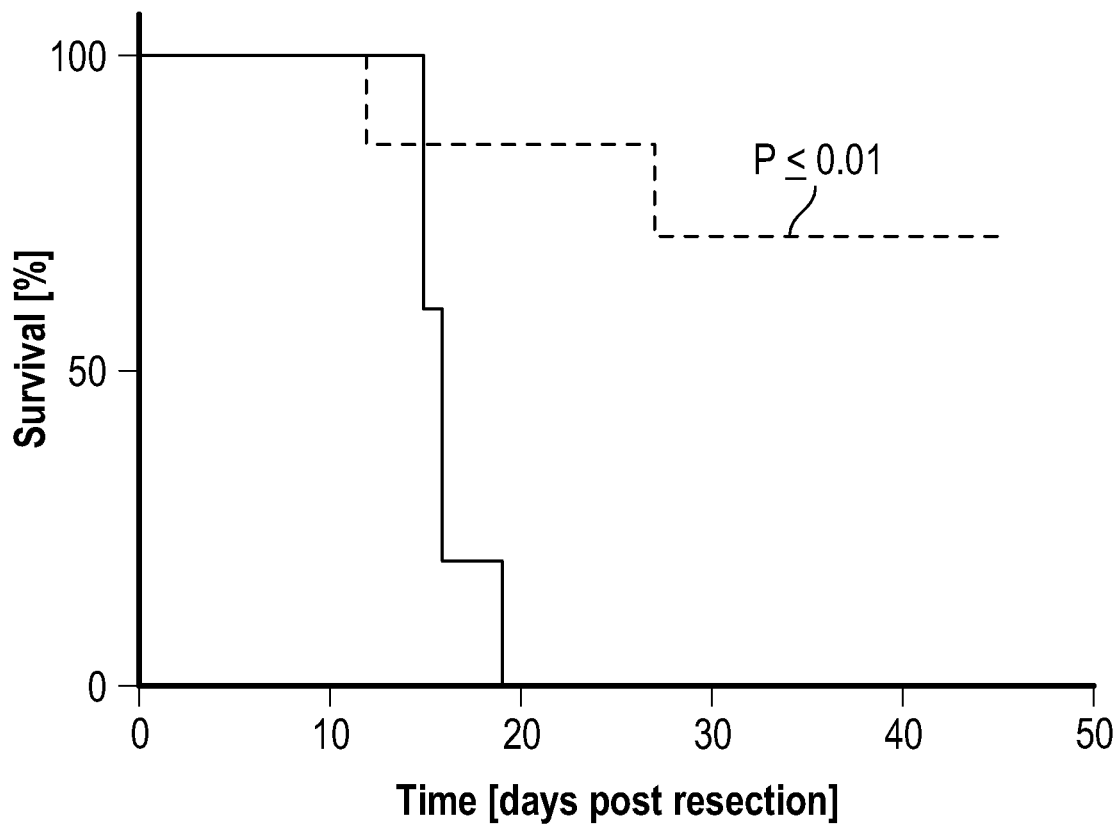

Furthermore, mouse tumor cells expressing IFNβ, GMCSF, and herpes simplex virus thymidine kinase (HSV-TK) grow in immune-compromised but not in immune-competent mice (FIG. 3A-C). Mice that did not develop tumors after CT2a-GMCSF-IFNβ/TK implantation are resistant to re-challenge with CT2a-FmC (FIG. 4A-C). That is, the engineered tumor cells also provoked an anti-tumor immune response.

One important consideration in the described experimental studies is the timing of vaccination in relation to that of tumor cell inoculation. The longer the gap between initiation of vaccination and tumor cell inoculation, the more relevant are the resulting observations for patients with unresected tumors (FIG. 5). Conversely, vaccination soon after tumor cell inoculation (as is typical in rodent studies) might resemble the clinical scenario in which patients with recently resected tumors are limited to microscopic disease. The studies in this preclinical model provide important information that predict whether anti-tumor (e.g. anti-glioma) vaccines alone, or in combination with other drugs, will have anti-tumor activity in the clinical setting.

Example 2: CRISPR-Enhanced Engineering of Therapy-Sensitive Cancer Cells for Self-Targeting of Primary and Metastatic Tumors Tumor cells engineered to express therapeutic agents have shown promise to treat cancer. However, their potential to target cell surface receptors specific to the tumor site and their post-treatment fate have not been explored. The Inventors created therapeutic tumor cells expressing ligands specific to primary and recurrent tumor sites (receptor self-targeted tumor cells) and extensively characterized two different approaches using: (1) therapy-resistant cancer cells, engineered with secretable death-receptor targeting ligands for "off-the-shelf" therapy in primary tumor settings; and (2) therapy-sensitive cancer cells, which were CRISPR-engineered to knock out therapy-specific cell surface receptors before engineering with receptor-self-targeted ligands and re-applied in autologous models of recurrent or metastatic disease. The inventors show that both approaches allow high expression of targeted ligands that induce tumor cell killing and translate into marked survival benefits in mouse models of multiple cancer types. Safe elimination of therapeutic cancer cells after treatment was achieved by co-engineering with a prodrug-converting suicide system, which also allowed for real time in vivo PET imaging of therapeutic tumor cell fate. This study demonstrates self-tumor tropism of engineered cancer cells and their therapeutic potential when engineered with self-receptor targeted molecules, and it establishes a proof-of-principle towards a safe clinical translation for different cancer types in primary, recurrent, and metastatic settings.

One of the major treatment hurdles of advanced-stage cancer is localized and distant tumor cell metastasis, resulting from vascular infiltration or penetration of anatomic boundaries (2, 3). A growing body of evidence suggests that tumor progression at this stage may be enhanced by circulating cancer cells' ability of "self-seeding", a process involving cell dissemination into the vascular system away from a primary or metastatic tumor, followed by the cells rehoming to the site of origin (4). Naturally, engineering tumor cells for self-targeted anticancer treatment is a double-edged sword: premature cell death due to self-toxicity of introduced transgenes may limit their antitumor efficacy, whereas long-term survival of therapeutic cells may potentially cause secondary tumor formation, even if they are initially efficacious in treating the targeted self-tumor site. Much of the progress recently seen in cancer therapies is ultimately a result of advances in the field of receptor-targeted therapies (5, 6), where disease- or cancer-specific (over-) expression of cell surface receptors is targeted to modulate downstream pathways involved in functions such as proliferation/survival, cell cycle regulation, metabolism, angiogenesis, inflammation, or immune response. To improve therapy success, it has therefore become increasingly common to categorize patients according to their disease-specific (receptor) gene expression profiles. In cancer therapies, targeting proliferative or triggering pro-apoptotic receptor-mediated pathways has proven especially attractive (7-9). In previous investigations, the feasibility of combining receptor-targeted treatments with cell-based therapies and associated benefits have been shown in distinct tumor settings (9-12). The inventors screened a panel of different cancer types for their responses to surface receptor ligands/antagonists that target cell proliferation and death pathways and identified the secretory variant of tumor necrosis factor (TNF)-related apoptosis-inducing ligand (S-TRAIL) as a promising anti-tumor agent due to its ability to strongly induce apoptosis in a wide variety of different cancer types, without causing considerable toxicity in normal cells (13-15).

Figure 6A:
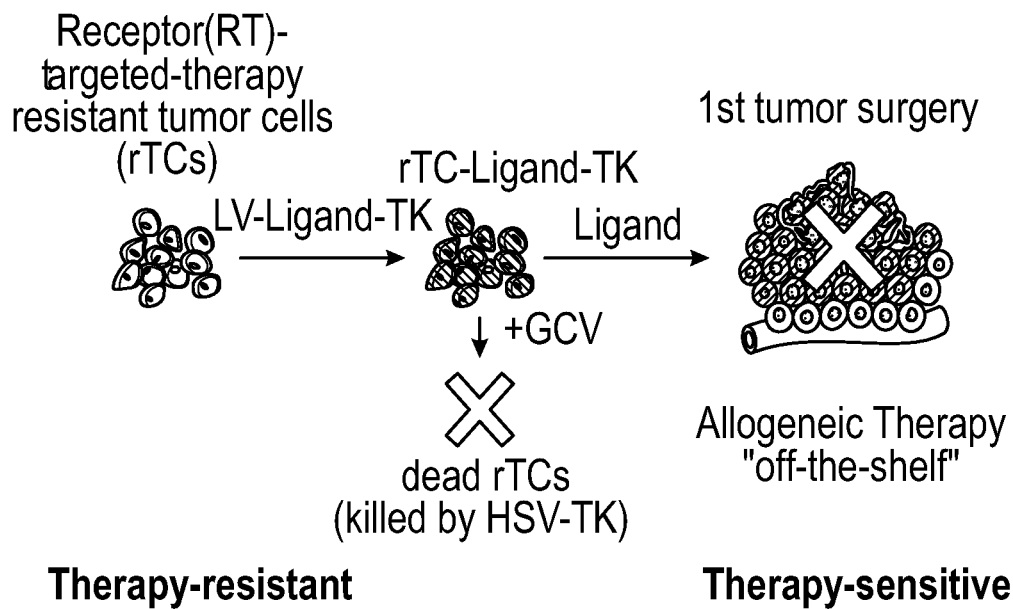
FIGS. 6A-6D demonstrates the concept of the invention and the identification of death receptor ligand as a potent agent for cancer-cell based self-targeting therapies.
Figure 6B:
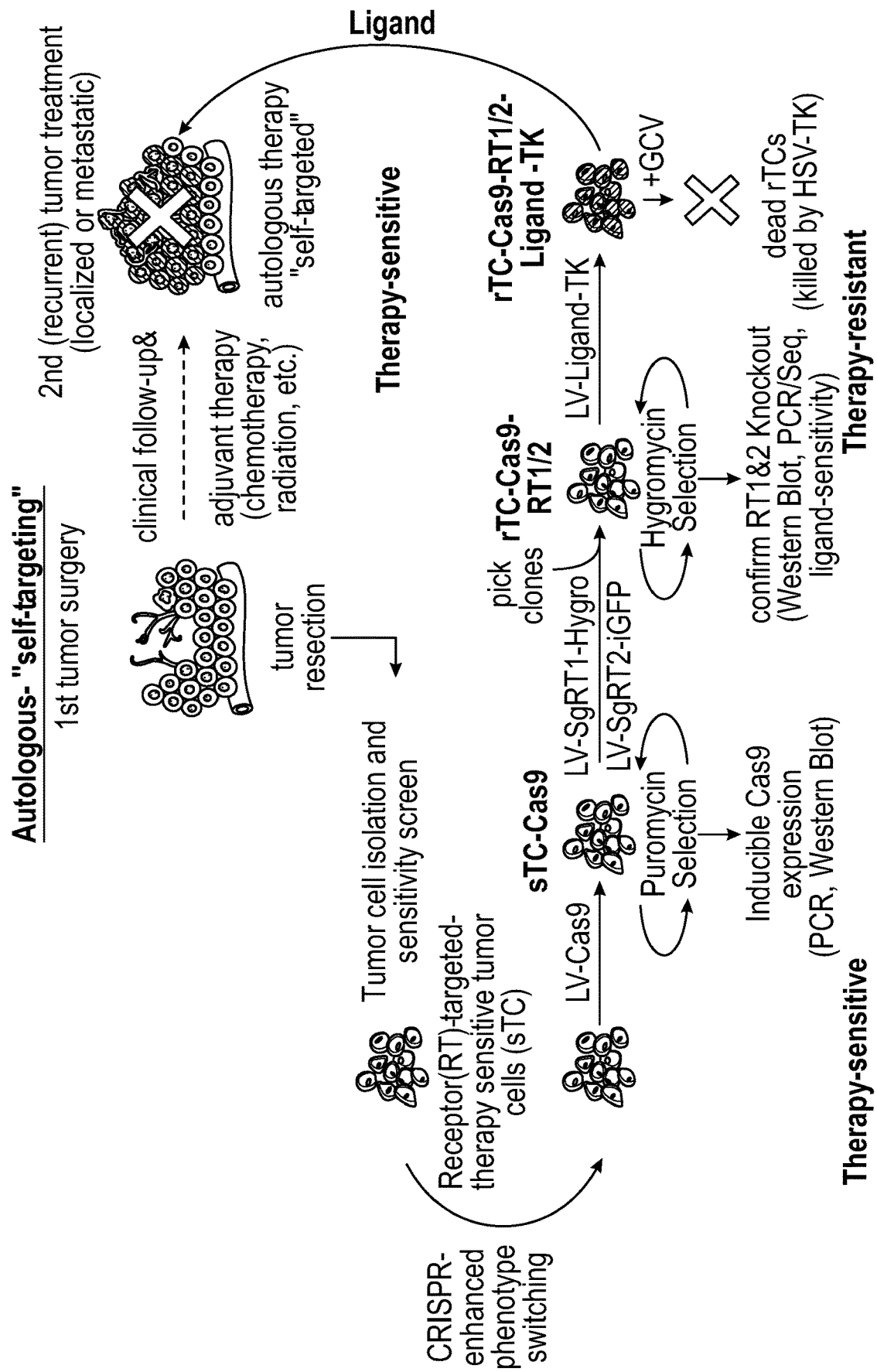
Figure 6C:
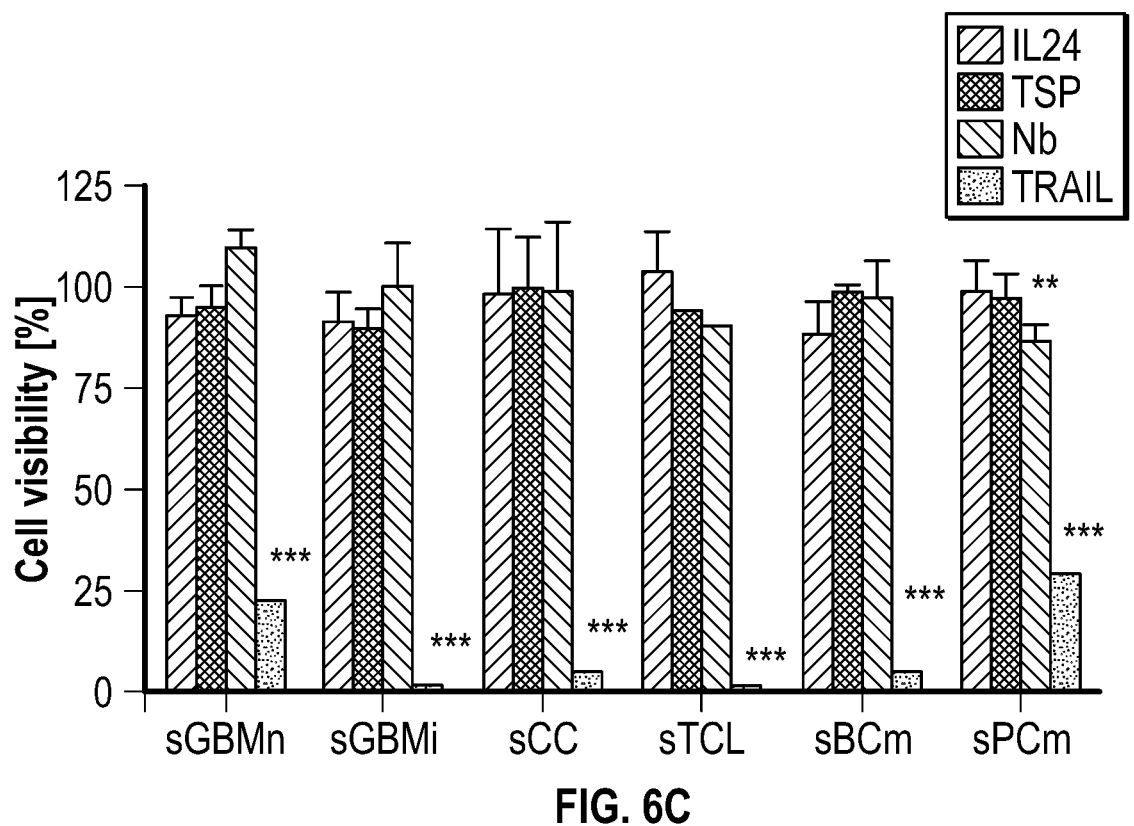

Building on the above findings, the inventors hypothesized that by applying recent advances in bioengineering, the inventors could simultaneously prevent receptor-mediated autocrine toxicity and combine the self-homing properties of cancer cells with the benefits of receptor-targeted treatment and inducible suicide system-related bystander effect/clearance. To test the clinical feasibility of this approach in first-line treatment of primary tumors as well as in the therapy of recurrent and metastatic disease, the inventors explored two different approaches: (1) an "off the shelf" allogeneic option for treatment of primary tumors with pre-engineered, therapy-resistant tumor cells which in a clinical setting would be selected to match the patients' HLA phenotype (FIG. 6A), and (2) an "autologous" approach for treatment in the recurrent setting, which uses CRISPR technology to switch the treatment response phenotype of the therapeutic cells from therapy-sensitive to therapy-resistant before engineering with therapeutic molecules (FIG. 6B). The inventors demonstrate that these approaches allow high expression of pro-apoptotic molecules without inflicting autocrine toxicity, which in combination with self-homing and suicide system-mediated bystander effect/clearance translates into marked survival benefits in mouse models of multiple cancer types.

Death Receptor (DR) 4/5 Targeted Therapy Demonstrates Potent Anti-Cancer Efficacy To investigate the therapeutic efficacy of receptor-targeted molecules, the Inventors tested a panel of different cancer cell lines for their susceptibility to treatment with cell surface receptor ligands/antagonists targeting CD36 (thrombospondin-1, TSP), epidermal growth factor receptor (EGFR) (EGFR-blocking nanobody, Nb), heterodimeric interleukin 20 receptor (IL20R) comprised of subunits α and β (interleukin 24, IL24), and DRs (TRAIL) (FIG. 6 C). A nodular (n) and an invasive (i) GBM cell line (Gli36Δ-EGFR and GBM8, respectively) were screened and found to be DR ligand (DRL)-sensitive(s) (herein referred to as sGBMn and sGBMi). The following non-GBM cancer lines were also identified as DRL-sensitive: PC3 (sPCm), Jurkat (sTCL), HCT116 (sCC), and MDA231-BrM2a (sBCm). In comparison to the other tested ligands, the DRL TRAIL was the most effective agent, with potential to eliminate treated cell lines at 72 hours after treatment (FIG. 6 C). In addition to the above DRL-sensitive(s) cell lines, three DRL-resistant (r) GBM cell lines were identified (GBM23, GBM64, GBM46, herein referred to as rGBMi1, rGBMi2, rGBMi3) (FIG. 6D). Based on these findings, DR4 and DR5 were chosen as the most suitable candidates to further investigate the therapeutic potential of receptor self-targeted therapies.

Figure 7A:
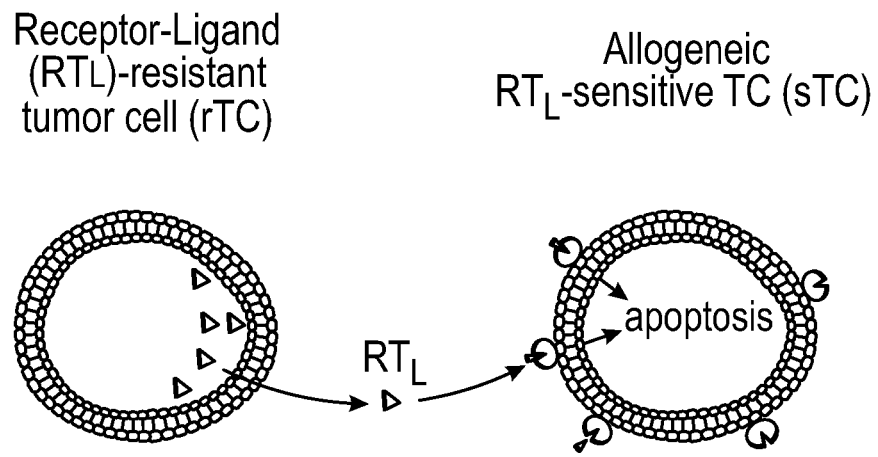
FIGS. 7A-7J. "Off-the-shelf" therapy using allogeneic self-targeting tumor cells.
Figure 7B:
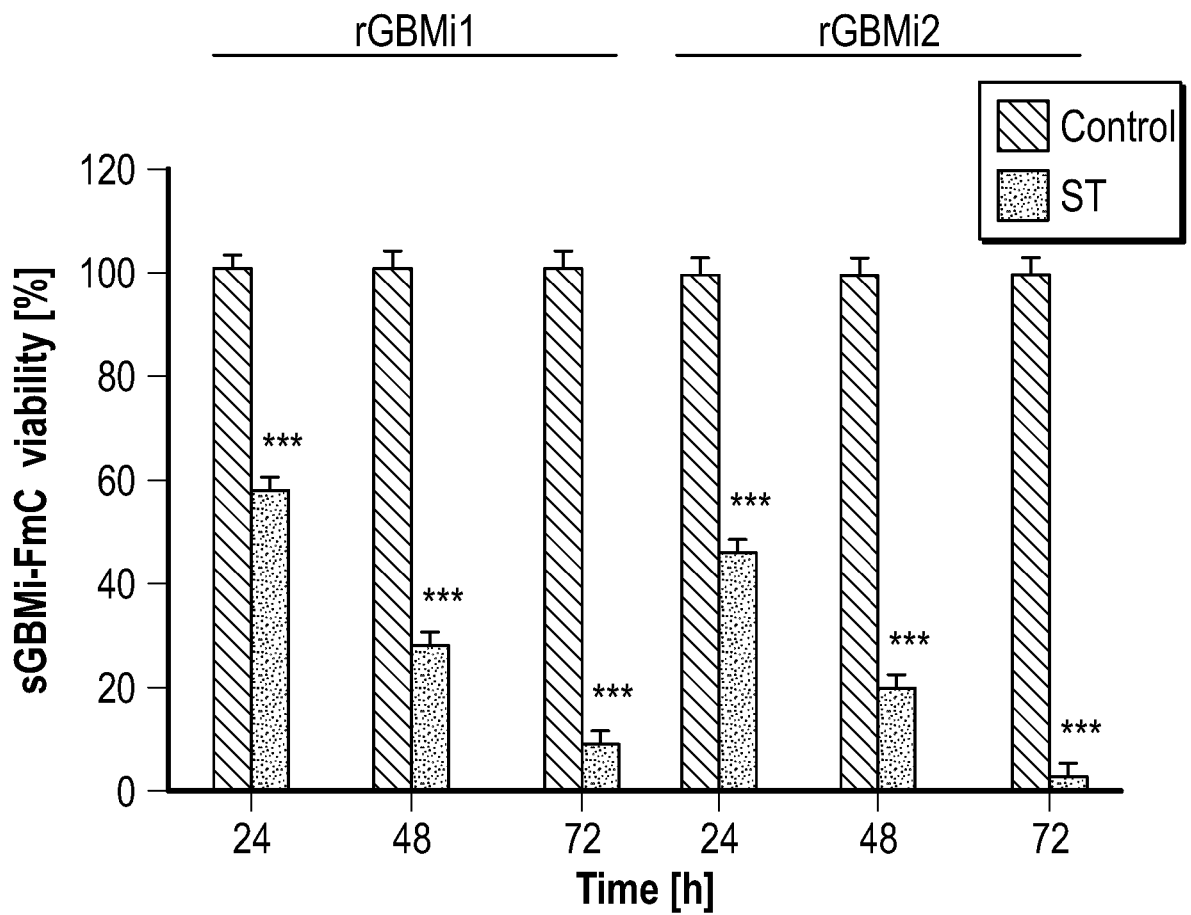
Figure 7C:
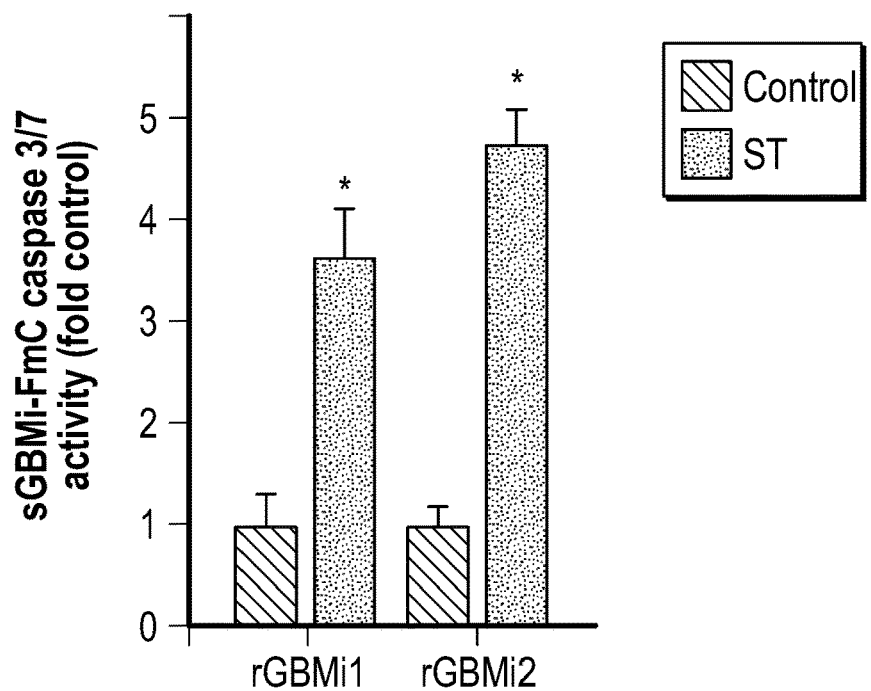
Figure 7D:
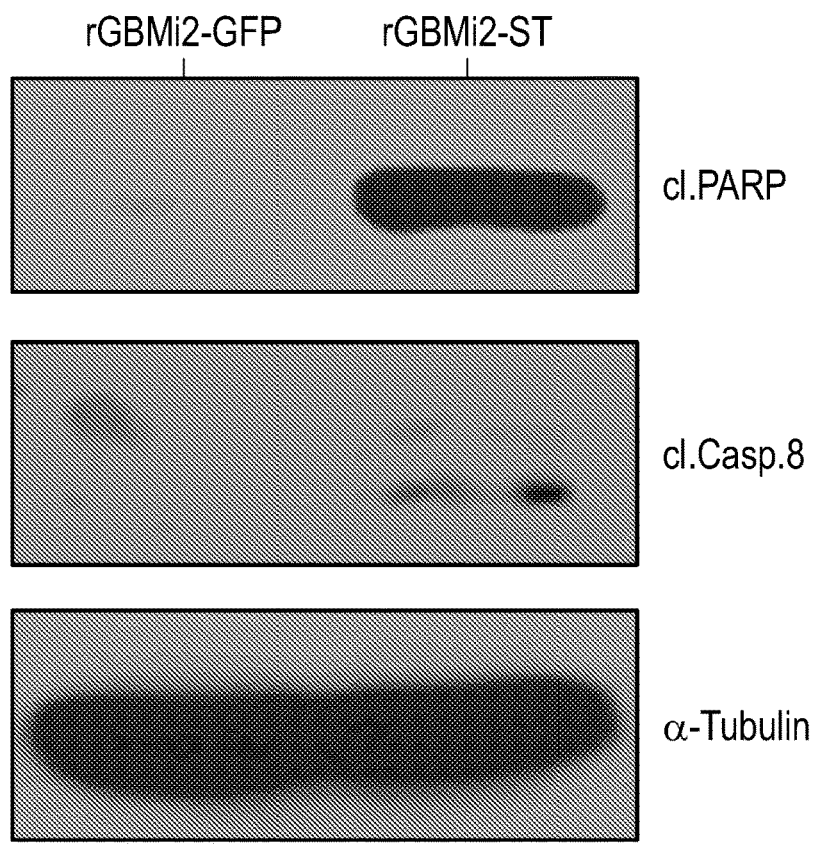
Figure 7E:
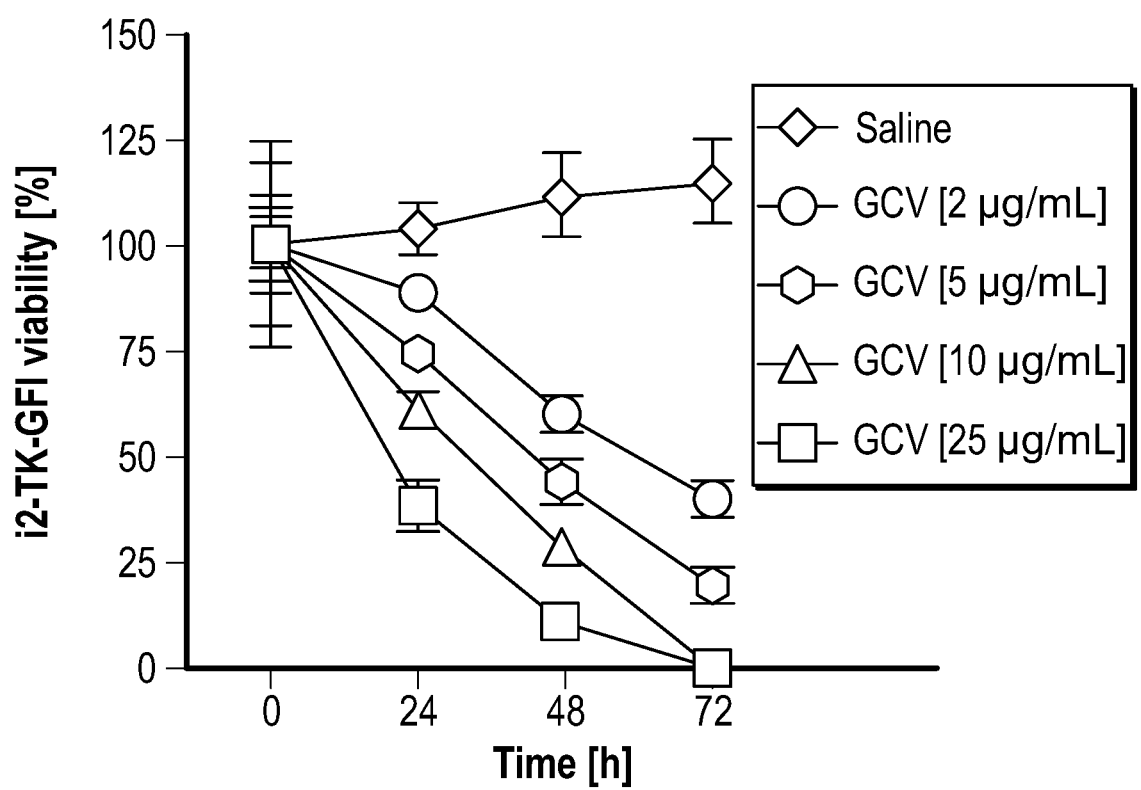

DRL-Resistant Tumor Cells can be Engineered to Express S-TRAIL and have Anti-Tumor Effects Against DRL-Sensitive Cells To test whether DRL-resistant glioblastoma stem cells (rGBM) can serve as a vehicle for DRL delivery towards DRL-sensitive tumors (sGBM) (FIG. 7A), we first analyzed DR expression of different rGBMs and sGBMi. RT-PCR analysis demonstrated that sGBMi expresses DR4/5, which are necessary to activate TRAIL-induced apoptosis. Interestingly, lack of DR expression was seen only in one of the three DRL-resistant lines, indicating that cells with preserved DR expression can nonetheless exhibit TRAIL resistance, likely due to activation of anti-apoptosis mechanisms. Next, we tested the feasibility of expression and secretion of DRL from invasive rGBMs (rGBMi) by engineering rGBMi1 and rGBMi2 with a secretable and potent variant of DRL (S-TRAIL, ST) or green fluorescent protein (GFP) (Control). Coculture of rGBMi1-ST and rGBMi2-ST with sGBMi engineered with lentivirus (LV) expressing Fluc-mCherry (sGBMi-FmC) showed robust killing of sGBMi-FmC cells over time, mediated by caspase-induced apoptosis (FIG. 7B-D). Furthermore, we transduced rGBMi1 and rGBMi2 with LV encoding a fusion variant of S-TRAIL with the optical reporter *Renilla* luciferase (RLuc(o), R1) (16). Both rGBMi1-R1-ST and rGBMi2-R1-ST demonstrated continued secretion of S-TRAIL into culture medium without autocrine toxicity of the therapeutic cells, as demonstrated by a time-dependent increase of bioluminescent imaging (BLI) signal intensity. Coculture assays of rGBMi1-R1-ST or rGBMi2-R1-ST with sGBMi-FmC further showed robust killing of sGBMi-FmC cells over time. Together, these data show that engineered rGBMs can continuously secrete S-TRAIL without inflicting autocrine toxicity and have the potential to serve as a delivery vehicle of S-TRAIL towards DRL-sensitive tumor cells. Due to the superior therapeutic efficacy observed for rGBMi2-ST compared to rGBMi1-ST, rGBMi2-ST was selected for further study.

Figure 7F:
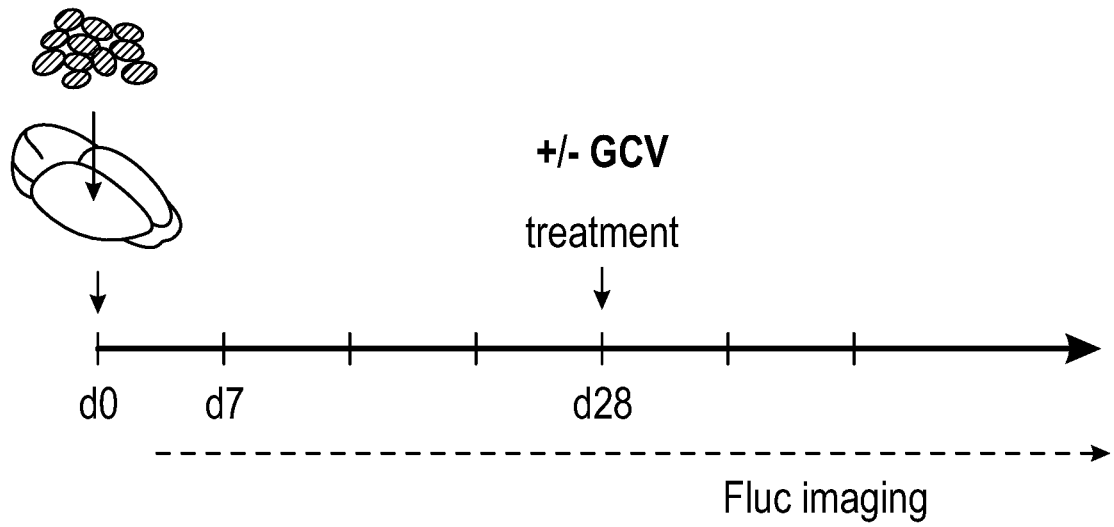
Figure 7F:
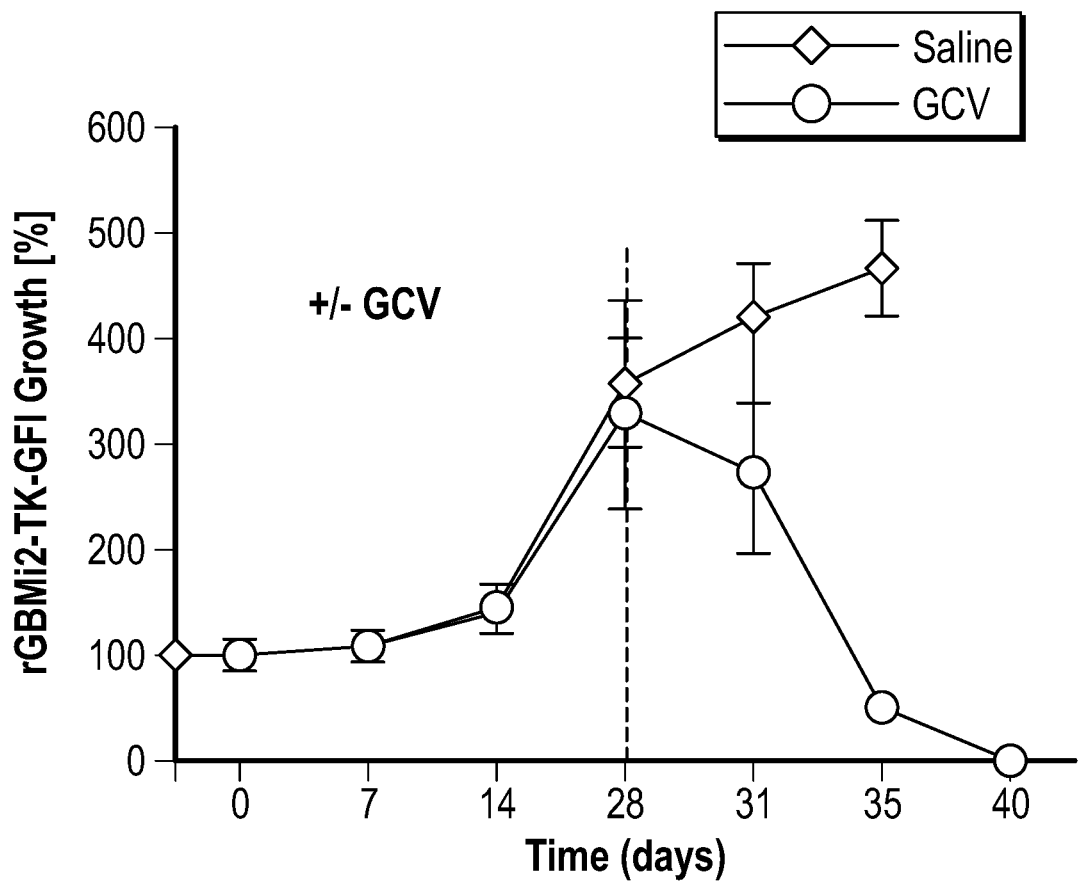
Figure 7G:
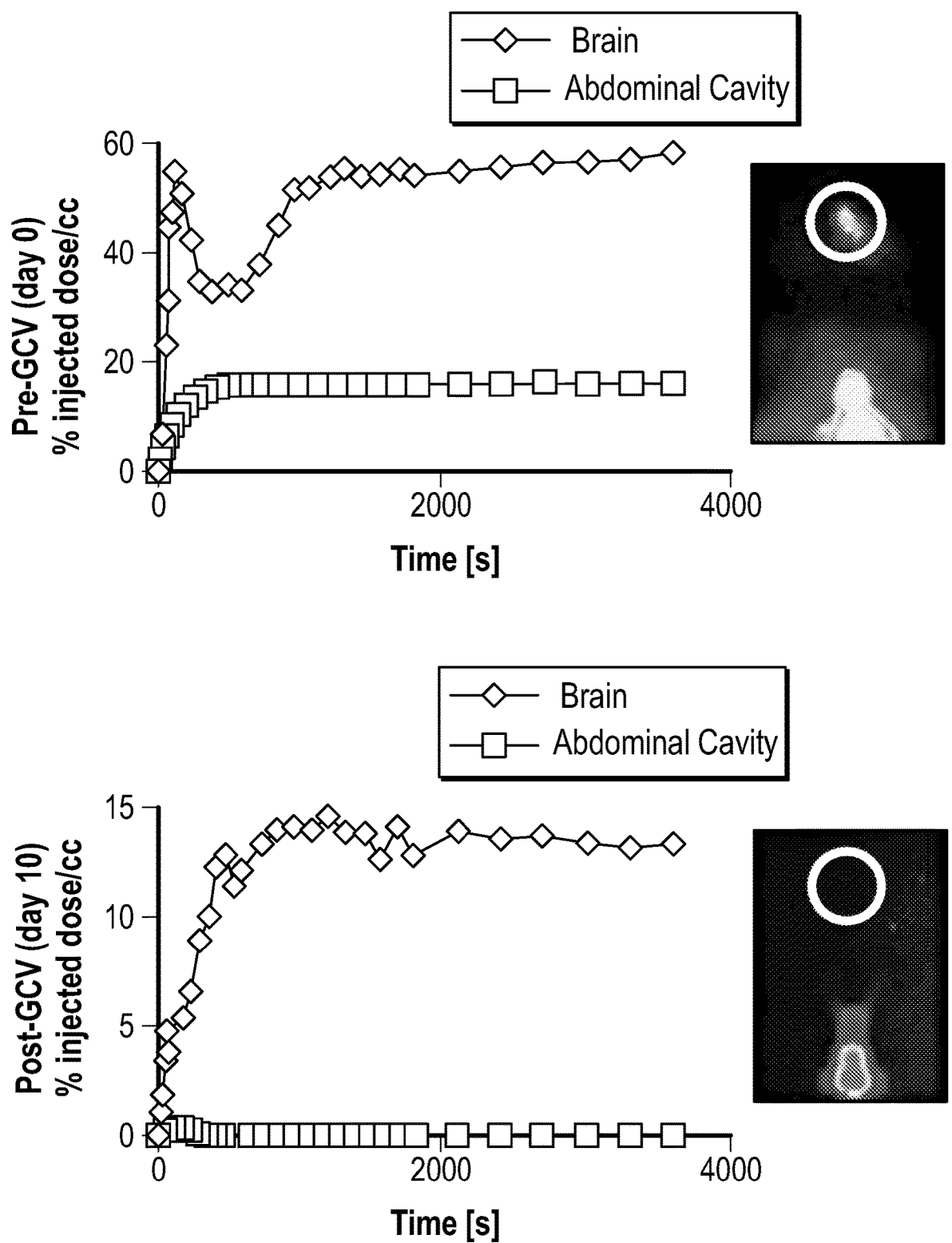

Prodrug-Converting Suicide System Allows Selective Elimination of Therapeutic rGBMs, and the Bystander Effect Increases Therapeutic Efficacy of rGBM-ST To ensure safety, a measure to efficiently eliminate therapeutic rGBMs had to be incorporated into the Inventor's approach. Thus, the Inventors next engineered rGBMi2 to either express a prodrug-converting enzyme (herpes simplex virus thymidine kinase, HSV-TK) or co-express ST, HSV-TK, and diagnostic GFP-firefly-luciferase (rGBMi2-TK and rGBMi2-ST-TK-GF1, respectively) and tested the efficacy of HSV-TK/ganciclovir (GCV)-induced clearance of therapeutic rGBM in vitro. GCV treatment resulted in dose- and time-dependent elimination of rGBMi2-TK cells in comparison to controls (FIG. 2E). In vivo non-invasive monitoring of intracranial rGBMi2-TK-GF1 tumor growth in mice demonstrated that GCV treatment eliminated therapeutic rGBMi2-TK-GF1 as compared to saline-treated control (FIG. 7F). In vivo GCV-induced cell clearance was further demonstrated in a clinically relevant 18F-FHBG PET imaging model using rGBMi2 co-engineered with S-TRAIL and TK (rGBMi2-ST-TK) (FIG. 7G). After 10 days of daily GCV treatment, the tumor-specific PET signal was no longer visible intracranially, with only unspecific abdominal signal due to tracer clearance (17) remaining. Together, these results indicate that therapeutically engineered rGBMs can be selectively eliminated using HSV-TK/GCV in vitro and in vivo and additionally demonstrate that therapeutic cell fate can be clinically monitored using PET imaging.

Figure 7H:
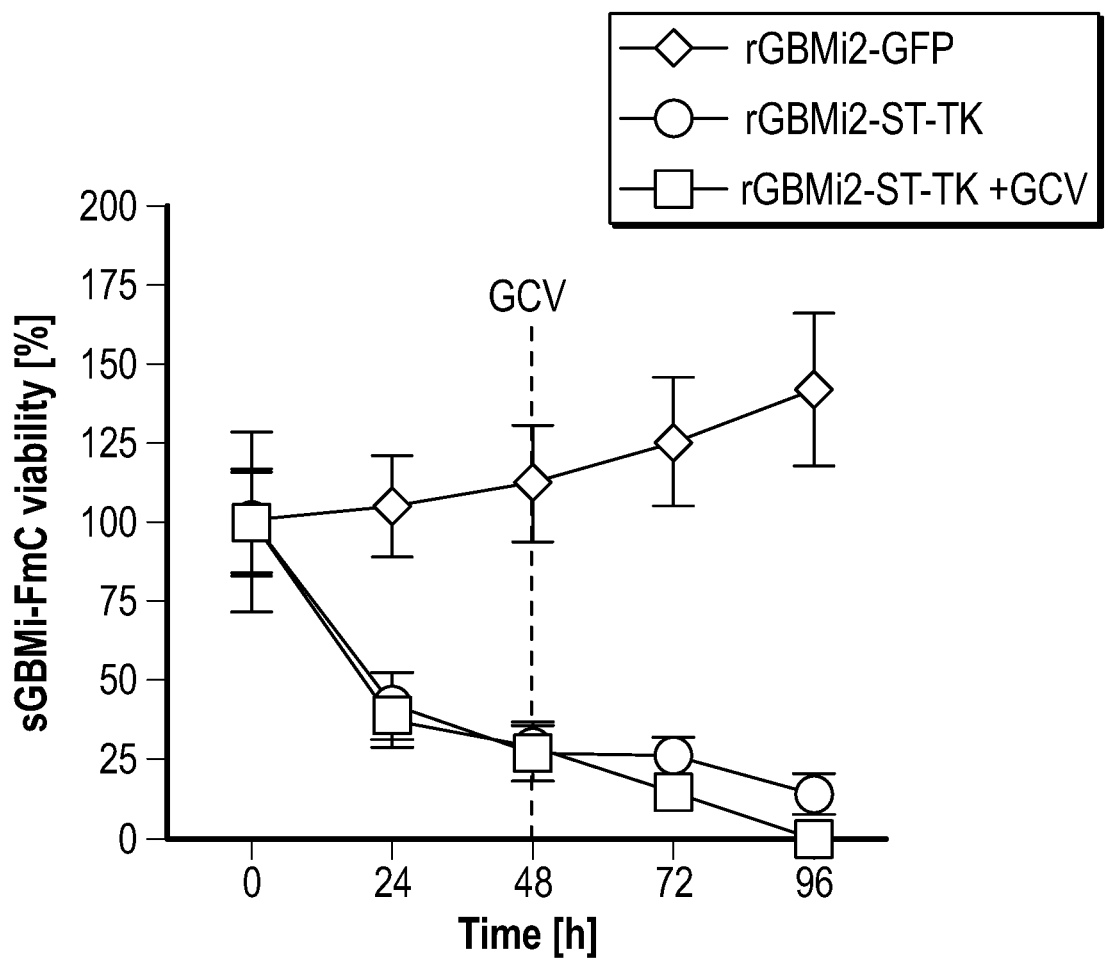

To examine the bystander effect of HSV-TK/GCV, we tested the therapeutic efficiency of rGBMi2-ST-TK or rGBMi2-GFP via coculture with the DRL-sensitive invasive GBM cell line sGBMi-FmC. A significant reduction in sGBMi-FmC viability was seen when cocultured with rGBMi2-ST-TK within 24 hours (P<0.05, with and without GCV), and at 96 hours sGBMi-FmC cells were completely eliminated when cocultures were treated with GCV and near-completely in non-GCV treated conditions (FIG. 7H). These results demonstrate that the introduction of HSV-TK may not only serve to eliminate therapeutic cells, but may further increase the therapeutic efficacy of S-TRAIL-mediated apoptosis via additional bystander effect. However, likely due to the highly TRAIL-sensitive phenotype of sGBMi-FmC, the observed difference between GCV-treated and GCV-non-treated conditions was not statistically significant (P>0.05 at the 96 hour time point).

Therapeutic rGBMs Show Efficacy Against DRL-Sensitive sGBMs

Figure 7I:
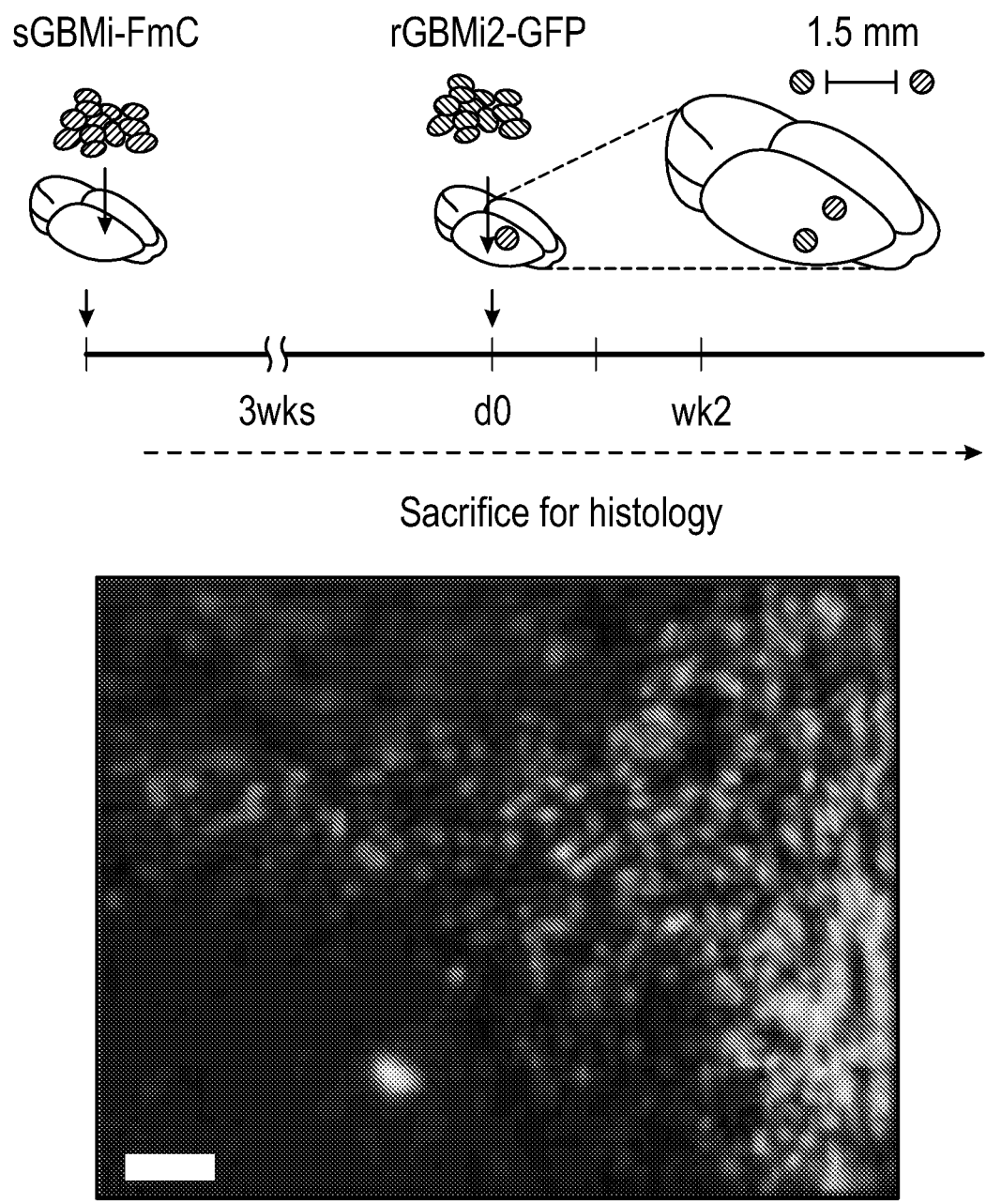
Figure 7J:
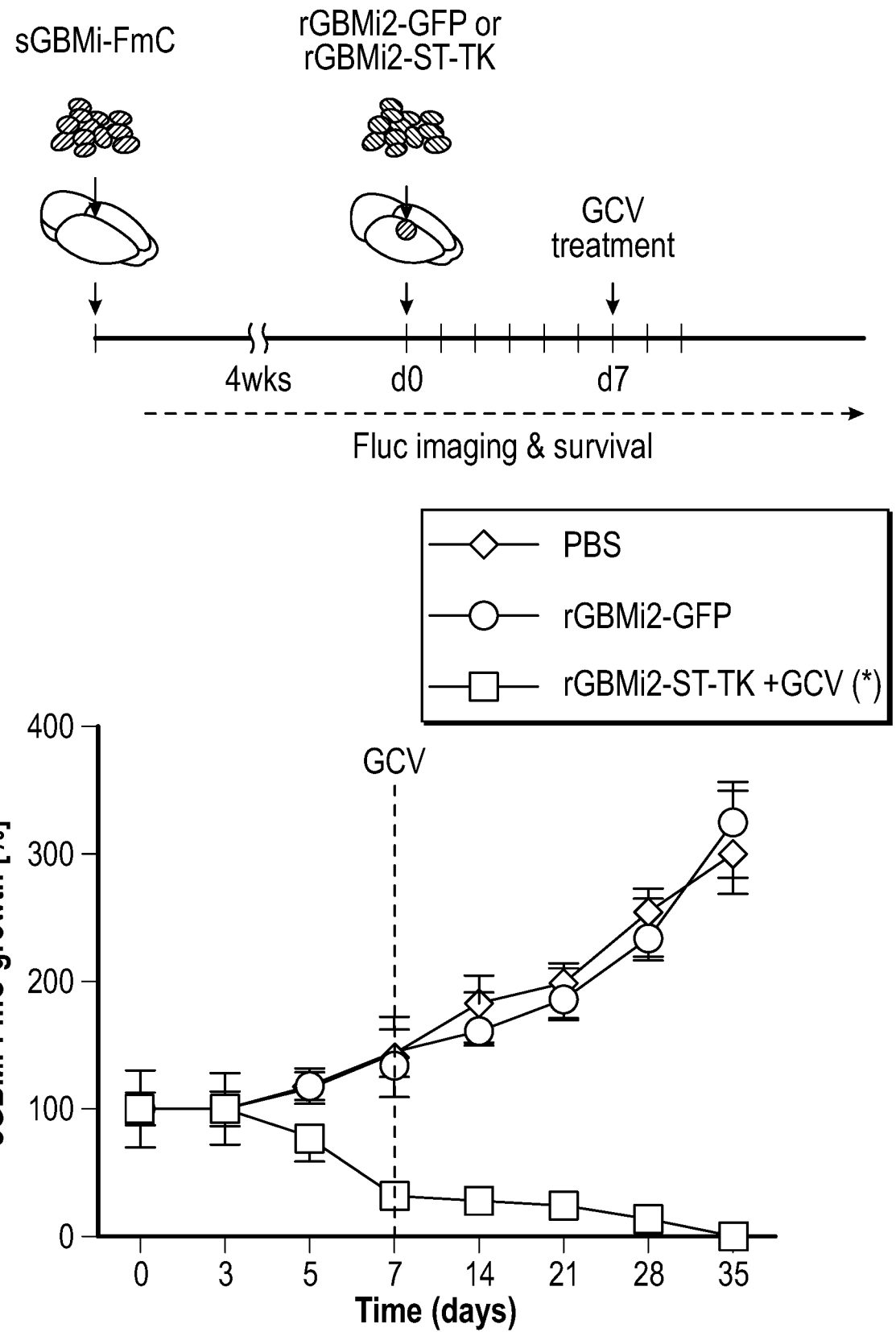
Figure 7J:
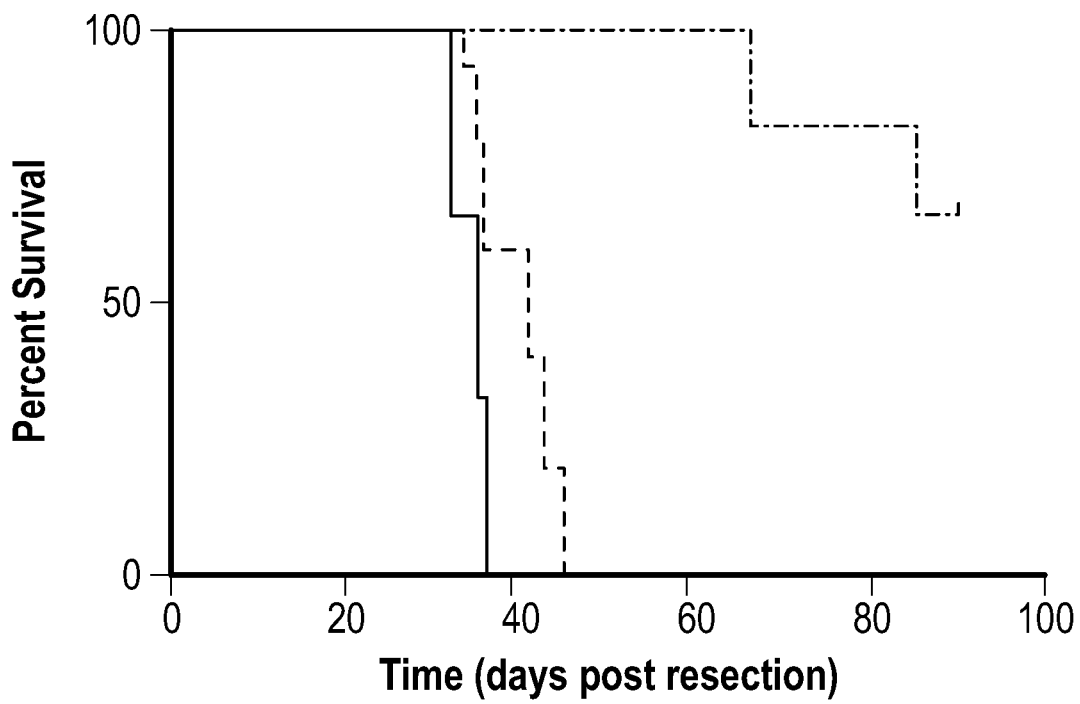

To investigate the in vivo growth pattern of therapeutic rGBMs and their potential for targeting of allogeneic DRL-sensitive GBMs (sGBMs), mice bearing sGBMi-FmC tumors were implanted with rGBMi2-GFP at a distance of 1.5 mm from the sGBMi-FmC tumor site. Fluorescence imaging of mouse brain sections showed extensive tracking of invading sGBMi-FmC cells by rGBMi2-GFP, suggesting rGBMi2-GFP migration towards pre-implanted sGBMi-FmC in vivo (FIG. 7I). Next, mice with established sGBMi-FmC tumors were injected intratumorally with either rGBMi2-GFP (control) or therapeutic rGBMi2-ST-TK cells. BLI revealed a marked reduction of sGBMi-FmC tumor sizes in the rGBMi2-ST-TK group, indicating a robust induction of cell death in sGBMi-FmC cells (FIG. 7J). After GCV treatment, the sGBMi-FmC tumors regressed further, and the therapeutic response translated into significant survival benefits for the mice (FIG. 7J, p<0.05). Together these data indicate that therapeutically armed DRL-resistant GBM cells can efficiently deliver cell surface receptor-specific anti-tumor ligands towards established sGBM and mediate efficacy in vivo.

Figure 8A:
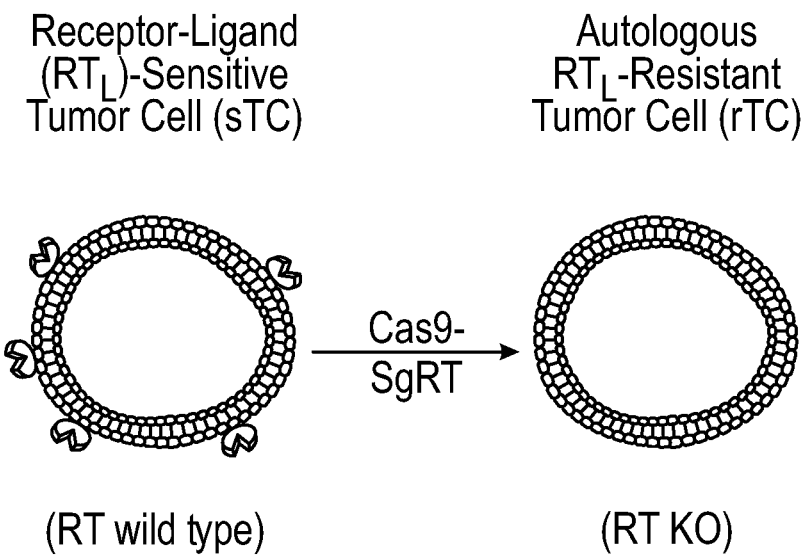
FIGS. 8A-8H. CRISPR-mediated DR knockout in tumor cells confers resistance to DR-targeted therapy. A) Concept of autologous approach: CRISPR-mediated receptor (RT) knockout (KO) is employed to change the phenotype of cancer cells from receptor-ligand (RTL)-sensitive to RTL-resistant prior to engineering with secretable RTL.
Figure 8B:
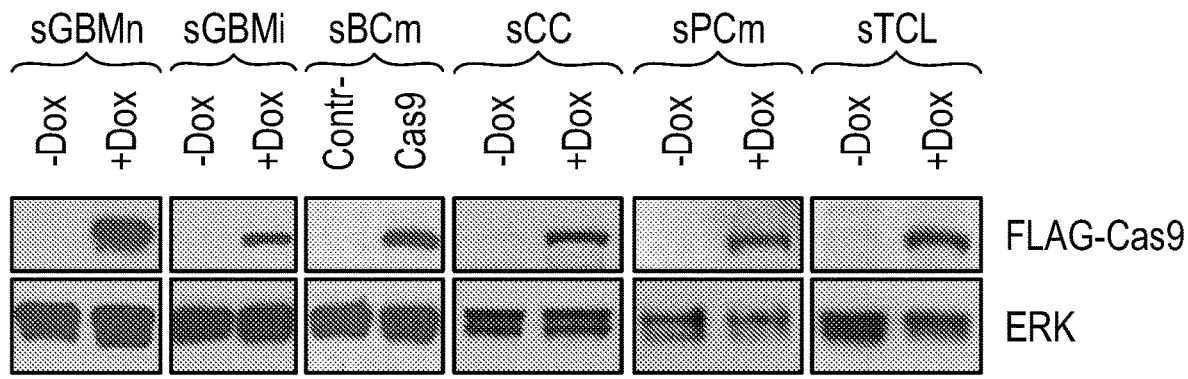
Figure 8C:
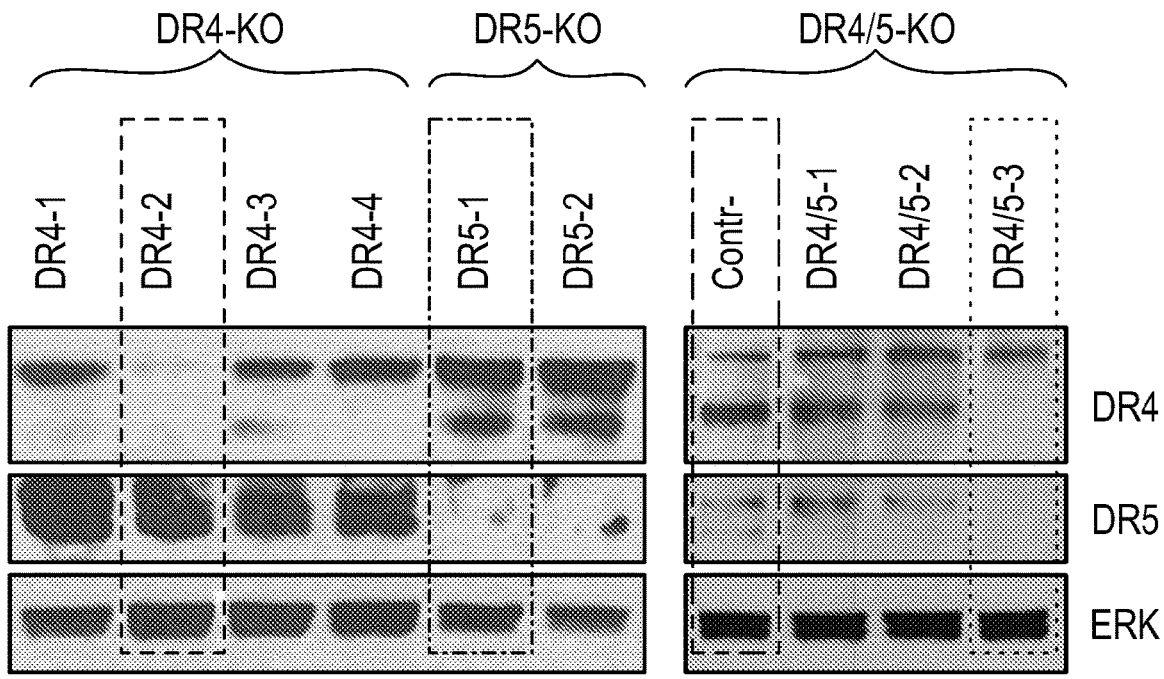
Figure 8D:
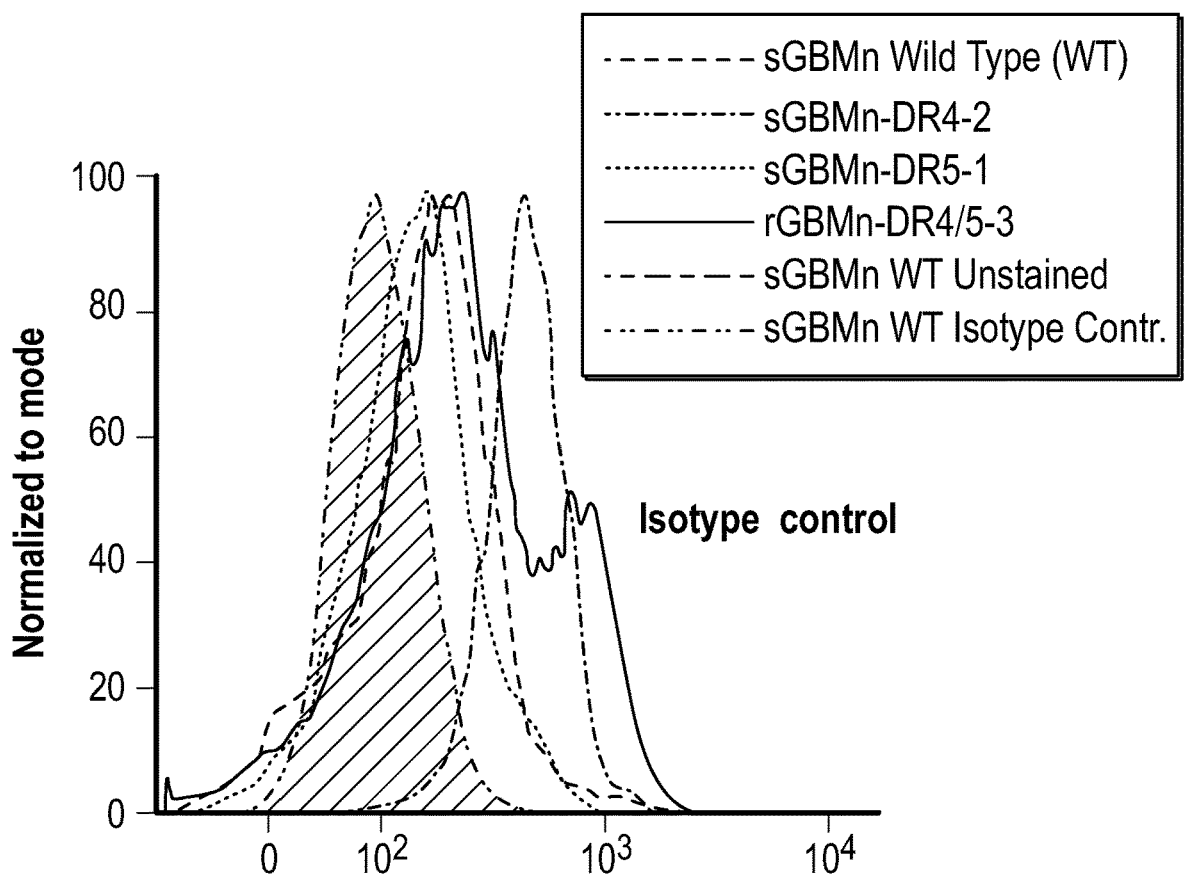
Figure 8D:
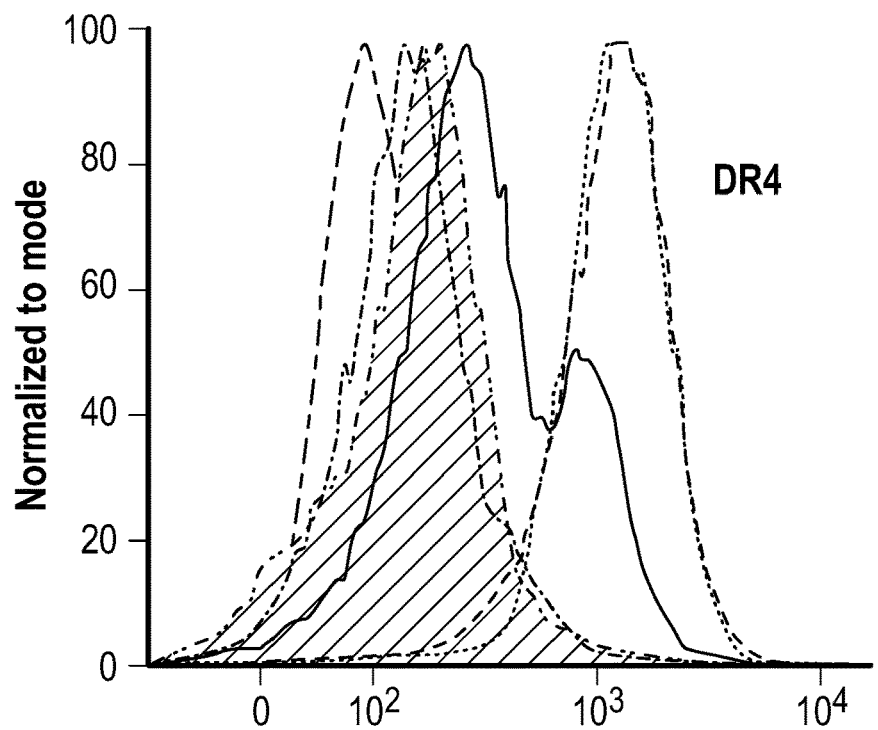
Figure 8D:
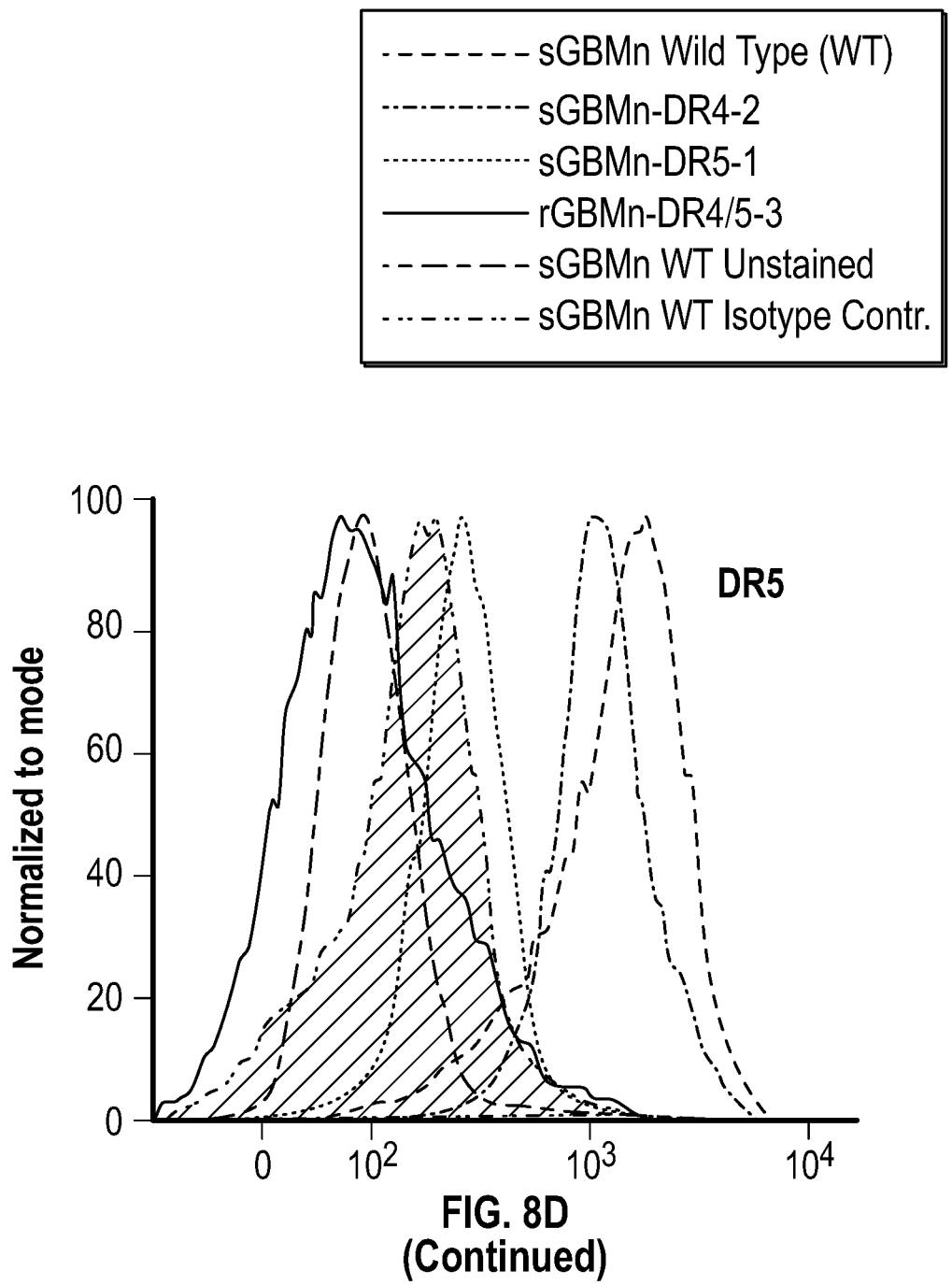
Figure 8E:
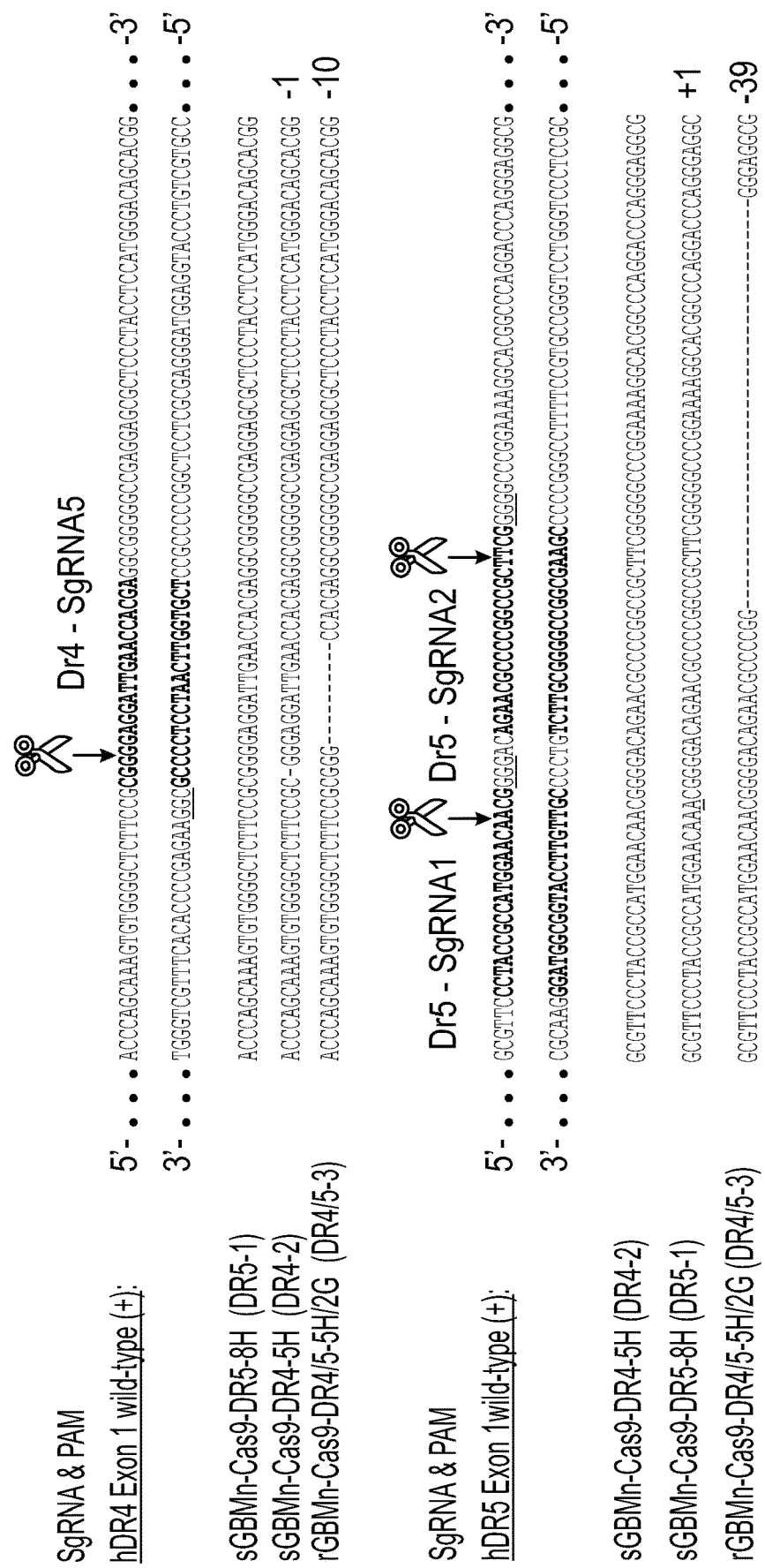
Figure 9A:
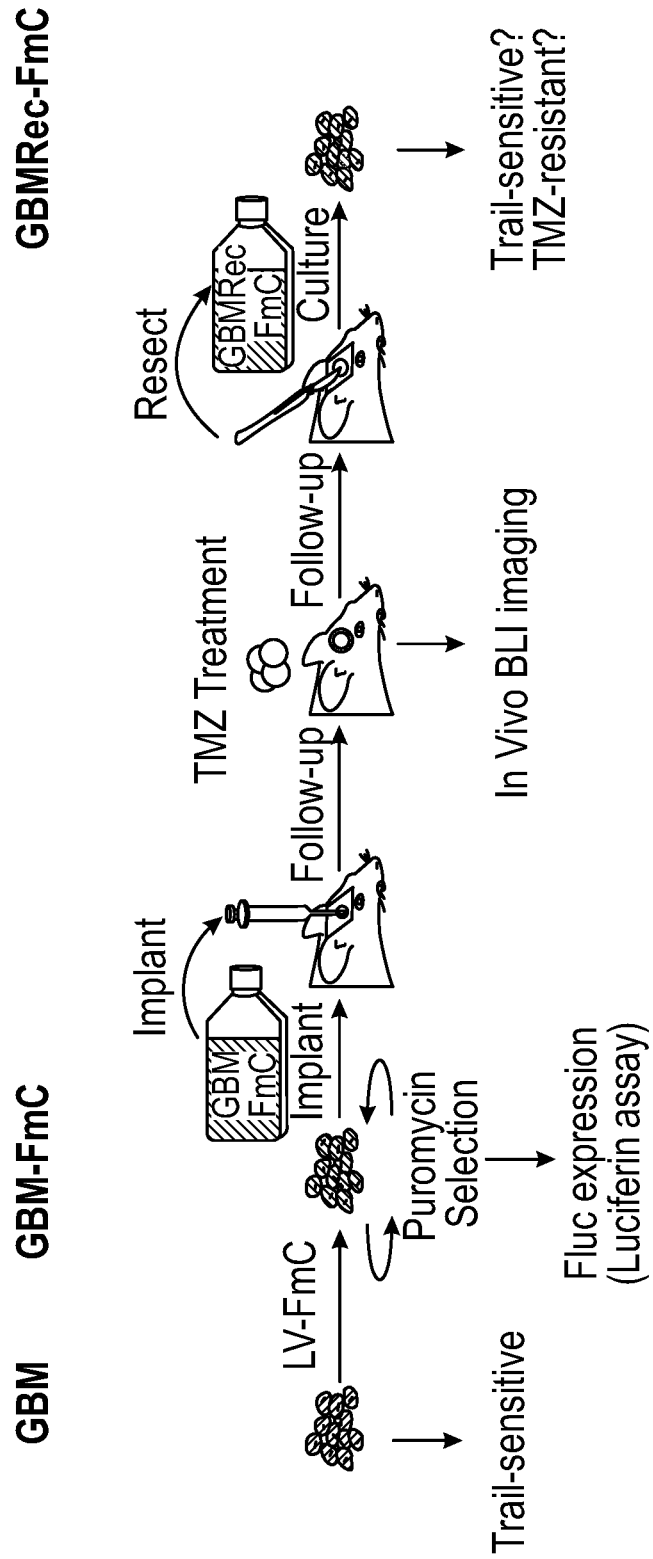
FIGS. 9A-9E. DR knockout tumor cells co-engineered with a secretable DR-ligand and a suicide-system exhibit self-targeting efficacy in autologous recurrent tumor models.

Cas9-Mediated DR Knockout in Tumor Cells Confers Resistance to DR-Targeted Therapy To translate the above findings into a clinical scenario that would potentially allow the use of patients' own (autologous) tumor cells for therapeutic self-targeting in the event of tumor recurrence (FIGS. 6B, 9A), the Inventors first engineered DRL-sensitive tumor lines of various cancer types with CRISPR-associated protein 9 (Cas9) RNA-guided DNA endonuclease. Inducible Cas9 expression was confirmed by western blotting (FIG. 9B) or RT-PCR. Cas9 tumor lines were then engineered with SgRNA expression vectors targeting DR4, DR5, or both receptors to create DR-knockout (KO) cell lines. Target efficacy of SgRNAs was semi-quantitatively evaluated by western blotting for DR4 and DR5 in mixed populations, followed by clonal selection and screening of individual clones for DR-KO status with western blotting (FIG. 8C; showing DR4, DR5, and DR4/5 knockout of sGBMn). Additionally, flow cytometric analysis confirmed marked reduction in surface expression of DR4, DR5, or DR4/5 (FIG. 8D), and genomic DNA sequencing identified indel mutations at SgRNA-targeted exonic gene segments of DR4-, DR5-, and DR4/5-double-KO clones (FIG. 3E). Together these results demonstrate successful Cas9 engineering of DRL-sensitive GBM cells to knock out DR4, DR5, or both DR4 and DR5.

Figure 8F:
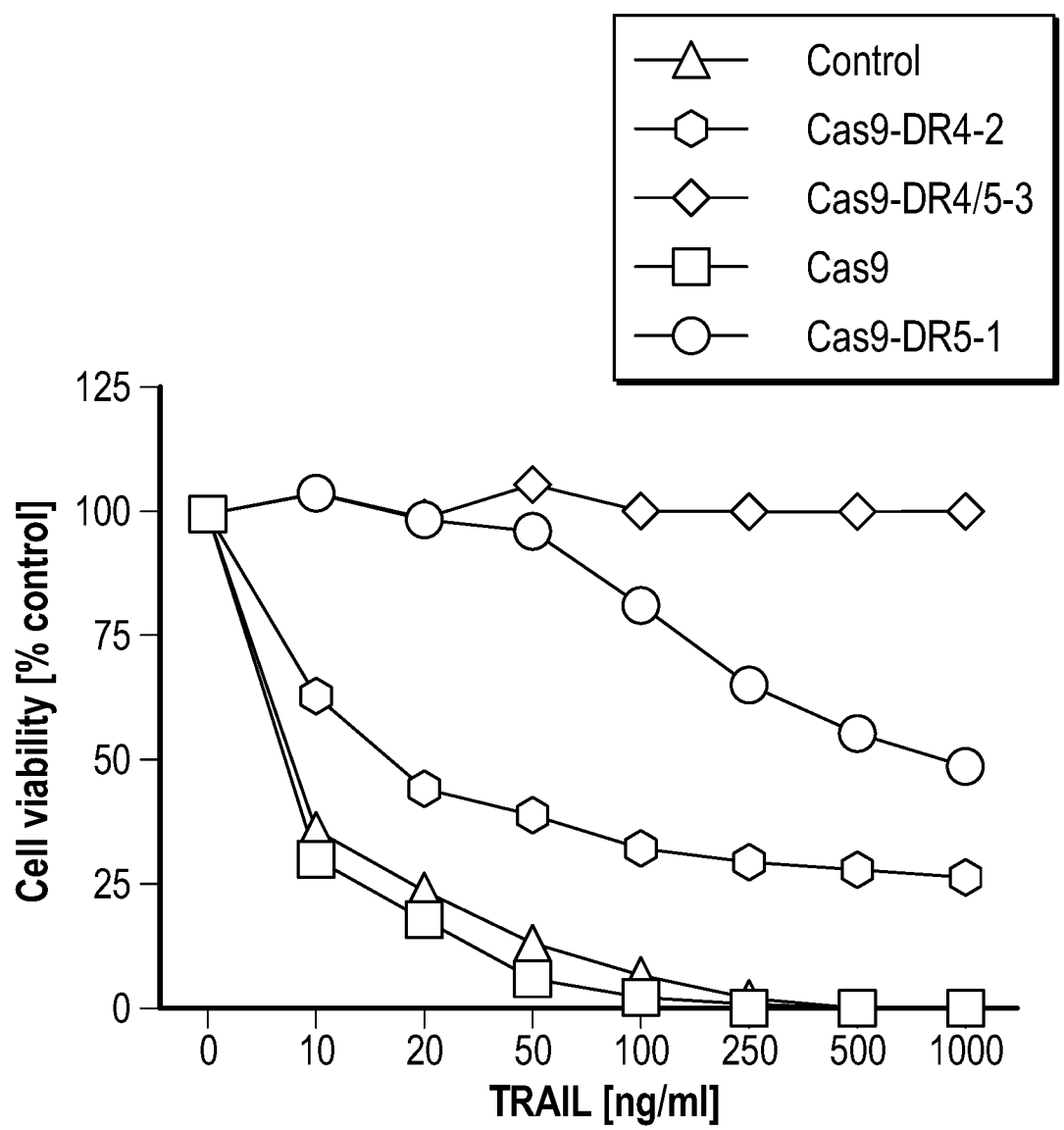
Figure 8G:
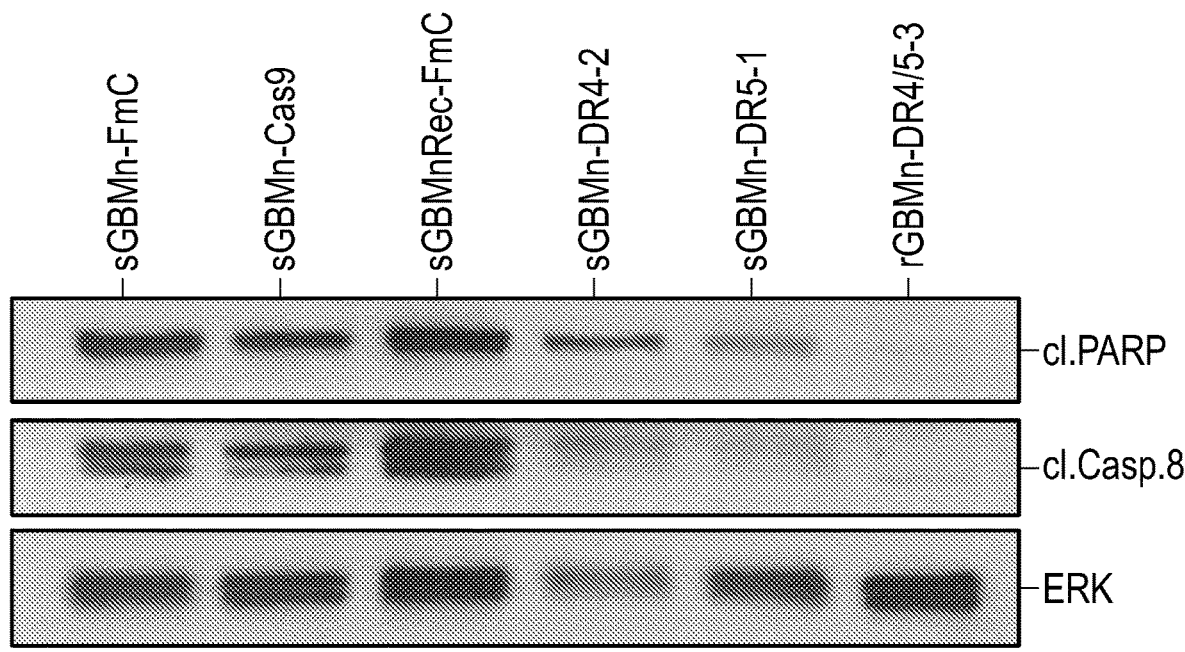

Next, the Inventors tested whether DR-KO correlates with a DRL-resistant phenotype in vitro. Cell viability assay of DR4/5 intact sGBMn cells (GBMn-Control and GBMn-Cas9), as well as their DR4, DR5, and DR4/5 DR-KO clones, identified DR5 as the more dominant receptor in TRAIL-induced apoptosis (FIG. 8F). However, complete resistance to DRL-mediated apoptosis was only observed in the third double knockout clone, GBMn-DR4/5-3 (FIG. 8F). Cleaved caspase 8 and cleaved PARP analysis of S-TRAIL-treated sGBMn cells further confirmed reduced activation of TRAIL-mediated apoptosis in sGBMn-DR single KO clones (sGBM-DR4-2 and sGBM-DR5-1) compared to DR-intact sGBMn cells and the fully resistant phenotype in the rGBMn-DR4/5 double KO clone rGBMn-DR4/5-3, herein referred to as rGBMnDR4/5 (FIG. 8G).

Figure 6D:
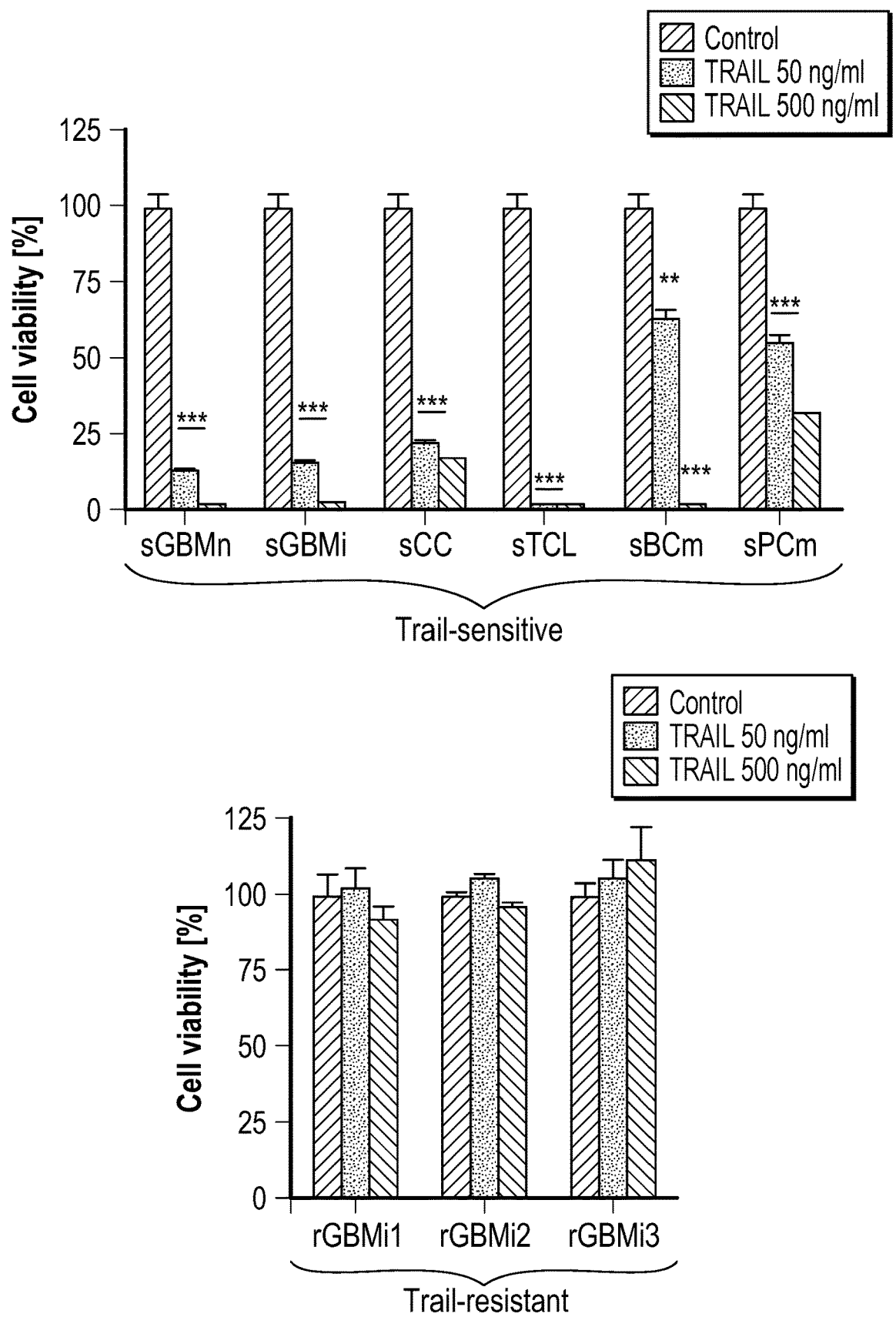
Figure 8H:
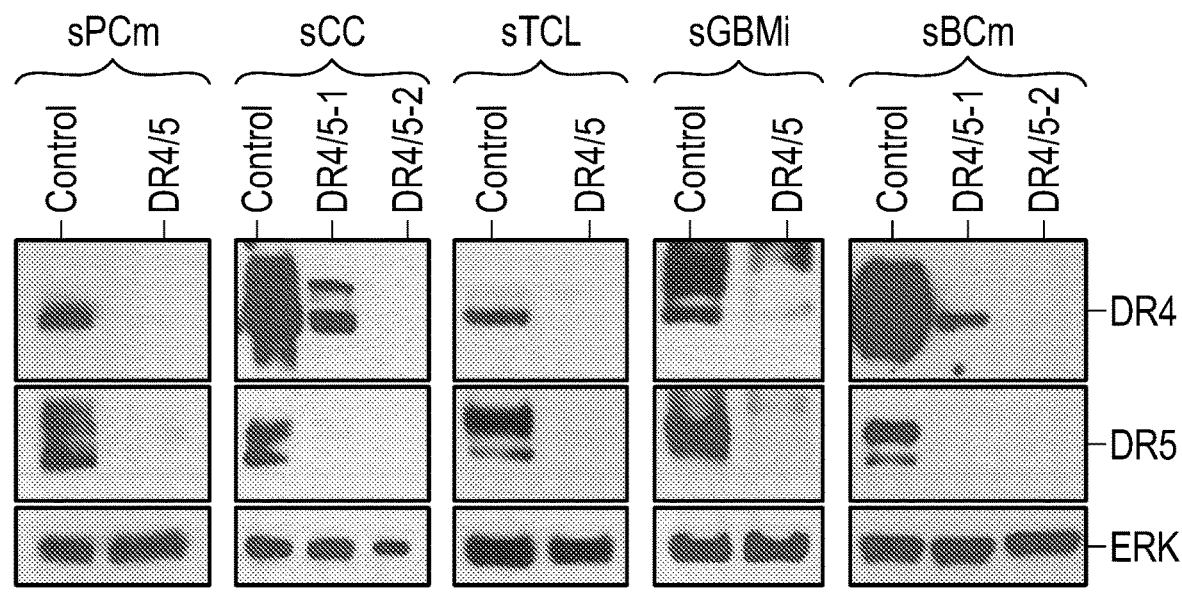

After verifying the DR KO strategy, the Inventors next aimed to extend the panel of DR4/5 double KO cell lines with the other cancer cell lines previously identified as TRAIL-sensitive (FIG. 6D). Using the same approach, the Inventors achieved DR4/5 double KO of S-TRAIL-sensitive metastatic prostate cancer (sPCm), colon cancer (sCC), and metastatic breast cancer cell lines (sBCm). Additionally, DR4/5 double KO of T cell leukemia cells (sTCL) and invasive GBM cell line sGBMi was established by engineering with DR4/5 KO constructs as described above, followed by in vitro selection with S-TRAIL exposure. Western blotting was used to confirm establishment of double KO lines (FIG. 8H). Sequencing of genomic DNA from wild type and DR4/5 double KO sBCm clone DR4/5-2 (herein referred to as rBCmDR4/5) further confirmed indel mutations of targeted exonic gene sequences. In conclusion, the Inventor's DR KO strategy can be applied to a variety of cancer types.

Figure 9B:
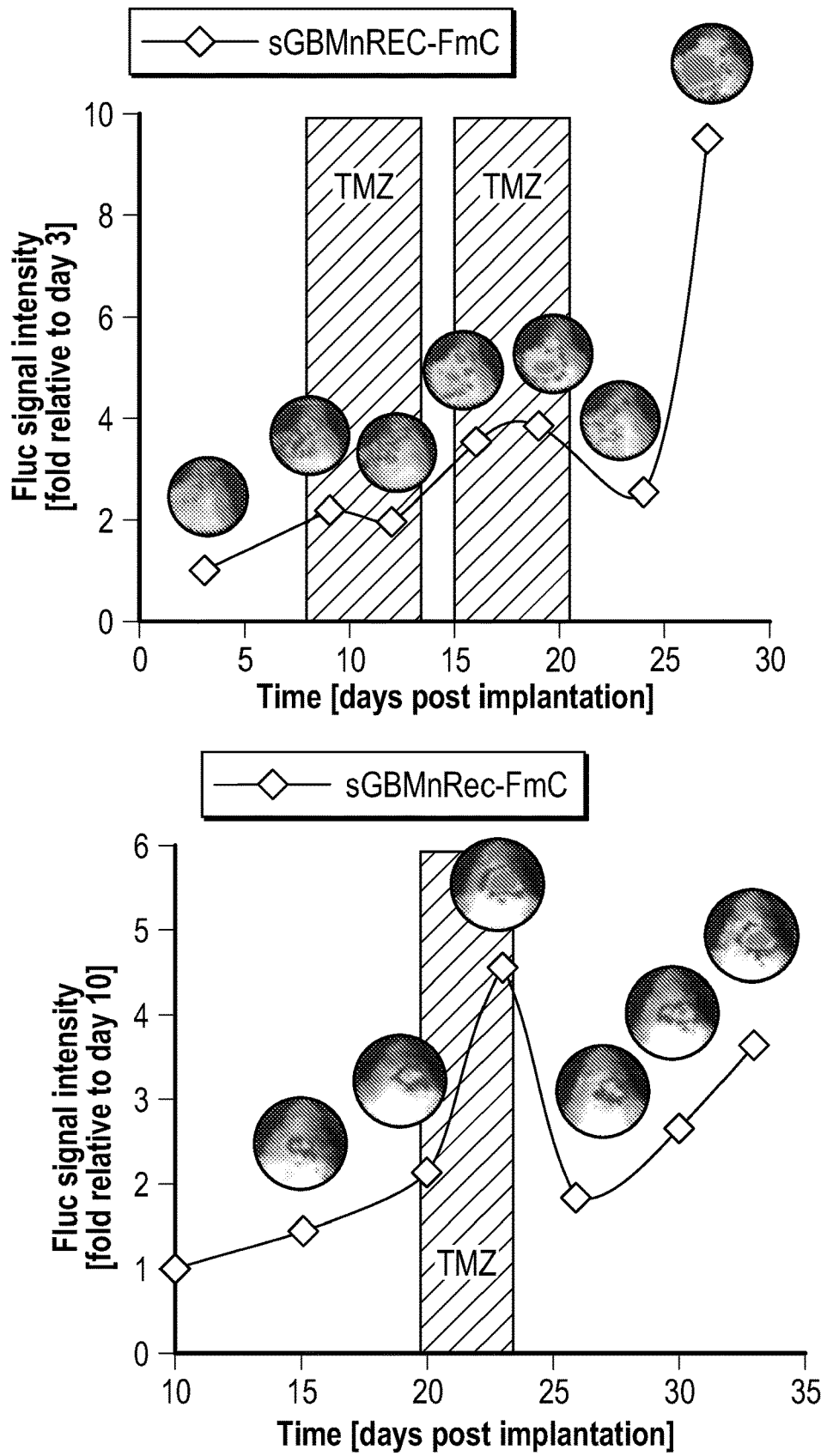
Figure 9C:
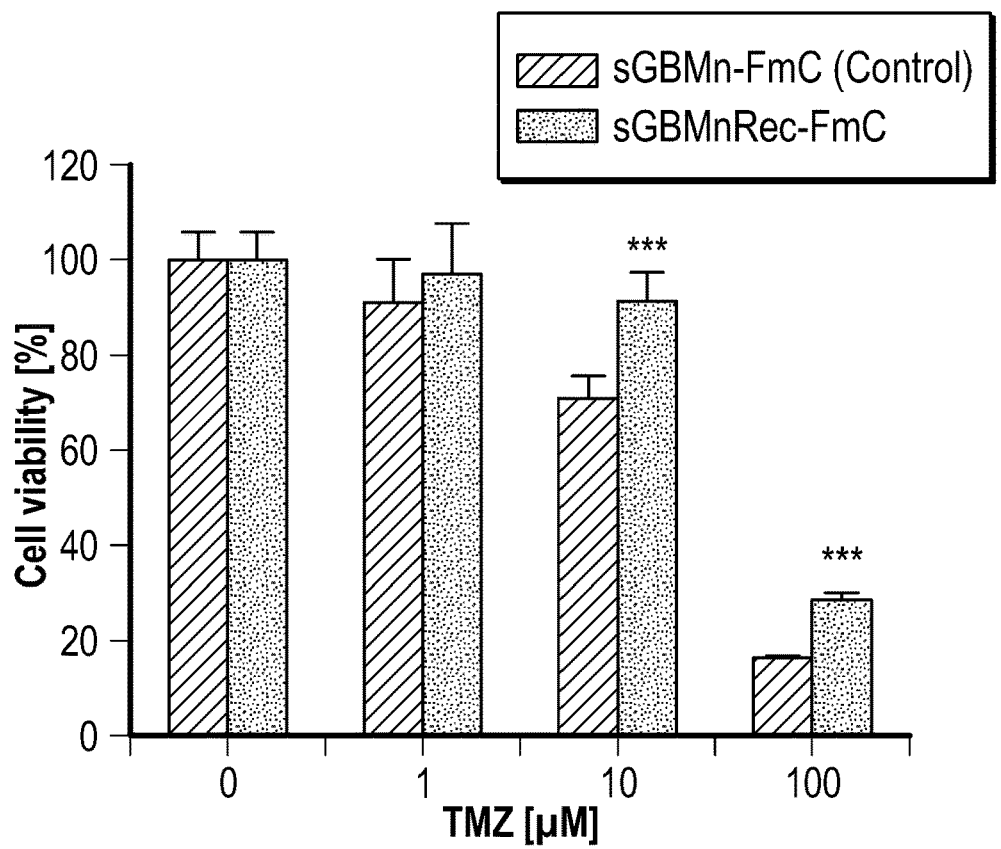
Figure 9C:
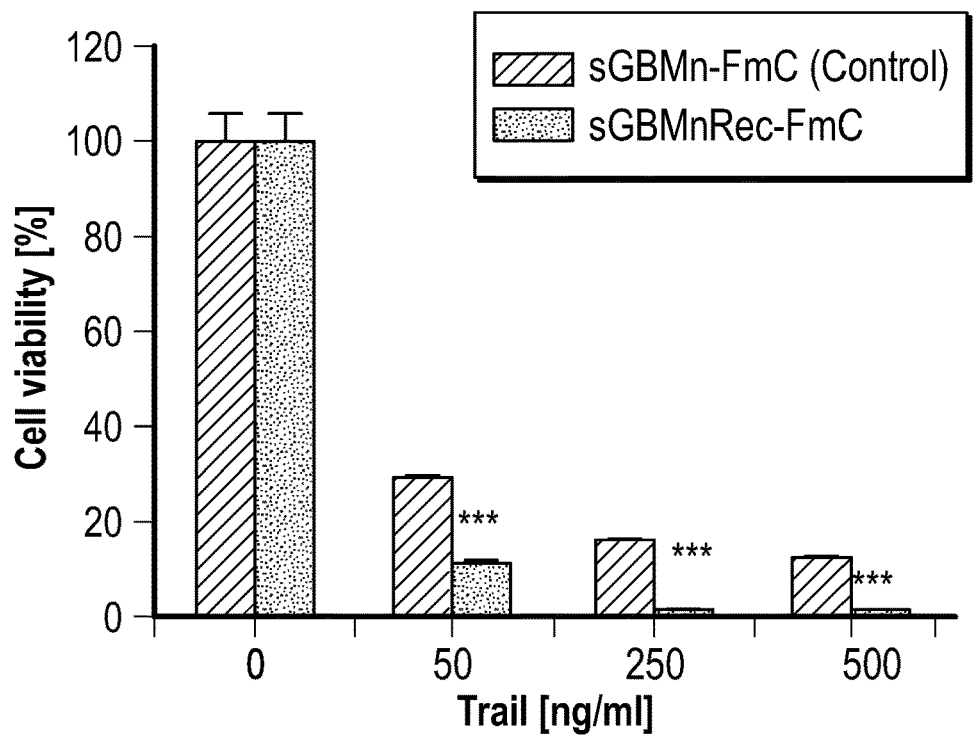
Figure 9C:
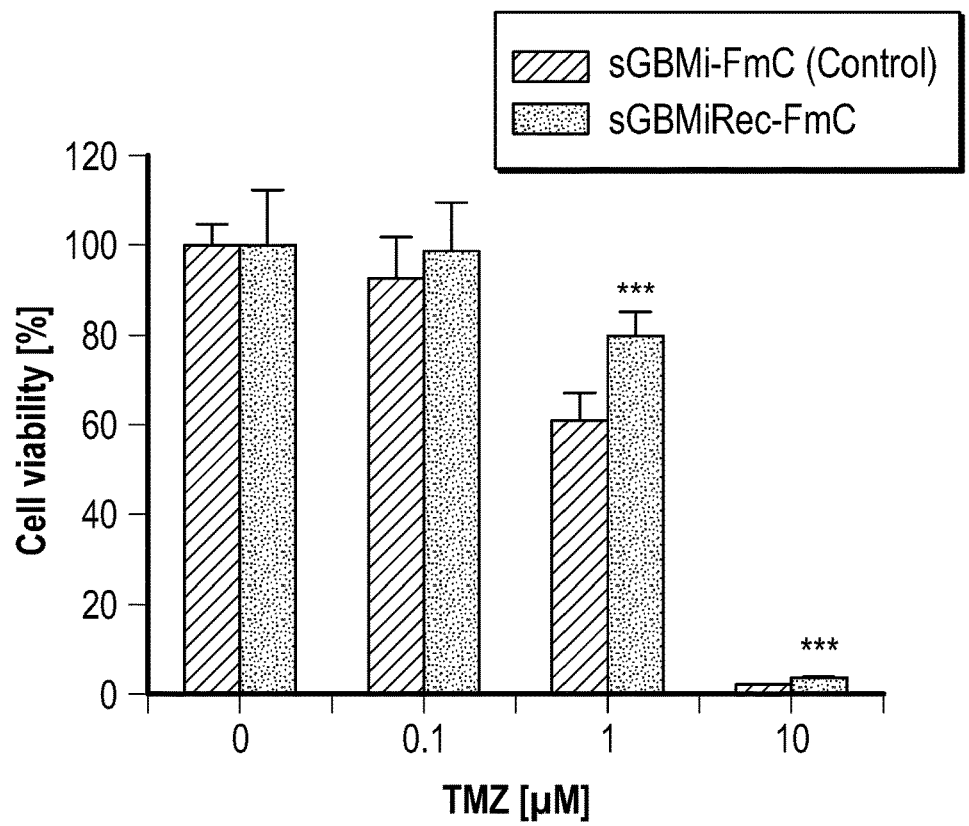
Figure 9C:
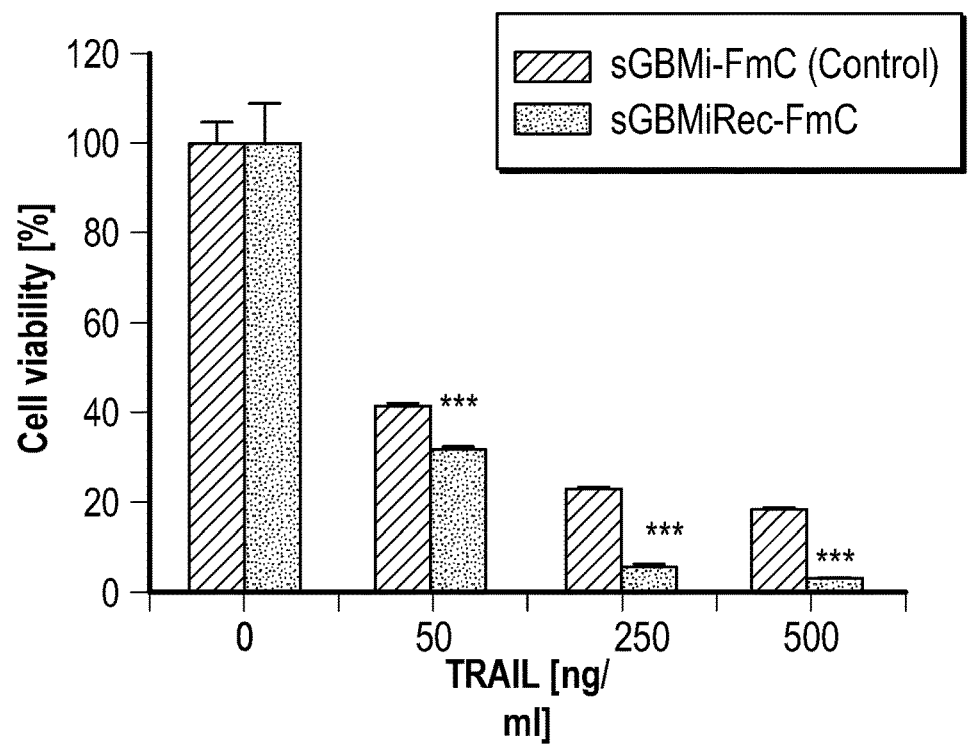

DR-KO Tumor Cells Co-Engineered with DR-Ligand and a Suicide System Exhibit Self-Targeting Efficacy in Autologous Recurrent Tumor Models In Vitro To mimic the clinical scenario of using autologous cells, established after primary tumor surgery, for self-targeted ligand delivery (outlined in FIG. 6B), the Inventors next aimed to establish mouse models of recurrent tumors as a platform to test the self-targeting efficacy of autologous CRISPR-engineered therapeutic cells. Further, with this approach we wanted to gain insight into whether adjuvant therapy, as commonly initiated after first-time tumor surgery, alters the TRAIL sensitivity phenotype of tumors (FIG. 9A). sGBMn and sGBMi (FIG. 6C) were transduced with LV to express FmC and implanted intracranially into SCID mice. Tumor-bearing mice were treated with temozolomide (TMZ), and therapy response was observed, as indicated by a reduction of the tumor cells' BLI signal (FIG. 9B). After tumor recurrence, mice were sacrificed, tumor cells were harvested using fluorescence microscopy as guidance, and recurrent (Rec) GBM cells (sGBMnRec and sGBMiRec) were established in culture. Cell viability assays of these recurrent GBM lines revealed increased resistance to TMZ, whereas sensitivity to DR-targeting S-TRAIL was unchanged or increased compared to the primary GBM cells (FIG. 9C). These findings suggest that adjuvant in vivo treatment with TMZ induces a TMZ-resistant phenotype in recurrent tumors, but does not negatively influence response to DR-targeted therapy.

Figure 9D:
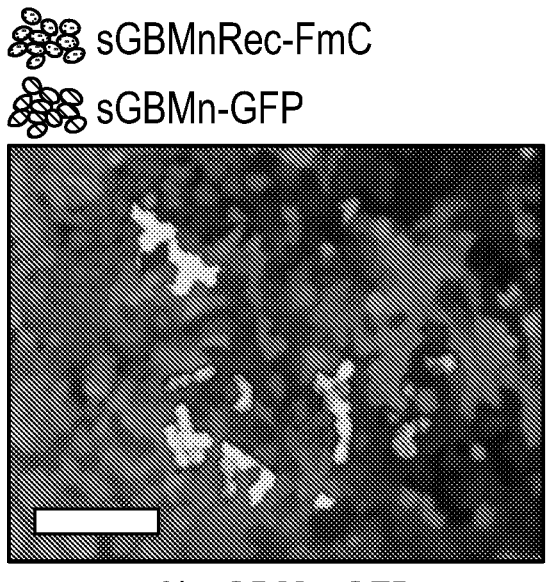
Figure 9D:
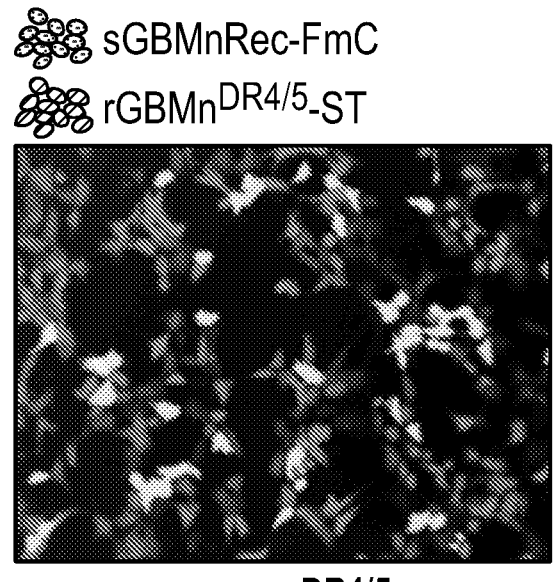
Figure 9D:
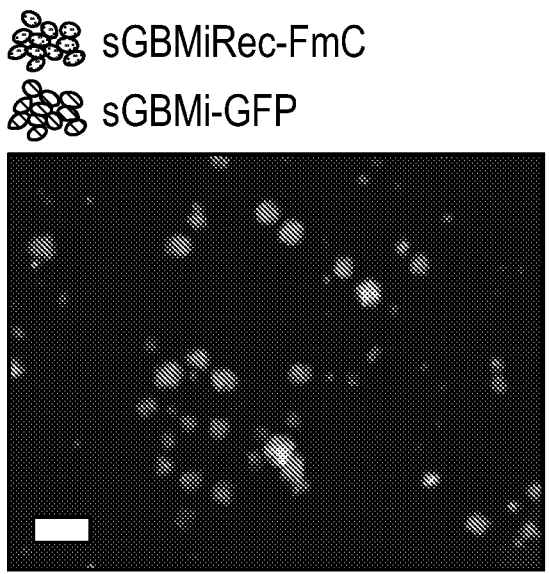
Figure 9D:
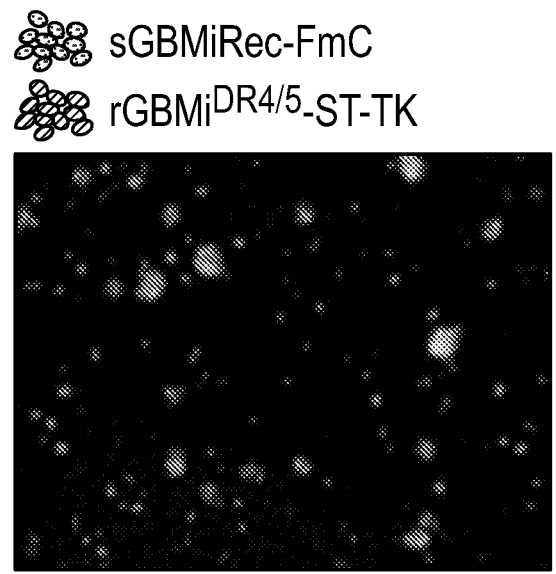
Figure 9D:
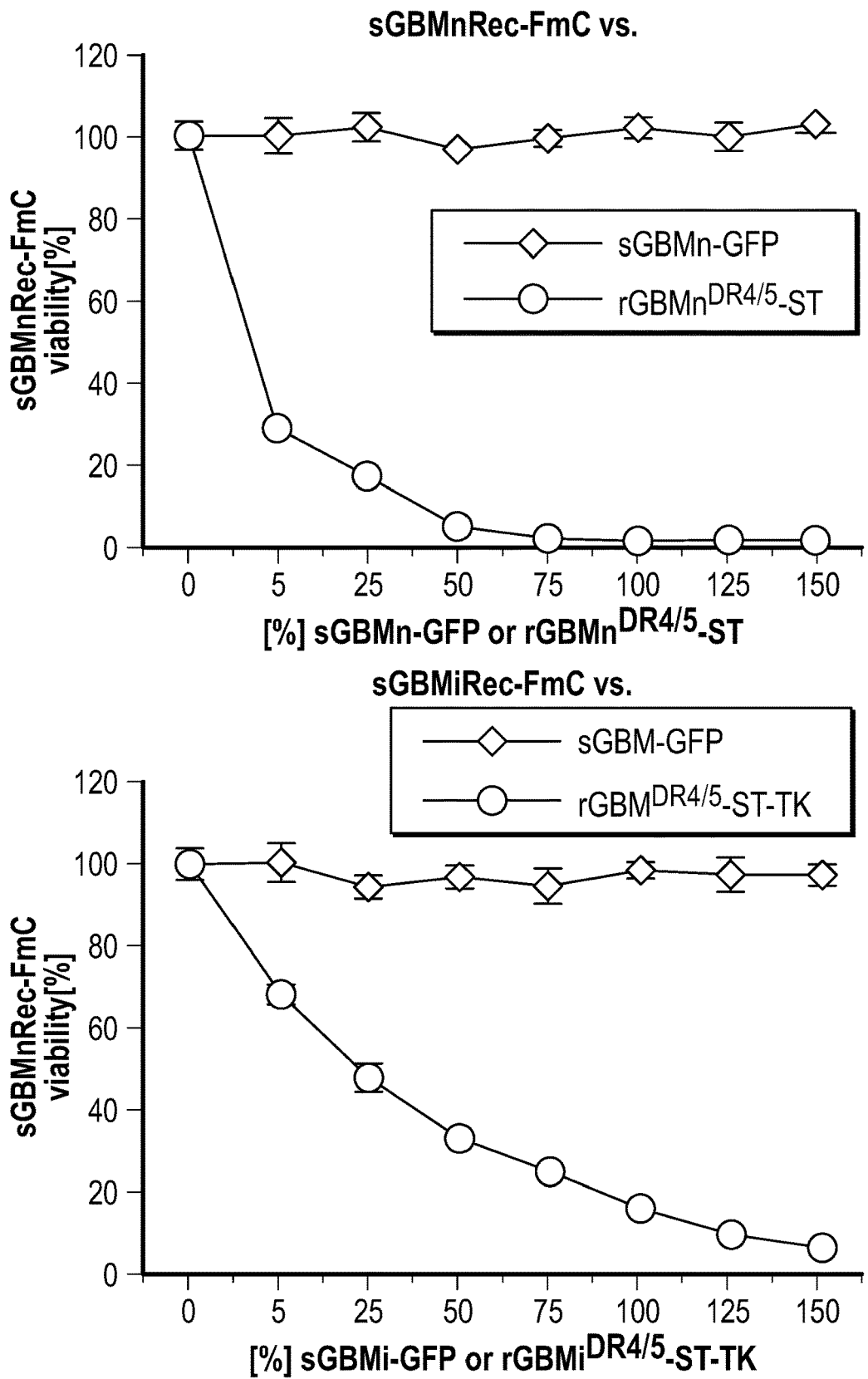

In light of the highly TRAIL-resistant phenotype observed after DR-KO, the Inventors next wanted to test whether the established DR4/5 double KO lines could serve as a cellular vehicle for continuous delivery of S-TRAIL towards autologous self-cells and ultimately be eliminated. To test this hypothesis, the Inventors transduced rGBMnDR4/5 and rGBMiDR4/5 with LVs to express S-TRAIL or co-express S-TRAIL and HSV-TK, followed by autologous coculture with their respective TMZ-resistant recurrent cell lines (sGBMnRec-FmC and sGBMiRec-FmC; FIG. 9D). DR4/5 double KO cell lines engineered to express S-TRAIL (ST) showed robust TRAIL expression and secretion as compared to GFP-transduced counterparts. TRAIL secretion from CRISPR-engineered therapeutic cancer cell lines was further quantified via ELISA time course. Autologous coculture of rGBMnDR4/5-ST and rGBMiDR4/5-ST-TK with their respective recurrent lines further revealed high potential for self-targeting, resulting in marked reduction of the targeted recurrent GBM cells in a dose-dependent manner as compared to coculture with GFP controls (FIG. 9D).

Figure 9E:
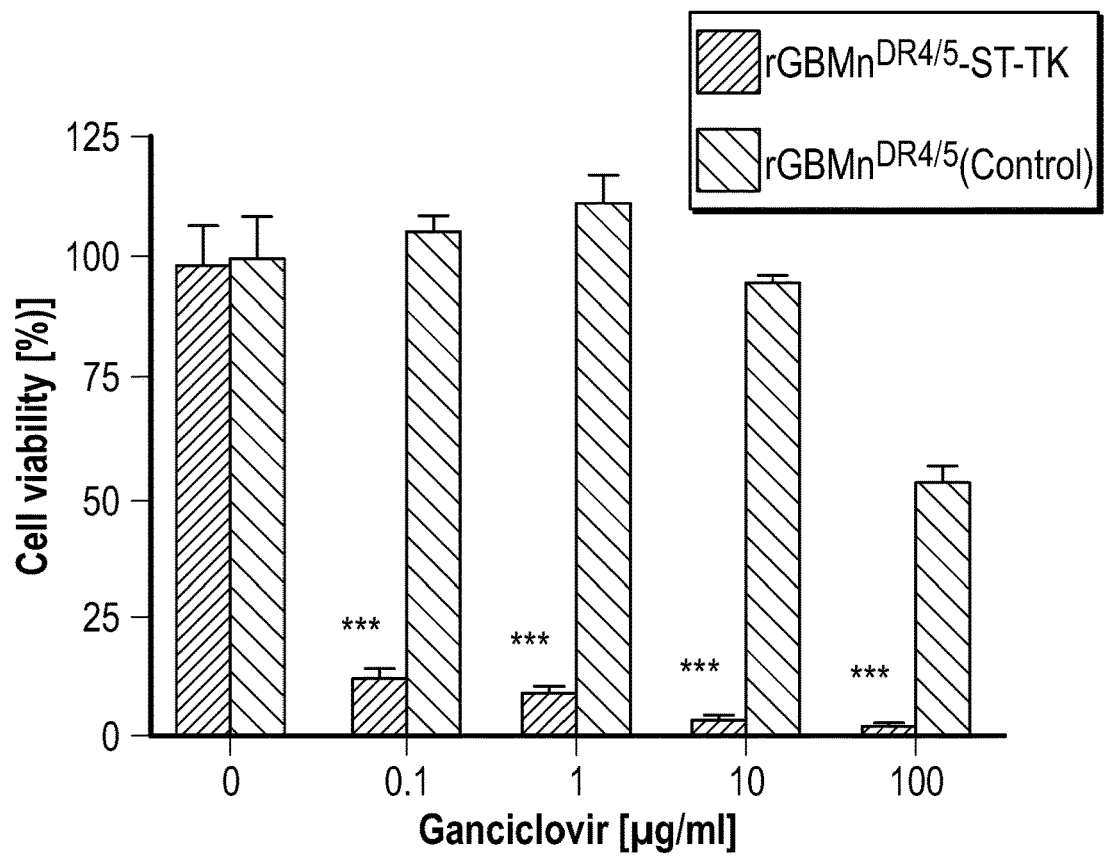
Figure 9E:
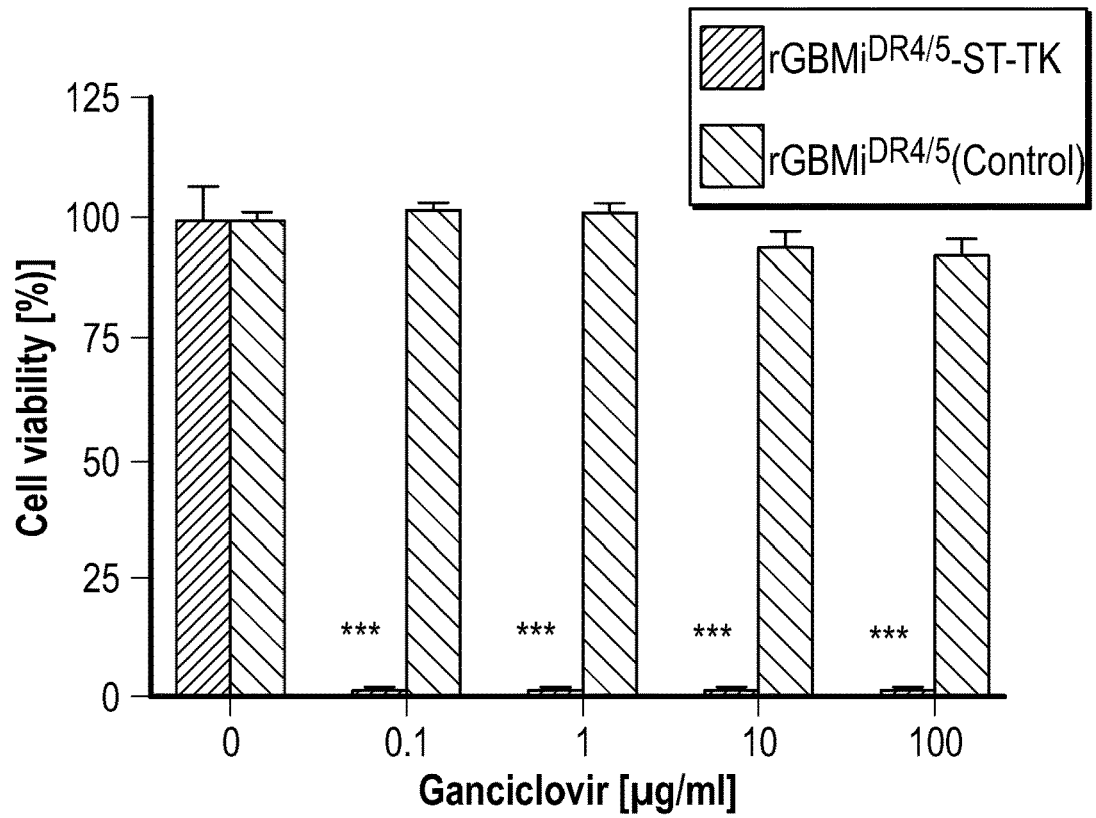

Treatment of both nodular and invasive rGBMnDR4/5-ST-TK and rGBMiDR4/5-ST-TK with GCV resulted in dose-dependent cell elimination as opposed to non-TK control lines (FIG. 9E). To further test whether HSV-TK bystander effect might also provide efficacy against TRAIL-resistant autologous self-cells (which may be needed in clinical settings of tumor recurrence with change in TRAIL sensitivity phenotype), DRL-resistant rGBMnDR4/5 were engineered to express FmC and cocultured with rGBMnDR4/5-ST-TK cells, followed by treatment with and without GCV. Addition of GCV resulted in not only cell death in the rGBMnDR4/5-ST-TK therapeutic line, but also elimination of TRAIL-resistant DR4/5 KO self-cells (rGBMnDR4/5-FmC) via bystander effect. Thus, should tumors acquire a DRL-resistant phenotype during adjuvant clinical therapy and tumor recurrence, TK-induced bystander effect of therapeutic self-cells might still provide robust treatment efficacy.

CRISPR-Engineered Tumor Cells Expressing Cytotoxic Molecules Show Autologous Self-Targeting Efficacy in Primary and Metastatic Tumors The Inventors established three mouse models, each closely mirroring a different clinical scenario of cancer treatment that might particularly benefit from tumor self-targeting: (1) implantation of autologous self-targeting cells into resection cavities of mice undergoing surgery for recurrent nodular tumors derived from the TMZ-resistant sGBMnRec-FmC, (2) direct stereotactic intratumoral implantation of autologous self-targeting cells into mice bearing recurrent invasive tumors derived from the TMZ-resistant sGBMiRec-FmC tumor line, and (3) injection of autologous self-targeting cells into the carotid artery of mice bearing established intracranial metastatic sBCm-FmC breast cancer deposits. The three outlined scenarios feature the potential of self-targeting for (1) local treatment of surgically controllable (primarily nodular) tumor recurrence, (2) local treatment of recurrent (primarily invasive) cancers for which surgical debulking is not indicated, and (3) systemic treatment for disseminated/metastatic disease.

Figure 10A:
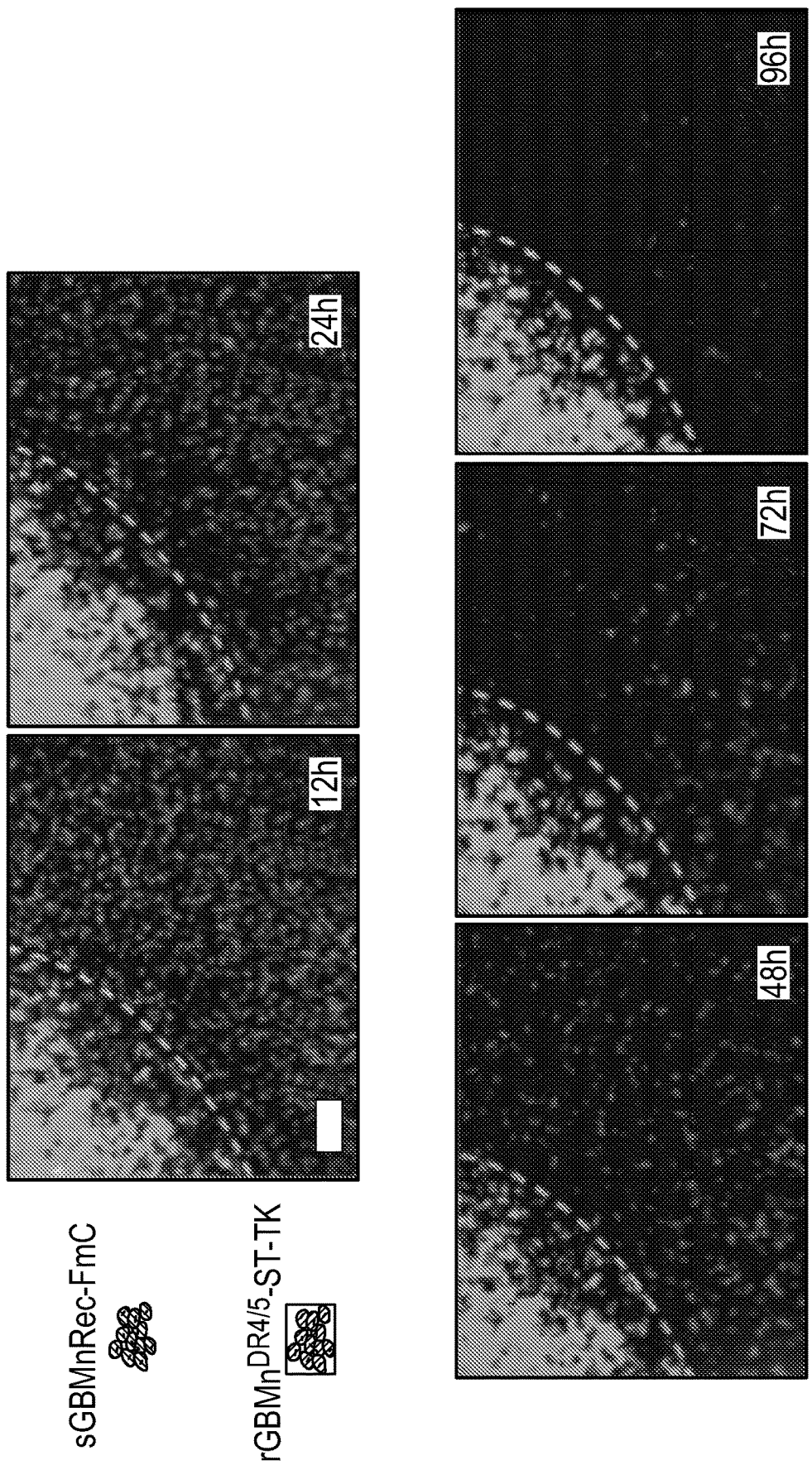
FIGS. 10A-10E. DR knockout cancer cell lines engineered with S-TRAIL and a suicide-system demonstrate autologous self-targeting efficacy in vivo.
Figure 10B:
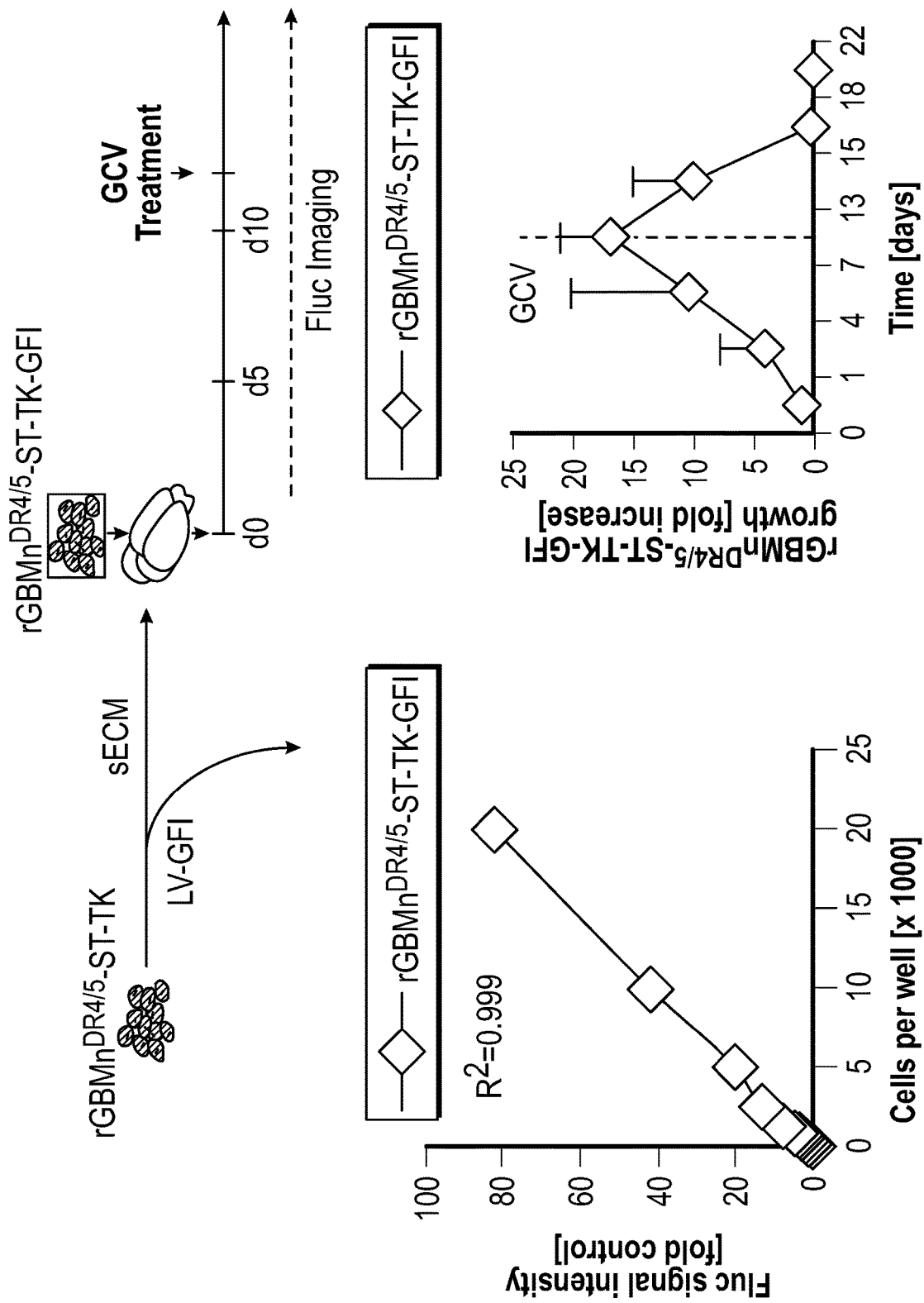
Figure 10C:
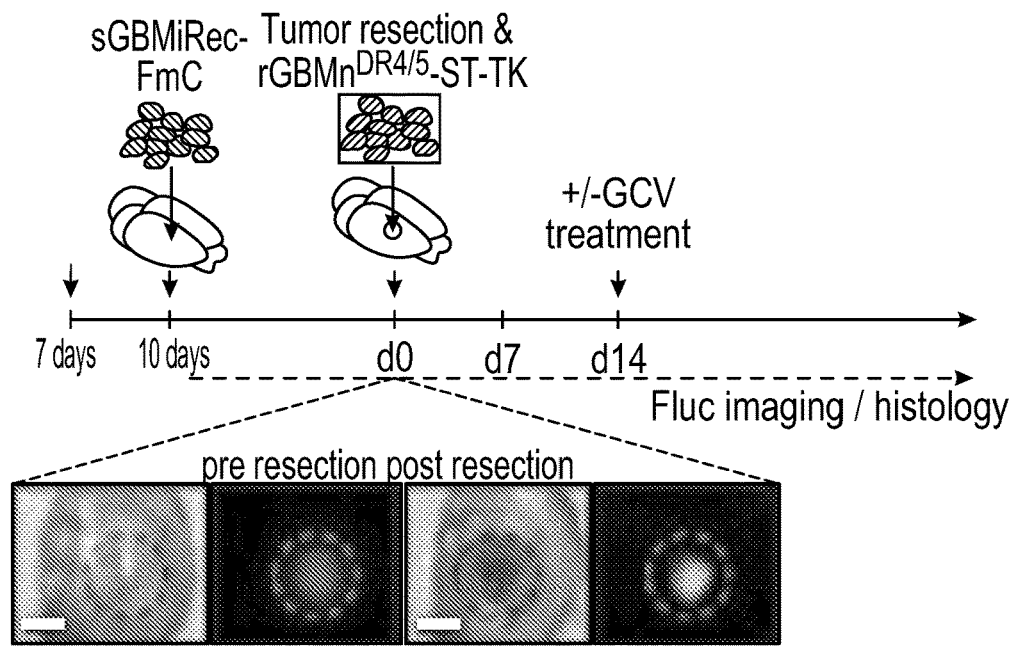
Figure 10C:
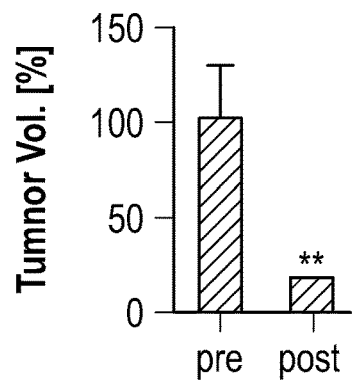
Figure 10C:
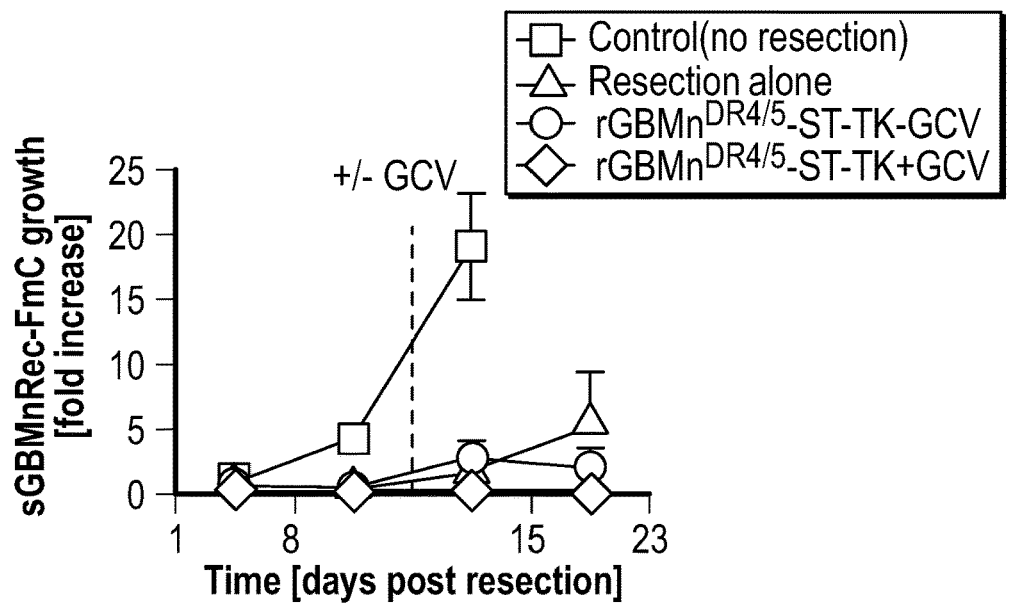
Figure 10C:
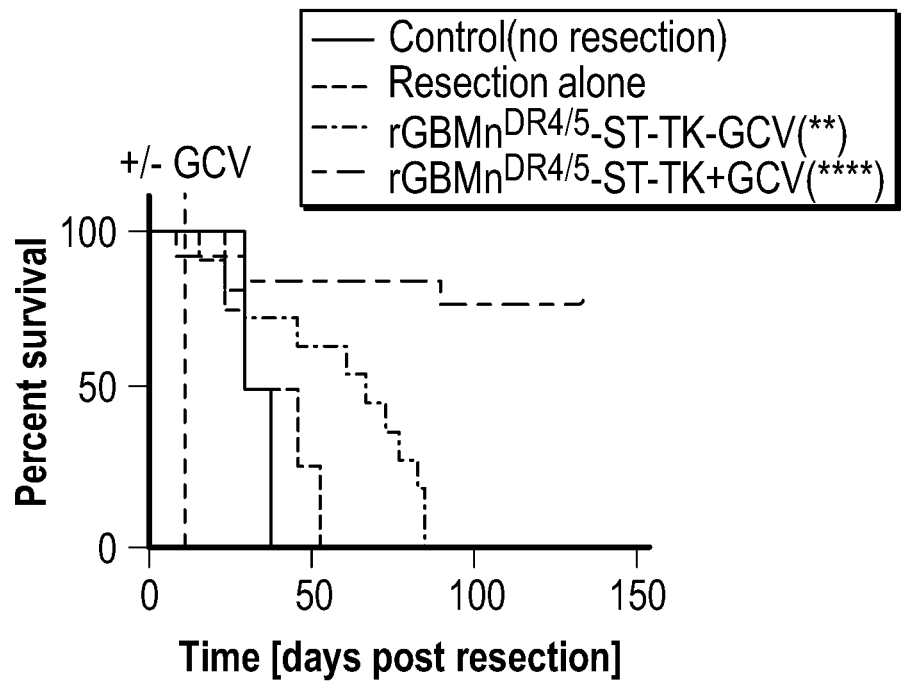
Figure 10C:
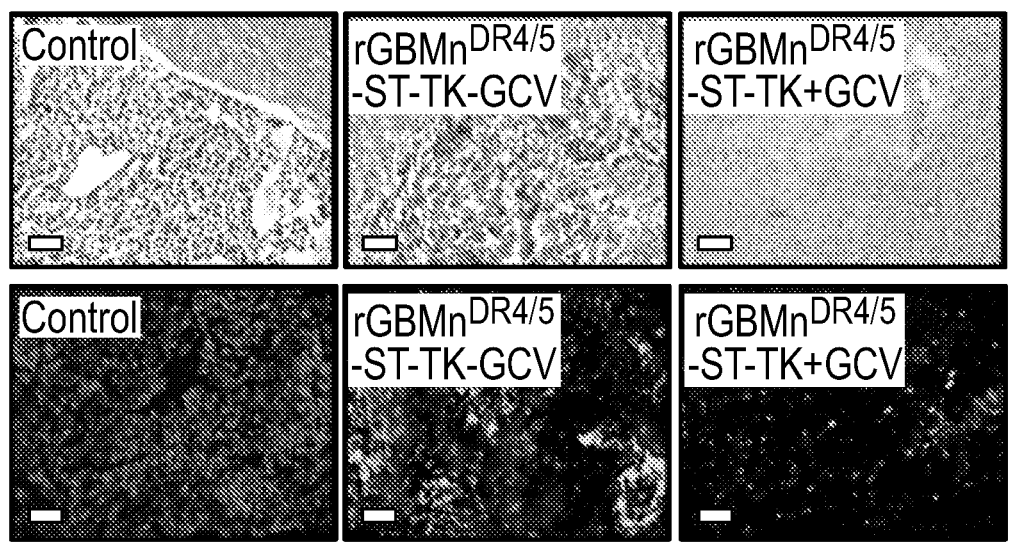

(1) Nodular recurrent GBM resection model: Local retention of therapeutic cells can be achieved by encapsulation of therapeutic cells into biodegradable synthetic extracellular matrix (sECM) before implantation into the resection cavity (16). First, efficacy of sECM-encapsulated rGBMnDR4/5-ST-TK cells against sGBMnRec-FmC self-cells was confirmed via in vitro coculture, indicating efficient release of S-TRAIL out of the sECM (FIG. 10A). Further, rGBMnDR4/5-ST-TK were co-engineered to express GF1 followed by sECM encapsulation and intracranial implantation into SCID mice to test for in vivo growth and efficiency of GCV-induced (HSV-TK mediated) cell clearance. Implanted sECM-encapsulated rGBMnDR4/5-ST-TK-GF1 localized to the implantation site, demonstrated in vivo growth, and GCV treatment resulted in successful cell clearance, as indicated by a drop of BLI signal back to baseline by day 9 after initiation of GCV therapy (FIG. 10B). Together these data show that S-TRAIL can be released from sECM-encapsulated CRISPR-engineered therapeutic tumor cells and that these cells retain their potential for in vivo growth but can be eliminated with GCV. Based on these observations, the Inventors next tested the in vivo antitumor efficacy of sECM-encapsulated rGBMnDR4/5-ST-TK in a clinically relevant resection model of mice bearing recurrent GBM. Mice implanted with the recurrent TMZ-treated autologous GBM cell line sGBMnRec-FmC (FIGS. 9A-C) underwent either no treatment (control) or fluorescence microscopy-guided subtotal tumor resection with or without simultaneous implantation of sECM-encapsulated rGBMnDR4/5-ST-TK into the resection cavity followed by treatment with or without GCV (FIG. 10C). As expected, tumor volume was significantly reduced immediately after GBM resection, as indicated by a drop of the BLI signal after surgery (FIG. 10C, p<0.01). Mice undergoing tumor resection and rGBMnDR4/5-ST-TK implantation demonstrated a marked survival benefit compared to non-resected control mice and mice with resection alone. Survival was further extended in mice receiving GCV treatment (FIG. 10C).

Figure 10D:
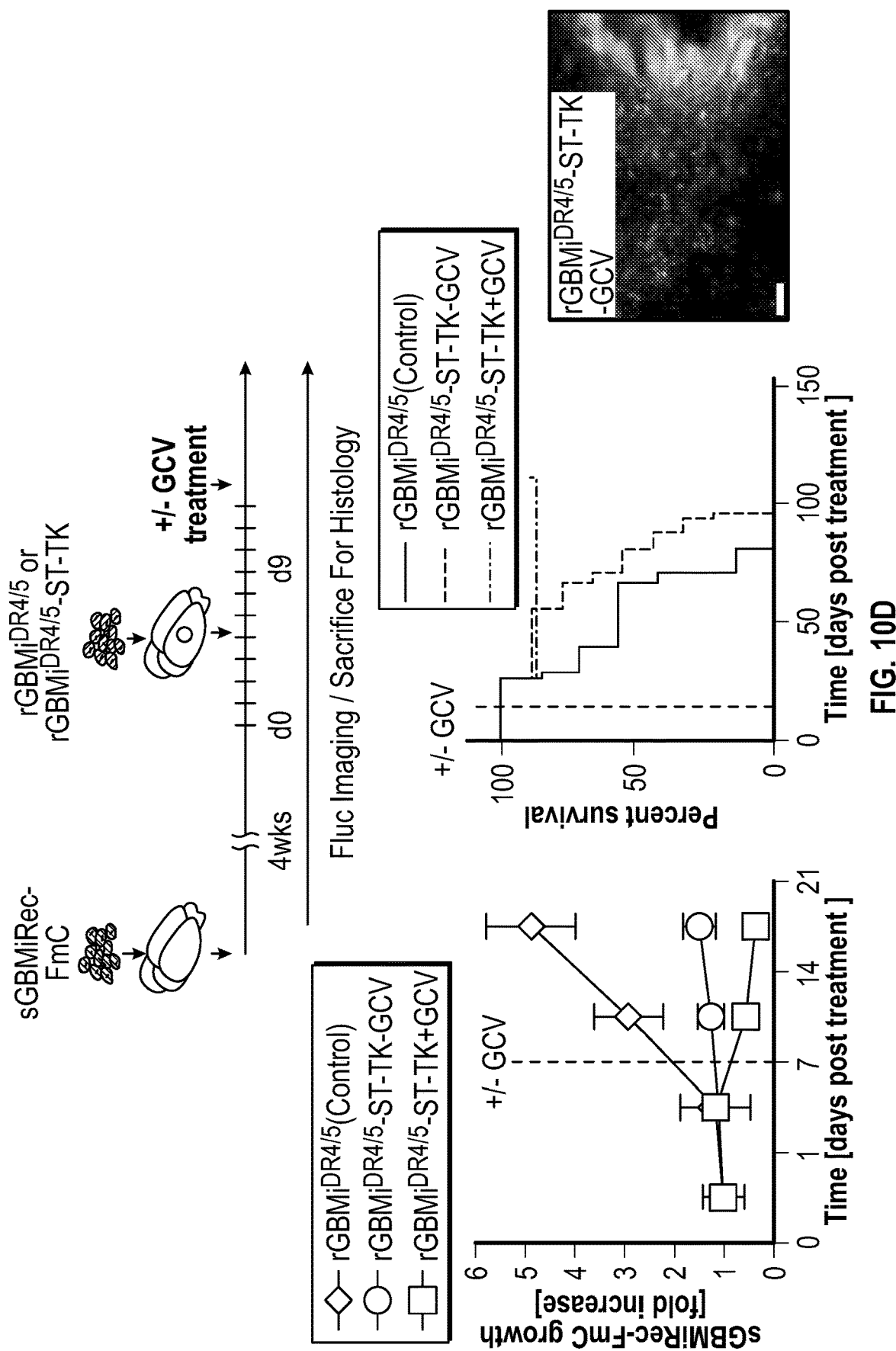
Figure 10E:
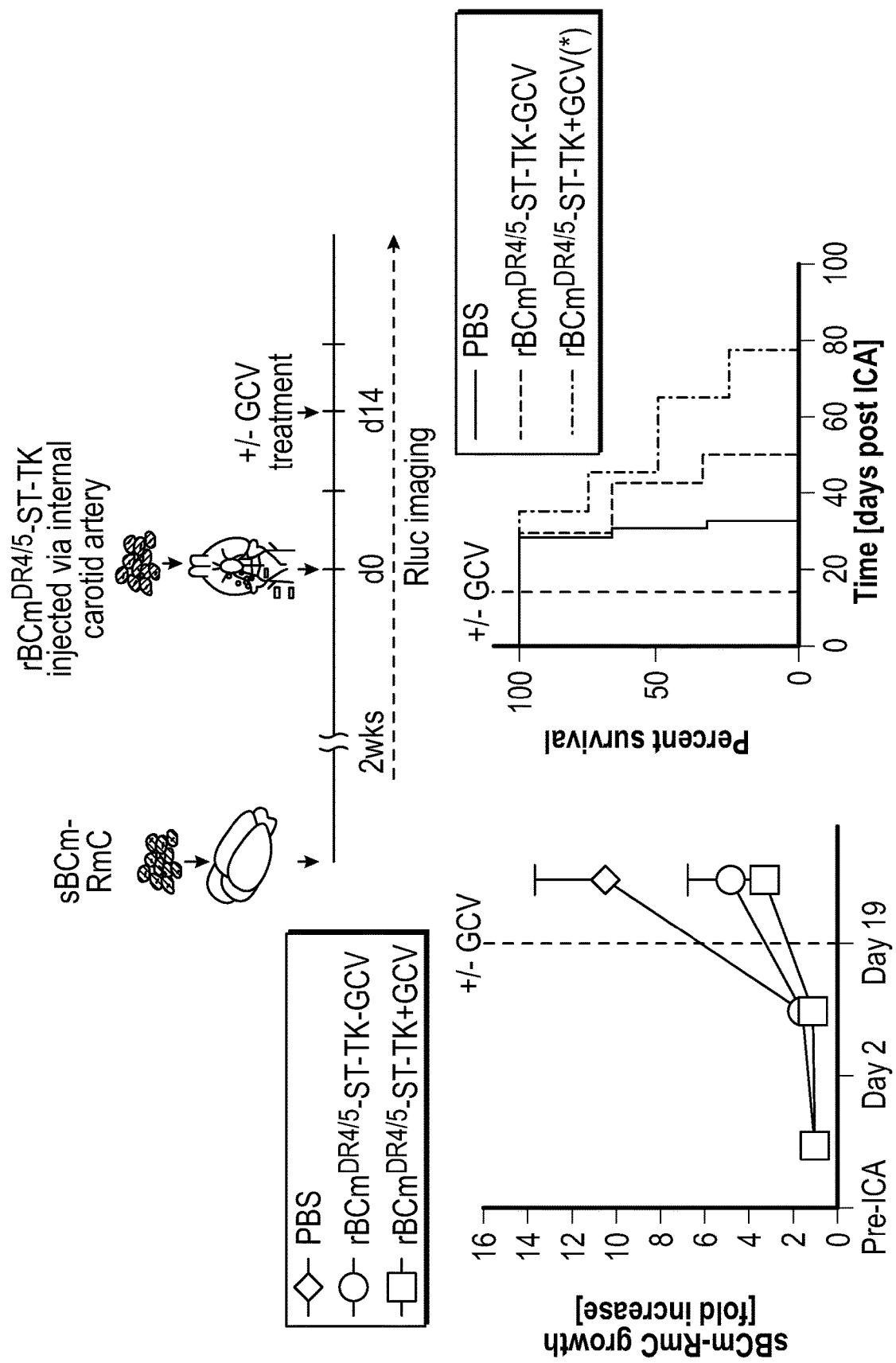
Figure 11A:
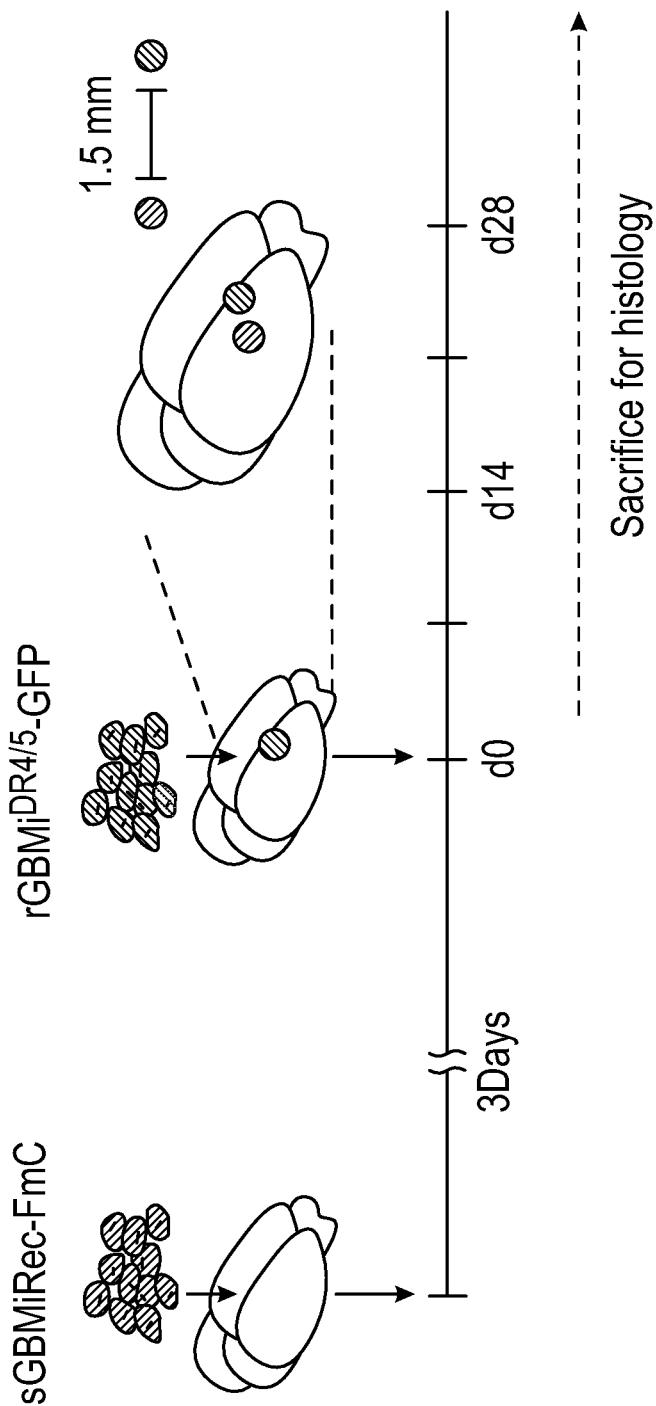
FIGS. 11A-11D. Migratory potential of CRISPR-engineered therapeutic tumor cells towards recurrent self-tumor sites.
Figure 11B:
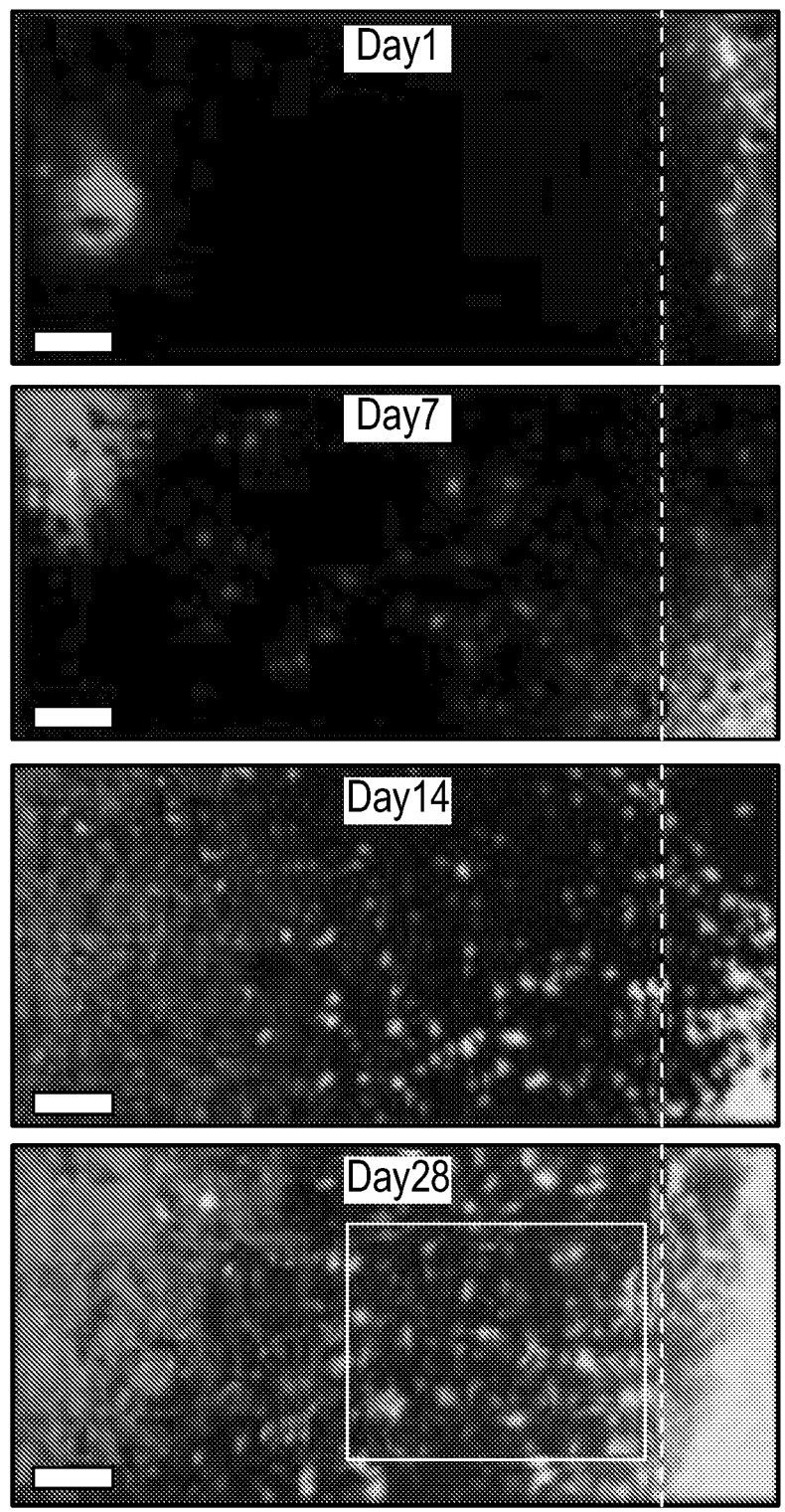
Figure 11C:
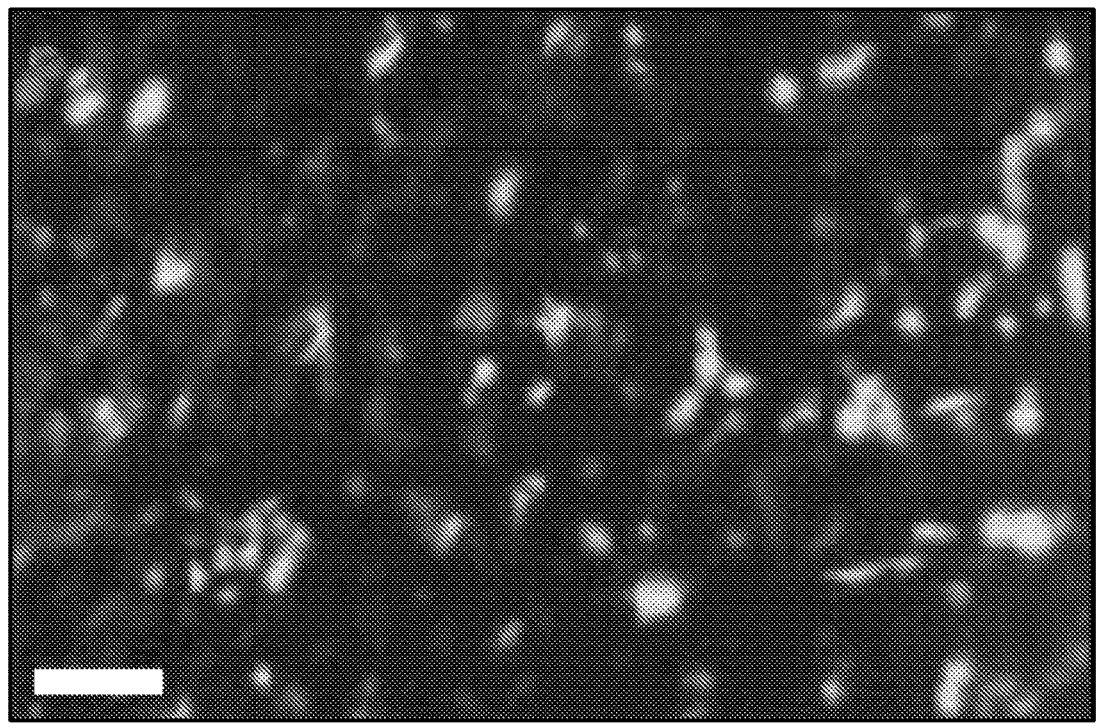
Figure 11D:
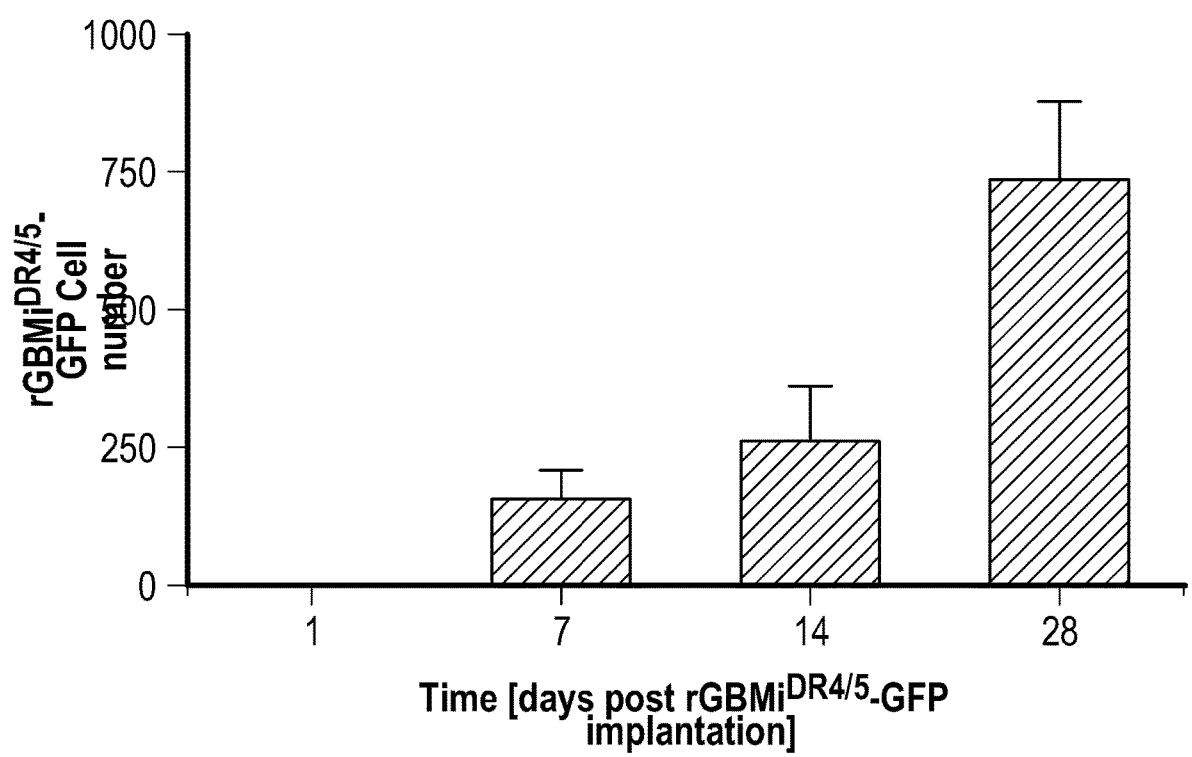
Figure 12A:
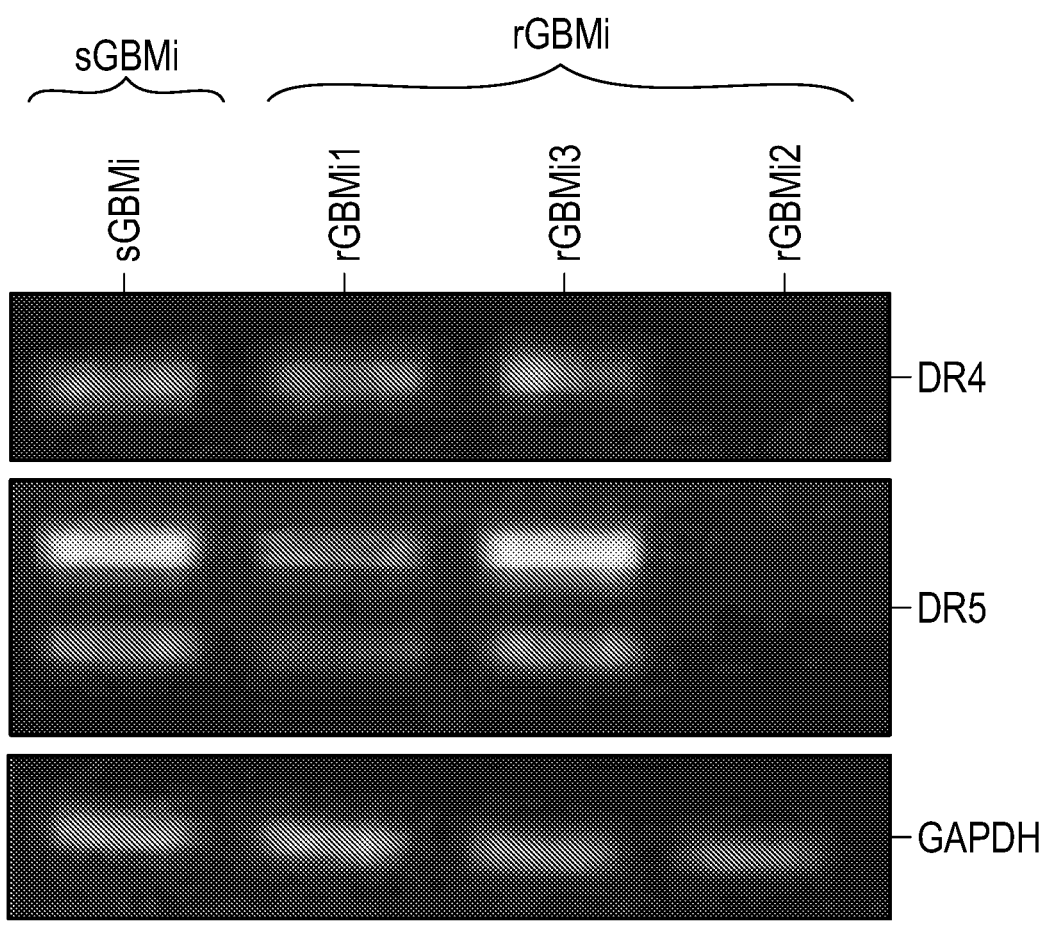
FIGS. 12A-12C depicts the DR expression, engineering of DRL-resistant cancer cells with Rluc(o)-S-TRAIL, and in vitro coculture efficacy.
Figure 12B:
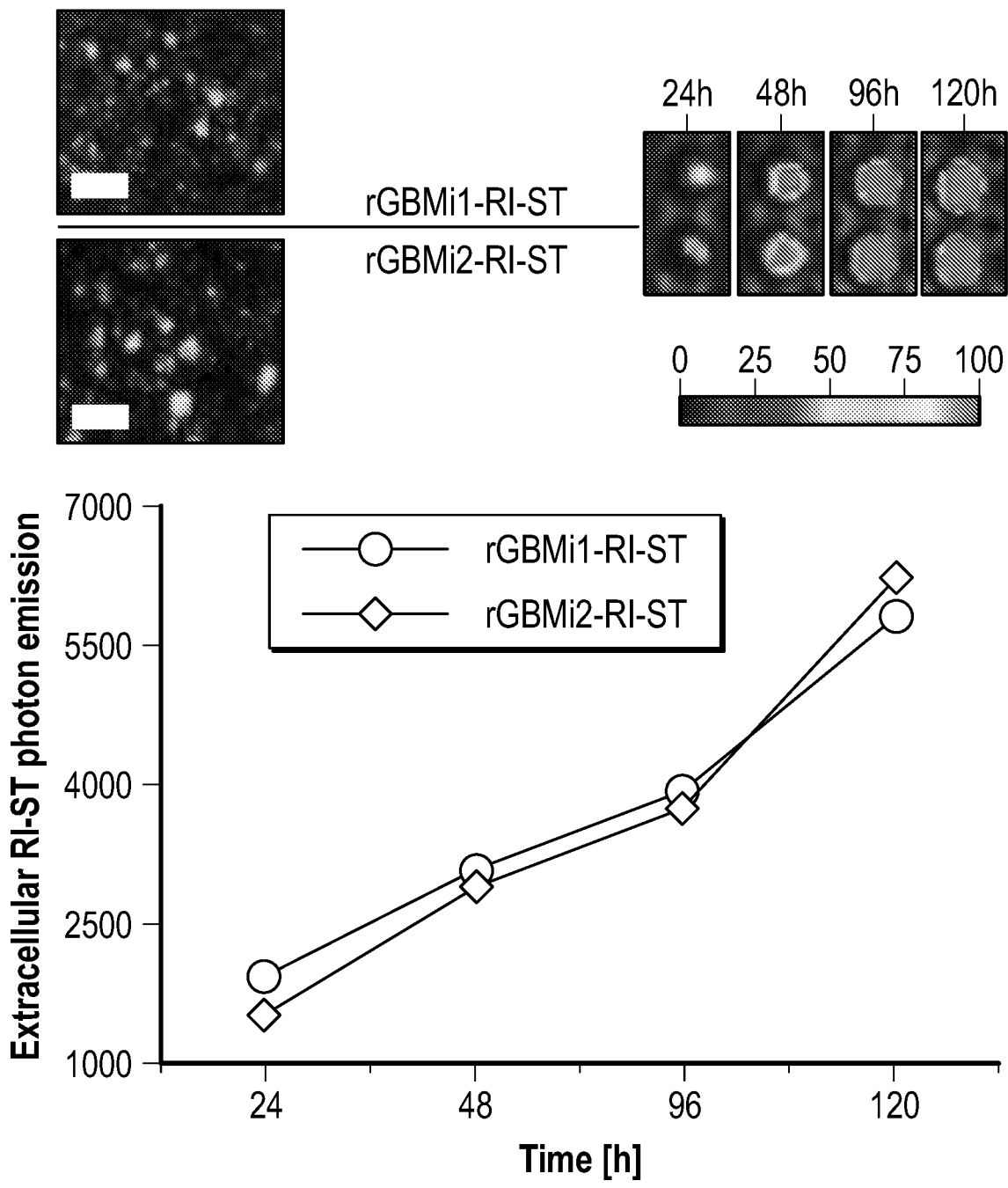
Figure 12C:
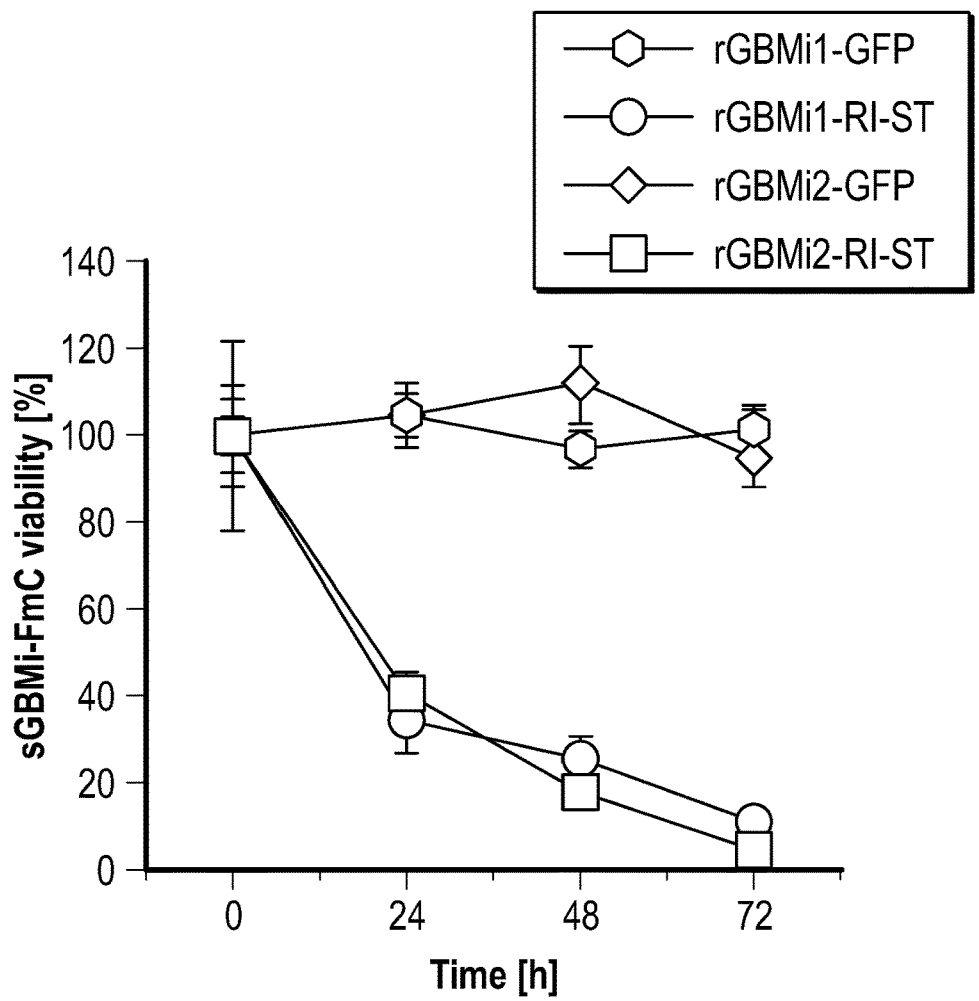
Figure 13A:
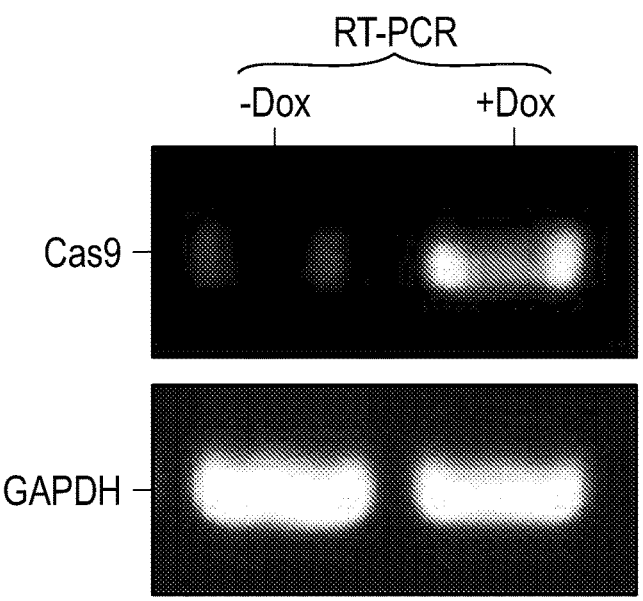
FIGS. 13A-13C demonstrates the Screening and identification of CRISPR-induced DR knockout.
Figure 13B:
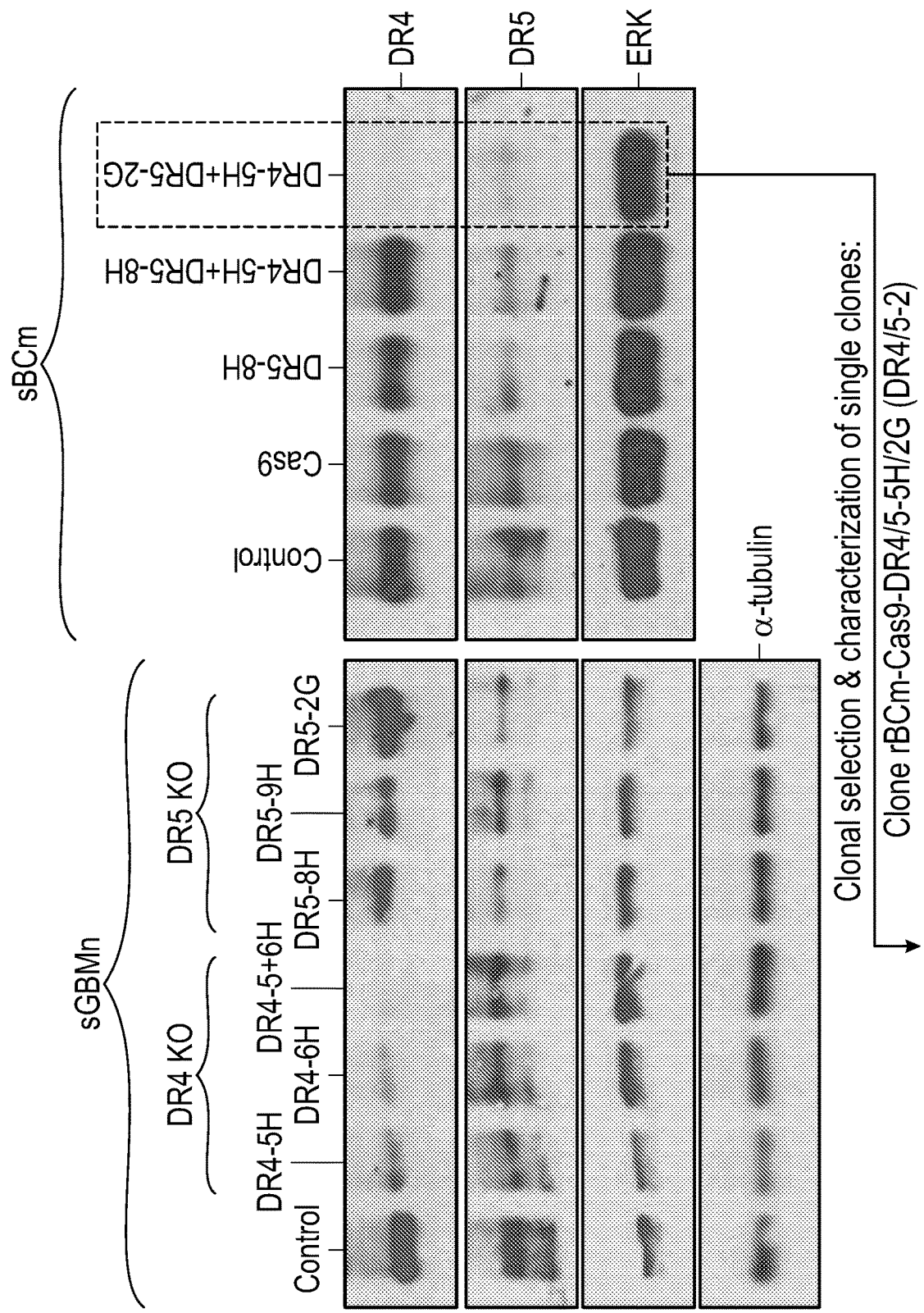
Figure 13C:
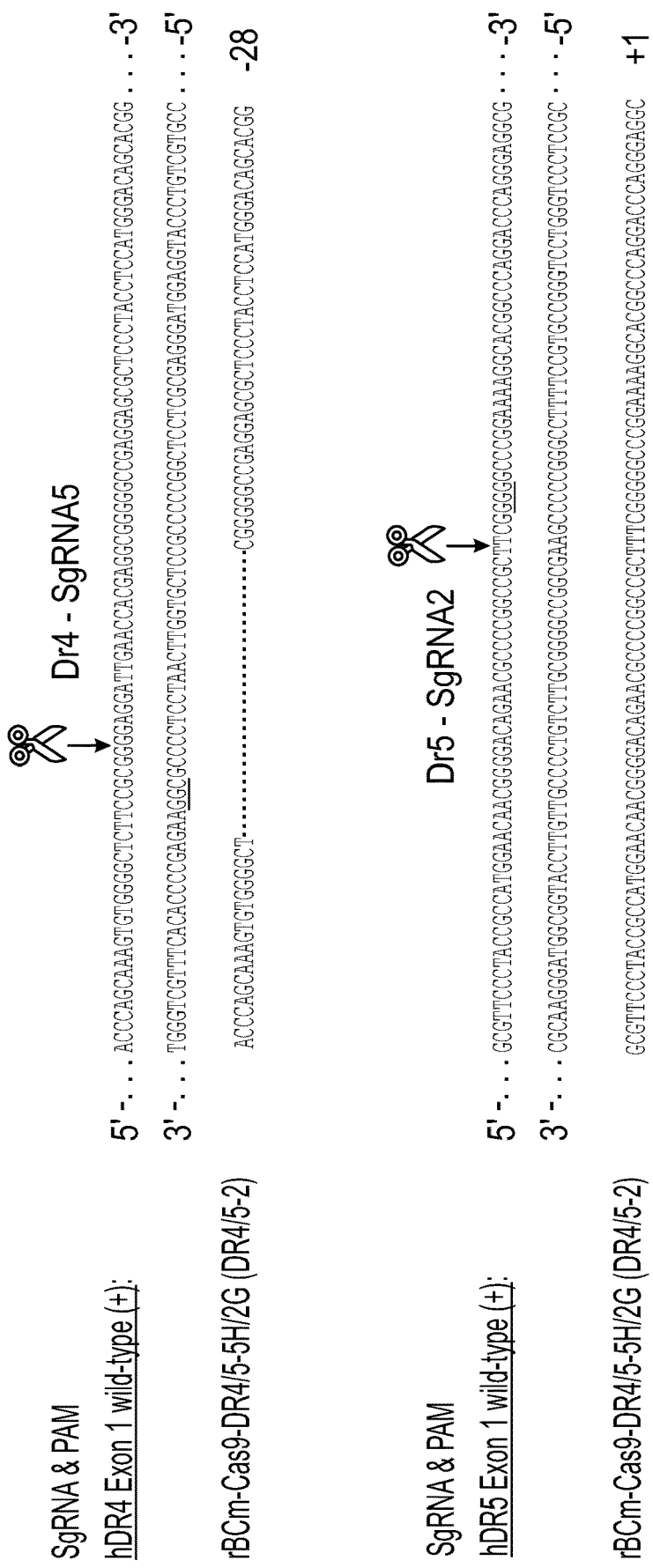
Figure 14A:
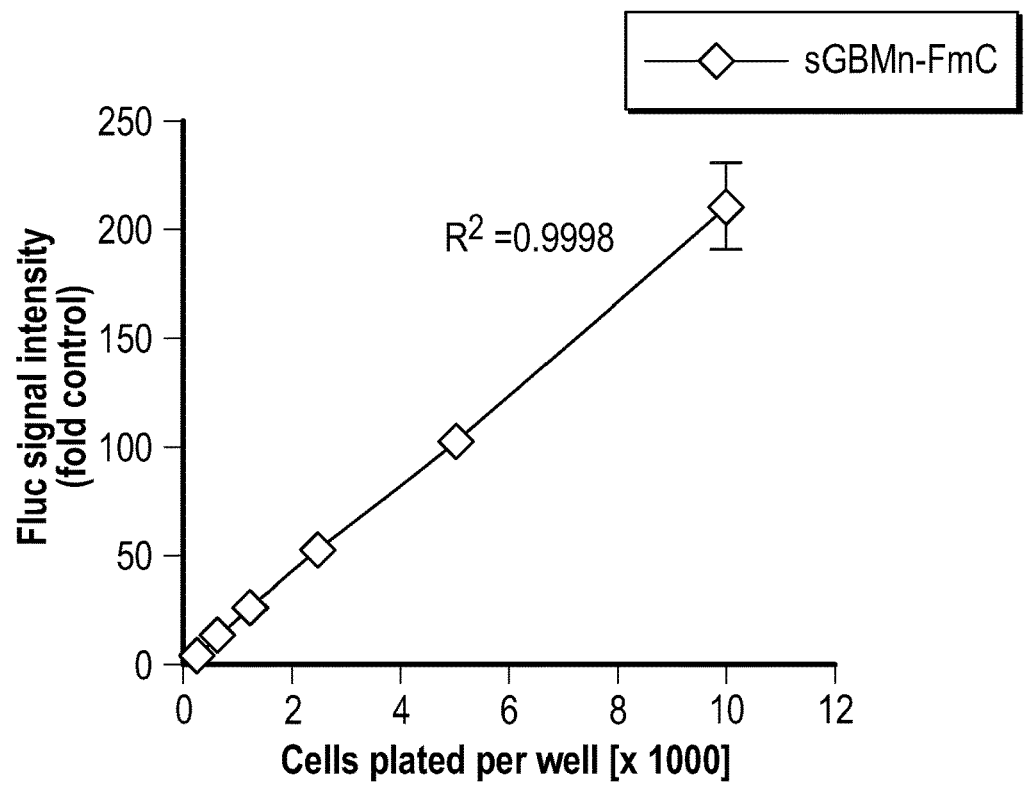
FIGS. 14A-14C depicts the engineering of cell lines for in vivo BLI and S-TRAIL expression from DR4/5 knockout cell lines.
Figure 14A:
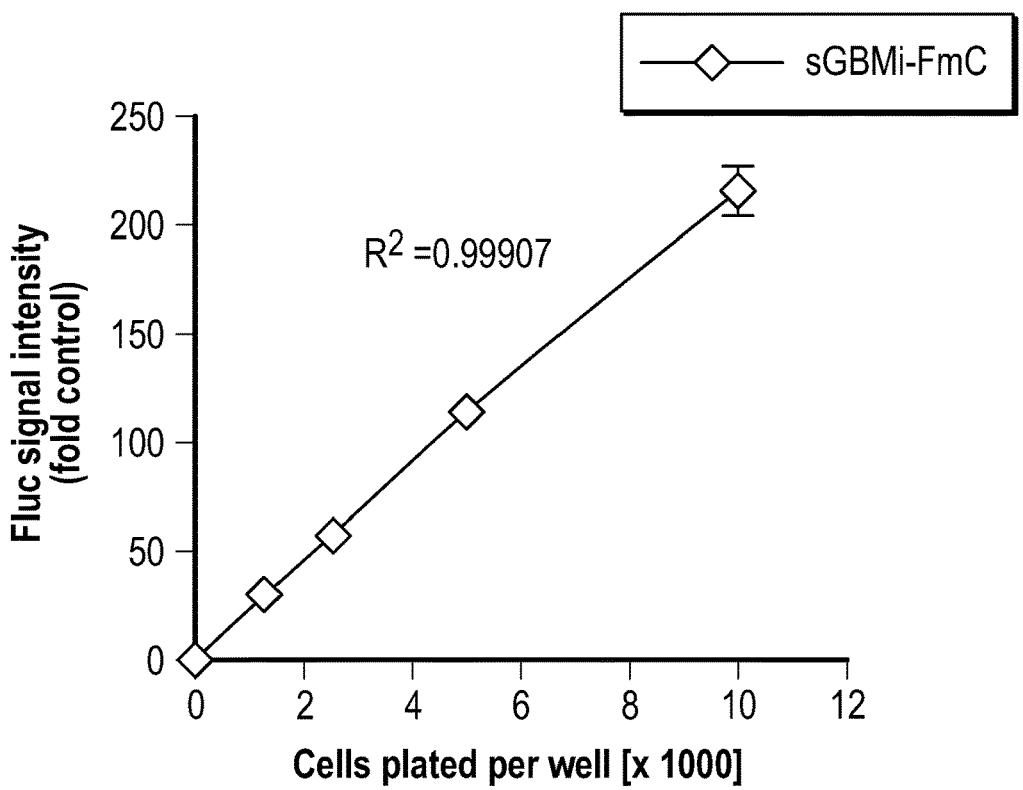
Figure 14A:
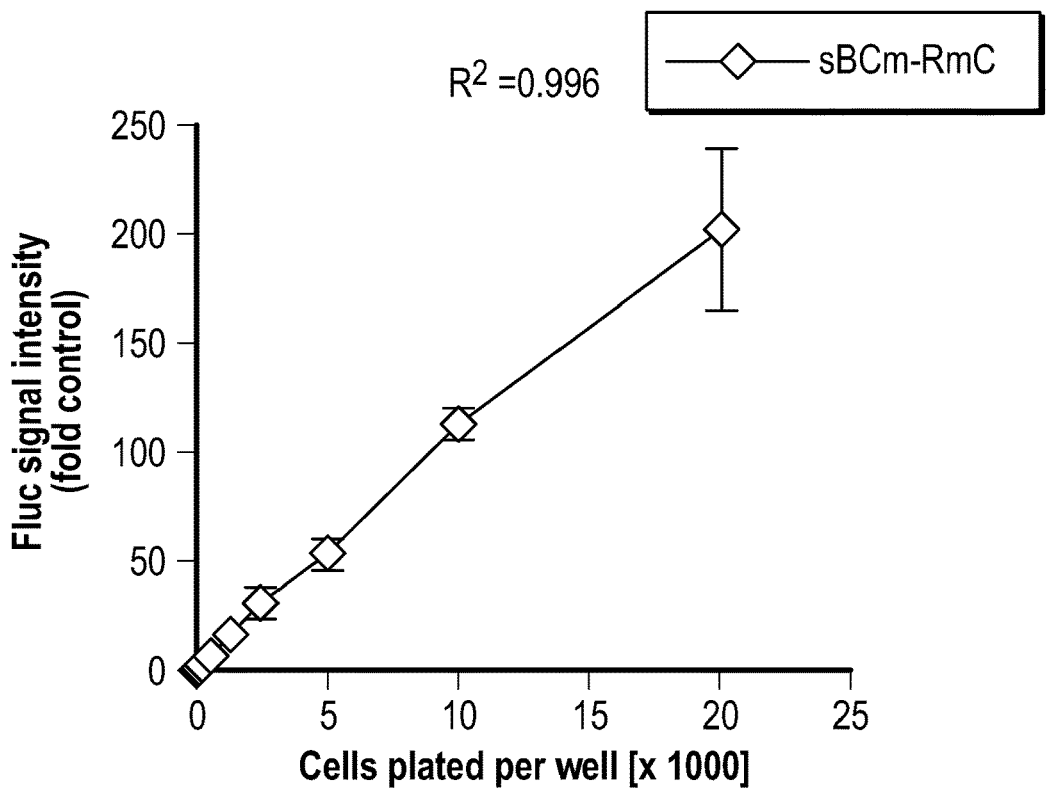
Figure 14A:
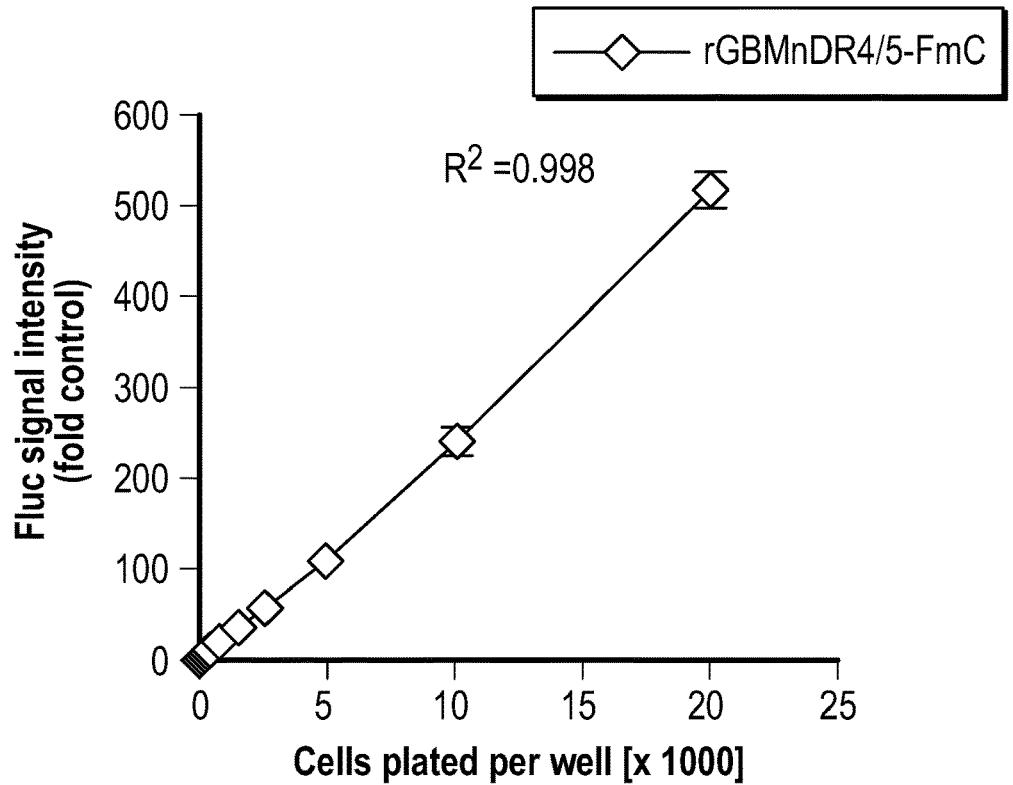
Figure 14B:
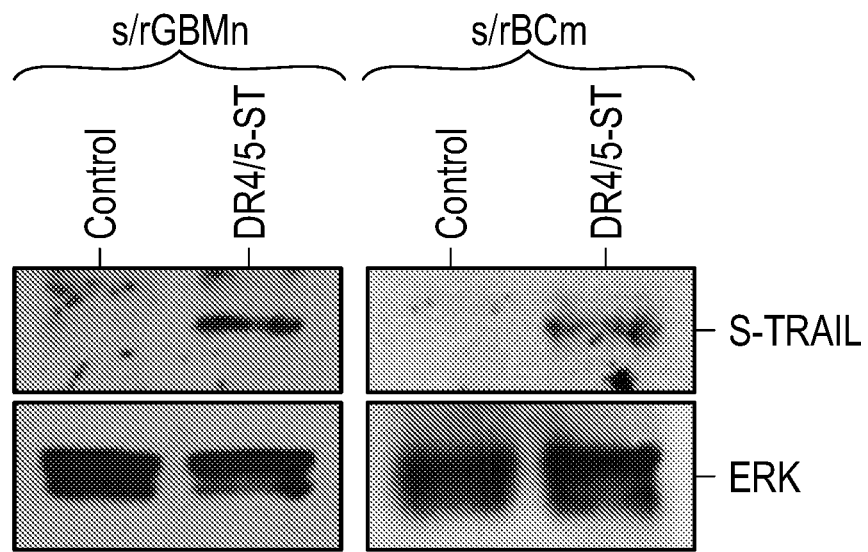
Figure 14C:
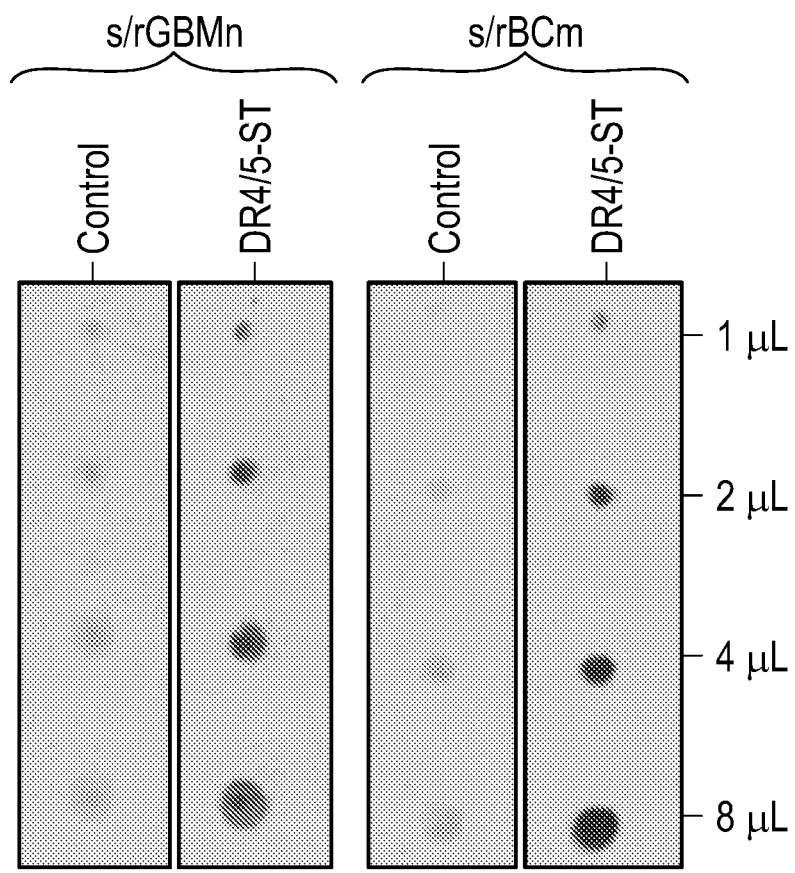
Figure 15:
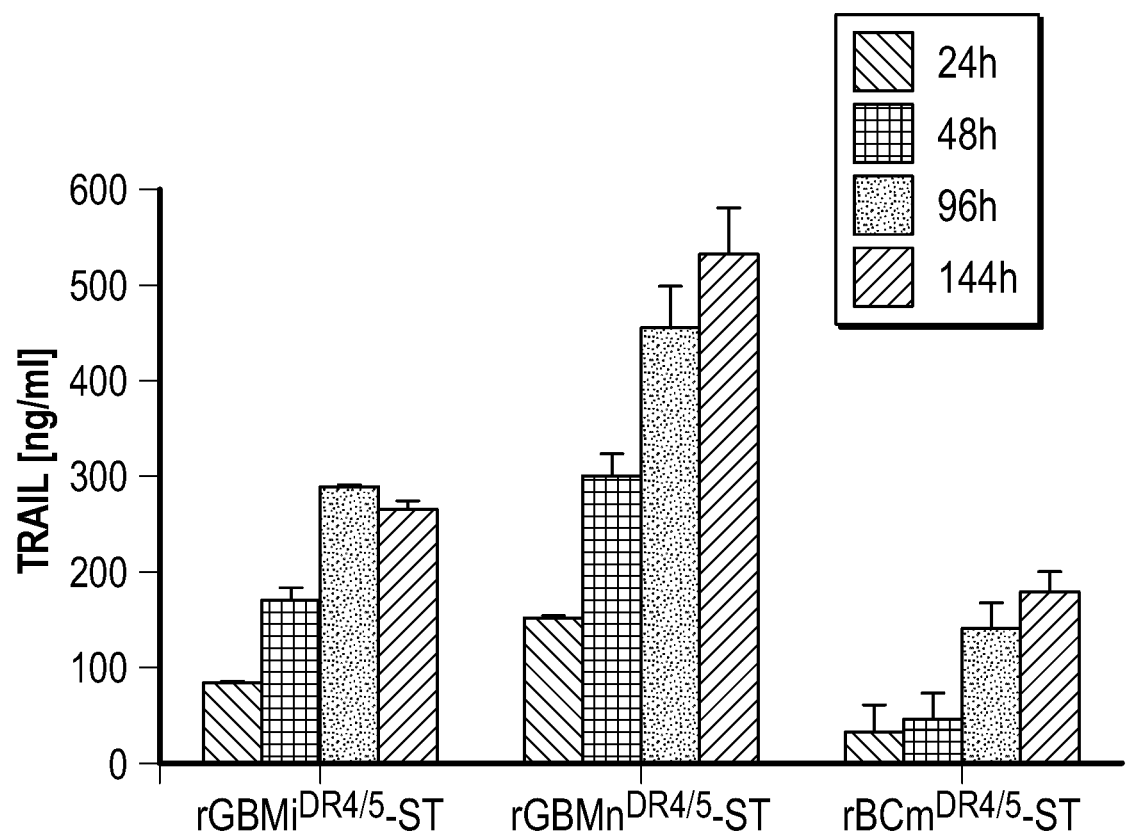
FIG. 15. ELISA quantification of secreted TRAIL from CRISPR-engineered therapeutic cancer cell lines. DR4/5 knockout cancer cell lines engineered with S-TRAIL were plated with 105 cells per well of a 6-well plate, and conditioned medium was collected at the indicated time points. Graph shows ELISA quantification of TRAIL in conditioned medium over time (n=2 technical replicates per time point and cell line). Means±SD are shown.
Figure 16A:
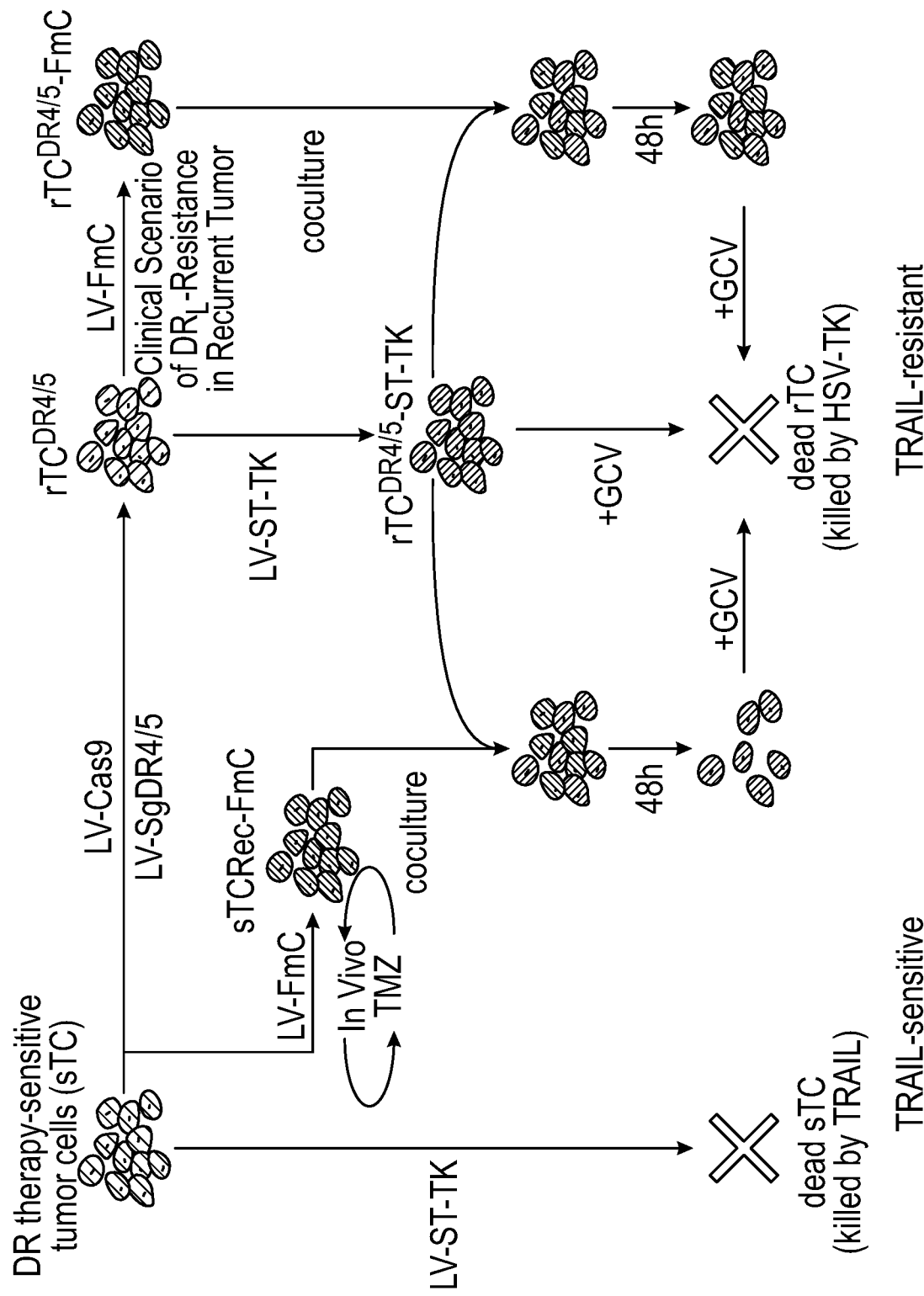
FIG. 16A and FIG. 16B. Concept of autologous cancer cell-based self-targeting strategies and possible role of GCV-activated HSV-TK suicide system in case of DRL non-responsive tumor recurrence.
Figure 16B:
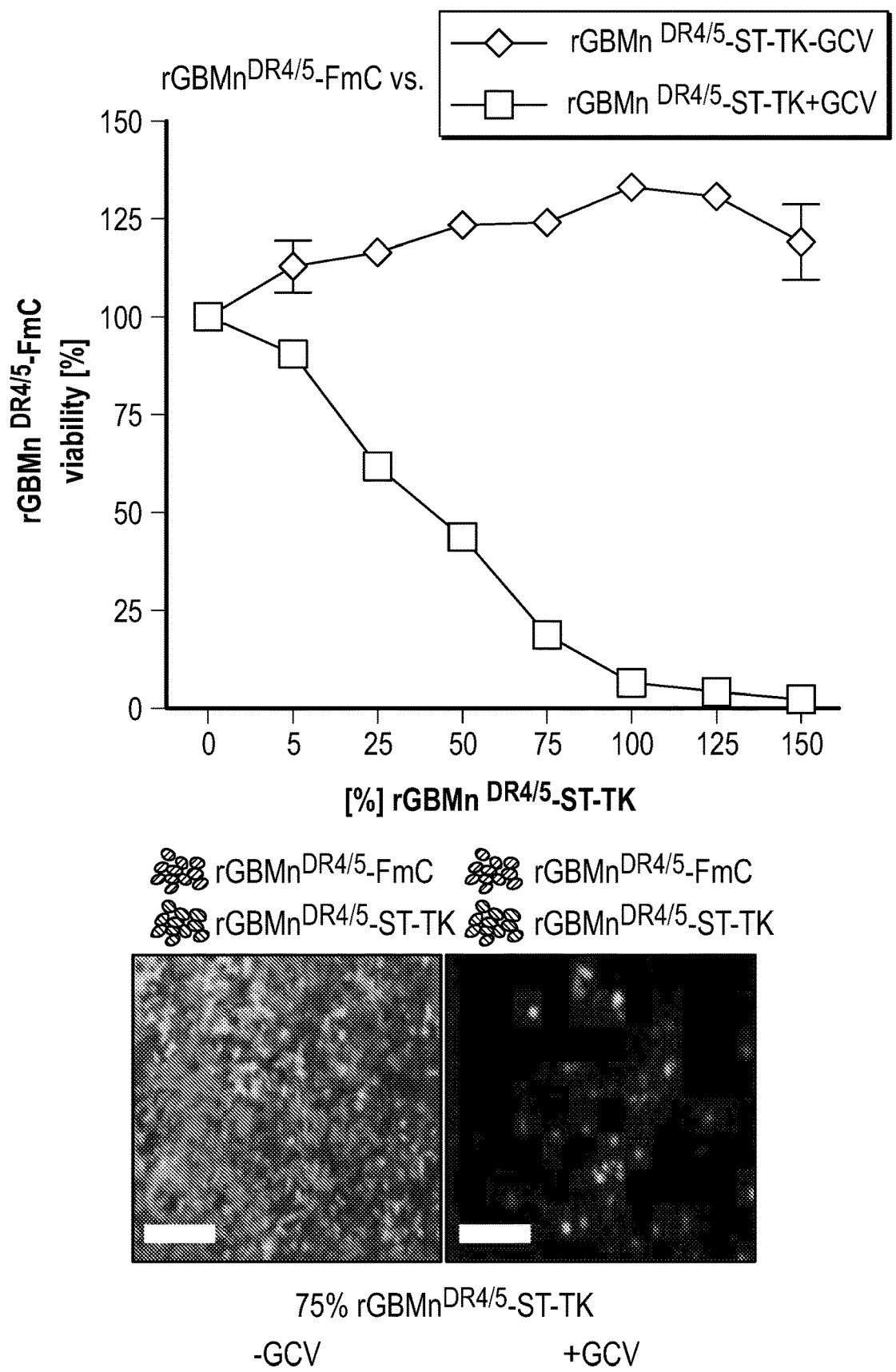

(2) Invasive recurrent GBM model: To investigate antitumor efficacy in the clinical setting of non-resectable recurrent tumors, the Inventors chose the highly invasive recurrent sGBMiRec-FmC model (FIG. 9A-C) and used direct stereotactic implantation of rGBMiDR4/5 (control) or therapeutic rGBMiDR4/5-ST-TK into the tumor site (FIG. 10D). A marked reduction of tumor burden was observed in rGBMiDR4/5-ST-TK treated mice in comparison to control mice (FIG. 10D). In comparison to controls, therapy with rGBMiDR4/5-ST-TK and GCV resulted in significant improvements of survival (FIG. 10D, p<0.01). Although initially effective in reducing sGBMiRec-FmC tumor growth, treatment with rGBMiDR4/5-ST-TK alone (without GCV) did not significantly improve mouse survival. This is likely a consequence of therapeutic tumor cell growth and underlines the importance of GCV treatment when using therapeutic tumor cells. (3) Metastatic breast-to-brain cancer model: To extend the applicability of above-outlined autologous self-targeting approaches to other tumor models, we further investigated their efficacy in a metastatic cancer model using the DRL-sensitive breast-to-brain metastatic cell line sBCm (FIGS. 6C-D), which was previously established by Bos et al. from the cell line MDA-MB-231 (23). DR4/5 double KO clone rBCmDR4/5 (FIG. 3H, sBCm-DR4/5-2) was engineered to express ST and TK, and TRAIL expression as well as secretion were confirmed by western blotting and ELISA analysis of conditioned medium over time. In vivo, mice bearing sBCm tumors engineered to express Rluc-mCherry (sBCm-RmC) were treated by injecting autologous rBCmDR4/5-ST-TK cells into the internal carotid artery (ICA) as previously described (24). In comparison to control mice, rBCmDR4/5-ST-TK and GCV treated mice showed marked reduction in tumor growth and prolonged survival (FIG. 10E).

Analysis of brain sections from sGBMn-FmC and sGBMi-FmC bearing mice using hematoxylin and eosin (HE) staining and fluorescence microscopy confirmed close proximity of therapeutic cells and targeted tumor deposits (FIG. 10C bottom, 10D bottom). To explore the time-dependent migration potential of CRISPR-engineered cells, mice bearing established sGBMiRec-FmC tumors were implanted with rGBMiDR4/5-GFP cells at a distance of 1.5 mm from the established tumor site. The Inventors data show that a directed migration of rGBMiDR4/5-GFP cells starting at 1 week after implantation, with steady increase of migrating cells over the follow-up period of 1 month, and cells covering more than 2 mm distance in this time period (FIG. 11). Together, the inventors in vivo data show that CRISPR-modified cancer cells engineered to secrete receptor-targeted therapeutic molecules can specifically target and kill autologous self-cells in mouse models of recurrent and metastatic cancers and that treatment increases the survival of mice.

This study demonstrates the therapeutic potential of using engineered tumor cells and their self-homing properties for receptor-targeted therapeutics for various cancers. The inventors show the feasibility and clinical translatability of this approach by using (1) "off-the-shelf" tumor cells resistant to DRL, which could be used for targeting of allogeneic patient tumors in clinical scenarios of primary tumor treatments and (2) inherently DRL-sensitive tumor cells, which after CRISPR-mediated DR knockout can be used in autologous settings of recurrent or metastatic disease.

Moreover, this study highlights the advantages of combining tumor cell-based receptor targeting with prodrug-activatable suicide systems and, using optical and PET imaging, demonstrates the feasibility, therapeutic efficacy, and safety of this approach in clinically relevant mouse models of primary, recurrent, and metastatic disease.

Despite great leaps in the treatment of malignant neoplasms over the past decades, cancer remains the second most common cause of death in the western world, slightly surpassed only by heart disease, and currently accounts for nearly 1 out of every 4 deaths in the US (20, 21). Consequently, new therapeutic approaches are desperately needed, especially in cases of recurrent and metastatic disease, where standard therapy has failed and evidence-based options for salvage treatments are limited or lacking. Preclinical data increasingly indicate that cell-based therapies enabling local delivery of therapeutic agents might provide a valuable option for these cases, and multiple studies are currently ongoing with the goal of translating these approaches into clinical settings (22-25). Associated advantages are manifold and include achievement of continuously high local concentrations of secreted agents with reduction of systemic toxicity, delivery of molecules with short half-lives that are inefficacious when used systemically, exposure or aid in detection of tumor-specific antigens and consecutive activation of the immune system, as well as the application of the pathotropic abilities of therapeutic cells to track tumor micro-deposits.

Traditionally, the main focus of research in the field of cell-based therapies has been on stem cells (SCs). In addition to the possibility of modifying these cells to express various proapoptotic and antiproliferative molecules, SCs' inherent pathotropic properties and their intrinsic antitumor effects have rendered them promising tools in the treatment of multiple cancers (24, 26). In the setting of GBM in particular, SC transplantation may enable local delivery of molecules that cannot pass the blood-brain barrier when administered systemically. However, despite the apparent advantages of using SCs for certain cancer types, several inherent and external roadblocks are still restricting widespread clinical translation of SC-based therapies: (1) adult SCs are often slow-growing in vitro and, unless artificially immortalized, (2) have a limited passage number, which makes engineering them with therapeutic molecules difficult and reduces treatment efficacy due to short in vivo survival (27); (3) donor SCs, prepared from a healthy individual or from a pool of healthy donors, may not (or only partially) match the recipient's HLA status, possibly causing adverse immune responses and/or toxicity as well as premature SC clearance by the recipient's immune system (28); (4) autologous SC transplantation would be ideal, but is time-consuming and therefore currently not practical in first-line treatment or for patients with end-stage cancer, because SCs have to be harvested, reengineered with therapeutic molecules, and expanded before reapplication can be considered (29). Moreover, SC harvesting from patients necessitates further interventional procedures, therefore adding to the overall risk of clinical complications, especially for late-stage and immunocompromised patients after chemotherapy.

Numerous studies have investigated the mechanisms that influence tumor progression and eventually contribute to metastasis (2, 3). One concept suggests that during tumor evolution, cancer cells gain the ability of "self-seeding", a process involving cell dissemination into the vascular system away from the primary or metastatic tumor, followed by the cells rehoming to the site of origin (4, 30, 31). The exact factors involved in this mechanism are not fully elucidated, but studies suggest that besides leaky primary tumor vasculature with impaired barrier function, cytokine-receptor interactions between the primary tumor and circulating cancer cells may play a major role (31-33). In a clinical scenario associated with this approach, cancer cells harvested at the time of tumor surgery would be introduced to culture conditions and engineered with anticancer agents, followed by local or systemic reapplication of autologous therapeutic cells upon tumor recurrence. Possible advantages, in comparison to above-mentioned SC-based therapies, are enhanced homing of therapeutic cancer cells towards the primary tumor site, ease of engineering with therapeutic molecules due to robust tumor cell growth in vitro, prolonged therapeutic cell survival resulting in enhanced therapeutic efficacy in vivo, and their ready availability for autologous therapy because tumor biopsy is part of standard management for the vast majority of cancer patients. In comparison to allogeneic approaches, treatment with autologous cells additionally does not increase the risk of adverse immune response and/or toxicity as well as premature therapeutic cell clearance by the recipient's immune system.

The inventors combined the advantages of suicide system-induced therapeutic cancer cell elimination with the continuous expression of a receptor-targeted anticancer agent. While other ligand/receptor pairings can be used, the DR-targeted apoptosis-inducing ligand, TRAIL, was specifically chosen for its superior anticancer efficacy when tested against other receptor-targeted molecules in a panel of tumor cell lines including solid and non-solid, as well as primary, recurrent, and metastatic lines. Besides TRAIL's receptor-targeted properties and its ability to strongly induce apoptosis in a wide range of human cancer cell lines, it has the advantage of not inducing cytotoxicity in normal cells and can be engineered in a secretable form (S-TRAIL) (42-44). However, although these properties seem ideal for self-targeted therapy, TRAIL-sensitive cancer cells cannot readily be engineered with S-TRAIL due to autocrine toxicity. The inventors explored different self-targeting approaches to avoid TRAIL-induced self-toxicity, each aimed at specific, clinically relevant cancer treatment scenarios. In models of primary cancer treatment, the inventors show that TRAIL-resistant cancer cells can be readily engineered with S-TRAIL and used "off-the-shelf" for targeting TRAIL-sensitive GBM. However, ideally one would like to use autologous cells for self-targeting, thereby avoiding possible immune-mediated premature elimination of therapeutic cells and adverse effects. The Inventors show that such an autologous approach can be realized by using CRISPR technology to knock out TRAIL receptors DR4 and DR5, thereby reversing the TRAIL-sensitivity phenotype and allowing engineering of previously TRAIL-sensitive cancer cells with S-TRAIL.

Considering the time needed for engineering of autologous cell lines, treatment with knockout lines should be aimed at therapy of recurrent or systemic/metastatic disease. Consequently, the autologous knockout lines was used either in mouse models of tumor recurrence or in a metastatic breast-to-brain model using the cell line sBCm, which was established through several rounds of brain selection of breast carcinoma cells (18). Besides reflecting different cancer models (primary, recurrent, metastatic), cell lines used in this study were further selected based on their in vivo growth characteristics. sBCm was specifically chosen to investigate self-targeting in metastatic settings based on a previous report (31), which demonstrated sBCm's highly efficient self-targeting phenotype in mouse models of primary breast cancer and lung metastasis (using lung metastatic derivative MDA231-LM2). The TRAIL-sensitive recurrent cell lines sGBMiRec-FmC (invasive growth) and sGBMnRec-FmC (nodular growth), on the other hand, reflect the different in vivo phenotypes of recurrent GBM to mimic the clinical scenarios where a 2nd (recurrent) tumor resection is possible (nodular), versus the case of a non-resectable recurrent GBM (invasive model). Based on these in vivo growth characteristics, the inventors further adapted techniques for in vivo therapy. In the nodular recurrent model (sGBMnRec-FmC), the inventors aimed to retain therapeutic cancer cells within close proximity to remaining tumor tissue by encapsulating therapeutic cells into synthetic biodegradable ECM before implantation into the resection cavity. In models of highly invasive recurrent GBM, however, resection is not an option, which is why direct implantation of non-encapsulated therapeutic cancer cells was used instead. Moreover, to promote homing to invasive tumor deposits, therapeutic cells were not ECM-encapsulated whenever direct implantation into invasive tumors was used. Our migration studies indicated that non-encapsulated CRISPR-engineered cells retain their ability for targeted delivery of therapeutics towards self-tumor sites. Although the exact mechanisms underlying the self-targeting of tumor cells remain to be further elucidated, studies have suggested multiple theories to explain this phenomenon. In addition to common cytokine-receptor interactions that mediate directed cell migration, the establishment of a favorable tumor microenvironment, which supports survival of migrating tumor cells, may play a crucial role in this process (31, 40, 41). In addition, it has been demonstrated that IL-6 and IL-8 might serve as tumor-derived attractants, and fascin actin-bundling protein 1 (FSCN1) as well as matrix metalloproteinase 1 (MMP1) might additionally be involved in mediating migration (17, 31, 42-45).

In metastatic disease, resection is also often not possible, due to either metastatic tumor location and/or large number of metastatic deposits. To mirror this scenario, breast-to-brain metastatic cell line sBCm was implanted intracranially into mice, followed by application of therapeutic cells via ICA injection, thereby reflecting systemic treatment of metastatic disease. Using the above outlined models, the Inventors demonstrated that CRISPR-modified therapeutic cancer cells can directly kill self-cells via TRAIL-induced apoptosis in vitro and in vivo and that in combination with their self-homing properties, these effects increase the survival of mice bearing autologous recurrent or metastatic tumor deposits.

One of the main concerns for treatments using therapeutic cancer cells is their tumorigenic potential. In this study, the inventors incorporated a prodrug-activatable suicide system to address this concern. The Inventors in vivo data demonstrate that therapeutic cancer cells expressing HSV-TK can be safely eliminated, and the inventors did not observe recurrences of therapeutic cells after in vivo GCV treatment. This is in line with clinical studies, which demonstrated a robust safety profile of HSV-TK systems when used on proliferating cells in patients (46, 47). The importance of GCV-induced therapeutic cancer cell elimination is highlighted by the Inventors in vivo survival studies, which showed that self-targeted therapy without GCV treatment did not provide overall survival benefit in non-resected tumor models. This is likely the case because therapeutic tumor cells retain their potential for in vivo growth and, even if very efficacious in treating the self-tumor site (as shown by the drop in BLI signal), will therefore eventually outgrow the targeted tumor cells and result in premature animal death if no GCV treatment is administered. Therefore, if these are considered for clinical translation, therapeutic cancer cells should be confirmed to have stable HSV-TK expression, and GCV will need to be administered to all patients. Moreover, adding a second suicide system (48-50) can be considered, and larger scale preclinical studies focused on analyzing the safety profile of this approach should be performed. In case of clinical translation, an advantage of the HSV-TK system is that it can be used to non-invasively monitor the fate of therapeutic cells via PET imaging in combination with radioactive substrates, such as the 18F-FHBG used in this study (51, 52).

Besides ensuring safety, the Inventors in vitro data demonstrate that HSV-TK-induced cell elimination is associated with a bystander effect, which may contribute to the overall treatment efficacy in cases of secondary TRAIL resistance. In clinical settings, HSV-TK-mediated tumor cell elimination might further boost therapeutic efficacy via exposure of tumor antigens followed by tumor-specific immunoactivation, which may be especially helpful in cases of tumors with heterogeneous DRL sensitivity (53-55).

Although DRL-based therapies have demonstrated great efficacy in many preclinical studies, efforts for their clinical translation have so far been disappointing. Due to the continued secretion of TRAIL at the tumor site (in contrast to intermittent systemic treatment), the approach described herein not only overcomes toxicity problems reported for systemic treatment but also addresses issues of inadequate local TRAIL concentration. In this study we additionally addressed the issue of inefficient patient selection (1) by screening tumor cell lines for TRAIL sensitivity. This approach reflects a clinical scenario where patients' tumor cells are screened for TRAIL sensitivity before treatment initiation. To translate this screening process into patient therapy, one could isolate patients' circulating cancer cells upon admission and screen them for DR expression when an allogeneic "off-the-shelf" approach is favored (61). Another option is to isolate and culture patients' own tumor cells after the first surgery and test them for TRAIL sensitivity in vitro before CRISPR modification and engineering with S-TRAIL. Each patient's own therapeutic cells could then be re-administered once the patient is readmitted for recurrent surgery (autologous approach), assuming that the recurrent tumor will retain its TRAIL-sensitive phenotype.

Recent studies on the TRAIL-inducing small molecule ONC201/TIC10 have shown promising results in a variety of cancers (62-64). ONC201 induces apoptosis in a p53-independent manner via selective antagonism of D2-like dopamine receptors (DRD2) and ultimately results in TRAIL induction. ONC201 is orally active and passes the blood-brain barrier, thus making it a promising agent for future therapy of GBMs (63). However, since ONC201 (unlike TRAIL) does not directly act on DRs, its clinical efficacy may not only depend on DRD2 and DR expression in tumor cells, but further relies on preservation of (downstream) pathways for Akt, ERK, and TRAIL. This might potentially reduce the number of targetable tumors and may further increase the potential for resistance. Therefore, local cell-based secretion of TRAIL as suggested in this study may provide higher efficacy.

In conclusion, the inventors demonstrate the fate, the therapeutic efficacy, and safety of engineered receptor-targeted human tumor cells in xenograft mouse models of primary, recurrent, and metastatic cancer. This study supports clinical development of cancer therapy that uses genetically engineered allogeneic or autologous tumor cells in cancer patients. The inventors envison that after the removal of the main tumor mass, patients' own cancer cells can be ex vivo engineered with receptor-targeted anti-tumor agent(s) as well as an inducible suicide system before they are re-administered via different routes, depending on the type and clinical stage of cancer. These cells would result in killing of residual, invasive, and metastatic tumor deposits with the ultimate goal of improving outcomes.

Materials and Methods

Study Design

This study was designed to evaluate the fate, therapeutic efficacy, and safety of receptor-targeted ligand-secreting human tumor cells. This objective was addressed by (1) determining suitable receptor-targeted ligands, (2) evaluating the self-targeting efficacy of inherently ligand-resistant tumor cells for therapeutic use against inherently sensitive cancer cell lines of the same cancer type, (3) assessing the feasibility of CRISPR-mediated knockout of ligand receptors to switch cancer cells' ligand-sensitivity phenotype from sensitive to resistant before engineering with previously self-toxic ligand, and (4) assessing the in vitro and in vivo self-targeting efficacy of these ligand-secreting therapeutic tumor cells.

In animal studies, mice were randomized to groups according to tumor volume at the start of treatment. The number of mice per group varied between experiments and is specified in the figure legends. The primary end point was survival. All in vivo procedures were approved by the Subcommittee on Research Animal Care at BWH and MGH. All in vitro and in vivo results are representative of two to five independent experiments. The investigators were not blinded during the study.

Statistical Analysis

Data were expressed as mean±SD for in vitro studies and ±SEM for in vivo studies and analyzed by Student's t test when comparing two groups. Survival times of mouse groups were analyzed and compared using log-rank test. GraphPad Prism 5 Software was used for all statistical analysis and also to generate Kaplan-Meier survival plots.

Differences were considered significant at P<0.05 (*), P<0.01 (), P<0.001 (*), P<0.0001 (****).

Supplementary Materials

Materials and Methods

Cell lines: Patient-derived primary invasive glioblastoma cell lines GBM8, GBM23, GBM64, and GBM46 and grown in neurobasal medium (Invitrogen) supplemented with 3 mM L-glutamine, B27 supplement, N2 supplement, 2 µg/ml heparin, 20 ng/ml EGF, and 20 ng/ml FGF as described previously (62, 63). Human established nodular glioblastoma cell line Gli36Δ-EGFR was previously generated from parental Gli36 cells by retroviral transduction with a cDNA coding for a mutant EGFR. Gli36Δ-EGFR was grown in DMEM supplemented with 10% (vol/vol) fetal bovine serum (FBS) and 1% (vol/vol) penicillin/streptomycin. HCT116 were grown in McCoy's 5a medium supplemented with 10% FBS and 1% penicillin/streptomycin. PC3 was cultured in F-12K medium supplemented with 10% FBS and 1% penicillin/streptomycin. Jurkat cells were cultured in RPMI-1640 medium supplemented with 10% FBS and 1% penicillin/streptomycin. The human breast-to-brain metastatic cell line MDA231-BrM2a was cultured in DMEM supplemented with 10% FBS and 1% penicillin/streptomycin as previously described (18).

Cloning of lentiviral CRISPR SgRNA expression plasmids and establishment of knockout cell lines: Top and bottom strands of SgRNA oligos were aligned as previously described (64) followed by cloning into PX459 plasmid (Addgene plasmid 48139) using restriction enzyme BbsI. U6-sgRNA regions of sequencing-confirmed PX459-sgRNA clones were PCR-amplified with the following primers containing flanking Gateway-attB1 and -attB2 sequences, respectively: attB1-forward:

5'GGGGACAAGTTTGTA-
CAAAAAAGCAGGGTCCGAGGGCCTATTTCC-
CATGATT-3' (SEQ ID NO: 58), attB2-reverse:
5'-GGGGACCACTTTGTA-
CAAGAAAGCTGGGTCTCTAGAGCCAT-
TTGTCTGCAG-3' (SEQ ID NO: 59). To prepare Gateway Entry clones, the amplified PCR products were gel-extracted, purified, and cloned into pDONR201 vector (Invitrogen) using the Gateway BP reaction. The lentiviral cDNA/shRNA gateway vectors pLKO.DEST.egfp (Addgene plasmid 32684) or pLKO.DEST.hygro (Addgene plasmid 32685) served as destination vectors after Gateway LR reaction. All destination SgRNA-expression vectors were sequenced to confirm correct U6-sgRNA inserts before proceeding with 3rd generation lentiviral packaging. The following sequences served for DR4 targeting (5'-3'; PAM underlined): either TCGTGGTTCAATCCTCCCGCGG (SEQ ID NO: 60) or TCTTGTGGACCCG-GAGCCGAGGG (SEQ ID NO: 61), and for DR5 targeting (5'-3'; PAM underlined): either AGAACGCCCCGGCCGCTTCGGGG (SEQ ID NO: 62) or CCTACCGCCATGGAACAACGGGG (SEQ ID NO: 63). To establish knockout lines, cells were transduced with lentiviral Cas9 expression vectors coding for either tetracycline-inducible or constitutively expressed Cas9 protein as previously described (65, 66). Confirmed Cas9 lines were engineered with lentiviral SgRNA expression vector pLKO.DEST.hygro containing the SgRNA target sequences described above for DR4 or DR5, respectively, followed by selection with hygromycin (200-500 µg/ml). For creation of double knockout lines, confirmed Cas9 lines were co-engineered with pLKO.DEST.hygro and pLKO.DEST.egfp lentiviral expression vectors to express both DR4 and DR5 targeting SgRNAs. To screen for SgRNA targeting efficacy, whole cell lysates of mixed populations were analyzed for DR4 and DR5 expression in comparison to non-engineered controls. Candidate populations were then clonally selected followed by screening of individual clones for DR-KO status with western blotting of cell lysates. To analyze KO clones for targeted indel formation, genomic DNA was isolated from clonal cell cultures as previously described (67), and the following primers were used for sequencing of target regions: DR4-forward: TCAGGGTTAGCCAACAGGAGCC (SEQ ID NO: 64); DR4-reverse: TTCTTCCTCCGACTCCGACGAC (SEQ ID NO: 65). DR5-forward: AGGCAGTGAAAGTA-CAGCCGCG (SEQ ID NO: 66); DR5-reverse: ATTCCCTCCTTGTCGCCCTCCC (SEQ ID NO: 67).

Establishment of TMZ-resistant recurrent tumor lines: TRAIL-sensitive sGBMn and sGBMi were transduced with the lentiviral vector LV-pico2-Fluc-mCherry (LV-FmC) followed by selection with puromycin (1 µg/ml). Stably FmC-expressing cells (sGBMn-FmC or sGBMi-FmC) were expanded in non-puromycin-containing medium, followed by intracranial implantation of 1×105 cells into the right frontal cortex of female SCID mice. In vivo tumor growth was monitored non-invasively via BLI of the tumor cells' Fluc signal activity. After establishment of stable growth, TMZ treatment was administered daily at a dose of 5 mg/kg/d intraperitoneally for 4 consecutive days, followed by 3 days without treatment. Antitumor efficacy of in vivo TMZ treatment was assessed via reduction of Fluc signal. Treatment was repeated with a dose of 10 mg/kg/d for 4 consecutive days from day 16 to 20 after tumor implantation for sGBMn-FmC due to incomplete response to treatment with 5 mg/kg/d. After tumor recurrence, as monitored by BLI, mice were sacrificed, and tumor cells were harvested and reintroduced to previous culturing conditions for further assessment.

Mouse models: Female SCID mice, 6-8 weeks of age (Charles River Laboratories) were used for all in vivo experiments. BLI was used to follow in vivo growth of Fluc- or Rluc-engineered implanted tumor cells over time using a Perkin-Elmer IVIS Lumina system. To test for in vivo migration towards self-tumor sites, sGBMi-FmC cells (3×105 cells per mouse) were implanted intracranially into the right hemisphere of mice, followed by Fluc imaging to monitor in vivo tumor growth. 3 weeks after tumor implantation, rGBMi2-GFP or saline were stereotactically implanted at a distance of 1.5 mm laterally from the previous implantation site. 2 weeks later mice were sacrificed via anesthetization with ketamine/xylazine followed by transcardial perfusion with phosphate-buffered saline (PBS) and subsequently with 4% formaldehyde to assess therapeutic cell migration towards allogeneic tumor deposits via fluorescence microscopic imaging. To assess whether CRISPR-engineered rGBMi cells retain their potential for in vivo growth and migration towards self-tumor sites, 5×105 sGBMiRec-FmC cells were implanted stereotactically into the right hemisphere of mice followed by injection of 5×105 rGBMiDR4/5-GFP cells at 1.5 mm lateral distance 3 days later. For fluorescence microscopy, mouse brains were harvested at days 1, 7, 14, and 28 after rGBMiDR4/5-GFP implantation (n=2 for each time point). Mice were anesthetized with ketamine/xylazine and then transcardially perfused with phosphate-buffered saline (PBS) and subsequently with 4% formaldehyde. Brains were removed and postfixed in 4% formaldehyde solution for 5 days, then in a saccharose-formaldehyde solution (15% sucrose followed by 30% sucrose in 4% formaldehyde) over 4 days. Brains were frozen, directly followed by coronal cryosectioning with 20 μm thickness. Using fluorescence microscopy, migration of CRISPR-engineered rGBMiDR4/5-GFP cells towards the sGBMiRec-FmC self-tumor site was semi-quantitatively assessed by counting the number of rGB-MiDR4/5-GFP cells (green) within a 2 mm magnified view spanning both tumor sites. The established (dense) rGB-MiDR4/5-GFP implantation site was excluded from counting (green cells counted only to the left of dashed line designating the edge of the implantation site).

To establish clinically relevant mouse xenograft models of recurrent GBM resection, mice underwent craniotomy, tumor implantation, and surgical resection as previously described (11). Briefly, mCherry-Fluc engineered tumor cells ($1.5 \times 10^5$ cells/mouse) were implanted into the right cerebral hemisphere of mice 2 weeks after craniotomy. BLI was used to follow tumor growth, and mice with established tumors (day 10 after implantation) underwent fluorescence microscopy-guided tumor resection using a SZX10 stereomicroscope system (Olympus) followed by sECM-encapsulated therapeutic autologous tumor cell implantation into the resection cavity. Tumor burden was followed by BLI over time, and mice were sacrificed when neurological symptoms became apparent.

In mouse models not involving tumor resection, therapeutically engineered allogeneic or autologous tumor cells were directly implanted into previously established intracranial tumors using the same burr hole and implantation coordinates used during initial tumor implantation. To evaluate the self-targeting efficacy of therapeutically engineered autologous tumor cells towards metastatic tumor deposits in the brain, sBCm-RmC cells ($3 \times 10^5$ cells/mouse) were implanted into the right cerebral hemisphere of mice. BLI was used to follow sBCm-RmC growth, and mice with established tumors underwent surgery for application of therapeutic rBCmDR4/5-ST-TK cells via injection of $5 \times 10^5$ cells into the right carotid artery as previously described (19). After treatment, tumor burden was followed by BLI over time, and mice were sacrificed when neurological symptoms became apparent. For in vivo experiments involving therapeutic cell elimination via the inducible suicide system HSV-TK, mice bearing tumors were treated daily with intraperitoneal injection of GCV (10 mg/kg) for two weeks starting at the time indicated for the respective experiments.

Antibodies for Western blot and flow cytometry analysis: Antibodies against p-44/42MAPK (ERK1/2) (Cell Signaling), cleaved PARP (Cell Signaling), caspase 8 (Cell Signaling), α-tubulin (Sigma), anti-FLAG (Sigma), anti-DR4 (ProSci), anti-DR5 (ProSci) and anti-TRAIL (Abcam) were used for western blotting. Anti-human CD261 (DR4) PE (eBioscience), and anti-human CD262 (DR5) PE (eBioscience) were used for flow cytometry analysis.

Flow cytometry analysis of cell surface receptors: Cells were dissociated, washed, and re-suspended in 0.5% BSA, 2 mM EDTA solution in PBS. Cells were stained with PE-conjugated anti-human DR4 or DR5 monoclonal antibodies (eBioscience) at 4° C. for 30 min. The cells were rinsed with 0.5% BSA, 2 mM EDTA at 4° C. Alexa Fluor 488 or PE-conjugated isotype-specific IgGs were used as controls. Flow cytometry was performed using FACSCalibur (BD) cell sorter, and data were analyzed using FlowJo software.

Western blot analysis: After treatment, cells were washed with cold PBS twice, and then lysed with cold RIPA buffer (20 mM Tris-HCl pH 8.0, 137 mM NaCl, 10% glycerol, 1% NP-40, 0.1% SDS, 0.5% Na-deoxycholate, 2 EDTA pH 8.0) supplemented with protease and phosphatase inhibitors (Roche protease inhibitor cocktail; Phosphatase Inhibitor Cocktail I and Phosphatase Inhibitor Cocktail II from Sigma-Aldrich). Cells were scraped into 1.5 ml microtubes and centrifuged at 4° C., 16,000 g for 10 minutes. Supernatant protein concentrations were determined using a Bio-Rad protein assay kit. 6×SDS-sample buffer was added to the washed samples, which were then boiled for 3 minutes and resolved on SDS-PAGE gel. For blotting whole cell lysates, $10^{-40}$ μg of protein was resolved on SDS-PAGE gel, transferred to nitrocellulose membrane, and probed with primary antibodies. For dot blot analysis, cells were plated with $3 \times 10^5$ cells per well of a 6-well plate, and conditioned medium was harvested 48 hours later followed by blotting on nitrocellulose membrane and immunoprobing with anti-TRAIL.

Lentiviral transductions and engineering of stable cell lines: Lentiviral packaging was performed by transfection of 293T cells as previously described (73), and cells were transduced with lentiviral vectors at M.O.I of 2 in medium containing protamine sulfate (2 μg/ml). For bioluminescence imaging, cancer cells were transduced with LV-Pico2-Fluc-mCherry, LV-Pico2-Rluc-mCherry, or LV-Pico2-Fluc-GFP and selected by FACS using a BD FACSAria™ Fusion cell sorter or puromycin selection (1 μg/ml) in culture. GFP or mCherry expression was visualized by fluorescence microscopy. Cell viability and caspase assays: Tumor cells were plated in 96-well plates and treated with different doses of S-TRAIL for 24 hours and different doses of GCV for up to 96 hours. Cell viability was measured using an ATP-dependent luminescent reagent (CellTiter Glo, Promega) for non-Fluc expressing cells, or with luciferin or coelenterazine for Fluc- and Rluc-expressing cells, respectively. Caspase activity was determined using a DEVD-aminoluciferin assay (Caspase-3/7 Glo, Promega) according to the manufacturer's instructions. Experiments were performed in triplicate. For treatments with conditioned medium, plasmid vectors coding for secretable expression of CD36-targeting ligand 3TSR (a functional thrombospondin-1, TSP-1 analog) (09), EGFR-blocking ligand NB (12), IL-20Rα/β-targeting ligand IL-24 (69), and DR ligand S-TRAIL (69) were transfected into 293T cells. Medium was changed the next day, collected 40 hours after transfection, and frozen at −80° C. until further use.

PET imaging: Mice implanted intracranially with rGBMi2-TK-GF1 were fasted for 4 hours before imaging, anesthetized with 2% isoflurane and 100% oxygen, and injected with 500 μCi of 18F-FHBG via the tail vein. Two hours later, a static dataset was acquired for 60 minutes in 1 bed position (FOV 4.2 cm) using an energy window of 250-700 keV for each mouse. Images were reconstructed using a 2D OSEM algorithm with 2 iterations and 16 subsets. For measuring the mean and maximum standardized uptake values (SUVmean and SUVmax) and metabolic tumor volume (MTV), three-dimensional (3D) regions of interest were drawn over the mouse brain, and uptake values were measured using the explore Vista software (GE Healthcare). The maximum intensity projection images were generated using ImageJ. After the baseline PET scan at day 0, mice were treated daily with GCV (10 mg/kg) and imaged again by PET at day 10 after GCV treatment.

Coculture experiments: Fluc-mCherry engineered tumor cells ($2 \times 10^3$ per well) were cocultured with therapeutic cells in 96-well plates. For evaluation of S-TRAIL effect, the relative number of Fluc-mCherry-expressing tumor cells was determined by Fluc bioluminescence 48 hours later. For evaluation of the effect of GCV treatment, cells were treated with 10 µg/ml GCV and plates were read 96 hours after treatment.

ELISA analysis of TRAIL expression: The amounts of TRAIL protein released from S-TRAIL-engineered CRISPR-modified therapeutic cancer cell lines were quantified using a human-specific TRAIL antigen capture enzyme-linked immunosorbent assay (ELISA) (Abcam).

Tissue processing and HE staining: Tumor-bearing mice were perfused and brains were harvested as described above, followed by coronal sectioning for histological analysis. Brain sections on slides were washed in PBS and mounted with aqueous mounting medium (Vectashield) to be visualized with fluorescence microscopy. For HE staining, sections were incubated with hematoxylin and eosin Y dye (1% alcohol), dehydrated with 95% and 100% EtOH, and mounted in xylene-based mounting medium (Permount, Fisher Scientific).

REFERENCES

1. V. T. DeVita, A. M. M. Eggermont, S. Hellman, D. J. Kerr, Clinical cancer research: the past, present and the future. Nature reviews. Clinical oncology 11, 663-669 (2014).
2. G. P. Gupta, J. Massagué, Cancer metastasis: building a framework. Cell 127, 679-695 (2006).
3. D. Spano, C. Heck, P. De Antonellis, G. Christofori, M. Zollo, Molecular networks that regulate cancer metastasis. Seminars in cancer biology 22, 234-249 (2012).
4. L. Norton, J. Massagué, Is cancer a disease of self-seeding? Nature medicine 12, 875-878 (2006).
5. T. M. Allen, Ligand-targeted therapeutics in anticancer therapy. Nature reviews. Cancer 2, 750-763 (2002).
6. M. Srinivasarao, C. V. Galliford, P. S. Low, Principles in the design of ligand-targeted cancer therapeutics and imaging agents. Nature reviews. Drug discovery 14, 203-219 (2015).
7. M. J. Duffy, N. O'Donovan, J. Crown, Use of molecular markers for predicting therapy response in cancer patients. Cancer treatment reviews 37, 151-159 (2011).
8. M. Kalia, Personalized oncology: recent advances and future challenges. Metabolism: clinical and experimental 62 Suppl 1, 4 (2013).
9. R. Kim, Recent advances in understanding the cell death pathways activated by anticancer therapy. Cancer 103, 1551-1560 (2005).
10. S. H. Choi, K. Tamura, R. K. Khajuria, D. Bhere, I. Nesterenko, J. Lawler, K. Shah, Antiangiogenic variant of TSP-1 targets tumor cells in glioblastomas. Molecular therapy: the journal of the American Society of Gene Therapy 23, 235-243 (2015).
11. T. M. Kauer, J. L. Figueiredo, S. Hingtgen, K. Shah, Encapsulated therapeutic stem cells implanted in the tumor resection cavity induce cell death in gliomas. Nature neuroscience 15, 197-204 (2011).
12. J. A. van de Water, T. Bagci-Onder, A. S. Agarwal, H. Wakimoto, R. C. Roovers, Y. Zhu, R. Kasmich, D. Bhere, P. M. Van Bergen en Henegouwen, K. Shah, Therapeutic stem cells expressing variants of EGFR-specific nanobodies have antitumor effects. Proceedings of the National Academy of Sciences of the United States of America 109, 16642-16647 (2012).
13. D. W. Stuckey, K. Shah, TRAIL on trial: preclinical advances in cancer therapy. Trends in molecular medicine 19, 685-694 (2013).
14. S. Wang, The promise of cancer therapeutics targeting the TNF-related apoptosis-inducing ligand and TRAIL receptor pathway. Oncogene 27, 6207-6215 (2008).
15. G. S. Wu, TRAIL as a target in anti-cancer therapy. Cancer letters 285, 1-5 (2009).
16. S. D. Hingtgen, R. Kasmieh, J. van de Water, R. Weissleder, K. Shah, A novel molecule integrating therapeutic and diagnostic activities reveals multiple aspects of stem cell-based therapy. Stem cells 28, 832-841 (2010).
17. S. Yaghoubi, J. R. Barrio, M. Dahlbom, M. Iyer, M. Namavari, N. Satyamurthy, R. Goldman, H. R. Herschman, M. E. Phelps, S. S. Gambhir, Human pharmacokinetic and dosimetry studies of [(18)F]FHBG: a reporter probe for imaging herpes simplex virus type-1 thymidine kinase reporter gene expression. Journal of nuclear medicine: official publication, Society of Nuclear Medicine 42, 1225-1234 (2001).
18. P. D. Bos, X. H. Zhang, C. Nadal, W. Shu, R. R. Gomis, D. X. Nguyen, A. J. Minn, M. J. van de Vijver, W. L. Gerald, J. A. Foekens, J. Massagué, Genes that mediate breast cancer metastasis to the brain. Nature 459, 1005-1009 (2009).
19. T. Bagci-Onder, W. Du, J. L. Figueiredo, J. Martinez-Quintanilla, K. Shah, Targeting breast to brain metastatic tumours with death receptor ligand expressing therapeutic stem cells. Brain: a journal of neurology 138, 1710-1721 (2015).
20. "American Cancer Society. Cancer Facts & Figures 2014," (American Cancer Society, Atlanta, 2014).
21. J. Xu, S. L. Murphy, K. D. Kochanek, B. A. Bastian, Deaths: Final Data for 2013. National Vital Statistics Reports 64, (2016).
22. L. A. Fliervoet, E. Mastrobattista, Drug delivery with living cells. Advanced drug delivery reviews 106, 63-72 (2016).
23. T. Squillaro, G. Peluso, U. Galderisi, Clinical Trials With Mesenchymal Stem Cells: An Update. Cell transplantation 25, 829-848 (2016).
24. D. W. Stuckey, K. Shah, Stem cell-based therapies for cancer treatment: separating hope from hype. Nature reviews. Cancer 14, 683-691 (2014).
25. A. K. Tsai, E. Davila, Producer T cells: Using genetically engineered T cells as vehicles to generate and deliver therapeutics to tumors. Oncoimmunology 5, (2016).
26. M. Mimeault, R. Hauke, S. K. Batra, Stem cells: a revolution in therapeutics-recent advances in stem cell biology and their therapeutic applications in regenerative medicine and cancer therapies. Clinical pharmacology and therapeutics 82, 252-264 (2007).
27. J. A. Bradley, E. M. Bolton, P.-R. A. Immunology, Stem cell medicine encounters the immune system. Nature Reviews Immunology, (2002).
28. G. G. Gornalusse, R. K. Hirata, S. E. Funk, L. Riolobos, V. S. Lopes, G. Manske, D. Prunkard, A. G. Colunga, L.-A. Hanafi, D. O. Clegg, HLA-E-expressing pluripotent stem cells escape allogeneic responses and lysis by NK cells, Nature biotechnology 35, 765 (2017).
29. S.-i. Nishikawa, R. A. Goldstein, C. R. Nierras, The promise of human induced pluripotent stem cells for research and therapy. Nature reviews. Molecular cell biology 9, 725-729 (2008).
30. E. Comen, L. Norton, J. Massague, Clinical implications of cancer self-seeding. Nature reviews. Clinical oncology 8, 369-377 (2011).

31. M.-Y. Y. Kim, T. Oskarsson, S. Acharyya, D. X. Nguyen, X. H. Zhang, L. Norton, J. Massagué, Tumor self-seeding by circulating cancer cells. Cell 139, 1315-1326 (2009).
32. E. Dondossola, L. Crippa, B. Colombo, E. Ferrero, A. Corti, Chromogranin A regulates tumor self-seeding and dissemination. Cancer research 72, 449-459 (2012).
33. Y. Zhang, Q. Ma, T. Liu, G. Guan, K. Zhang, J. Chen, N. Jia, S. Yan, G. Chen, S. Liu, K. Jiang, Y. Lu, Y. Wen, H. Zhao, Y. Zhou, Q. Fan, X. Qiu, Interleukin-6 suppression reduces tumour self-seeding by circulating tumour cells in a human osteosarcoma nude mouse model. Oncotarget 7, 446-458 (2016).
34. N. J. Roberts, S. Zhou, L. A. Diaz, M. Holdhoff, Systemic use of tumor necrosis factor alpha as an anticancer agent. Oncotarget 2, 739-751 (2011).
35. H. Wajant, K. Pfizenmaier, P. Scheurich, Tumor necrosis factor signaling. Cell death and differentiation 10, 45-65 (2003).
36. G. D. Kalliolias, L. B. Ivashkiv, TNF biology, pathogenic mechanisms and emerging therapeutic strategies. Nature reviews. Rheumatology 12, 49-62 (2016).
37. J. E. Allen, W. S. El-Deiry, Regulation of the human TRAIL gene. Cancer biology & therapy 13, 1143-1151 (2012).
38. A. Ashkenazi, R. C. Pai, S. Fong, S. Leung, D. A. Lawrence, S. A. Marsters, C. Blackie, L. Chang, A. E. McMurtrey, A. Hebert, L. DeForge, I. L. Koumenis, D. Lewis, L. Harris, J. Bussiere, H. Koeppen, Z. Shahrokh, R. H. Schwall, Safety and antitumor activity of recombinant soluble Apo2 ligand. J Clin Invest 104, 155-162 (1999).
39. H. Walczak, R. E. Miller, K. Ariail, B. Gliniak, T. S. Griffith, M. Kubin, W. Chin, J. Jones, A. Woodward, T. Le, C. Smith, P. Smolak, R. G. Goodwin, C. T. Rauch, J. C. Schuh, D. H. Lynch, Tumoricidal activity of tumor necrosis factor-related apoptosis-inducing ligand in vivo. Nat Med 5, 157-163 (1999).
40. A. O. Sahin, M. Buitenhuis, Molecular mechanisms underlying adhesion and migration of hematopoietic stem cells. Cell adhesion & migration 6, 39-48 (2012).
41. K. Shah, Stem cell-based therapies for tumors in the brain: are we there yet? Neuro-oncology 18, 1066-1078 (2016).
42. K. Arihiro, H. Oda, M. Kaneko, K. Inai, Cytokines facilitate chemotactic motility of breast carcinoma cells. Breast Cancer 7, 221-230 (2000).
43. A. J. Minn, G. P. Gupta, P. M. Siegel, P. D. Bos, W. Shu, D. D. Giri, A. Viale, A. B. Olshen, W. L. Gerald, J. Massagué, Genes that mediate breast cancer metastasis to lung. Nature 436, 518-524 (2005).
44. J. Wang, G. Taraboletti, K. Matsushima, J. Damme, A. Mantovani, Induction of haptotactic migration of melanoma cells by neutrophil activating protein/interleukin-8. Biochemical and Biophysical Research Communications 169, 165-170 (1990).
45. D. J. Waugh, C. Wilson, The interleukin-8 pathway in cancer. Clin Cancer Res 14, 6735-6741 (2008).
46. F. Ciceri, C. Bonini, S. Marktel, E. Zappone, P. Servida, M. Bernardi, A. Pescarollo, A. Bondanza, J. Peccatori, S. Rossini, Z. Magnani, M. Salomoni, C. Benati, M. Ponzoni, L. Callegaro, P. Corradini, M. Bregni, C. Traversari, C. Bordignon, Antitumor effects of HSV-TK-engineered donor lymphocytes after allogeneic stem-cell transplantation, Blood 109, 4698-707 (2007).
47. F. Ciceri, C. Bonini, M. T. Stanghellini, A. Bondanza, C. Traversari, M. Salomoni, L. Turchetto, S. Colombi, M. Bernardi, J. Peccatori, A. Pescarollo, P. Servida, Z. Magnani, S. K. Perna, V. Valtolina, F. Crippa, L. Callegaro, E. Spoldi, R. Crocchiolo, K. Fleischhauer, M. Ponzoni, L. Vago, S. Rossini, A. Santoro, E. Todisco, J. Apperley, E. Olavarria, S. Slavin, E. M. Weissinger, A. Ganser, M. Stadler, E. Yannaki, A. Fassas, A. Anagnostopoulos, M. Bregni, C. G. Stampino, P. Bruzzi, C. Bordignon, Infusion of suicide-gene-engineered donor lymphocytes after family haploidentical haemopoietic stem-cell transplantation for leukaemia (the TK007 trial): a non-randomised phase I-II study. The Lancet. Oncology 10, 489-500 (2009).
48. M. Ando, T. Nishimura, S. Yamazaki, T. Yamaguchi, A. Kawana-Tachikawa, T. Hayama, Y. Nakauchi, J. Ando, Y. Ota, S. Takahashi, K. Nishimura, M. Ohtaka, M. Nakanishi, J. J. Miles, S. R. Burrows, M. K. Brenner, H. Nakauchi, A Safeguard System for Induced Pluripotent Stem Cell-Derived Rejuvenated T Cell Therapy. Stem cell reports 5, 597-608 (2015).
49. C. Bonini, A. Bondanza, S. K. Perna, S. Kaneko, C. Traversari, F. Ciceri, C. Bordignon, The suicide gene therapy challenge: how to improve a successful gene therapy approach, Mol. Ther. 15, 1248-52 (2007).
50. A. Di Stasi, S. K. Tey, G. Dotti, Y. Fujita, A. Kennedy-Nasser, C. Martinez, K. Straathof, E. Liu, A. G. Durett, B. Grilley, H. Liu, C. R. Cruz, B. Savoldo, A. P. Gee, J. Schindler, R. A. Krance, H. E. Heslop, D. M. Spencer, C. M. Rooney, M. K. Brenner, Inducible apoptosis as a safety switch for adoptive cell therapy. N Engl J Med 365, 1673-1683 (2011).
51. S.-C. C. Hung, W.-P. P. Deng, W. K. Yang, R.-S. S. Liu, C.-C. C. Lee, T.-C. C. Su, R.-J. J. Lin, D.-M. M. Yang, C.-W. W. Chang, W.-H. H. Chen, H.-J. J. Wei, J. G. Gelovani, Mesenchymal stem cell targeting of microscopic tumors and tumor stroma development monitored by noninvasive in vivo positron emission tomography imaging. Clinical cancer research: an official journal of the American Association for Cancer Research 11, 7749-7756 (2005).
52. J. G. Tjuvajev, M. Doubrovin, T. Akhurst, S. Cai, J. Balatoni, M. M. Alauddin, R. Finn, W. Bornmann, H. Thaler, P. S. Conti, R. G. Blasberg, Comparison of radiolabeled nucleoside probes (FIAU, FHBG, and FHPG) for PET imaging of HSV1-tk gene expression. Journal of nuclear medicine: official publication, Society of Nuclear Medicine 43, 1072-1083 (2002).
53. S. Gagandeep, R. Brew, B. Green, S. E. Christmas, D. Klatzmann, G. J. Poston, A. R. Kinsella, Prodrug-activated gene therapy: involvement of an immunological component in the "bystander effect". Cancer Gene Ther 3, 83-88 (1996).
54. S. Kuriyama, M. Kikukawa, K. Masui, H. Okuda, T. Nakatani, T. Akahane, A. Mitoro, K. Tominaga, H. Tsujinoue, H. Yoshiji, S. Okamoto, H. Fukui, K. Ikenaka, Cancer gene therapy with HSV-tk/GCV system depends on T-cell-mediated immune responses and causes apoptotic death of tumor cells in vivo. Int J Cancer 83, 374-380 (1999).
55. R. G. Vile, S. Castleden, J. Marshall, R. Camplejohn, C. Upton, H. Chong, Generation of an anti-tumour immune response in a non-immunogenic tumour: HSVtk killing in vivo stimulates a mononuclear cell infiltrate and a Th1-like profile of intratumoural cytokine expression. Int J Cancer 71, 267-274 (1997).
56. N. Bessis, F. J. GarciaCozar, M. C. Boissier, Immune responses to gene therapy vectors: influence on vector function and effector mechanisms. Gene therapy 11, (2004).

57. W.-J. J. Dai, L.-Y. Y. Zhu, Z.-Y. Y. Yan, Y. Xu, Q.-L. L. Wang, X.-J. J. Lu, CRISPR-Cas9 for in vivo Gene Therapy: Promise and Hurdles. Molecular therapy. Nucleic acids 5, (2016).
58. M. Jo, T. H. Kim, D. W. Seol, J. E. Esplen, K. Dorko, T. R. Billiar, S. C. Strom, Apoptosis induced in normal human hepatocytes by tumor necrosis factor-related apoptosis-inducing ligand. Nature medicine 6, 564-567 (2000).
59. S. K. Kelley, L. A. Harris, D. Xie, L. Deforge, K. Totpal, J. Bussiere, J. A. Fox, Preclinical studies to predict the disposition of Apo2L/tumor necrosis factor-related apoptosis-inducing ligand in humans: characterization of in vivo efficacy, pharmacokinetics, and safety. The Journal of pharmacology and experimental therapeutics 299, 31-38 (2001).
60. H. Xiang, C. B. Nguyen, S. K. Kelley, N. Dybdal, E. Escandón, Tissue distribution, stability, and pharmacokinetics of Apo2 ligand/tumor necrosis factor-related apoptosis-inducing ligand in human colon carcinoma COLO205 tumor-bearing nude mice. Drug metabolism and disposition: the biological fate of chemicals 32, 1230-1238 (2004).
61. G. Siravegna, S. Marsoni, S. Siena, A. Bardelli, Integrating liquid biopsies into the management of cancer. Nature reviews. Clinical oncology 14, 531-548 (2017).
62. J. E. Allen, C. L. Kline, V. V. Prabhu, J. Wagner, J. Ishizawa, N. Madhukar, A. Lev, M. Baumeister, L. Zhou, A. Lulla, M. Stogniew, L. Schalop, C. Benes, H. L. Kaufman, R. S. Pottorf, B. R. Nallaganchu, G. L. Olson, F. Al-Mulla, M. Duvic, G. S. Wu, D. T. Dicker, M. K. Talekar, B. Lim, O. Elemento, W. Oster, J. Bertino, K. Flaherty, M. L. Wang, G. Borthakur, M. Andreeff, M. Stein, W. S. El-Deiry, Discovery and clinical introduction of first-in-class imipridone ONC201. Oncotarget 7, 74380-74392 (2016).
63. J. E. Allen, G. Krigsfeld, P. A. Mayes, L. Patel, D. T. Dicker, A. S. Patel, N. G. Dolloff, E. Messaris, K. A. Scata, W. Wang, J.-Y. Y. Zhou, G. S. Wu, W. S. El-Deiry, Dual inactivation of Akt and ERK by TIC10 signals Foxo3a nuclear translocation, TRAIL gene induction, and potent antitumor effects. Science translational medicine 5, (2013).
64. C. L. B. L. B. Kline, M. D. Ralff, A. R. Lulla, J. M. Wagner, P. H. Abbosh, D. T. Dicker, J. E. Allen, W. S. El-Deiry, Role of Dopamine Receptors in the Anticancer Activity of ONC201. Neoplasia (New York, N.Y.) 20, 80-91 (2018).
65. H. Wakimoto, S. Kesari, C. J. Farrell, W. T. Curry, C. Zaupa, M. Aghi, T. Kuroda, A. Stemmer-Rachamimov, K. Shah, T.-C. C. Liu, D. S. Jeyaretna, J. Debasitis, J. Pruszak, R. L. Martuza, S. D. Rabkin, Human glioblastoma-derived cancer stem cells: establishment of invasive glioma models and treatment with oncolytic herpes simplex virus vectors. Cancer research 69, 3472-3481 (2009).
66. H. Wakimoto, G. Mohapatra, R. Kanai, W. T. Curry, S. Yip, M. Nitta, A. P. Patel, Z. R. Barnard, A. O. Stemmer-Rachamimov, D. N. Louis, R. L. Martuza, S. D. Rabkin, Maintenance of primary tumor phenotype and genotype in glioblastoma stem cells. Neuro-oncology 14, 132-144 (2012).
67. F. A. Ran, P. D. Hsu, J. Wright, V. Agarwala, D. A. Scott, F. Zhang, Genome engineering using the CRISPR-Cas9 system. Nature protocols 8, 2281-2308 (2013).
68. N. E. Sanjana, O. Shalem, F. Zhang, Improved vectors and genome-wide libraries for CRISPR screening. Nature methods 11, 783-784 (2014).
69. T. Wang, J. J. Wei, D. M. Sabatini, E. S. Lander, Genetic screens in human cells using the CRISPR-Cas9 system. Science 343, 80-84 (2014).
70. W. M. Strauss, Preparation of genomic DNA from mammalian tissue. Current protocols in molecular biology Chapter 2, (2001).
71. K. Shah, S. Hingtgen, R. Kasmieh, J. L. Figueiredo, E. Garcia-Garcia, A. Martinez-Serrano, X. Breakefield, R. Weissleder, Bimodal viral vectors and in vivo imaging reveal the fate of human neural stem cells in experimental glioma model. The Journal of neuroscience: the official journal of the Society for Neuroscience 28, 4406-4413 (2008).
72. S. Hingtgen, R. Kasmieh, E. Elbayly, I. Nesterenko, J.-L. L. Figueiredo, R. Dash, D. Sarkar, D. Hall, D. Kozakov, S. Vajda, P. B. Fisher, K. Shah, A first-generation multifunctional cytokine for simultaneous optical tracking and tumor therapy. PloS one 7, (2012).
73. K. Shah, C.-H. H. Tung, K. Yang, R. Weissleder, X. O. Breakefield, Inducible release of TRAIL fusion proteins from a proapoptotic form for tumor therapy. Cancer research 64, 3236-3242 (2004).

```
SEQUENCES
In some embodiments, the TRAIL nucleic
acid includes the following nucleic acid
sequence CCDS 3219.1 (SEQ ID No. 1):
ATGGCTATGATGGAGGTCCAGGGGGGACCCAGCCTGGGAC

AGACCTGCGTGCTGATCGTGATCTTCACAGTGCTCCTGCA

GTCTCTCTGTGTGGCTGTAACTTACGTGTACTTTACCAAC

GAGCTGAAGCAGATGCAGGACAAGTACTCCAAAAGTGGCA

TTGCTTGTTTCTTAAAAGAAGATGACAGTTATTGGGACCC

CAATGACGAAGAGTATGAACAGCCCCTGCTGGCAAGTC

AAGTGGCAACTCCGTCAGCTCGTTAGAAAGATGATTTTGA

GAACCTCTGAGGAAACCATTTCTACAGTTCAAGAAAAGCA

ACAAAATATTTCTCCCCTAGTGAGAGAAAGAGGTCCTCAG

AGAGTAGCAGCTCACATAACTGGGACCAGAGGAAGAAGCA

ACACATTGTCTTCTCCAAACTCCAAGAATGAAAAGGCTCT

GGGCCGCAAAATAAACTCCTGGGAATCATCAAGGAGTGGG

CATTCATTCCTGAGCAACTTGCACTTGAGGAATGGTGAAC

TGGTCATCCATGAAAAGGGTTTTACTACATCTATTCCCA

AACATACTTTCGATTTCAGGAGGAAATAAAAGAAAACACA

AAGAACGACAAACAAATGGTCCAATATATTTACAAATACA

CAAGTTATCCTGACCCTATATTGTTGATGAAAAGTGCTAG

AAATAGTTGTTGGTCTAAAGATGCAGAATATGGACTCTAT

TCCATCTATCAAGGGGGAATATTTGAGCTTAAGGAAAATG

ACAGAATTTTTGTTTCTGTAACAAATGAGCACTTGATAGA

CATGGACCATGAAGCCAGTTTTTTTGGGGCCTTTTTAGTT

GGCTAA

In some embodiments, the TRAIL mRNA
sequences includes the following sequence
NM_001190942.1 (SEQ ID No. 2):
ACAGAACCCAGAAAAACAACTCATTCGCTTTCATTTCCTC
```

ACTGACTATAAAAGAATAGAGAAGGAAGGGCTTCAGTGAC

CGGCTGCCTGGCTGACTTACAGCAGTCAGACTCTGACAGG

ATCATGGCTATGATGGAGGTCCAGGGGGACCCAGCCTGG

GACAGACCTGCGTGCTGATCGTGATCTTCACAGTGCTCCT

GCAGTCTCTCTGTGTGGCTGTAACTTACGTGTACTTTACC

AACGAGCTGAAGCAGATGCAGGACAAGTACTCCAAAAGTG

GCATTGCTTGTTTCTTAAAAGAAGATGACAGTTATTGGGA

CCCCAATGACGAAGAGAGTATGAACAGCCCCTGCTGGCAA

GTCAAGTGGCAACTCCGTCAGCTCGTTAGAAAGACTCCAA

GAATGAAAAGGCTCTGGGCCGCAAAATAAACTCCTGGGAA

TCATCAAGGAGTGGGCATTCATTCCTGAGCAACTTGCACT

TGAGGAATGGTGAACTGGTCATCCATGAAAAAGGGTTTTA

CTACATCTATTCCCAAACATACTTTCGATTTCAGGAGGAA

ATAAAAGAAAACACAAAGAACGACAAACAAATGGTCCAAT

ATATTTACAAATACACAAGTTATCCTGACCCTATATTGTT

GATGAAAAGTGCTAGAAATAGTTGTTGGTCTAAAGATGCA

GAATATGGACTCTATTCCATCTATCAAGGGGAATATTTG

AGCTTAAGGAAAATGACAGAATTTTTGTTTCTGTAACAAA

TGAGCACTTGATAGACATGGACCATGAAGCCAGTTTTTTT

GGGGCCTTTTTAGTTGGCTAACTGACCTGGAAAGAAAAAG

CAATAACCTCAAAGTGACTATTCAGTTTTCAGGATGATAC

ACTATGAAGATGTTTCAAAAAATCTGACCAAAACAAACAA

ACAGAAAACAGAAAACAAAAAAACCTCTATGCAATCTGAG

TAGAGCAGCCACAACCAAAAAATTCTACAACACACACTGT

TCTGAAAGTGACTCACTTATCCCAAGAGAATGAAATTGCT

GAAAGATCTTTCAGGACTCTACCTCATATCAGTTTGCTAG

CAGAAATCTAGAAGACTGTCAGCTTCCAAACATTAATGCA

ATGGTTAACATCTTCTGTCTTTATAATCTACTCCTTGTAA

AGACTGTAGAAGAAAGAGCAACAATCCATCTCTCAAGTAG

TGTATCACAGTAGTAGCCTCCAGGTTTCCTTAAGGGACAA

CATCCTTAAGTCAAAAGAGAGAAGAGGCACCACTAAAGA

TCGCAGTTTGCCTGGTGCAGTGGCTCACACCTGTAATCCC

AACATTTTGGGAACCCAAGGTGGGTAGATCACGAGATCAA

GAGATCAAGACCATAGTGACCAACATAGTGAAACCCCATC

TCTACTGAAAGTACAAAAATTAGCTGGGTGTGTTGGCACA

TGCCTGTAGTCCCAGCTACTTGAGAGGCTGAGGCAAGAGA

ATTGTTTGAACCCGGGAGGCAGAGGTTGCAGTGTGGTGAG

ATCATGCCACTACACTCCAGCCTGGCGACAGAGCGAGACT

TGGTTTCAAAAAAAAAAAAAAAAAAAACTTCAGTAAGTAC

GTGTTATTTTTTTCAATAAAATTCTATTACAGTATGTCAT

GTTTGCTGTAGTGCTCATATTTATTGTTGTTTTTGTTTTA

GTACTCACTTGTTTCATAATATCAAGATTACTAAAAATGG

GGGAAAAGACTTCTAATCTTTTTTTCATAATATCTTTGAC

ACATATTACAGAAGAAATAAATTTCTTACTTTTAATTTAA

TATGA

In some embodiments, the TRAIL polypeptide includes the following amino acid sequence NP_001177871.1 (SEQ ID No. 3):
MAMMEVQGGPSLGQTCVLIVIFTVLLQSLCVAVTYVYFTN

ELKQMQDKYSKSGIACFLKEDDSYWDPNDEESMNSPCWQV

KWQLRQLVRKTPRMKRLWAAK

In some embodiments, the DR4 nucleic acid includes the following nucleic acid sequence CCDS 6039.1 (SEQ ID No. 4):
ATGGCGCCACCACCAGCTAGAGTACATCTAGGTGCGTTCC

TGGCAGTGACTCCGAATCCCGGGAGCGCAGCGAGTGGGAC

AGAGGCAGCCGCGGCCACACCCAGCAAAGTGTGGGCTCT

TCCGCGGGGAGGATTGAACCACGAGGCGGGGGCCGAGGAG

CGCTCCCTACCTCCATGGGACAGCACGGACCCAGTGCCCG

GGCCCGGGCAGGGCGCGCCCCAGGACCCAGGCCGGCGCGG

GAAGCCAGCCCTCGGCTCCGGGTCCACAAGACCTTCAAGT

TTGTCGTCGTCGGGGTCCTGCTGCAGGTCGTACCTAGCTC

AGCTGCAACCATCAAACTTCATGATCAATCAATTGGCACA

CAGCAATGGGAACATAGCCCTTTGGGAGAGTTGTGTCCAC

CAGGATCTCATAGATCAGAACATCCTGGAGCCTGTAACCG

GTGCACAGAGGGTGTGGGTTACACCAATGCTTCCAACAAT

TTGTTTGCTTGCCTCCCATGTACAGCTTGTAAATCAGATG

AAGAAGAGAAGTCCCTGCACCACGACCAGGAACACAGC

ATGTCAGTGCAAACCAGGAACTTTCCGGAATGACAATTCT

GCTGAGATGTGCCGGAAGTGCAGCAGAGGGTGCCCCAGAG

GGATGGTCAAGGTCAAGGATTGTACGCCCTGGAGTGACAT

CGAGTGTGTCCACAAAGAATCAGGCAATGGACATAATATA

TGGGTGATTTTGGTTGTGACTTTGGTTGTTCCGTTGCTGT

TGGTGGCTGTGCTGATTGTCTGTTGTTGCATCGGCTCAGG

TTGTGGAGGGGACCCCAAGTGCATGGACAGGGTGTGTTTC

TGGCGCTTGGGTCTCCTACGAGGGCCTGGGGCTGAGGACA

ATGCTCACAACGAGATTCTGAGCAACGCAGACTCGCTGTC

CACTTTCGTCTCTGAGCAGCAAATGGAAAGCCAGGAGCCG

GCAGATTTGACAGGTGTCACTGTACAGTCCCCAGGGGAGG

CACAGTGTCTGCTGGGACCGGCAGAAGCTGAAGGGTCTCA

GAGGAGGAGGCTGCTGGTTCCAGCAAATGGTGCTGACCCC

ACTGAGACTCTGATGCTGTTCTTTGACAAGTTTGCAAACA

TCGTGCCCTTTGACTCCTGGGACCAGCTCATGAGGCAGCT

GGACCTCACGAAAAATGAGATCGATGTGGTCAGAGCTGGT

-continued

ACAGCAGGCCCAGGGGATGCCTTGTATGCAATGCTGATGA

AATGGGTCAACAAAACTGGACGGAACGCCTCGATCCACAC

CCTGCTGGATGCCTTGGAGAGGATGGAAGAGAGACATGCA

AGAGAGAAGATTCAGGACCTCTTGGTGGACTCTGGAAAGT

TCATCTACTTAGAAGATGGCACAGGCTCTGCCGTGTCCTT

GGAGTGA

In some embodiments, the DR4 mRNA sequences
includes the following nucleotide sequence
available at, e.g. NCBI Ref Seq NM_003844.3
(SEQ ID No.: 5):
GCAGGTGCCCCGAAAAGGGGGCGGGGTCAGGGGTGCCCTG

AACTCCGAATGCGAAGTTCTGTCTTGTCATAGCCAAGCAC

GCTGCTTCTTGGATTGACCTGGCAGGATGGCGCCACCACC

AGCTAGAGTACATCTAGGTGCGTTCCTGGCAGTGACTCCG

AATCCCGGGAGCGCAGCGAGTGGGACAGAGGCAGCCGCGG

CCACACCCAGCAAAGTGTGGGGCTCTTCCGCGGGGAGGAT

TGAACCACGAGGCGGGGCCGAGGAGCGCTCCCTACCTCC

ATGGGACAGCACGGACCCAGTGCCCGGGCCCGGGCAGGGC

GCGCCCCAGGACCCAGGCCGGCGCGGGAAGCCAGCCCTCG

GCTCCGGGTCCACAAGACCTTCAAGTTTGTCGTCGTCGGG

GTCCTGCTGCAGGTCGTACCTAGCTCAGCTGCAACCATCA

AACTTCATGATCAATCAATTGGCACACAGCAATGGGAACA

TAGCCCTTTGGGAGAGTTGTGTCCACCAGGATCTCATAGA

TCAGAACATCCTGGAGCCTGTAACCGGTGCACAGAGGGTG

TGGGTTACACCAATGCTTCCAACAATTTGTTTGCTTGCCT

CCCATGTACAGCTTGTAAATCAGATGAAGAAGAGAGAAGT

CCCTGCACCACGACCAGGAACACAGCATGTCAGTGCAAAC

CAGGAACTTTCCGGAATGACAATTCTGCTGAGATGTGCCG

GAAGTGCAGCAGAGGGTGCCCCAGAGGGATGGTCAAGGTC

AAGGATTGTACGCCCTGGAGTGACATCGAGTGTGTCCACA

AAGAATCAGGCAATGGACATAATATATGGGTGATTTTGGT

TGTGACTTTGGTTGTTCCGTTGCTGTTGGTGGCTGTGCTG

ATTGTCTGTTGTTGCATCGGCTCAGGTTGTGGAGGGGACC

CCAAGTGCATGGACAGGGTGTGTTTCTGGCGCTTGGGTCT

CCTACGAGGGCCTGGGGCTGAGGACAATGCTCACAACGAG

ATTCTGAGCAACGCAGACTCGCTGTCCACTTTCGTCTCTG

AGCAGCAAATGGAAAGCCAGGAGCCGGCAGATTTGACAGG

TGTCACTGTACAGTCCCCAGGGGAGGCACAGTGTCTGCTG

GGACCGGCAGAAGCTGAAGGGTCTCAGAGGAGGAGGCTGC

TGGTTCCAGCAAATGGTGCTGACCCCACTGAGACTCTGAT

GCTGTTCTTTGACAAGTTTGCAAACATCGTGCCCTTTGAC

TCCTGGGACCAGCTCATGAGGCAGCTGGACCTCACGAAAA

-continued
ATGAGATCGATGTGGTCAGAGCTGGTACAGCAGGCCCAGG

GGATGCCTTGTATGCAATGCTGATGAAATGGGTCAACAAA

ACTGGACGGAACGCCTCGATCCACACCCTGCTGGATGCCT

TGGAGAGGATGGAAGAGAGACATGCAAGAGAGAAGATTCA

GGACCTCTTGGTGGACTCTGGAAAGTTCATCTACTTAGAA

GATGGCACAGGCTCTGCCGTGTCCTTGGAGTGAAAGACTC

TTTTTACCAGAGGTTTCCTCTTAGGTGTTAGGAGTTAATA

CATATTAGGTTTTTTTTTTTTTAACATGTATACAAAGTA

AATTCTTAGCCAGGTGTAGTGGCTCATGCCTGTAATCCCA

GCACTTTGGGAGGCTGAGGCGGGTGGATCACTTGAGGTCA

GAAGTTCAAGACCAGCCTGACCAACATCGTGAAATGCCGT

CTTTACAAAAAAATACAAAAATTAACTGGAAAAAAAAAAA

AAA

In some embodiments, the DR4 polypeptide
sequences include the following polypeptide
sequence available at, e.g., NCBI Ref
Seq NP_003835.3 (SEQ ID No. 6).
MAPPPARVHLGAFLAVTPNPGSAASGTEAAAATPSKVWGS

SAGRIEPRGGGRGALPTSMGQHGPSARARAGRAPGPRPAR

EASPRLRVHKTFKFVVVGVLLQVVPSSAATIKLHDQSIGT

QQWEHSPLGELCPPGSHRSEHPGACNRCTEGVGYTNASNN

LFACLPCTACKSDEEERSPCTTTRNTACQCKPGTFRNDNS

AEMCRKCSRGCPRGMVKVKDCTPWSDIECVHKESGNGHNI

WVILVVTLVVPLLLVAVLIVCCCIGSGCGGDPKCMDRVCF

WRLGLLRGPGAEDNAHNEILSNADSLSTFVSEQQMESQEP

ADLTGVTVQSPGEAQCLLGPAEAEGSQRRRLLVPANGADP

TETLMLFFDKFANIVPFDSWDQLMRQLDLTKNEIDVVRAG

TAGPGDALYAMLMKWVNKTGRNASIHTLLDALERMEERHA

REKIQDLLVDSGKFIYLEDGTGSAVSLE

In some embodiments, the DR5 nucleic acid
includes the following nucleic acid sequence
CCDS 6035.1 (SEQ ID No. 7).
ATGGAACAACGGGACAGAACGCCCCGGCCGCTTCGGGGG

CCCGGAAAAGGCACGGCCCAGGACCCAGGGAGGCGCGGGG

AGCCAGGCCTGGGCCCCGGGTCCCCAAGACCCTTGTGCTC

GTTGTCGCCGCGGTCCTGCTGTTGGTCTCAGCTGAGTCTG

CTCTGATCACCCAACAAGACCTAGCTCCCCAGCAGAGAGC

GGCCCCACAACAAAAGAGGTCCAGCCCCTCAGAGGGATTG

TGTCCACCTGGACACCATATCTCAGAAGACGGTAGAGATT

GCATCCTGCAAATATGGACAGGACTATAGCACTCACTG

GAATGACCTCCTTTTCTGCTTGCGCTGCACCAGGTGTGAT

TCAGGTGAAGTGGAGCTAAGTCCCTGCACCACGACCAGAA

ACACAGTGTGTCAGTGCGAAGAAGGCACCTTCCGGAAGA

AGATTCTCCTGAGATGTGCCGGAAGTGCCGCACAGGGTGT

-continued

CCCAGAGGGATGGTCAAGGTCGGTGATTGTACACCCTGGA

GTGACATCGAATGTGTCCACAAAGAATCAGGTACAAAGCA

CAGTGGGAAGTCCCAGCTGTGGAGGAGACGGTGACCTCC

AGCCCAGGGACTCCTGCCTCTCCCTGTTCTCTCTCAGGCA

TCATCATAGGAGTCACAGTTGCAGCCGTAGTCTTGATTGT

GGCTGTGTTTGTTTGCAAGTCTTTACTGTGGAAGAAAGTC

CTTCCTTACCTGAAAGGCATCTGCTCAGGTGGTGGTGGGG

ACCCTGAGCGTGTGGACAGAAGCTCACAACGACCTGGGC

TGAGGACAATGTCCTCAATGAGATCGTGAGTATCTTGCAG

CCCACCCAGGTCCCTGAGCAGGAAATGGAAGTCCAGGAGC

CAGCAGAGCCAACAGGTGTCAACATGTTGTCCCCCGGGGA

GTCAGAGCATCTGCTGGAACCGGCAGAAGCTGAAAGGTCT

CAGAGGAGGAGGCTGCTGGTTCCAGCAAATGAAGGTGATC

CCACTGAGACTCTGAGACAGTGCTTCGATGACTTTGCAGA

CTTGGTGCCCTTTGACTCCTGGGAGCCGCTCATGAGGAAG

TTGGGCCTCATGGACAATGAGATAAAGGTGGCTAAAGCTG

AGGCAGCGGGCCACAGGGACACCTTGTACACGATGCTGAT

AAAGTGGGTCAACAAAACCGGGCGAGATGCCTCTGTCCAC

ACCCTGCTGGATGCCTTGGAGACGCTGGGAGAGAGACTTG

CCAAGCAGAAGATTGAGGACCACTTGTTGAGCTCTGGAAA

GTTCATGTATCTAGAAGGTAATGCAGACTCTGCCATGTCC

TAA

In some embodiments, the DR5 mRNA sequences
includes the following nucleotide sequence
available at, e.g. NCBI Ref Seq
NM_003842.5 (SEQ ID No.: 8):
AGCCTGGACACATAAATCAGCACGCGGCCGGAGAACCCCG

CAATCTCTGCGCCCACAAAATACACCGACGATGCCCGATC

TACTTTAAGGGCTGAAACCCACGGGCCTGAGAGACTATAA

GAGCGTTCCCTACCGCCATGGAACAACGGGGACAGAACGC

CCCGGCCGCTTCGGGGGCCCGGAAAAGGCACGGCCCAGGA

CCCAGGGAGGCGCGGGGAGCCAGGCCTGGGCCCCGGGTCC

CCAAGACCCTTGTGCTCGTTGTCGCCGCGGTCCTGCTGTT

GGTCTCAGCTGAGTCTGCTCTGATCACCCAACAAGACCTA

GCTCCCCAGCAGAGAGCGGCCCCACAACAAAGAGGTCCA

GCCCCTCAGAGGGATTGTGTCCACCTGGACACCATATCTC

AGAAGACGGTAGAGATTGCATCTCCTGCAAATATGGACAG

GACTATAGCACTCACTGGAATGACCTCCTTTTCTGCTTGC

GCTGCACCAGGTGTGATTCAGGTGAAGTGGAGCTAAGTCC

CTGCACCACGACCAGAAACACAGTGTGTCAGTGCGAAGAA

GGCACCTTCCGGGAAGAAGATTCTCCTGAGATGTGCCGGA

AGTGCCGCACAGGGTGTCCCAGAGGGATGGTCAAGGTCGG

TGATTGTACACCCTGGAGTGACATCGAATGTGTCCACAAA

GAATCAGGTACAAAGCACAGTGGGGAAGTCCCAGCTGTGG

AGGAGACGGTGACCTCCAGCCCAGGGACTCCTGCCTCTCC

CTGTTCTCTCTCAGGCATCATCATAGGAGTCACAGTTGCA

GCCGTAGTCTTGATTGTGGCTGTGTTTGTTTGCAAGTCTT

TACTGTGGAAGAAAGTCCTTCCTTACCTGAAAGGCATCTG

CTCAGGTGGTGGTGGGGACCCTGAGCGTGTGGACAGAAGC

TCACAACGACCTGGGGCTGAGGACAATGTCCTCAATGAGA

TCGTGAGTATCTTGCAGCCCACCCAGGTCCCTGAGCAGGA

AATGGAAGTCCAGGAGCCAGCAGAGCCAACAGGTGTCAAC

ATGTTGTCCCCCGGGGAGTCAGAGCATCTGCTGGAACCGG

CAGAAGCTGAAAGGTCTCAGAGGAGGAGGCTGCTGGTTCC

AGCAAATGAAGGTGATCCCACTGAGACTCTGAGACAGTGC

TTCGATGACTTTGCAGACTTGGTGCCCTTTGACTCCTGGG

AGCCGCTCATGAGGAAGTTGGGCCTCATGGACAATGAGAT

AAAGGTGGCTAAAGCTGAGGCAGCGGGCCACAGGGACACC

TTGTACACGATGCTGATAAAGTGGGTCAACAAAACCGGGC

GAGATGCCTCTGTCCACACCCTGCTGGATGCCTTGGAGAC

GCTGGGAGAGAGACTTGCCAAGCAGAAGATTGAGGACCAC

TTGTTGAGCTCTGGAAAGTTCATGTATCTAGAAGGTAATG

CAGACTCTGCCATGTCCTAAGTGTGATTCTCTTCAGGAAG

TCAGACCTTCCCTGGTTTACCTTTTTTCTGGAAAAAGCCC

AACTGGACTCCAGTCAGTAGGAAAGTGCCACAATTGTCAC

ATGACCGGTACTGGAAGAAACTCTCCCATCCAACATCACC

CAGTGGATGGAACATCCTGTAACTTTTCACTGCACTTGGC

ATTATTTTTATAAGCTGAATGTGATAATAAGGACACTATG

GAAATGTCTGGATCATTCCGTTTGTGCGTACTTTGAGATT

TGGTTTGGGATGTCATTGTTTTCACAGCACTTTTTTATCC

TAATGTAAATGCTTTATTTATTTATTTGGGCTACATTGTA

AGATCCATCTACACAGTCGTTGTCCGACTTCACTTGATAC

TATATGATATGAACCTTTTTGGGTGGGGGTGCGGGCA

GTTCACTCTGTCTCCCAGGCTGGAGTGCAATGGTGCAATC

TTGGCTCACTATAGCCTTGACCTCTCAGGCTCAAGCGATT

CTCCCACCTCAGCCATCCAAATAGCTGGGACCACAGGTGT

GCACCACCACGCCCGGCTAATTTTTTGTATTTTGTCTAGA

TATAGGGGCTCTCTATGTTGCTCAGGGTGGTCTCGAATTC

CTGGACTCAAGCAGTCTGCCCACCTCAGACTCCCAAAGCG

GTGGAATTAGAGGCGTGAGCCCCCATGCTTGGCCTTACCT

TTCTACTTTTATAATTCTGTATGTTATTATTTTATGAACA

TGAAGAAACTTTAGTAAATGTACTTGTTTACATAGTTATG

TGAATAGATTAGATAAACATAAAAGGAGGAGACATACAAT

GGGGGAAGAAGAAGAAGTCCCCTGTAAGATGTCACTGTCT

GGGTTCCAGCCCTCCCTCAGATGTACTTTGGCTTCAATGA

TTGGCAACTTCTACAGGGGCCAGTCTTTTGAACTGGACAA

CCTTACAAGTATATGAGTATTATTTATAGGTAGTTGTTTA

CATATGAGTCGGGACCAAAGAGAACTGGATCCACGTGAAG

TCCTGTGTGTGGCTGGTCCCTACCTGGGCAGTCTCATTTG

CACCCATAGCCCCCATCTATGGACAGGCTGGGACAGAGGC

AGATGGGTTAGATCACACATAACAATAGGGTCTATGTCAT

ATCCCAAGTGAACTTGAGCCCTGTTTGGGCTCAGGAGATA

GAAGACAAAATCTGTCTCCCACGTCTGCCATGGCATCAAG

GGGGAAGAGTAGATGGTGCTTGAGAATGGTGTGAAATGGT

TGCCATCTCAGGAGTAGATGGCCCGGCTCACTTCTGGTTA

TCTGTCACCCTGAGCCCATGAGCTGCCTTTTAGGGTACAG

ATTGCCTACTTGAGGACCTTGGCCGCTCTGTAAGCATCTG

ACTCATCTCAGAAATGTCAATTCTTAAACACTGTGGCAAC

AGGACCTAGAATGGCTGACGCATTAAGGTTTTCTTCTTGT

GTCCTGTTCTATTATTGTTTTAAGACCTCAGTAACCATTT

CAGCCTCTTTCCAGCAAACCTTCTCCATAGTATTTCAGT

CATGGAAGGATCATTTATGCAGGTAGTCATTCCAGGAGTT

TTTGGTCTTTTCTGTCTCAAGGCATTGTGTGTTTTGTTCC

GGGACTGGTTTGGGTGGGACAAAGTTAGAATTGCCTGAAG

ATCACACATTCAGACTGTTGTGTCTGTGGAGTTTTAGGAG

TGGGGGGTGACCTTTCTGGTCTTTGCACTTCCATCCTCTC

CCACTTCCATCTGGCATCCCACGCGTTGTCCCCTGCACTT

CTGGAAGGCACAGGGTGCTGCTGCCTCCTGGTCTTTGCCT

TTGCTGGGCCTTCTGTGCAGGACGCTCAGCCTCAGGGCTC

AGAAGGTGCCAGTCCGGTCCCAGGTCCCTTGTCCCTTCCA

CAGAGGCCTTCCTAGAAGATGCATCTAGAGTGTCAGCCTT

ATCAGTGTTTAAGATTTTCTTTTATTTTTAATTTTTTTG

AGACAGAATCTCACTCTCTCGCCCAGGCTGGAGTGCAACG

GTACGATCTTGGCTCAGTGCAACCTCCGCCTCCTGGGTTC

AAGCGATTCTCGTGCCTCAGCCTCCGGAGTAGCTGGGATT

GCAGGCACCCGCCACCACGCCTGGCTAATTTTTGTATTTT

TAGTAGAGACGGGGTTTCACCATGTTGGTCAGGCTGGTCT

CGAACTCCTGACCTCAGGTGATCCACCTTGGCCTCCGAAA

GTGCTGGGATTACAGGCGTGAGCCACCAGCCAGGCCAAGC

TATTCTTTTAAAGTAAGCTTCCTGACGACATGAAATAATT

GGGGGTTTTGTTGTTTAGTTACATTAGGCTTTGCTATATC

CCCAGGCCAAATAGCATGTGACACAGGACAGCCATAGTAT

AGTGTGTCACTCGTGGTTGGTGTCCTTTCATGCTTCTGCC

CTGTCAAAGGTCCCTATTTGAAATGTGTTATAATACAAAC

AAGGAAGCACATTGTGTACAAAATACTTATGTATTTATGA

ATCCATGACCAAATTAAATATGAAACCTTATATAAAAA

In some embodiments, the DR5 mRNA sequences includes the following nucleotide sequence available at, e.g. NCBI Ref Seq NP_003842.5 (SEQ ID No.: 9):

MEQRGQNAPAASGARKRHGPGPREARGARPGPRVPKTLVL

VVAAVLLLVSAESALITQQDLAPQQRAAPQQKRSSPSEGL

CPPGHHISEDGRDCISCKYGQDYSTHWNDLLFCLRCTRCD

SGEVELSPCTTTRNTVCQCEEGTFREEDSPEMCRKCRTGC

PRGMVKVGDCTPWSDIECVHKESGTKHSGEVPAVEETVTS

SPGTPASPCSLSGIIIGVTVAAVVLIVAVFVCKSLLWKKV

LPYLKGICSGGGGDPERVDRSSQRPGAEDNVLNEIVSILQ

PTQVPEQEMEVQEPAEPTGVNMLSPGESEHLLEPAEAERS

QRRRLLVPANEGDPTETLRQCFDDFADLVPFDSWEPLMRK

LGLMDNEIKVAKAEAAGHRDTLYTMLIKWVNKTGRDASVH

TLLDALETLGERLAKQKIEDHLLSSGKFMYLEGNADSAMS

In some embodiments, the IFN-beta nucleic acid includes the following nucleic acid sequence CCDS 6495.1 (SEQ ID No. 10):

ATGACCAACAAGTGTCTCCTCCAAATTGCTCTCCTGTTGT

GCTTCTCCACTACAGCTCTTTCCATGAGCTACAACTTGCT

TGGATTCCTACAAAGAAGCAGCAATTTTCAGTGTCAGAAG

CTCCTGTGGCAATTGAATGGGAGGCTTGAATACTGCCTCA

AGGACAGGATGAACTTTGACATCCCTGAGGAGATTAAGCA

GCTGCAGCAGTTCCAGAAGGAGGACGCCGCATTGACCATC

TATGAGATGCTCCAGAACATCTTTGCTATTTTCAGACAAG

ATTCATCTAGCACTGGCTGGAATGAGACTATTGTTGAGAA

CCTCCTGGCTAATGTCTATCATCAGATAAACCATCTGAAG

ACAGTCCTGGAAGAAAACTGGAGAAAGAAGATTTCACCA

GGGGAAAACTCATGAGCAGTCTGCACCTGAAAAGATATTA

TGGGAGGATTCTGCATTACCTGAAGGCCAAGGAGTACAGT

CACTGTGCCTGGACCATAGTCAGAGTGGAAATCCTAAGGA

ACTTTTACTTCATTAACAGACTTACAGGTTACCTCCGAAA

CTGA

In some embodiments, the IFN-beta mRNA sequence includes the following sequence NM_002176.4 (SEQ ID No. 11):

ATTCTAACTGCAACCTTTCGAAGCCTTTGCTCTGGCACAA

CAGGTAGTAGGCGACACTGTTCGTGTTGTCAACATGACCA

ACAAGTGTCTCCTCCAAATTGCTCTCCTGTTGTGCTTCTC

CACTACAGCTCTTTCCATGAGCTACAACTTGCTTGGATTC

CTACAAAGAAGCAGCAATTTTCAGTGTCAGAAGCTCCTGT

GGCAATTGAATGGGAGGCTTGAATACTGCCTCAAGGACAG

```
GATGAACTTTGACATCCCTGAGGAGATTAAGCAGCTGCAG

CAGTTCCAGAAGGAGGACGCCGCATTGACCATCTATGAGA

TGCTCCAGAACATCTTTGCTATTTTCAGACAAGATTCATC

TAGCACTGGCTGGAATGAGACTATTGTTGAGAACCTCCTG

GCTAATGTCTATCATCAGATAAACCATCTGAAGACAGTCC

TGGAAGAAAAACTGGAGAAAGAAGATTTCACCAGGGGAAA

ACTCATGAGCAGTCTGCACCTGAAAAGATATTATGGGAGG

ATTCTGCATTACCTGAAGGCCAAGGAGTACAGTCACTGTG

CCTGGACCATAGTCAGAGTGGAAATCCTAAGGAACTTTTA

CTTCATTAACAGACTTACAGGTTACCTCCGAAACTGAAGA

TCTCCTAGCCTGTGCCTCTGGGACTGGACAATTGCTTCAA

GCATTCTTCAACCAGCAGATGCTGTTTAAGTGACTGATGG

CTAATGTACTGCATATGAAAGGACACTAGAAGATTTTGAA

ATTTTTATTAAATTATGAGTTATTTTTATTTATTTAAATT

TTATTTTGGAAAATAAATTATTTTTGGTGCAAAAGTCAA
```
In some embodiments, the IFN-beta polypeptide
includes the following amino acid
sequence NP_002167.1 (SEQ ID No. 12):
MTNKCLLQIALLLCFSTTALSMSYNLLGFLQRSSNFQCQK
LLWQLNGRLEYCLKDRMNFDIPEETKQLQQFQKEDAALTI
YEMLQNIFAIFRQDSSSTGWNETIVENLLANVYHQINHLK
TVLEEKLEKEDFTRGKLMSSLHLKRYYGRILHYLKAKEYS
HCAWTIVRVEILRNFYFINRLTGYLRN In some embodiments, the IFNAR1 nucleic acid
sequence includes the following nucleic
acid sequence CCDS 13624.1 (SEQ ID No. 13):
```
ATGATGGTCGTCCTCCTGGGCGCGACGACCCTAGTGCTCG

TCGCCGTGGCGCCATGGGTGTTGTCCGCAGCCGCAGGTGG

AAAAAATCTAAATCTCCTCAAAAAGTAGAGGTCGACATC

ATAGATGACAACTTTATCCTGAGGTGGAACAGGAGCGATG

AGTCTGTCGGGAATGTGACTTTTTCATTCGATTATCAAAA

AACTGGGATGGATAATTGGATAAAATTGTCTGGGTGTCAG

AATATTACTAGTACCAAATGCAACTTTTCTTCACTCAAGC

TGAATGTTTATGAAGAAATTAAATTGCGTATAAGAGCAGA

AAAAGAAAACACTTCTTCATGGTATGAGGTTGACTCATTT

ACACCATTTCGCAAAGCTCAGATTGGTCCTCCAGAAGTAC

ATTTAGAAGCTGAAGATAAGGCAATAGTGATACACATCTC

TCCTGGAACAAAAGATAGTGTTATGTGGGCTTTGGATGGT

TTAAGCTTTACATATAGCTTAGTTATCTGGAAAAACTCTT

CAGGTGTAGAAGAAAGGATTGAAAATATTTATTCCAGACA

TAAAATTTATAAACTCTCACCAGAGACTACTTATTGTCTA

AAAGTTAAAGCAGCACTACTTACGTCATGGAAAATTGGTG

TCTATAGTCCAGTACATTGTATAAAGACCACAGTTGAAAA

TGAACTACCTCCACCAGAAAATATAGAAGTCAGTGTCCAA
```

```
AATCAGAACTATGTTCTTAAATGGGATTATACATATGCAA

ACATGACCTTTCAAGTTCAGTGGCTCCACGCCTTTTTAAA

AAGGAATCCTGGAAACCATTTGTATAAATGGAAACAAATA

CCTGACTGTGAAAATGTCAAAACTACCCAGTGTGTCTTTC

CTCAAAACGTTTTCCAAAAAGGAATTTACCTTCTCCGCGT

ACAAGCATCTGATGGAAATAACACATCTTTTTGGTCTGAA

GAGATAAAGTTTGATACTGAAATACAAGCTTTCCTACTTC

CTCCAGTCTTTAACATTAGATCCCTTAGTGATTCATTCCA

TATCTATATCGGTGCTCCAAAACAGTCTGGAAACACGCCT

GTGATCCAGGATTATCCACTGATTTATGAAATTATTTTTT

GGGAAAACACTTCAAATGCTGAGAGAAAAATTATCGAGAA

AAAAACTGATGTTACAGTTCCTAATTTGAAACCACTGACT

GTATATTGTGTGAAAGCCAGAGCACACACCATGGATGAAA

AGCTGAATAAAAGCAGTGTTTTTAGTGACGCTGTATGTGA

GAAAACAAAACCAGGAAATACCTCTAAAATTTGGCTTATA

GTTGGAATTTGTATTGCATTATTTGCTCTCCCGTTTGTCA

TTTATGCTGCGAAAGTCTTCTTGAGATGCATCAATTATGT

CTTCTTTCCATCACTTAAACCTTCTTCCAGTATAGATGAG

TATTTCTCTGAACAGCCATTGAAGAATCTTCTGCTTTCAA

CTTCTGAGGAACAAATCGAAAAATGTTTCATAATTGAAAA

TATAAGCACAATTGCTACAGTAGAAGAAACTAATCAAACT

GATGAAGATCATAAAAAATACAGTTCCCAAACTAGCCAAG

ATTCAGGAAATTATTCTAATGAAGATGAAAGCGAAAGTAA

AACAAGTGAAGAACTACAGCAGGACTTTGTATGA
```
In some embodiments, the IFNAR1 mRNA sequence
includes the following nucleic acid sequence
NCBI Ref. Seq. NM_000629.3 (SEQ ID No. 14):
```
GGTGTGACTTAGGACGGGGCGATGCGGCTGAGAGGAGCT

GCGCGTGCGCGAACATGTAACTGGTGGGATCTGCGGCGGC

TCCCAGATGATGGTCGTCCTCCTGGGCGCGACGACCCTAG

TGCTCGTCGCCGTGGCGCCATGGGTGTTGTCCGCAGCCGC

AGGTGGAAAAAATCTAAATCTCCTCAAAAAGTAGAGGTC

GACATCATAGATGACAACTTTATCCTGAGGTGGAACAGGA

GCGATGAGTCTGTCGGGAATGTGACTTTTTCATTCGATTA

TCAAAAAACTGGGATGGATAATTGGATAAAATTGTCTGGG

TGTCAGAATATTACTAGTACCAAATGCAACTTTTCTTCAC

TCAAGCTGAATGTTTATGAAGAAATTAAATTGCGTATAAG

AGCAGAAAAAGAAAACACTTCTTCATGGTATGAGGTTGAC

TCATTTACACCATTTCGCAAAGCTCAGATTGGTCCTCCAG

AAGTACATTTAGAAGCTGAAGATAAGGCAATAGTGATACA

CATCTCTCCTGGAACAAAAGATAGTGTTATGTGGGCTTTG

GATGGTTTAAGCTTTACATATAGCTTAGTTATCTGGAAAA
```

```
ACTCTTCAGGTGTAGAAGAAAGGATTGAAAATATTTATTC
CAGACATAAAATTTATAAACTCTCACCAGAGACTACTTAT
TGTCTAAAAGTTAAAGCAGCACTACTTACGTCATGGAAAA
TTGGTGTCTATAGTCCAGTACATTGTATAAAGACCACAGT
TGAAAATGAACTACCTCCACCAGAAAATATAGAAGTCAGT
GTCCAAAATCAGAACTATGTTCTTAAATGGGATTATACAT
ATGCAAACATGACCTTTCAAGTTCAGTGGCTCCACGCCTT
TTTAAAAAGGAATCCTGGAAACCATTTGTATAAATGGAAA
CAAATACCTGACTGTGAAAATGTCAAAACTACCCAGTGTG
TCTTTCCTCAAAACGTTTTCCAAAAAGGAATTTACCTTCT
CCGCGTACAAGCATCTGATGGAAATAACACATCTTTTTGG
TCTGAAGAGATAAAGTTTGATACTGAAATACAAGCTTTCC
TACTTCCTCCAGTCTTTAACATTAGATCCCTTAGTGATTC
ATTCCATATCTATATCGGTGCTCCAAAACAGTCTGGAAAC
ACGCCTGTGATCCAGGATTATCCACTGATTTATGAAATTA
TTTTTTGGGAAAACACTTCAAATGCTGAGAGAAAAATTAT
CGAGAAAAAAACTGATGTTACAGTTCCTAATTTGAAACCA
CTGACTGTATATTGTGTGAAAGCCAGAGCACACACCATGG
ATGAAAAGCTGAATAAAAGCAGTGTTTTTAGTGACGCTGT
ATGTGAGAAAACAAAACCAGGAAATACCTCTAAAATTTGG
CTTATAGTTGGAATTTGTATTGCATTATTTGCTCTCCCGT
TTGTCATTTATGCTGCGAAAGTCTTCTTGAGATGCATCAA
TTATGTCTTCTTTCCATCACTTAAACCTTCTTCCAGTATA
GATGAGTATTTCTCTGAACAGCCATTGAAGAATCTTCTGC
TTTCAACTTCTGAGGAACAAATCGAAAAATGTTTCATAAT
TGAAAATATAAGCACAATTGCTACAGTAGAAGAAACTAAT
CAAACTGATGAAGATCATAAAAAATACAGTTCCCAAACTA
GCCAAGATTCAGGAAATTATTCTAATGAAGATGAAAGCGA
AAGTAAAACAAGTGAAGAACTACAGCAGGACTTTGTATGA
CCAGAAATGAACTGTGTCAAGTATAAGGTTTTTCAGCAGG
AGTTACACTGGGAGCCTGAGGTCCTCACCTTCCTCTCAGT
AACTACAGAGAGGACGTTTCCCTGTTTAGGGAAAGAAAAA
ACATCTTCAGATCATAGGTCCTAAAAATACGGGCAAGCTC
TTAACTATTTAAAAATGAAATTACAGGCCCGGGCACGGTG
GCTCACACCTGTAATCCCAGCACTTTGGGAGGCTGAGGCA
GGCAGATCATGAGGTCAAGAGATCGAGACCAGCCTGGCCA
ACGTGGTGAAACCCCATCTCTACTAAAAATACAAAAATTA
GCCGGGTGTGGTGGCGCGCGCCTGTTGTCTTAGCTACTCA
GGAGGCTGAGGCAGGAGAATCGCTTGAAAACAGGAGGTGG
AGGTTGCAGTGAGCCGAGATCACGCCACTGCACTCCAGCC
TGGTGACAGCGTGAGACTCTTTAAAAAAGAAATTAAAAG
AGTTGAGACAAACGTTTCCTACATTCTTTTCCATGTGTAA
AATCATGAAAAAGCCTGTCACCGGACTTGCATTGGATGAG
ATGAGTCAGACCAAAACAGTGGCCACCCGTCTTCCTCCTG
TGAGCCTAAGTGCAGCCGTGCTAGCTGCGCACCGTGGCTA
AGGATGACGTCTGTGTTCCTGTCCATCACTGATGCTGCTG
GCTACTGCATGTGCCACACCTGTCTGTTCGCCATTCCTAA
CATTCTGTTTCATTCTTCCTCGGGAGATATTTCAAACATT
TGGTCTTTTCTTTTAACACTGAGGGTAGGCCCTTAGGAAA
TTTATTTAGGAAAGTCTGAACACGTTATCACTTGGTTTTC
TGGAAAGTAGCTTACCCTAGAAAACAGCTGCAAATGCCAG
AAAGATGATCCCTAAAAATGTTGAGGGACTTCTGTTCATT
CATCCCGAGAACATTGGCTTCCACATCACAGTATCTACCC
TTACATGGTTTAGGATTAAAGCCAGGCAATCTTTTACTAT
GCATTAAGACCTCTGATTCAAAACTTATTAGAACAGTAGC
TTCTGCTGGAATTTGCAATCACTGAAGTCATAGAAAATAG
GTAACTATCTAATTAGAGAAATAATTGTTGTATTTTAAGA
TCTGAGAGTGTGTACAAGTTTTAGTATACATGCCATGCCA
GAAGATAGTGTATGCAAGAAGTCTTGGGACCAGAAAATGG
CAATGATAGGAGACTGACATAGAAGAAGAATGCTTCCCTA
GGAAAAAGGTCGCTGGCTTTGGTGCAAGAGGAAGAAGAAT
GTTCCACTGGAAGCCTGAGCACCTAATCAGCTCTCAGTGA
TCAACCCACTCTTGTTATGGGTGGTCTCTGTCACTTTGAA
TGCCAGGCTGGCTTCTCGTCTAGCAGTATTCAGATACCCC
TTCTGCTCAGCCTGCTTGGCGTTAAAATACAAATCATTGA
ACTGAGGGGAAAAATGTAACTAGGAAGAAAAACCCAATT
TAAGAAATTACATAATGCTTTCCAAAGGCACCTACAACTT
AGTTTTAAATTACTTGCTACTGGGGATTACCCATGGATAT
CCTTAATAGGCAGGAAGTCTGGGAATTCTGGTGGCCTCTA
GGGCAGTGTTCTCACAGCACCGTTCCGACAGGGACCAGTG
AAAGAAAAGAGACAAAGTTAGAACGTGCTGGGGAGCGGCC
ATTTCTAAGGCCAGTCTGGTTTAAGTAGTCATTTCTGCTG
AAAAAACAGATGATCCTGGTGGAAGAAAAGGTTGAAGGCA
GCTGCCCTCGGGAGGGCTGTGATGCTCGGCACATCCTGCC
TGGCACATACACGTGTCTGCAGGCCACACCGTGCATGTCC
CCAGACCTGCCGCCTGGCTTCTGGAGTGCTTCAAGCAGAG
CATGGTGGGTCATTGAGGAGACCCAGGAATCTCATCTGAG
AACCCACTCTCTGCCGGAGAACCCCATGGTGACACATTTT
CATCTTTCTGACCAGAGGCTGTTTTTTTTTTTTTTGAGA
CAGTCTCATTCTGTTGCCCAGGCTGGAGTGCAGTGGCTTG
ATCTCGGCTCACTGCAACCTCGCCTCCCGGGTTCAAGCAA
```

TTCTCTGCCGCAGCCTCCAGAGTAGCTGGGATAACAGGTG

CCCACCACCACACCCCACTAATTTTTGTATTTGTATTTTT

AGTAGAGATGGGGTTTCACCATGTTGGTCAGGCTGGTCTT

GGACTCCTGACCTCATGCTCCACCCGCTTCGGCCTCCCAA

AGTTCTGGGATTACAGGTGTGAGCCACCGTGCACGGCCGG

CCTGACCTTTGGAAAAGCCTTGTCACTTTGGACGTTTGCG

TCTTTGAAGAGGCGATGGGAGCATATCATGACTGCCTGCC

ACCATTGCTTTTCAGACTACCACAACTCAATCATGCTGTC

CAGGACTTCTGGCCCTGTGTTCACCACTGGGAAAACGTAC

TTCAGACTGGATAGCCTAAAAAGGAGCAATGCCCTTGTAG

GATGTGGAGAAGGGAAAATACGGACATTAACATTAAAAGA

CACCAGTGAAATTGTTAGGTCTCTAGGAAGTTGGAGCACA

AGGCTTCACGCTTTAAGACCATCTGTGGTTTTCAGTGAAC

AAGCGCTGAGCACCAGCAGCAGAAAACAACAACAAAAAAA

CACCTCGTTTTTACCTTGTCTTCTAGACATGAAAAGGCAG

TTGCATTCCACTCTGCATTATGTTCTACATGTTGCTTTAT

CAGTATATGCTTAGCTGTAAGTGACAAGTATTTTTTCTGA

ACAGAAGTTTACTTAGAAATACCATGCACTTGGGGGTACC

AATTAACCGCCTGAAAATTAGCATATTGATAGTTCTTAGA

GAGACCAGATATAATCTAAGAATTTATATGAAAGATTTGT

ATCATTAGAGCCAGAAATAATTTTATATTAATATATAATA

CAGATTAACATTATATATAATATGTACCTGTGTCACTTCT

GACATGAGCCTGTAAACATATATTCATATATGTACCTGCA

CATGTACCCACCTGATGTAGGTCTTATTCCTTTAGTATGG

ACTTAAAGTACTTATTCATATACCTTGTAACTAAAAATTA

GAACAGCTCCCTAGAATTGTGAACTTTTAAGAGTCTGACT

AGAAATTTGCAACTTATAAAAAAGTTACTTTTAAAAATAT

AAGTTAGGGCTAGGCACAGTGGCTCATGCCTATAATCTCA

GCACTTTTGGGAGGCCAAGACAGGAGGATCACTTCAGGCC

AGGAGTTCAAGATCAACCAACCTGGGTAACATGGCCAGAC

CCCATCTCTATTTATATATATATATATAAAACTTAGAGTT

TTTATCTTCCCCTAAAAGAGGCCGTGATATTTGCAGCAGC

CTCAAATTGCTCTTAAGGGGTTTAGGTGTGCAGAAGCTTT

CCTTTCCCTACCCAGTAACCATGTGACTACTAACGTGGTA

TATTGATTATTTTGTTTGCTGTCTGTCTCCCCTGCCCCA

CTGCTGGAACAGAGGCTCCAAGAAAACAGGGACCTTATTA

TTCATTACTGCATCCCAGTAATGAAAGTACTTAGAAAAT

AATTATTGAATGAATGAAATCTAAACTGTGAACCTGAGGG

TGTTTGTGGCAGTGTTTGTTTTACTGAATTGTAGAAGGAC

ATAACCGTGTTTTCAGTGTTTCTATGGAACAAACTTGTAC

ATTTTATTTCACTTGTGTTTTGTCTTAAACCCTACTGCTG

GAAACAATTTTATGTAATAAGCAATGGGCCCAAAAGTCTA

GGAGTTTTTTTGTACTTAGTGAATTTGTATGCAACAGAGA

TGCTGCAGCTGATGCCTTTAAAAGGTATTCATCATGGAAG

AGCTGAGGCCTGTGCTTGGTGTTCCAGAGCCCAGGGTTGA

GCATCCTGAAGGAGCCACTGCAGCCGTCACTGTCCCCAGA

GCCTGTGGAGATAGAGCCTGTTTGCTGCTTTTTCTTCCCG

CTCTTAAGACATGGCTGGAGCTCAGTCTTCATTGAATGAA

GTTTGCTGTGGTATTGCATAGCCTTGCTTTCTTGAACTAA

ACTGTTTGCCCTTCACAAGTAGTTCTTCTTTCAGGATTAG

TTCGTTCCAAGGAGGCTCTTCAGTCTCACAGATAAGTAGA

TCTCTCCTGCTGTCTGGACACATTTCACTCGGAAATTGAA

TACAATTTGTATTCAGGCTGGGAACCTGAACACACACTTG

TGTTTTTAAGCTTCCCTTTTTTACAGTGGACAAGGACACA

AATAATAAATAAATCATCCCTAATGCCCAAGAAATGCCCT

GGTACTTAGTAATAACAAAATACCAGTAACTTCCA

The IFNAR1polypeptide is assigned NCBI Ref Seq. NP_000620.2 (SEQ ID No. 15):
MMVVLLGATTLVLVAVAPWVLSAAAGGKNLKSPQKVEVDI

IDDNFILRWNRSDESVGNVTFSFDYQKTGMDNWIKLSGCQ

NITSTKCNFSSLKLNVYEEIKLRIRAEKENTSSWYEVDSF

TPFRKAQIGPPEVHLEAEDKAIVIHISPGTKDSVMWALDG

LSFTYSLVIWKNSSGVEERIENIYSRHKIYKLSPETTYCL

KVKAALLTSWKIGVYSPVHCIKTTVENELPPPENTEVSVQ

NQNYVLKWDYTYANMTFQVQWLHAFLKRNPGNHLYKWKQI

PDCENVKTTQCVFPQNVFQKGIYLLRVQASDGNNTSFWSE

EIKFDTEIQAFLLPPVFNIRSLSDSFHIYIGAPKQSGNTP

VIQDYPLIYEIIFWENTSNAERKIIEKKTDVTVPNLKPLT

VYCVKARAHTMDEKLNKSSVFSDAVCEKTKPGNTSKIWLI

VGICIALFALPFVIYAAKVFLRCINYVFFPSLKPSSSIDE

YFSEQPLKNLLLSTSEEQIEKCFIIENISTIATVEETNQT

DEDHKKYSSQTSQDSGNYSNEDESESKTSEELQQDFV

In some embodiments, the GMCSF nucleic acid includes the following nucleic acid sequence CCDS4150.1(SEQ ID No. 16):
ATGTGGCTGCAGAGCCTGCTGCTCTTGGGCACTGTGGCCT

GCAGCATCTCTGCACCCGCCCGCTCGCCCAGCCCCAGCAC

GCAGCCCTGGGAGCATGTGAATGCCATCCAGGAGGCCCGG

CGTCTCCTGAACCTGAGTAGAGACACTGCTGCTGAGATGA

ATGAAACAGTAGAAGTCATCTCAGAAATGTTTGACCTCCA

GGAGCCGACCTGCCTACAGACCCGCCTGGAGCTGTACAAG

CAGGGCCTGCGGGGCAGCCTCACCAAGCTCAAGGGCCCCT

TGACCATGATGGCCAGCCACTACAAGCAGCACTGCCCTCC

-continued
AACCCCGGAAACTTCCTGTGCAACCCAGATTATCACCTTT

GAAAGTTTCAAAGAGAACCTGAAGGACTTTCTGCTTGTCA

TCCCCTTTGACTGCTGGGAGCCAGTCCAGGAGTGA

In some embodiments, the GMCSF mRNA sequence includes the following sequence NM_000758.4 (SEQ ID No. 17):
AGTACACAGAGAGAAAGGCTAAAGTTCTCTGGAGGATGTG

GCTGCAGAGCCTGCTGCTCTTGGGCACTGTGGCCTGCAGC

ATCTCTGCACCCGCCCGCTCGCCCAGCCCCAGCACGCAGC

CCTGGGAGCATGTGAATGCCATCCAGGAGGCCCGGCGTCT

CCTGAACCTGAGTAGAGACACTGCTGCTGAGATGAATGAA

ACAGTAGAAGTCATCTCAGAAATGTTTGACCTCCAGGAGC

CGACCTGCCTACAGACCCGCCTGGAGCTGTACAAGCAGGG

CCTGCGGGGCAGCCTCACCAAGCTCAAGGGCCCCTTGACC

ATGATGGCCAGCCACTACAAGCAGCACTGCCCTCCAACCC

CGGAAACTTCCTGTGCAACCCAGATTATCACCTTTGAAAG

TTTCAAAGAGAACCTGAAGGACTTTCTGCTTGTCATCCCC

TTTGACTGCTGGGAGCCAGTCCAGGAGTGAGACCGGCCAG

ATGAGGCTGGCCAAGCCGGGGAGCTGCTCTCTCATGAAAC

AAGAGCTAGAAACTCAGGATGGTCATCTTGGAGGGACCAA

GGGGTGGGCCACAGCCATGGTGGGAGTGGCCTGGACCTGC

CCTGGGCCACACTGACCCTGATACAGGCATGGCAGAAGAA

TGGGAATATTTTATACTGACAGAAATCAGTAATATTTATA

TATTTATATTTTTAAAATATTTATTTATTTATTTATTTAA

GTTCATATTCCATATTTATTCAAGATGTTTTACCGTAATA

ATTATTATTAAAAATATGCTTCTACTTG

In some embodiments, the GMCSF polypeptide includes the following amino acid sequence NP_000749.2 (SEQ ID No. 18):
MWLQSLLLLGTVACSISAPARSPSPSTQPWEHVNAIQEAR

RLLNLSRDTAAEMNETVEVISEMFDLQEPTCLQTRLELYK

QGLRGSLTKLKGPLTMMASHYKQHCPPTPETSCATQIITF

ESFKENLKDFLLVIPFDCWEPVQE

In some embodiments, the TK polypeptide includes the following amino acid sequence YP 009137097.1 (SEQ ID No. 19):
MASYPCHQHASAFDQAARSRGHNNRRTALRPRRQQKATEV

RLEQKMPTLLRVYIDGPHGMGKTTTTQLLVALGSRDDIVY

VPEPMTYWRVLGASETIANIYTTQHRLDQGEISAGDAAVV

MTSAQITMGMPYAVTDAVLAPHIGGEAGSSHAPPPALTLI

FDRHPTAALLCYPAARYLMGSMTPQAVLAFVALIPPTLPG

TNIVLGALPEDRHIDRLAKRQRPGERLDLAMLAAIRRVYG

LLANTVRYLQGGGSWREDWGQLSGAAVPPQGAEPQSNAGP

RPHIGDTLFTLFRAPELLAPNGDLYNVFAWALDVLAKRLR

PMHVFILDYDQSPAGCRDALLQLTSGMVQTHVTTPGSIPT

ICDLARTFAREMGEAN

In some embodiments, the CASP9 nucleic acid includes the following nucleic acid sequence CCD559995.1 (SEQ ID No. 20):
ATGGACGAAGCGGATCGGCGGCTCCTGCGGCGGTGCCGGC

TGCGGCTGGTGGAAGAGCTGCAGGTGGACCAGCTCTGGGA

CGCCCTGCTGAGCCGCGAGCTGTTCAGGCCCCATATGATC

GAGGACATCCAGCGGGCAGGCTCTGGATCTCGGCGGGATC

AGGCCAGGCAGCTGATCATAGATCTGGAGACTCGAGGGAG

TCAGGCTCTTCCTTTGTTCATCTCCTGCTTAGAGGACACA

GGCCAGGACATGCTGGCTTCGTTTCTGCGAACTAACAGGC

AAGCAGCAAAGTTGTCGAAGCCAACCCTAGAAAACCTTAC

CCCAGTGGTGCTCAGACCAGAGATTCGCAAACCAGAGGTT

CTCAGACCGGAAACACCCAGACCAGTGGACATTGGTTCTG

GAGGATTTGGTGATGTCGAGCAGAAAGACCATGGGTTTGA

GGTGGCCTCCACTTCCCCTGAAGACGAGTCCCCTGGCAGT

AACCCCGAGCCAGATGCCACCCCGTTCCAGGAAGGTTTGA

GGACCTTCGACCAGCTGGACGCCATATCTAGTTTGCCCAC

ACCCAGTGACATCTTTGTGTCCTACTCTACTTTCCCAGGT

TTTGTTTCCTGGAGGGACCCCAAGAGTGGCTCCTGGTACG

TTGAGACCCTGGACGACATCTTTGAGCAGTGGGCTCACTC

TGAAGACCTGCAGTCCCTCCTGCTTAGGGTCGCTAATGCT

GTTTCGGTGAAAGGGATTTATAAACAGATGCCTGGTTGCT

TTAATTTCCTCCGGAAAAAACTTTTCTTTAAAACATCATA

A

In some embodiments, the CASP9 mRNA sequence includes the following sequence NM_001229.5 (SEQ ID No. 21):
AGTTGGCTACTCGCCATGGACGAAGCGGATCGGCGGCTCC

TGCGGCGGTGCCGGCTGCGGCTGGTGGAAGAGCTGCAGGT

GGACCAGCTCTGGGACGCCCTGCTGAGCCGCGAGCTGTTC

AGGCCCCATATGATCGAGGACATCCAGCGGGCAGGCTCTG

GATCTCGGCGGGATCAGGCCAGGCAGCTGATCATAGATCT

GGAGACTCGAGGGAGTCAGGCTCTTCCTTTGTTCATCTCC

TGCTTAGAGGACACAGGCCAGGACATGCTGGCTTCGTTTC

TGCGAACTAACAGGCAAGCAGCAAAGTTGTCGAAGCCAAC

CCTAGAAAACCTTACCCCAGTGGTGCTCAGACCAGAGATT

CGCAAACCAGAGGTTCTCAGACCGGAAACACCCAGACCAG

TGGACATTGGTTCTGGAGGATTTGGTGATGTCGGTGCTCT

TGAGAGTTTGAGGGGAAATGCAGATTTGGCTTACATCCTG

AGCATGGAGCCCTGTGGCCACTGCCTCATTATCAACAATG

TGAACTTCTGCCGTGAGTCCGGGCTCCGCACCCGCACTGG

-continued
```
CTCCAACATCGACTGTGAGAAGTTGCGGCGTCGCTTCTCC
TCGCTGCATTTCATGGTGGAGGTGAAGGGCGACCTGACTG
CCAAGAAAATGGTGCTGGCTTTGCTGGAGCTGGCGCAGCA
GGACCACGGTGCTCTGGACTGCTGCGTGGTGGTCATTCTC
TCTCACGGCTGTCAGGCCAGCCACCTGCAGTTCCCAGGGG
CTGTCTACGGCACAGATGGATGCCCTGTGTCGGTCGAGAA
GATTGTGAACATCTTCAATGGGACCAGCTGCCCCAGCCTG
GGAGGGAAGCCCAAGCTCTTTTTCATCCAGGCCTGTGGTG
GGGAGCAGAAAGACCATGGGTTTGAGGTGGCCTCCACTTC
CCCTGAAGACGAGTCCCCTGGCAGTAACCCCGAGCCAGAT
GCCACCCCGTTCCAGGAAGGTTTGAGGACCTTCGACCAGC
TGGACGCCATATCTAGTTTGCCCACACCCAGTGACATCTT
TGTGTCCTACTCTACTTTCCCAGGTTTTGTTTCCTGGAGG
GACCCCAAGAGTGGCTCCTGGTACGTTGAGACCCTGGACG
ACATCTTTGAGCAGTGGGCTCACTCTGAAGACCTGCAGTC
CCTCCTGCTTAGGGTCGCTAATGCTGTTTCGGTGAAAGGG
ATTTATAAACAGATGCCTGGTTGCTTTAATTTCCTCCGGA
AAAAACTTTTCTTTAAAACATCATAAGGCCAGGGCCCCTC
ACCCTGCCTTATCTTGCACCCCAAAGCTTTCCTGCCCCAG
GCCTGAAAGAGGCTGAGGCCTGGACTTTCCTGCAACTCAA
GGACTTTGCAGCCGGCACAGGGTCTGCTCTTTCTCTGCCA
GTGACAGACAGGCTCTTAGCAGCTTCCAGATTGACGACAA
GTGCTGAACAGTGGAGGAAGAGGGACAGATGAATGCCGTG
GATTGCACGTGGCCTCTTGAGCAGTGGCTGGTCCAGGGCT
AGTGACTTGTGTCCCATGATCCCTGTGTTGTCTCTAGAGC
AGGGATTAACCTCTGCACTACTGACATGTGGGGCCAGGTC
ACCCTTGCTGTGAGGCTGTCCTGTACATTGTGGGATGTT
CAGCACTGTCCCTTGCCTCAATGCCAGTAACGCGTCTTCC
TGAGTGGTGCCAAACAAAAGGTTCTCAGGTGTTGCCAAA
TATGTCCTGGGGTATAAAACTTTCCTCGCCTGACAACCAC
TGGTCTGTAGGGATTTTTGGCTACACACAAACCAGTATCG
CTCATAGATCAGCAAACCGGGGCCTACTAGAGTCTGAACA
GCTGTAATCTATGAATTCTAAGTGAAATTTTAAAAATTGT
TAATTTTCCTATATTGCATTAATTTTAAAAAATAAATCT
GAGGCAAATATGGACTCTCTTTTGCCTATTTCTTCCCTCA
TTTTGCTCCAACTCTTTCTTCTTCCTTACAAAAGAGACTT
TTGCTTTTTTCGAAACATTTCCCCATGTTTTTCTGGGGTC
TCGCTATGTTGCCCAGGCTGGTCTCAAACTCCTGGGCTCA
AGTGACCCTCCCAAGTAGCTCTTACTACAGGCGTGCACCA
TTGCACCCAGCCCCATTTATTCATGTCTTATTTCACTTGA
TCCTTATCCCATCCCAGGAAGGCAACAAGGGTGAGAACCC
TGTGCTCAGGGAGGTTAGGTCTCTTGTCCAAGGGAAAACG
ATTATCCAGAGAAGAGACCTGGCCAGAACCTGGGTCCCCT
GAGTCCTAGCCATGCTTCCCATGTGCCTTACTTGCTGAAG
CACCCCCGGACTGCAGTGTGAACGTGCTGTGCAATAGTGA
CACGCTGGGCTTCCCCACAAGGCTCCACCCTGAGGTCTTT
TAAGCTGTCCTTATGCCAGCCTATTTCTTGTTTTTGGGC
CTTTTTTTTTGGAGATAGGGTCTCACTCTGTCGCCCAGGC
TGGAGTGCAATGACGCAATCTTGGCTTATTGCAGTCTCGA
CCTCCTGGGCTCAAGAGATCCTTCCACCTCAGCCACCTGA
GTAGCTTGGACTACAGGTGTGCACCACCTCTCCCAGTTAA
TTTTTGTATTTTTAGTAGAGACAGAGTTATGCCATGTTAC
TCAGGCTGGTCTTGAACTCCTGGACTCAAGCGATCAGCCT
GCCTTAGCCTCCCAAAGTGCAGGGGTTACAGGCTTGAGCC
ATTGCGCCTGACCTATTTCTGGTTCTTAGGGCCCTGGATG
TTAGGATGGATTTCTGAATTAATAATAATAATAAAACCCT
CATCAAGA
```
In some embodiments, the CASP9 polypeptide includes the following amino acid sequence NP_001220.2 (SEQ ID No. 22):
MDEADRRLLRRCRLRLVEELQVDQLWDALLSRELFRPHMI
EDIQRAGSGSRRDQARQLIIDLETRGSQALPLFISCLEDT
GQDMLASFLRTNRQAAKLSKPTLENLTPVVLRPEIRKPEV
LRPETPRPVDIGSGGFGDVGALESLRGNADLAYILSMEPC
GHCLIINNVNFCRESGLRTRTGSNIDCEKLRRRFSSLHFM
VEVKGDLTAKKMVLALLELAQQDHGALDCCVVVILSHGCQ
ASHLQFPGAVYGTDGCPVSVEKIVNIFNGTSCPSLGGKPK
LFFIQACGGEQKDHGFEVASTSPEDESPGSNPEPDATPFQ
EGLRTFDQLDAISSLPTPSDIFVSYSTFPGFVSWRDPKSG
SWYVETLDDIFEQWAHSEDLQSLLLRVANAVSVKGIYKQM
PGCFNFLRKKLFFKTS In some embodiments, the CASP9 polypeptide includes the following nucleotide sequence (SEQ ID No. 23):
```
TTTTGTGGCATGAGATGTGGCATGAAGGGCTGGAAGAAGC
ATCCCGCCTGTATTTCGGCGAACGAAATGTGAAGGGCATG
TTTGAGGTTCTCGAGCCGCTGCACGCGATGATGGAGAGGG
GACCTCAAACTCTGAAAGAGACCTCCTTCAATCAAGCTTA
TGGCCGGGATCTGATGGAGGCTCAGGAATGGTGCCGAAAA
TATATGAAGAGTGGAAACGTAAAAGACCTTCTGCAGGCCT
GGGATTTGTACTATCACGTTTTCCGACGAATCTCAAAGCT
TGAATACTCAGGTGGAGGCAGCTTGGAAGGTGTGCAAGTA
GAAACGATATCTCCAGGCGACGGTCGCACATTCCCTAAGA
GGGGGCAAACATGCGTGGTACACTATACAGGGATGCTTGA
```

AGATGGCAAAAAATTTGACTCTAGTAGGGACCGGAATAAA

CCCTTCAAGTTCATGCTCGGCAAACAAGAAGTTATAAGAG

GGTGGGAAGAAGGCGTCGCACAGATGTCAGTAGGGCAAAG

AGCAAAGCTCACTATATCTCCTGATTATGCATACGGAGCG

ACTGGCCACCCTGGCATAATACCACCGCACGCAACCCTGG

TATTTGATGTTGAGTTGTTGAAGTTGGAATCCGGCGGGGG

AGGGAGTGGGGGCGGAGGGTCTGGTGGTGGTGGATCAGGG

GTAGATGGTTTCGGGGATGTTGGGGCACTGGAGTCCTTGC

GCGGGAACGCTGACCTCGCATATATCTTGAGCATGGAGCC

TTGTGGTCATTGTCTCATTATAAATAATGTTAACTTTTGT

AGAGAAAGCGGTCTCCGAACGAGAACGGGTTCTAATATAG

ACTGCGAAAAGCTTAGGCGGAGATTTTCTAGTCTGCACTT

TATGGTTGAAGTCAAGGGAGATCTCACTGCCAAAAAAATG

GTGCTCGCGCTGCTGGAGCTCGCTCAACAGGATCATGGCG

CCCTCGACTGCTGCGTTGTGGTCATCCTCAGTCACGGATG

CCAGGCATCCCATCTCCAGTTCCCCGGTGCCGTCTATGGC

ACGGACGGGTGCCCTGTTTCAGTCGAGAAGATTGTAAACA

TTTTTAATGGTACGAGTTGTCCAAGCCTTGGGGGAAAGCC

GAAACTGTTTTTCATACAGGCATGCGGCGGGGAACAAAAA

GATCACGGGTTCGAAGTAGCTTCAACTTCCCCGGAGGATG

AATCTCCAGGAAGCAACCCCGAACCGGACGCGACACCTTT

TCAAGAGGGACTCCGAACATTCGACCAACTCGACGCAATA

AGTAGCCTGCCAACTCCGTCCGACATCTTTGTATCTTATT

CTACGTTTCCGGGTTTTGTCTCCTGGCGGGACCCCAAATC

AGGGAGTTGGTACGTAGAGACACTGGATGATATTTTCGAA

CAGTGGGCTCACTCTGAAGACCTTCAGTCCCTTTTGTTGA

GAGTCGCCAATGCGGTTTCAGTGAAAGGGATTTATAAACA

GATGCCTGGATGCTTCAATTTCCTCCGAAAGAAGCTTTTC

TTTAAAACATCTG

---

The invention claimed is:

1. A tumor cell engineered to express heterologous polypeptides including:
   (i) an IFN-β polypeptide;
   (ii) a Granulocyte-Macrophage Colony Stimulating Factor (GM-CSF) polypeptide; and
   (iii) a heterologous inducible cell suicide system;
   wherein the cell is further engineered to inactivate endogenous receptor for the IFN-β polypeptide.

2. The tumor cell of claim 1, which is a human tumor cell.

3. A method of treating cancer in an individual in need thereof, the method comprising administering a tumor cell of claim 1 to the individual.

4. The method of claim 3, wherein the tumor cell is autologous to the individual.

5. The method of claim 3, wherein the administering promotes apoptosis of cells of one or more tumors in the individual and promotes an anti-tumor immune response that either kills tumor cells, inhibits metastasis or both.

6. The method of claim 3, wherein the tumor cell is administered via implantation into a tumor resection cavity or via intratumoral injection.

7. The method of claim 3, wherein the tumor cell is a melanoma cell, a lung cancer cell, a breast cancer cell or a glioblastoma cell.

8. The method of claim 3, further comprising, after administering the tumor cell, the step of administering an inducer of the heterologous inducible cell suicide system, thereby killing the administered tumor cell.

9. The method of claim 3, wherein the administering promotes an anti-cancer vaccine effect that inhibits recurrence of the cancer.

10. A pharmaceutical composition comprising a tumor cell of claim 1.

* * * * *

SEQUENCE LISTING

<160> NUMBER OF SEQ ID NOS: 71

<210> SEQ ID NO 1
<211> LENGTH: 846
<212> TYPE: DNA
<213> ORGANISM: Homo sapiens

<400> SEQUENCE: 1
atggctatga tggaggtcca ggggggaccc agcctgggac agacctgcgt gctgatcgtg     60
atcttcacag tgctcctgca gtctctctgt gtggctgtaa cttacgtgta ctttaccaac    120
gagctgaagc agatgcagga caagtactcc aaaagtggca ttgcttgttt cttaaaagaa    180
gatgacagtt attgggaccc caatgacgaa gagagtatga acagccctg ctggcaagtc     240 aagtggcaac tccgtcagct cgttagaaag atgattttga gaacctctga ggaaaccatt    300
tctacagttc aagaaaagca acaaaatatt tctcccctag tgagagaaag aggtcctcag    360
agagtagcag ctcacataac tgggaccaga ggaagaagca acacattgtc ttctccaaac    420
tccaagaatg aaaaggctct gggccgcaaa ataaactcct gggaatcatc aaggagtggg    480
cattcattcc tgagcaactt gcacttgagg aatggtgaac tggtcatcca tgaaaaaggg    540
ttttactaca tctattccca acatacttt cgatttcagg aggaaataaa agaaaacaca    600
aagaacgaca acaaatggt ccaatatatt tacaaataca caagttatcc tgaccctata    660
ttgttgatga aaagtgctag aaatagttgt ggtctaaag atgcagaata tggactctat    720
tccatctatc aagggggaat atttgagctt aaggaaatg acagaatttt tgtttctgta    780
acaaatgagc acttgataga catggaccat gaagccagtt tttttgggc ctttttagtt    840 ggctaa                                                              846

<210> SEQ ID NO 2
<211> LENGTH: 1805
<212> TYPE: DNA
<213> ORGANISM: Homo sapiens

<400> SEQUENCE: 2

```
acagaaccca gaaaaacaac tcattcgctt tcatttcctc actgactata aagaataga    60
gaaggaaggg cttcagtgac cggctgcctg gctgacttac agcagtcaga ctctgacagg   120
atcatggcta tgatggaggt ccagggggga cccagcctgg acagacctg cgtgctgatc    180
gtgatcttca cagtgctcct gcagtctctc tgtgtggctg taacttacgt gtactttacc   240
aacgagctga agcagatgca ggacaagtac tccaaaagtg gcattgcttg tttcttaaaa   300
gaagatgaca gttattggga ccccaatgac gaagagagta tgaacagccc ctgctggcaa   360
gtcaagtggc aactccgtca gctcgttaga aagactccaa gaatgaaaag gctctgggcc   420
gcaaaataaa ctcctgggaa tcatcaagga gtgggcattc attcctgagc aacttgcact   480
tgaggaatgg tgaactggtc atccatgaaa aagggtttta ctacatctat tcccaaacat   540
actttcgatt tcaggaggaa ataaaagaaa cacaaagaa cgacaaacaa atggtccaat    600
atatttacaa atacacaagt tatcctgacc ctatattgtt gatgaaaagt gctagaaata   660
gttgttggtc taaagatgca gaatatggac tctattccat ctatcaaggg ggaatatttg   720
agcttaagga aaatgacaga attttttgttt ctgtaacaaa tgagcacttg atagacatgg   780
accatgaagc cagttttttt ggggccttt tagttggcta actgacctgg aaagaaaaag    840
caataacctc aaagtgacta ttcagtttc aggatgatac actatgaaga tgtttcaaaa    900
aatctgacca aacaaacaa acagaaaaca gaaaacaaaa aaacctctat gcaatctgag   960
tagagcagcc acaaccaaaa aattctacaa cacacactgt tctgaaagtg actcacttat  1020
cccaagagaa tgaaattgct gaaagatctt tcaggactct acctcatatc agtttgctag  1080
cagaaatcta gaagactgtc agcttccaaa cattaatgca atggttaaca tcttctgtct  1140
ttataatcta ctccttgtaa agactgtaga agaaagagca acaatccatc tctcaagtag  1200
tgtatcacag tagtagcctc caggtttcct aagggacaa catccttaag tcaaaagaga   1260
gaagaggcac cactaaaaga tcgcagtttg cctggtgcag tggctcacac ctgtaatccc  1320
aacattttgg gaacccaagg tgggtagatc acgagatcaa gagatcaaga ccatagtgac  1380
caacatagtg aaaccccatc tctactgaaa gtacaaaaat tagctgggtg tgttggcaca  1440
tgcctgtagt cccagctact tgagaggctg aggcaagaga attgtttgaa cccgggaggc  1500
agaggttgca gtgtggtgag atcatgccac tacactccag cctggcgaca gagcgagact  1560
tggtttcaaa aaaaaaaaaa aaaaaaactt cagtaagtac gtgttatttt tttcaataaa  1620
attctattac agtatgtcat gtttgctgta gtgctcatat ttattgttgt ttttgtttta  1680
gtactcactt gtttcataat atcaagatta ctaaaaatgg gggaaaagac ttctaatctt  1740
tttttcataa tatctttgac acatattaca gaagaaataa atttcttact tttaatttaa  1800
tatga                                                              1805
```

<210> SEQ ID NO 3
<211> LENGTH: 101
<212> TYPE: PRT
<213> ORGANISM: Homo sapiens

<400> SEQUENCE: 3

```
Met Ala Met Met Glu Val Gln Gly Gly Pro Ser Leu Gly Gln Thr Cys
1               5                   10                  15
Val Leu Ile Val Ile Phe Thr Val Leu Leu Gln Ser Leu Cys Val Ala
            20                  25                  30
```

```
Val Thr Tyr Val Tyr Phe Thr Asn Glu Leu Lys Gln Met Gln Asp Lys
         35                  40                  45

Tyr Ser Lys Ser Gly Ile Ala Cys Phe Leu Lys Glu Asp Asp Ser Tyr
 50                  55                  60

Trp Asp Pro Asn Asp Glu Glu Ser Met Asn Ser Pro Cys Trp Gln Val
 65                  70                  75                  80

Lys Trp Gln Leu Arg Gln Leu Val Arg Lys Thr Pro Arg Met Lys Arg
                 85                  90                  95

Leu Trp Ala Ala Lys
            100
```

<210> SEQ ID NO 4
<211> LENGTH: 1407
<212> TYPE: DNA
<213> ORGANISM: Homo sapiens

<400> SEQUENCE: 4

| | | | | | |
|---|---|---|---|---|---|
| atggcgccac | caccagctag | agtacatcta | ggtgcgttcc | tggcagtgac | tccgaatccc | 60 |
| gggagcgcag | cgagtgggac | agaggcagcc | gcggccacac | ccagcaaagt | gtggggctct | 120 |
| tccgcgggga | ggattgaacc | acgaggcggg | ggccgaggac | cgctccctac | ctccatggga | 180 |
| cagcacggac | ccagtgcccg | ggcccgggca | gggcgcgccc | caggacccag | gccggcgcgg | 240 |
| gaagccagcc | ctcggctccg | ggtccacaag | accttcaagt | tgtcgtcgt | cggggtcctg | 300 |
| ctgcaggtcg | tacctagctc | agctgcaacc | atcaaacttc | atgatcaatc | aattggcaca | 360 |
| cagcaatggg | aacatagccc | tttgggagag | ttgtgtccac | caggatctca | tagatcagaa | 420 |
| catcctggag | cctgtaaccg | tgcacagag | ggtgtgggtt | acaccaatgc | ttccaacaat | 480 |
| ttgtttgctt | gcctcccatg | tacagcttgt | aaatcagatg | aagaagagag | aagtccctgc | 540 |
| accacgacca | ggaacacagc | atgtcagtgc | aaaccaggaa | ctttccggaa | tgacaattct | 600 |
| gctgagatgt | gccggaagtg | cagcagaggg | tgccccagag | ggatggtcaa | ggtcaaggat | 660 |
| tgtacgccct | ggagtgacat | cgagtgtgtc | cacaaagaat | caggcaatgg | acataatata | 720 |
| tgggtgattt | tggttgtgac | tttggttgtt | ccgttgctgt | tggtggctgt | gctgattgtc | 780 |
| tgttgttgca | tcggctcagg | ttgtggaggg | accccaagt | gcatggacag | ggtgtgtttc | 840 |
| tggcgcttgg | gtctcctacg | agggcctggg | gctgaggaca | atgctcacaa | cgagattctg | 900 |
| agcaacgcag | actcgctgtc | cactttcgtc | tctgagcagc | aaatggaaag | ccaggagccg | 960 |
| gcagatttga | caggtgtcac | tgtacagtcc | ccaggggagg | cacagtgtct | gctgggaccg | 1020 |
| gcagaagctg | aagggtctca | gaggaggagg | ctgctggttc | cagcaaatgg | tgctgacccc | 1080 |
| actgagactc | tgatgctgtt | cttttgacaag | tttgcaaaca | tcgtgccctt | tgactcctgg | 1140 |
| gaccagctca | tgaggcagct | ggacctcacg | aaaaatgaga | tcgatgtggt | cagagctggt | 1200 |
| acagcaggcc | caggggatgc | cttgtatgca | atgctgatga | aatgggtcaa | caaaactgga | 1260 |
| cggaacgcct | cgatccacac | cctgctggat | gccttggaga | ggatggaaga | gagacatgca | 1320 |
| agagagaaga | ttcaggacct | cttggtggac | tctggaaagt | tcatctactt | agaagatggc | 1380 |
| acaggctctg | ccgtgtcctt | ggagtga |  |  |  | 1407 |

<210> SEQ ID NO 5
<211> LENGTH: 1764
<212> TYPE: DNA
<213> ORGANISM: Homo sapiens

<400> SEQUENCE: 5

```
gcaggtgccc cgaaaagggg gcggggtcag gggtgccctg aactccgaat gcgaagttct    60
gtcttgtcat agccaagcac gctgcttctt ggattgacct ggcaggatgg cgccaccacc   120
agctagagta catctaggtg cgttcctggc agtgactccg aatcccggga gcgcagcgag   180
tgggacagag gcagccgcgg ccacacccag caaagtgtgg ggctcttccg cggggaggat   240
tgaaccacga ggcggggggcc gaggagcgct ccctacctcc atgggacagc acggacccag   300
tgcccgggcc cgggcagggc gcgcccagg acccaggccg gcgcgggaag ccagccctcg   360
gctccgggtc cacaagacct tcaagtttgt cgtcgtcggg gtcctgctgc aggtcgtacc   420
tagctcagct gcaaccatca aacttcatga tcaatcaatt ggcacacagc aatgggaaca   480
tagcccttttg ggagagttgt gtccaccagg atctcataga tcagaacatc ctggagcctg   540
taaccggtgc acagagggtg tgggttacac caatgcttcc aacaatttgt ttgcttgcct   600
cccatgtaca gcttgtaaat cagatgaaga agagagaagt ccctgcacca cgaccaggaa   660
cacagcatgt cagtgcaaac caggaacttt ccggaatgac aattctgctg agatgtgccg   720
gaagtgcagc agagggtgcc ccagagggat ggtcaaggtc aaggattgta cgccctggag   780
tgacatcgag tgtgtccaca agaatcagg caatggacat aatatatggg tgattttggt   840
tgtgactttg gttgttccgt tgctgttggt ggctgtgctg attgtctgtt gttgcatcgg   900
ctcaggttgt ggaggggacc ccaagtgcat ggacagggtg tgtttctggc gcttgggtct   960
cctacgaggg cctgggggctg aggacaatgc tcacaacgag attctgagca acgcagactc  1020
gctgtccact ttcgtctctg agcagcaaat ggaaagccag gagccggcag atttgacagg  1080
tgtcactgta cagtccccag gggaggcaca gtgtctgctg gaccggcag aagctgaagg  1140
gtctcagagg aggaggctgc tggttccagc aaatggtgct gaccccactg agactctgat  1200
gctgttcttt gacaagtttg caaacatcgt gcccttttgac tcctgggacc agctcatgag  1260
gcagctggac ctcacgaaaa atgagatcga tgtggtcaga gctggtacag caggcccagg  1320
ggatgccttg tatgcaatgc tgatgaaatg ggtcaacaaa actggacgga acgcctcgat  1380
ccacaccctg ctggatgcct tggagaggat ggaagagaga catgcaagag agaagattca  1440
ggacctcttg gtggactctg gaaagttcat ctacttagaa gatggcacag gctctgccgt  1500
gtccttggag tgaaagactc ttttaccag aggtttcctc ttaggtgtta ggagttaata  1560
catattaggt tttttttttt tttaacatgt atacaaagta aattcttagc caggtgtagt  1620
ggctcatgcc tgtaatccca gcactttggg aggctgaggc gggtggatca cttgaggtca  1680
gaagttcaag accagcctga ccaacatcgt gaaatgccgt ctttacaaaa aaatacaaaa  1740
attaactgga aaaaaaaaaa aaaa                                          1764
```

<210> SEQ ID NO 6
<211> LENGTH: 468
<212> TYPE: PRT
<213> ORGANISM: Homo sapiens

<400> SEQUENCE: 6

Met Ala Pro Pro Ala Arg Val His Leu Gly Ala Phe Leu Ala Val
1               5                   10                  15

Thr Pro Asn Pro Gly Ser Ala Ala Ser Gly Thr Glu Ala Ala Ala
                20                  25                  30

Thr Pro Ser Lys Val Trp Gly Ser Ala Gly Arg Ile Glu Pro Arg
            35                  40                  45

```
Gly Gly Gly Arg Gly Ala Leu Pro Thr Ser Met Gly Gln His Gly Pro
         50                  55                  60

Ser Ala Arg Ala Arg Ala Gly Arg Ala Pro Gly Pro Arg Pro Ala Arg
 65                  70                  75                  80

Glu Ala Ser Pro Arg Leu Arg Val His Lys Thr Phe Lys Phe Val Val
                     85                  90                  95

Val Gly Val Leu Leu Gln Val Val Pro Ser Ala Ala Thr Ile Lys
                100                 105                 110

Leu His Asp Gln Ser Ile Gly Thr Gln Gln Trp Glu His Ser Pro Leu
            115                 120                 125

Gly Glu Leu Cys Pro Pro Gly Ser His Arg Ser Glu His Pro Gly Ala
        130                 135                 140

Cys Asn Arg Cys Thr Glu Gly Val Gly Tyr Thr Asn Ala Ser Asn Asn
145                 150                 155                 160

Leu Phe Ala Cys Leu Pro Cys Thr Ala Cys Lys Ser Asp Glu Glu Glu
                165                 170                 175

Arg Ser Pro Cys Thr Thr Thr Arg Asn Thr Ala Cys Gln Cys Lys Pro
            180                 185                 190

Gly Thr Phe Arg Asn Asp Asn Ser Ala Glu Met Cys Arg Lys Cys Ser
        195                 200                 205

Arg Gly Cys Pro Arg Gly Met Val Lys Val Lys Asp Cys Thr Pro Trp
    210                 215                 220

Ser Asp Ile Glu Cys Val His Lys Glu Ser Gly Asn Gly His Asn Ile
225                 230                 235                 240

Trp Val Ile Leu Val Val Thr Leu Val Val Pro Leu Leu Leu Val Ala
                245                 250                 255

Val Leu Ile Val Cys Cys Cys Ile Gly Ser Gly Cys Gly Gly Asp Pro
                260                 265                 270

Lys Cys Met Asp Arg Val Cys Phe Trp Arg Leu Gly Leu Leu Arg Gly
            275                 280                 285

Pro Gly Ala Glu Asp Asn Ala His Asn Glu Ile Leu Ser Asn Ala Asp
        290                 295                 300

Ser Leu Ser Thr Phe Val Ser Glu Gln Gln Met Glu Ser Gln Glu Pro
305                 310                 315                 320

Ala Asp Leu Thr Gly Val Thr Val Gln Ser Pro Gly Glu Ala Gln Cys
                325                 330                 335

Leu Leu Gly Pro Ala Glu Ala Glu Gly Ser Gln Arg Arg Arg Leu Leu
            340                 345                 350

Val Pro Ala Asn Gly Ala Asp Pro Thr Glu Thr Leu Met Leu Phe Phe
        355                 360                 365

Asp Lys Phe Ala Asn Ile Val Pro Phe Asp Ser Trp Asp Gln Leu Met
    370                 375                 380

Arg Gln Leu Asp Leu Thr Lys Asn Glu Ile Asp Val Val Arg Ala Gly
385                 390                 395                 400

Thr Ala Gly Pro Gly Asp Ala Leu Tyr Ala Met Leu Met Lys Trp Val
                405                 410                 415

Asn Lys Thr Gly Arg Asn Ala Ser Ile His Thr Leu Leu Asp Ala Leu
            420                 425                 430

Glu Arg Met Glu Glu Arg His Ala Arg Glu Lys Ile Gln Asp Leu Leu
        435                 440                 445

Val Asp Ser Gly Lys Phe Ile Tyr Leu Glu Asp Gly Thr Gly Ser Ala
    450                 455                 460
```

Val Ser Leu Glu
465

<210> SEQ ID NO 7
<211> LENGTH: 1323
<212> TYPE: DNA
<213> ORGANISM: Homo sapiens

<400> SEQUENCE: 7

| | | | | | |
|---|---|---|---|---|---|
| atggaacaac | ggggacagaa | cgccccggcc | gcttcggggg | cccggaaaag | gcacggccca | 60 |
| ggacccaggg | aggcgcgggg | agccaggcct | gggccccggg | tccccaagac | ccttgtgctc | 120 |
| gttgtcgccg | cggtcctgct | gttggtctca | gctgagtctg | ctctgatcac | ccaacaagac | 180 |
| ctagctcccc | agcagagagc | ggccccacaa | caaagaggt | ccagcccctc | agagggattg | 240 |
| tgtccacctg | gacaccatat | ctcagaagac | ggtagagatt | gcatctcctg | caaatatgga | 300 |
| caggactata | gcactcactg | gaatgacctc | cttttctgct | tgcgctgcac | caggtgtgat | 360 |
| tcaggtgaag | tggagctaag | tccctgcacc | acgaccagaa | acacagtgtg | tcagtgcgaa | 420 |
| gaaggcacct | tccgggaaga | agattctcct | gagatgtgcc | ggaagtgccg | cacagggtgt | 480 |
| cccagaggga | tggtcaaggt | cggtgattgt | acaccctgga | gtgacatcga | atgtgtccac | 540 |
| aaagaatcag | gtacaaagca | cagtggggaa | gtcccagctg | tggaggagac | ggtgacctcc | 600 |
| agcccaggga | ctcctgcctc | tccctgttct | ctctcaggca | tcatcatagg | agtcacagtt | 660 |
| gcagccgtag | tcttgattgt | ggctgtgttt | gtttgcaagt | ctttactgtg | aagaaagtc | 720 |
| cttccttacc | tgaaaggcat | ctgctcaggt | ggtggtgggg | accctgagcg | tgtggacaga | 780 |
| agctcacaac | gacctggggc | tgaggacaat | gtcctcaatg | agatcgtgag | tatcttgcag | 840 |
| cccacccagg | tccctgagca | ggaaatgaa | gtccaggagc | cagcagagcc | aacaggtgtc | 900 |
| aacatgttgt | ccccggggga | gtcagagcat | ctgctggaac | cggcagaagc | tgaaaggtct | 960 |
| cagaggagga | ggctgctggt | tccagcaaat | gaaggtgatc | ccactgagac | tctgagacag | 1020 |
| tgcttcgatg | actttgcaga | cttggtgccc | tttgactcct | gggagccgct | catgaggaag | 1080 |
| ttgggcctca | tggacaatga | gataaaggtg | gctaaagctg | aggcagcggg | ccacagggac | 1140 |
| accttgtaca | cgatgctgat | aaagtgggtc | aacaaaaccg | ggcgagatgc | ctctgtccac | 1200 |
| accctgctgg | atgccttgga | gacgctggga | gagagacttg | ccaagcagaa | gattgaggac | 1260 |
| cacttgttga | gctctggaaa | gttcatgtat | ctagaaggta | atgcagactc | tgccatgtcc | 1320 |
| taa | | | | | | 1323 |

<210> SEQ ID NO 8
<211> LENGTH: 3998
<212> TYPE: DNA
<213> ORGANISM: Homo sapiens

<400> SEQUENCE: 8

| | | | | | |
|---|---|---|---|---|---|
| agcctggaca | cataaatcag | cacgcggccg | gagaacccg | caatctctgc | gcccacaaaa | 60 |
| tacaccgacg | atgcccgatc | tactttaagg | gctgaaaccc | acgggcctga | gagactataa | 120 |
| gagcgttccc | taccgccatg | gaacaacggg | gacagaacgc | cccggccgct | tcggggccc | 180 |
| ggaaaaggca | cggcccagga | cccagggagg | cgcggggagc | caggcctggg | ccccgggtcc | 240 |
| ccaagaccct | tgtgctcgtt | gtcgccgcgg | tcctgctgtt | ggtctcagct | gagtctgctc | 300 |
| tgatcaccca | acaagaccta | gctccccagc | agagagcggc | cccacaacaa | agaggtcca | 360 |
| gccctcaga | gggattgtgt | ccacctggac | accatatctc | agaagacggt | agagattgca | 420 |

```
tctcctgcaa atatggacag gactatagca ctcactggaa tgacctcctt ttctgcttgc    480
gctgcaccag gtgtgattca ggtgaagtgg agctaagtcc ctgcaccacg accagaaaca    540
cagtgtgtca gtgcgaagaa ggcaccttcc gggaagaaga ttctcctgag atgtgccgga    600
agtgccgcac agggtgtccc agagggatgg tcaaggtcgg tgattgtaca ccctggagtg    660
acatcgaatg tgtccacaaa gaatcaggta caaagcacag tggggaagtc ccagctgtgg    720
aggagacggt gacctccagc ccagggactc ctgcctctcc ctgttctctc tcaggcatca    780
tcataggagt cacagttgca gccgtagtct tgattgtggc tgtgtttgtt tgcaagtctt    840
tactgtggaa gaaagtcctt ccttacctga aaggcatctg ctcaggtggt ggtggggacc    900
ctgagcgtgt ggacagaagc tcacaacgac ctggggctga ggacaatgtc tcaatgaga    960 tcgtgagtat cttgcagccc acccaggtcc ctgagcagga atggaagtc caggagccag    1020 cagagccaac aggtgtcaac atgttgtccc ccggggagtc agagcatctg ctggaaccgg    1080
cagaagctga aaggtctcag aggaggaggc tgctggttcc agcaaatgaa ggtgatccca    1140
ctgagactct gagacagtgc ttcgatgact ttgcagactt ggtgcccttt gactcctggg    1200
agccgctcat gaggaagttg ggcctcatgg acaatgagat aaaggtggct aaagctgagg    1260
cagcgggcca caggacacc ttgtacacga tgctgataaa gtgggtcaac aaaaccgggc    1320
gagatgcctc tgtccacacc ctgctggatg ccttggagac gctgggagag agacttgcca    1380
agcagaagat tgaggaccac ttgttgagct ctggaaagtt catgtatcta gaaggtaatg    1440
cagactctgc catgtcctaa gtgtgattct cttcaggaag tcagaccttc cctggtttac    1500 ctttttctg gaaaaagccc aactggactc cagtcagtag gaaagtgcca caattgtcac    1560
atgaccggta ctggaagaaa ctctcccatc caacatcacc cagtggatgg aacatcctgt    1620
aacttttcac tgcacttggc attatttta aagctgaat gtgataataa ggacactatg     1680
gaaatgtctg gatcattccg tttgtgcgta ctttgagatt tggtttggga tgtcattgtt    1740
ttcacagcac ttttttatcc taatgtaaat gctttattta tttatttggg ctacattgta    1800
agatccatct acacagtcgt tgtccgactt cacttgatac tatatgatat gaacctttt    1860 tgggtggggg gtgcgggca gttcactctg tctcccaggc tggagtgcaa tggtgcaatc    1920
ttggctcact atagccttga cctctcaggc tcaagcgatt ctcccacctc agccatccaa    1980
atagctggga ccacaggtgt gcaccaccac gcccggctaa tttttttgtat tttgtctaga   2040 tatagggct ctctatgttg ctcagggtgg tctcgaattc ctggactcaa gcagtctgcc    2100
cacctcagac tcccaaagcg gtggaattag aggcgtgagc ccccatgctt ggccttacct    2160
ttctactttt ataattctgt atgttattat tttatgaaca tgaagaaact ttagtaaatg    2220
tacttgttta catagttatg tgaatagatt agataaacat aaaaggagga gacatacaat    2280
gggggaagaa gaagaagtcc cctgtaagat gtcactgtct gggttccagc cctccctcag    2340
atgtactttg gcttcaatga ttggcaactt ctacagggc cagtcttttg aactggacaa     2400
ccttacaagt atatgagtat tatttatagg tagttgttta catatgagtc gggaccaaag    2460
agaactggat ccacgtgaag tcctgtgtgt ggctggtccc tacctgggca gtctcatttg    2520
cacccatagc ccccatctat ggacaggctg gacagagcc agatggggtta gatcacacat    2580 aacaataggg tctatgtcat atcccaagtg aacttgagcc ctgtttgggc tcaggagata    2640
gaagacaaaa tctgtctccc acgtctgcca tggcatcaag ggggaagagt agatggtgct    2700
tgagaatggt gtgaaatggt tgccatctca ggagtagatg gccgggctca cttctggtta    2760
tctgtcaccc tgagcccatg agctgccttt tagggtacag attgcctact tgaggacctt    2820
```

```
ggccgctctg taagcatctg actcatctca gaaatgtcaa ttcttaaaca ctgtggcaac    2880
aggacctaga atggctgacg cattaaggtt ttcttcttgt gtcctgttct attattgttt    2940
taagacctca gtaaccattt cagcctcttt ccagcaaacc cttctccata gtatttcagt    3000
catggaagga tcatttatgc aggtagtcat tccaggagtt tttggtcttt tctgtctcaa    3060
ggcattgtgt gttttgttcc gggactggtt tgggtgggac aaagttagaa ttgcctgaag    3120
atcacacatt cagactgttg tgtctgtgga gttttaggag tggggggtga cctttctggt    3180
ctttgcactt ccatcctctc ccacttccat ctggcatccc acgcgttgtc ccctgcactt    3240
ctggaaggca cagggtgctg ctgcctcctg gtctttgcct ttgctgggcc ttctgtgcag    3300
gacgctcagc ctcagggctc agaaggtgcc agtccggtcc caggtccctt gtcccttcca    3360
cagaggcctt cctagaagat gcatctgag tgtcagcctt atcagtgttt aagattttc    3420 ttttattttt aattttttg agacagaatc tcactctctc gcccaggctg gagtgcaacg    3480
gtacgatctt ggctcagtgc aacctccgcc tcctgggttc aagcgattct cgtgcctcag    3540
cctccggagt agctgggatt gcaggcaccc gccaccacgc ctggctaatt tttgtatttt    3600
tagtagagac ggggtttcac catgttggtc aggctggtct cgaactcctg acctcaggtg    3660
atccaccttg gcctccgaaa gtgctgggat tacaggcgtg agccaccagc caggccaagc    3720 tattcttta aagtaagctt cctgacgaca tgaaataatt gggggttttg ttgtttagtt    3780
acattaggct ttgctatatc cccaggccaa atagcatgtg acacaggaca gccatagtat    3840
agtgtgtcac tcgtggttgg tgtcctttca tgcttctgcc ctgtcaaagg tccctatttg    3900
aaatgtgtta taatacaaac aaggaagcac attgtgtaca aaatacttat gtatttatga    3960
atccatgacc aaattaaata tgaaaccttta tataaaaa                           3998
```

<210> SEQ ID NO 9
<211> LENGTH: 440
<212> TYPE: PRT
<213> ORGANISM: Homo sapiens

<400> SEQUENCE: 9

```
Met Glu Gln Arg Gly Gln Asn Ala Pro Ala Ala Ser Gly Ala Arg Lys
1               5                   10                  15

Arg His Gly Pro Gly Pro Arg Glu Ala Arg Gly Ala Arg Pro Gly Pro
            20                  25                  30

Arg Val Pro Lys Thr Leu Val Leu Val Val Ala Ala Val Leu Leu Leu
        35                  40                  45

Val Ser Ala Glu Ser Ala Leu Ile Thr Gln Gln Asp Leu Ala Pro Gln
    50                  55                  60

Gln Arg Ala Ala Pro Gln Gln Lys Arg Ser Ser Pro Ser Glu Gly Leu
65                  70                  75                  80

Cys Pro Pro Gly His His Ile Ser Glu Asp Gly Arg Asp Cys Ile Ser
                85                  90                  95

Cys Lys Tyr Gly Gln Asp Tyr Ser Thr His Trp Asn Asp Leu Leu Phe
            100                 105                 110

Cys Leu Arg Cys Thr Arg Cys Asp Ser Gly Glu Val Glu Leu Ser Pro
        115                 120                 125

Cys Thr Thr Thr Arg Asn Thr Val Cys Gln Cys Glu Glu Gly Thr Phe
    130                 135                 140

Arg Glu Glu Asp Ser Pro Glu Met Cys Arg Lys Cys Arg Thr Gly Cys
145                 150                 155                 160
```

-continued

Pro Arg Gly Met Val Lys Val Gly Asp Cys Thr Pro Trp Ser Asp Ile
           165                 170                 175

Glu Cys Val His Lys Glu Ser Gly Thr Lys His Ser Gly Glu Val Pro
        180                 185                 190

Ala Val Glu Glu Thr Val Thr Ser Ser Pro Gly Thr Pro Ala Ser Pro
    195                 200                 205

Cys Ser Leu Ser Gly Ile Ile Ile Gly Val Thr Val Ala Ala Val Val
210                 215                 220

Leu Ile Val Ala Val Phe Val Cys Lys Ser Leu Leu Trp Lys Lys Val
225                 230                 235                 240

Leu Pro Tyr Leu Lys Gly Ile Cys Ser Gly Gly Gly Asp Pro Glu
            245                 250                 255

Arg Val Asp Arg Ser Ser Gln Arg Pro Gly Ala Glu Asp Asn Val Leu
            260                 265                 270

Asn Glu Ile Val Ser Ile Leu Gln Pro Thr Gln Val Pro Glu Gln Glu
            275                 280                 285

Met Glu Val Gln Glu Pro Ala Glu Pro Thr Gly Val Asn Met Leu Ser
    290                 295                 300

Pro Gly Glu Ser Glu His Leu Leu Glu Pro Ala Glu Ala Glu Arg Ser
305                 310                 315                 320

Gln Arg Arg Arg Leu Leu Val Pro Ala Asn Glu Gly Asp Pro Thr Glu
                325                 330                 335

Thr Leu Arg Gln Cys Phe Asp Asp Phe Ala Asp Leu Val Pro Phe Asp
            340                 345                 350

Ser Trp Glu Pro Leu Met Arg Lys Leu Gly Leu Met Asp Asn Glu Ile
        355                 360                 365

Lys Val Ala Lys Ala Glu Ala Ala Gly His Arg Asp Thr Leu Tyr Thr
370                 375                 380

Met Leu Ile Lys Trp Val Asn Lys Thr Gly Arg Asp Ala Ser Val His
385                 390                 395                 400

Thr Leu Leu Asp Ala Leu Glu Thr Leu Gly Glu Arg Leu Ala Lys Gln
                405                 410                 415

Lys Ile Glu Asp His Leu Leu Ser Ser Gly Lys Phe Met Tyr Leu Glu
            420                 425                 430

Gly Asn Ala Asp Ser Ala Met Ser
            435                 440

<210> SEQ ID NO 10
<211> LENGTH: 564
<212> TYPE: DNA
<213> ORGANISM: Homo sapiens

<400> SEQUENCE: 10
atgaccaaca agtgtctcct ccaaattgct ctcctgttgt gcttctccac tacagctctt      60
tccatgagct acaacttgct tggattccta caaagaagca gcaattttca gtgtcagaag    120
ctcctgtggc aattgaatgg gaggcttgaa tactgcctca ggacaggat gaactttgac     180 atccctgagg agattaagca gctgcagcag ttccagaagg aggacgccgc attgaccatc    240
tatgagatgc tccagaacat ctttgctatt ttcagacaag attcatctag cactggctgg    300
aatgagacta ttgttgagaa cctcctggct aatgtctatc atcagataaa ccatctgaag    360
acagtcctgg aagaaaaact ggagaaagaa gatttcacca ggggaaaact catgagcagt    420
ctgcacctga aaagatatta tgggaggatt ctgcattacc tgaaggccaa ggagtacagt    480

```
cactgtgcct ggaccatagt cagagtggaa atcctaagga actttttactt cattaacaga    540 cttacaggtt acctccgaaa ctga                                            564
```

<210> SEQ ID NO 11
<211> LENGTH: 839
<212> TYPE: DNA
<213> ORGANISM: Homo sapiens

<400> SEQUENCE: 11

```
attctaactg caacctttcg aagcctttgc tctggcacaa caggtagtag cgacactgt      60 tcgtgttgtc aacatgacca acaagtgtct cctccaaatt gctctcctgt tgtgcttctc    120
cactacagct ctttccatga gctacaactt gcttggattc ctacaaagaa gcagcaattt    180
tcagtgtcag aagctcctgt ggcaattgaa tgggaggctt gaatactgcc tcaaggacag    240
gatgaacttt gacatccctg aggagattaa gcagctgcag cagttccaga aggaggacgc    300
cgcattgacc atctatgaga tgctccagaa catctttgct attttcagac aagattcatc    360
tagcactggc tggaatgaga ctattgttga aacctcctg gctaatgtct atcatcagat     420
aaaccatctg aagacagtcc tggaagaaaa actggagaaa gaagatttca ccaggggaaa    480
actcatgagc agtctgcacc tgaaaagata ttatgggagg attctgcatt acctgaaggc    540
caaggagtac agtcactgtg cctggaccat agtcagagtg aaatcctaa ggaactttta     600 cttcattaac agacttacag gttacctccg aaactgaaga tctcctagcc tgtgcctctg    660
ggactggaca attgcttcaa gcattcttca accagcagat gctgtttaag tgactgatgg    720
ctaatgtact gcatatgaaa ggacactaga agattttgaa attttttatta aattatgagt   780 tatttttatt tatttaaatt ttattttgga aaataaatta ttttggtgc aaaagtcaa      839
```

<210> SEQ ID NO 12
<211> LENGTH: 187
<212> TYPE: PRT
<213> ORGANISM: Homo sapiens

<400> SEQUENCE: 12

```
Met Thr Asn Lys Cys Leu Leu Gln Ile Ala Leu Leu Cys Phe Ser
1               5                  10                  15

Thr Thr Ala Leu Ser Met Ser Tyr Asn Leu Leu Gly Phe Leu Gln Arg
            20                  25                  30

Ser Ser Asn Phe Gln Cys Gln Lys Leu Leu Trp Gln Leu Asn Gly Arg
        35                  40                  45

Leu Glu Tyr Cys Leu Lys Asp Arg Met Asn Phe Asp Ile Pro Glu Glu
    50                  55                  60

Ile Lys Gln Leu Gln Gln Phe Gln Lys Glu Asp Ala Ala Leu Thr Ile
65                  70                  75                  80

Tyr Glu Met Leu Gln Asn Ile Phe Ala Ile Phe Arg Gln Asp Ser Ser
                85                  90                  95

Ser Thr Gly Trp Asn Glu Thr Ile Val Glu Asn Leu Leu Ala Asn Val
            100                 105                 110

Tyr His Gln Ile Asn His Leu Lys Thr Val Leu Glu Glu Lys Leu Glu
        115                 120                 125

Lys Glu Asp Phe Thr Arg Gly Lys Leu Met Ser Ser Leu His Leu Lys
    130                 135                 140

Arg Tyr Tyr Gly Arg Ile Leu His Tyr Leu Lys Ala Lys Glu Tyr Ser
145                 150                 155                 160
```

His Cys Ala Trp Thr Ile Val Arg Val Glu Ile Leu Arg Asn Phe Tyr
              165                 170                 175

Phe Ile Asn Arg Leu Thr Gly Tyr Leu Arg Asn
        180                 185

<210> SEQ ID NO 13
<211> LENGTH: 1674
<212> TYPE: DNA
<213> ORGANISM: Homo sapiens

<400> SEQUENCE: 13

```
atgatggtcg tcctcctggg cgcgacgacc ctagtgctcg tcgccgtggc gccatgggtg     60
ttgtccgcag ccgcaggtgg aaaaaatcta aaatctcctc aaaaagtaga ggtcgacatc    120
atagatgaca actttatcct gaggtggaac aggagcgatg agtctgtcgg gaatgtgact    180
ttttcattcg attatcaaaa aactgggatg gataattgga taaaattgtc tgggtgtcag    240
aatattacta gtaccaaatg caacttttct tcactcaagc tgaatgttta tgaagaaatt    300
aaattgcgta taagagcaga aaaagaaaac acttcttcat ggtatgaggt tgactcattt    360
acaccatttc gcaaagctca gattggtcct ccagaagtac atttagaagc tgaagataag    420
gcaatagtga tacacatctc tcctggaaca aagatagtg ttatgtgggc tttgatggt     480
ttaagctta catatagctt agttatctgg aaaaactctt caggtgtaga agaaggatt     540
gaaaatattt attccagaca taaaatttat aaactctcac cagagactac ttattgtcta    600
aaagttaaag cagcactact tacgtcatgg aaaaattggtg tctatagtcc agtacattgt    660
ataaagacca cagttgaaaa tgaactacct ccaccagaaa atatagaagt cagtgtccaa    720
aatcagaact atgttcttaa atgggattat acatatgcaa acatgacctt tcaagttcag    780
tggctccacg cctttttaaa aaggaatcct ggaaaccatt tgtataaatg aaacaaata    840
cctgactgtg aaaatgtcaa aactacccag tgtgtctttc ctcaaaacgt tttccaaaaa    900
ggaatttacc ttctccgcgt acaagcatct gatggaaata acatctttt ttggtctgaa     960
gagataaagt ttgatactga aatacaagct ttcctacttc ctccagtctt taacattaga   1020
tcccttagtg attcattcca tatctatatc ggtgctccaa acagtctgg aaacacgcct    1080
gtgatccagg attatccact gatttatgaa attattttt gggaaaacac ttcaaatgct   1140
gagagaaaaa ttatcgagaa aaaaactgat gttacagttc ctaatttgaa accactgact   1200
gtatattgtg tgaaagccag agcacacacc atggatgaaa agctgaataa agcagtgtt    1260
tttagtgacg ctgtatgtga gaaacaaaa ccaggaaata cctctaaaat ttggcttata   1320
gttggaattt gtattgcatt atttgctctc ccgtttgtca tttatgctgc gaaagtcttc   1380
ttgagatgca tcaattatgt cttctttcca tcacttaaac cttcttccag tatagatgag   1440
tatttctctg aacagccatt gaagaatctt ctgctttcaa cttctgagga caaatcgaa    1500
aaatgtttca taattgaaaa tataagcaca attgctacag tagaagaaac taatcaaact   1560
gatgaagatc ataaaaaata cagttcccaa actagccaag attcaggaaa ttattctaat   1620
gaagatgaaa gcgaaagtaa aacaagtgaa gaactacagc aggactttgt atga         1674
```

<210> SEQ ID NO 14
<211> LENGTH: 6075
<212> TYPE: DNA
<213> ORGANISM: Homo sapiens

<400> SEQUENCE: 14

```
ggtgtgactt aggacggggc gatggcggct gagaggagct gcgcgtgcgc gaacatgtaa      60
ctggtgggat ctgcggcggc tcccagatga tggtcgtcct cctgggcgcg acgaccctag     120
tgctcgtcgc cgtggcgcca tgggtgttgt ccgcagccgc aggtggaaaa aatctaaaat     180
ctcctcaaaa agtagaggtc gacatcatag atgacaactt tatcctgagg tggaacagga     240
gcgatgagtc tgtcgggaat gtgactttt cattcgatta tcaaaaaact gggatggata     300
attggataaa attgtctggg tgtcagaata ttactagtac caaatgcaac ttttcttcac     360
tcaagctgaa tgtttatgaa gaaattaaat tgcgtataag agcagaaaaa gaaaacactt     420
cttcatggta tgaggttgac tcatttacac catttcgcaa agctcagatt ggtcctccag     480
aagtacattt agaagctgaa gataaggcaa tagtgataca catctctcct ggaacaaaag     540
atagtgttat gtgggctttg gatggtttaa gctttacata tagcttagtt atctggaaaa     600
actcttcagg tgtagaagaa aggattgaaa atatttattc cagacataaa atttataaac     660
tctcaccaga gactacttat tgtctaaaag ttaaagcagc actacttacg tcatggaaaa     720
ttggtgtcta tagtccagta cattgtataa agaccacagt tgaaaatgaa ctacctccac     780
cagaaaatat agaagtcagt gtccaaaatc agaactatgt tcttaaatgg gattatacat     840
atgcaaacat gacctttcaa gttcagtggc tccacgcctt tttaaaaagg aatcctggaa     900
accatttgta taaatggaaa caaatacctg actgtgaaaa tgtcaaaact acccagtgtg     960
tctttcctca aaacgttttc caaaaaggaa tttaccttct ccgcgtacaa gcatctgatg    1020
gaaataacac atcttttgg tctgaagaga taaagtttga tactgaaata caagctttcc    1080
tacttcctcc agtctttaac attagatccc ttagtgattc attccatatc tatatcggtg    1140
ctccaaaaca gtctggaaac acgcctgtga tccaggatta tccactgatt tatgaaatta    1200
tttttttggga aaacacttca aatgctgaga gaaaaattat cgagaaaaaa actgatgtta    1260
cagttcctaa tttgaaacca ctgactgtat attgtgtgaa agccagagca cacaccatgg    1320
atgaaaagct gaataaaagc agtgttttta gtgacgctgt atgtgagaaa caaaaccag    1380
gaaataccctc taaaatttgg cttatagttg gaatttgtat tgcattattt gctctcccgt    1440
ttgtcattta tgctgcgaaa gtcttcttga gatgcatcaa ttatgtcttc tttccatcac    1500
ttaaaccttc ttccagtata gatgagtatt tctctgaaca gccattgaag aatcttctgc    1560
tttcaacttc tgaggaacaa atcgaaaaat gtttcataat tgaaaatata agcacaattg    1620
ctacagtaga agaaactaat caaactgatg aagatcataa aaaatacagt tcccaaacta    1680
gccaagattc aggaaattat tctaatgaag atgaaagcga agtaaaaca agtgaagaac    1740
tacagcagga ctttgtatga ccagaaatga actgtgtcaa gtataaggtt tttcagcagg    1800
agttacactg ggagcctgag gtcctcacct tcctctcagt aactacagag aggacgtttc    1860
cctgtttagg gaaagaaaaa acatcttcag atcataggtc ctaaaaatac gggcaagctc    1920
ttaactattt aaaaatgaaa ttacaggccc gggcacggtg gctcacacct gtaatcccag    1980
cactttggga ggctgaggca ggcagatcat gaggtcaaga gatcgagacc agcctggcca    2040
acgtggtgaa accccatctc tactaaaaat acaaaaatta gccgggtgtg gtggcgcgcg    2100
cctgttgtct tagctactca ggaggctgag gcaggagaat cgcttgaaaa caggaggtgg    2160
aggttgcagt gagccgagat cacgccactg cactccagcc tggtgacagc gtgagactct    2220
ttaaaaaaag aaattaaaag agttgagaca aacgtttcct acattctttt ccatgtgtaa    2280
```

```
aatcatgaaa aagcctgtca ccggacttgc attggatgag atgagtcaga ccaaaacagt    2340
ggccacccgt cttcctcctg tgagcctaag tgcagccgtg ctagctgcgc accgtggcta    2400
aggatgacgt ctgtgttcct gtccatcact gatgctgctg gctactgcat gtgccacacc    2460
tgtctgttcg ccattcctaa cattctgttt cattcttcct cgggagatat ttcaaacatt    2520
tggtcttttc ttttaacact gagggtaggc ccttaggaaa tttatttagg aaagtctgaa    2580
cacgttatca cttggttttc tggaaagtag cttaccctag aaaacagctg caaatgccag    2640
aaagatgatc cctaaaaatg ttgagggact tctgttcatt catcccgaga acattggctt    2700
ccacatcaca gtatctaccc ttacatggtt taggattaaa gccaggcaat cttttactat    2760
gcattaagac ctctgattca aaacttatta gaacagtagc ttctgctgga atttgcaatc    2820
actgaagtca tagaaaatag gtaactatct aattagagaa ataattgttg tattttaaga    2880
tctgagagtg tgtacaagtt ttagtataca tgccatgcca gaagatagtg tatgcaagaa    2940
gtcttgggac cagaaaatgg caatgatagg agactgacat agaagaagaa tgcttcccta    3000
ggaaaaaggt cgctggcttt ggtgcaagag gaagaagaat gttccactgg aagcctgagc    3060
acctaatcag ctctcagtga tcaacccact cttgttatgg gtggtctctg tcactttgaa    3120
tgccaggctg gcttctcgtc tagcagtatt cagataccccc ttctgctcag cctgcttggc    3180
gttaaaatac aaatcattga actgaggggg aaaaatgtaa ctaggaagaa aaacccaatt    3240
taagaaatta cataatgctt tccaaaggca cctacaactt agttttaaat tacttgctac    3300
tggggattac ccatggatat ccttaatagg caggaagtct gggaattctg gtggcctcta    3360
gggcagtgtt ctcacagcac cgttccgaca gggaccagtg aaagaaaaga dacaaagtta    3420
gaacgtgctg gggagcggcc atttctaagg ccagtctggt ttaagtagtc atttctgctg    3480
aaaaaacaga tgatcctggt ggaagaaaag gttgaaggca gctgccctcg ggagggctgt    3540
gatgctcggc acatcctgcc tggcacatac acgtgtctgc aggccacacc gtgcatgtcc    3600
ccagacctgc cgcctggctt ctggagtgct tcaagcagag catggtgggt cattgaggag    3660
acccaggaat ctcatctgag aacccactct ctgccggaga accccatggt gacacatttt    3720
catctttctg accagaggct gtttttttt tttttttgaga cagtctcatt ctgttgccca    3780
ggctggagtg cagtggcttg atctcggctc actgcaacct cgcctcccgg gttcaagcaa    3840
ttctctgccg cagcctccag agtagctggg ataacaggtg cccaccacca cccccacta    3900 atttttgtat ttgtattttt agtagagatg gggtttcacc atgttggtca ggctggtctt    3960
ggactcctga cctcatgctc cacccgcttc ggcctcccaa agttctggga ttacaggtgt    4020
gagccaccgt gcacggccgg cctgaccttt ggaaaagcct tgtcactttg gacgtttgcg    4080
tctttgaaga ggcgatggga gcatatcatg actgcctgcc accattgctt ttcagactac    4140
cacaactcaa tcatgctgtc caggacttct ggccctgtgt tcaccactgg gaaaacgtac    4200
ttcagactgg atagcctaaa aaggagcaat gcccttgtag gatgtggaga agggaaaata    4260
cggacattaa cattaaaaga caccagtgaa attgttaggt ctctaggaag ttggagcaca    4320
aggcttcacg ctttaagacc atctgtggtt ttcagtgaac aagcgctgag caccagcagc    4380
agaaaacaac aacaaaaaaa cacctcgttt ttaccttgtc ttctagacat gaaaaggcag    4440
ttgcattcca ctctgcatta tgttctacat gttgctttat cagtatatgc ttagctgtaa    4500
gtgacaagta ttttttctga acagaagttt acttagaaat accatgcact tgggggtacc    4560
aattaaccgc ctgaaaatta gcatattgat agttcttaga gagaccagat ataatctaag    4620
aatttatatg aaagatttgt atcattagag ccagaaataa ttttatatta atatataata    4680
```

-continued

```
cagattaaca ttatatataa tatgtacctg tgtcacttct gacatgagcc tgtaaacata    4740
tattcatata tgtacctgca catgtaccca cctgatgtag gtcttattcc tttagtatgg    4800
acttaaagta cttattcata taccttgtaa ctaaaaatta aacagctcc ctagaattgt     4860 gaacttttaa gagtctgact agaaatttgc aacttataaa aaagttactt ttaaaaatat   4920
aagttagggc taggcacagt ggctcatgcc tataatctca gcacttttgg gaggccaaga   4980
caggaggatc acttcaggcc aggagttcaa gatcaaccaa cctgggtaac atggccagac   5040
cccatctcta tttatatata tatatataaa acttagagtt tttatcttcc cctaaaagag   5100
gccgtgatat ttgcagcagc ctcaaattgc tcttaagggg tttaggtgtg cagaagcttt   5160
cctttcccta cccagtaacc atgtgactac taacgtggta tattgattta ttttgtttgc   5220
tgtctgtctc ccctgcccca ctgctggaac agaggctcca agaaaacagg gaccttatta   5280
ttcattactg catccccagt aatgaaagta cttagaaaat aattattgaa tgaatgaaat   5340
ctaaactgtg aacctgaggg tgtttgtggc agtgtttgtt ttactgaatt gtagaaggac   5400 ataccgtgt tttcagtgtt tctatggaac aaacttgtac atttatttc acttgtgttt     5460 tgtcttaaac cctactgctg gaaacaattt tatgtaataa gcaatgggcc caaaagtcta   5520
ggagtttttt tgtacttagt gaatttgtat gcaacagaga tgctgcagct gatgccttta   5580
aaaggtattc atcatggaag agctgaggcc tgtgcttggt gttccagagc ccagggttga   5640
gcatcctgaa ggagccactg cagccgtcac tgtccccaga gcctgtggag atagagcctg   5700
tttgctgctt tttcttcccg ctcttaagac atggctggag ctcagtcttc attgaatgaa   5760
gtttgctgtg gtattgcata gccttgcttt cttgaactaa actgtttgcc cttcacaagt   5820
agttcttctt tcaggattag ttcgttccaa ggaggctctt cagtctcaca gataagtaga   5880
tctctcctgc tgtctggaca catttcactc ggaaattgaa tacaatttgt attcaggctg   5940
ggaacctgaa cacacacttg tgtttttaag cttccctttt ttacagtgga caaggacaca   6000
aataataaat aaatcatccc taatgcccaa gaaatgccct ggtacttagt aataacaaaa   6060
taccagtaac ttcca                                                    6075
```

<210> SEQ ID NO 15
<211> LENGTH: 557
<212> TYPE: PRT
<213> ORGANISM: Homo sapiens

<400> SEQUENCE: 15

```
Met Met Val Val Leu Leu Gly Ala Thr Thr Leu Val Leu Val Ala Val
1               5                   10                  15

Ala Pro Trp Val Leu Ser Ala Ala Gly Gly Lys Asn Leu Lys Ser
            20                  25                  30

Pro Gln Lys Val Glu Val Asp Ile Ile Asp Asp Asn Phe Ile Leu Arg
        35                  40                  45

Trp Asn Arg Ser Asp Glu Ser Val Gly Asn Val Thr Phe Ser Phe Asp
    50                  55                  60

Tyr Gln Lys Thr Gly Met Asp Asn Trp Ile Lys Leu Ser Gly Cys Gln
65                  70                  75                  80

Asn Ile Thr Ser Thr Lys Cys Asn Phe Ser Ser Leu Lys Leu Asn Val
                85                  90                  95

Tyr Glu Glu Ile Lys Leu Arg Ile Arg Ala Glu Lys Glu Asn Thr Ser
                100                 105                 110
```

```
Ser Trp Tyr Glu Val Asp Ser Phe Thr Pro Phe Arg Lys Ala Gln Ile
        115                 120                 125

Gly Pro Pro Glu Val His Leu Glu Ala Glu Asp Lys Ala Ile Val Ile
130                 135                 140

His Ile Ser Pro Gly Thr Lys Asp Ser Val Met Trp Ala Leu Asp Gly
145                 150                 155                 160

Leu Ser Phe Thr Tyr Ser Leu Val Ile Trp Lys Asn Ser Ser Gly Val
                165                 170                 175

Glu Glu Arg Ile Glu Asn Ile Tyr Ser Arg His Lys Ile Tyr Lys Leu
                180                 185                 190

Ser Pro Glu Thr Thr Tyr Cys Leu Lys Val Lys Ala Ala Leu Leu Thr
            195                 200                 205

Ser Trp Lys Ile Gly Val Tyr Ser Pro Val His Cys Ile Lys Thr Thr
210                 215                 220

Val Glu Asn Glu Leu Pro Pro Pro Glu Asn Ile Glu Val Ser Val Gln
225                 230                 235                 240

Asn Gln Asn Tyr Val Leu Lys Trp Asp Tyr Thr Tyr Ala Asn Met Thr
                245                 250                 255

Phe Gln Val Gln Trp Leu His Ala Phe Leu Lys Arg Asn Pro Gly Asn
                260                 265                 270

His Leu Tyr Lys Trp Lys Gln Ile Pro Asp Cys Glu Asn Val Lys Thr
                275                 280                 285

Thr Gln Cys Val Phe Pro Gln Asn Val Phe Gln Lys Gly Ile Tyr Leu
            290                 295                 300

Leu Arg Val Gln Ala Ser Asp Gly Asn Asn Thr Ser Phe Trp Ser Glu
305                 310                 315                 320

Glu Ile Lys Phe Asp Thr Glu Ile Gln Ala Phe Leu Leu Pro Pro Val
                325                 330                 335

Phe Asn Ile Arg Ser Leu Ser Asp Ser Phe His Ile Tyr Ile Gly Ala
                340                 345                 350

Pro Lys Gln Ser Gly Asn Thr Pro Val Ile Gln Asp Tyr Pro Leu Ile
                355                 360                 365

Tyr Glu Ile Ile Phe Trp Glu Asn Thr Ser Asn Ala Glu Arg Lys Ile
            370                 375                 380

Ile Glu Lys Lys Thr Asp Val Thr Val Pro Asn Leu Lys Pro Leu Thr
385                 390                 395                 400

Val Tyr Cys Val Lys Ala Arg Ala His Thr Met Asp Glu Lys Leu Asn
                405                 410                 415

Lys Ser Ser Val Phe Ser Asp Ala Val Cys Glu Lys Thr Lys Pro Gly
                420                 425                 430

Asn Thr Ser Lys Ile Trp Leu Ile Val Gly Ile Cys Ile Ala Leu Phe
            435                 440                 445

Ala Leu Pro Phe Val Ile Tyr Ala Ala Lys Val Phe Leu Arg Cys Ile
450                 455                 460

Asn Tyr Val Phe Phe Pro Ser Leu Lys Pro Ser Ser Ser Ile Asp Glu
465                 470                 475                 480

Tyr Phe Ser Glu Gln Pro Leu Lys Asn Leu Leu Leu Ser Thr Ser Glu
                485                 490                 495

Glu Gln Ile Glu Lys Cys Phe Ile Ile Glu Asn Ile Ser Thr Ile Ala
                500                 505                 510

Thr Val Glu Glu Thr Asn Gln Thr Asp Glu Asp His Lys Lys Tyr Ser
            515                 520                 525
```

```
Ser Gln Thr Ser Gln Asp Ser Gly Asn Tyr Ser Asn Glu Asp Glu Ser
        530                 535                 540
Glu Ser Lys Thr Ser Glu Glu Leu Gln Gln Asp Phe Val
545                 550                 555

<210> SEQ ID NO 16
<211> LENGTH: 435
<212> TYPE: DNA
<213> ORGANISM: Homo sapiens

<400> SEQUENCE: 16
atgtggctgc agagcctgct gctcttgggc actgtggcct gcagcatctc tgcacccgcc       60
cgctcgccca gccccagcac gcagccctgg gagcatgtga atgccatcca ggaggcccgg      120
cgtctcctga acctgagtag agacactgct gctgagatga atgaaacagt agaagtcatc      180
tcagaaatgt ttgacctcca ggagccgacc tgcctacaga cccgcctgga gctgtacaag      240
cagggcctgc ggggcagcct caccaagctc aagggcccct tgaccatgat ggccagccac      300
tacaagcagc actgccctcc aaccccggaa acttcctgtg caacccagat tatcaccttt      360
gaaagtttca agagaacct gaaggacttt ctgcttgtca tcccctttga ctgctgggag      420
ccagtccagg agtga                                                       435

<210> SEQ ID NO 17
<211> LENGTH: 788
<212> TYPE: DNA
<213> ORGANISM: Homo sapiens

<400> SEQUENCE: 17
agtacacaga gagaaaggct aaagttctct ggaggatgtg gctgcagagc ctgctgctct       60
tgggcactgt ggcctgcagc atctctgcac ccgcccgctc gcccagcccc agcacgcagc      120
cctgggagca tgtgaatgcc atccaggagg cccggcgtct cctgaacctg agtagagaca      180
ctgctgctga gatgaatgaa acagtagaag tcatctcaga aatgtttgac ctccaggagc      240
cgacctgcct acagacccgc ctggagctgt acaagcaggg cctgcggggc agcctcacca      300
agctcaaggg ccccttgacc atgatggcca gccactacaa gcagcactgc cctccaaccc      360
cggaaacttc ctgtgcaacc cagattatca cctttgaaag tttcaagag aacctgaagg      420 actttctgct tgtcatcccc tttgactgct gggagccagt ccaggagtga gaccggccag      480
atgaggctgg ccaagccggg gagctgctct ctcatgaaac aagagctaga aactcaggat      540
ggtcatcttg gagggaccaa ggggtgggcc acagccatgg tgggagtggc ctggacctgc      600
cctgggccac actgaccctg atacaggcat ggcagaagaa tgggaatatt ttatactgac      660
agaaatcagt aatatttata tatttatatt tttaaaatat ttatttattt atttatttaa      720
gttcatattc catatttatt caagatgttt taccgtaata attattatta aaaatatgct      780
tctacttg                                                               788

<210> SEQ ID NO 18
<211> LENGTH: 144
<212> TYPE: PRT
<213> ORGANISM: Homo sapiens

<400> SEQUENCE: 18

Met Trp Leu Gln Ser Leu Leu Leu Leu Gly Thr Val Ala Cys Ser Ile
1               5                   10                  15

Ser Ala Pro Ala Arg Ser Pro Ser Pro Ser Thr Gln Pro Trp Glu His
                20                  25                  30
```

```
Val Asn Ala Ile Gln Glu Ala Arg Arg Leu Leu Asn Leu Ser Arg Asp
         35                  40                  45

Thr Ala Ala Glu Met Asn Glu Thr Val Glu Val Ile Ser Glu Met Phe
 50                  55                  60

Asp Leu Gln Glu Pro Thr Cys Leu Gln Thr Arg Leu Glu Leu Tyr Lys
 65                  70                  75                  80

Gln Gly Leu Arg Gly Ser Leu Thr Lys Leu Lys Gly Pro Leu Thr Met
                 85                  90                  95

Met Ala Ser His Tyr Lys Gln His Cys Pro Pro Thr Pro Glu Thr Ser
                100                 105                 110

Cys Ala Thr Gln Ile Ile Thr Phe Glu Ser Phe Lys Glu Asn Leu Lys
                115                 120                 125

Asp Phe Leu Leu Val Ile Pro Phe Asp Cys Trp Glu Pro Val Gln Glu
    130                 135                 140

<210> SEQ ID NO 19
<211> LENGTH: 376
<212> TYPE: PRT
<213> ORGANISM: Human alphaherpesvirus 1

<400> SEQUENCE: 19

Met Ala Ser Tyr Pro Cys His Gln His Ala Ser Ala Phe Asp Gln Ala
 1               5                  10                  15

Ala Arg Ser Arg Gly His Asn Asn Arg Arg Thr Ala Leu Arg Pro Arg
                 20                  25                  30

Arg Gln Gln Lys Ala Thr Glu Val Arg Leu Glu Gln Lys Met Pro Thr
         35                  40                  45

Leu Leu Arg Val Tyr Ile Asp Gly Pro His Gly Met Gly Lys Thr Thr
 50                  55                  60

Thr Thr Gln Leu Leu Val Ala Leu Gly Ser Arg Asp Asp Ile Val Tyr
 65                  70                  75                  80

Val Pro Glu Pro Met Thr Tyr Trp Arg Val Leu Gly Ala Ser Glu Thr
                 85                  90                  95

Ile Ala Asn Ile Tyr Thr Thr Gln His Arg Leu Asp Gln Gly Glu Ile
                100                 105                 110

Ser Ala Gly Asp Ala Ala Val Val Met Thr Ser Ala Gln Ile Thr Met
    115                 120                 125

Gly Met Pro Tyr Ala Val Thr Asp Ala Val Leu Ala Pro His Ile Gly
    130                 135                 140

Gly Glu Ala Gly Ser Ser His Ala Pro Pro Ala Leu Thr Leu Ile Phe
145                 150                 155                 160

Phe Asp Arg His Pro Ile Ala Ala Leu Leu Cys Tyr Pro Ala Ala Arg
                165                 170                 175

Tyr Leu Met Gly Ser Met Thr Pro Gln Ala Val Leu Ala Phe Val Ala
                180                 185                 190

Leu Ile Pro Pro Thr Leu Pro Gly Thr Asn Ile Val Leu Gly Ala Leu
    195                 200                 205

Pro Glu Asp Arg His Ile Asp Arg Leu Ala Lys Arg Gln Arg Pro Gly
    210                 215                 220

Glu Arg Leu Asp Leu Ala Met Leu Ala Ala Ile Arg Arg Val Tyr Gly
225                 230                 235                 240

Leu Leu Ala Asn Thr Val Arg Tyr Leu Gln Gly Gly Gly Ser Trp Arg
                245                 250                 255
```

Glu Asp Trp Gly Gln Leu Ser Gly Ala Ala Val Pro Pro Gln Gly Ala
                260                 265                 270

Glu Pro Gln Ser Asn Ala Gly Pro Arg Pro His Ile Gly Asp Thr Leu
            275                 280                 285

Phe Thr Leu Phe Arg Ala Pro Glu Leu Leu Ala Pro Asn Gly Asp Leu
290                 295                 300

Tyr Asn Val Phe Ala Trp Ala Leu Asp Val Leu Ala Lys Arg Leu Arg
305                 310                 315                 320

Pro Met His Val Phe Ile Leu Asp Tyr Asp Gln Ser Pro Ala Gly Cys
                325                 330                 335

Arg Asp Ala Leu Leu Gln Leu Thr Ser Gly Met Val Gln Thr His Val
                340                 345                 350

Thr Thr Pro Gly Ser Ile Pro Thr Ile Cys Asp Leu Ala Arg Thr Phe
            355                 360                 365

Ala Arg Glu Met Gly Glu Ala Asn
    370                 375

<210> SEQ ID NO 20
<211> LENGTH: 801
<212> TYPE: DNA
<213> ORGANISM: Homo sapiens

<400> SEQUENCE: 20
atggacgaag cggatcggcg gctcctgcgg cggtgccggc tgcggctggt ggaagagctg      60
caggtggacc agctctggga cgccctgctg agccgcgagc tgttcaggcc ccatatgatc     120
gaggacatcc agcgggcagg ctctggatct cggcgggatc aggccaggca gctgatcata     180
gatctggaga ctcgagggag tcaggctctt cctttgttca tctcctgctt agaggacaca     240
ggccaggaca tgctggcttc gtttctgcga actaacaggc aagcagcaaa gttgtcgaag     300
ccaaccctag aaaaccttac cccagtggtg ctcagaccag agattcgcaa accagaggtt     360
ctcagaccgg aaacacccag accagtggac attggttctg gaggatttgg tgatgtcgag     420
cagaaagacc atgggtttga ggtggcctcc acttcccctg aagacgagtc ccctggcagt     480
aaccccgagc cagatgccac cccgttccag aaggtttga ggaccttcga ccagctggac     540
gccatatcta gtttgcccac acccagtgac atctttgtgt cctactctac tttcccaggt     600
tttgtttcct ggagggaccc caagagtggc tcctggtacg ttgagaccct ggacgacatc     660
tttgagcagt gggctcactc tgaagacctg cagtccctcc tgcttagggt cgctaatgct     720
gtttcggtga aagggattta taacagatg cctggttgct taatttcct ccggaaaaaa     780 ctttctttta aacatcata a                                              801

<210> SEQ ID NO 21
<211> LENGTH: 2808
<212> TYPE: DNA
<213> ORGANISM: Homo sapiens

<400> SEQUENCE: 21
agttggctac tcgccatgga cgaagcggat cggcggctcc tgcggcggtg ccggctgcgg      60
ctggtggaag agctgcaggt ggaccagctc tgggacgccc tgctgagccg cgagctgttc     120 aggcccata tgatcgagga catccagcgg gcaggctctg gatctcggcg ggatcaggcc     180
aggcagctga tcatagatct ggagactcga gggagtcagg ctcttccttt gttcatctcc     240
tgcttagagg acacaggcca ggacatgctg gcttcgtttc tgcgaactaa caggcaagca     300

```
gcaaagttgt cgaagccaac cctagaaaac cttaccccag tggtgctcag accagagatt      360
cgcaaaccag aggttctcag accggaaaca cccagaccag tggacattgg ttctggagga      420
tttggtgatg tcggtgctct tgagagtttg aggggaaatg cagatttggc ttacatcctg      480
agcatggagc cctgtggcca ctgcctcatt atcaacaatg tgaacttctg ccgtgagtcc      540
gggctccgca cccgcactgg ctccaacatc gactgtgaga agttgcggcg tcgcttctcc      600
tcgctgcatt tcatggtgga ggtgaagggc gacctgactg ccaagaaaat ggtgctggct      660
ttgctggagc tggcgcagca ggaccacggt gctctggact gctgcgtggt ggtcattctc      720
tctcacggct gtcaggccag ccacctgcag ttcccagggg ctgtctacgg cacagatgga      780
tgccctgtgt cggtcgagaa gattgtgaac atcttcaatg ggaccagctg ccccagcctg      840
ggagggaagc ccaagctctt tttcatccag gcctgtggtg gggagcagaa agaccatggg      900
tttgaggtgg cctccacttc ccctgaagac gagtcccctg gcagtaaccc cgagccagat      960
gccaccccgt tccaggaagg tttgaggacc ttcgaccagc tggacgccat atctagtttg     1020
cccacaccca gtgacatctt tgtgtcctac tctactttcc caggttttgt ttcctggagg     1080
gaccccaaga gtggctcctg gtacgttgag accctggacg acatctttga gcagtgggct     1140
cactctgaag acctgcagtc cctcctgctt agggtcgcta atgctgtttc ggtgaaaggg     1200
atttataaac agatgcctgg ttgctttaat ttcctccgga aaaaacttt  ctttaaaaca     1260 tcataaggcc agggcccctc accctgcctt atccttgcacc ccaaagcttt cctgccccag     1320
gcctgaaaga ggctgaggcc tggactttcc tgcaactcaa ggactttgca gccggcacag     1380
ggtctgctct ttctctgcca gtgacagaca ggctcttagc agcttccaga ttgacgacaa     1440
gtgctgaaca gtggaggaag agggacagat gaatgccgtg gattgcacgt ggcctcttga     1500
gcagtggctg gtccagggct agtgacttgt gtcccatgat ccctgtgttg tctctagagc     1560
agggattaac ctctgcacta ctgacatgtg gggccaggtc accctttgct gtgaggctgt     1620
cctgtacatt gtgggatgtt cagcactgtc ccttgcctca atgccagtaa cgcgtcttcc     1680
tgagtggtgc caaacaaaaa ggttctcagg tgttgccaaa tatgtcctgg ggtataaaac     1740
tttcctcgcc tgacaaccac tggtctgtag ggattttttgg ctacacacaa accagtatcg     1800
ctcatagatc agcaaaccgg ggcctactag agtctgaaca gctgtaatct atgaattcta     1860
agtgaaattt taaaaattgt taattttttcc tatattgcat taattttaaa aaataaatct     1920
gaggcaaata tggactctct tttgcctatt tcttccctca ttttgctcca actctttctt     1980
cttccttaca aaagagactt ttgcttttttt cgaaacattt ccccatgttt ttctggggtc     2040
tcgctatgtt gcccaggctg gtctcaaact cctgggctca agtgaccctc ccaagtagct     2100
cttactacag gcgtgcacca ttgcacccag ccccatttat tcatgtctta tttcacttga     2160
tccttatccc atcccaggaa ggcaacaagg gtgagaaccc tgtgctcagg gaggttaggt     2220
ctcttgtcca agggaaaacg attatccaga gaagagacct ggccagaacc tgggtcccct     2280
gagtcctagc catgcttccc atgtgcctta cttgctgaag cacccccgga ctgcagtgtg     2340
aacgtgctgt gcaatagtga cacgctgggc ttccccacaa ggctccaccc tgaggtcttt     2400
taagctgtcc ttatgccagc ctatttcttg ttttttgggc cttttttttt ggagataggg     2460
tctcactctg tcgcccaggc tggagtgcaa tgacgcaatc ttggcttatt gcagtctcga     2520
cctcctgggc tcaagagatc cttccacctc agccacctga gtagcttgga ctacaggtgt     2580
gcaccacctc tcccagttaa ttttttgtatt tttagtagag acagagttat gccatgttac     2640
tcaggctggt cttgaactcc tggactcaag cgatcagcct gccttagcct cccaaagtgc     2700
```

```
aggggttaca ggcttgagcc attgcgcctg acctatttct ggttcttagg gccctggatg      2760
ttaggatgga tttctgaatt aataataata ataaaaccct catcaaga                   2808
```

<210> SEQ ID NO 22
<211> LENGTH: 416
<212> TYPE: PRT
<213> ORGANISM: Homo sapiens

<400> SEQUENCE: 22

```
Met Asp Glu Ala Asp Arg Arg Leu Leu Arg Arg Cys Arg Leu Arg Leu
1               5                   10                  15

Val Glu Glu Leu Gln Val Asp Gln Leu Trp Asp Ala Leu Leu Ser Arg
            20                  25                  30

Glu Leu Phe Arg Pro His Met Ile Glu Asp Ile Gln Arg Ala Gly Ser
        35                  40                  45

Gly Ser Arg Arg Asp Gln Ala Arg Gln Leu Ile Ile Asp Leu Glu Thr
    50                  55                  60

Arg Gly Ser Gln Ala Leu Pro Leu Phe Ile Ser Cys Leu Glu Asp Thr
65                  70                  75                  80

Gly Gln Asp Met Leu Ala Ser Phe Leu Arg Thr Asn Arg Gln Ala Ala
                85                  90                  95

Lys Leu Ser Lys Pro Thr Leu Glu Asn Leu Thr Pro Val Val Leu Arg
            100                 105                 110

Pro Glu Ile Arg Lys Pro Glu Val Leu Arg Pro Glu Thr Pro Arg Pro
        115                 120                 125

Val Asp Ile Gly Ser Gly Gly Phe Gly Asp Val Gly Ala Leu Glu Ser
    130                 135                 140

Leu Arg Gly Asn Ala Asp Leu Ala Tyr Ile Leu Ser Met Glu Pro Cys
145                 150                 155                 160

Gly His Cys Leu Ile Ile Asn Asn Val Asn Phe Cys Arg Glu Ser Gly
                165                 170                 175

Leu Arg Thr Arg Thr Gly Ser Asn Ile Asp Cys Glu Lys Leu Arg Arg
            180                 185                 190

Arg Phe Ser Ser Leu His Phe Met Val Glu Val Lys Gly Asp Leu Thr
        195                 200                 205

Ala Lys Lys Met Val Leu Ala Leu Leu Glu Leu Ala Gln Gln Asp His
    210                 215                 220

Gly Ala Leu Asp Cys Cys Val Val Val Ile Leu Ser His Gly Cys Gln
225                 230                 235                 240

Ala Ser His Leu Gln Phe Pro Gly Ala Val Tyr Gly Thr Asp Gly Cys
                245                 250                 255

Pro Val Ser Val Glu Lys Ile Val Asn Ile Phe Asn Gly Thr Ser Cys
            260                 265                 270

Pro Ser Leu Gly Gly Lys Pro Lys Leu Phe Phe Ile Gln Ala Cys Gly
        275                 280                 285

Gly Glu Gln Lys Asp His Gly Phe Glu Val Ala Ser Thr Ser Pro Glu
    290                 295                 300

Asp Glu Ser Pro Gly Ser Asn Pro Glu Pro Asp Ala Thr Pro Phe Gln
305                 310                 315                 320

Glu Gly Leu Arg Thr Phe Asp Gln Leu Asp Ala Ile Ser Ser Leu Pro
                325                 330                 335

Thr Pro Ser Asp Ile Phe Val Ser Tyr Ser Thr Phe Pro Gly Phe Val
            340                 345                 350
```

Ser Trp Arg Asp Pro Lys Ser Gly Ser Trp Tyr Val Glu Thr Leu Asp
            355                 360                 365

Asp Ile Phe Glu Gln Trp Ala His Ser Glu Asp Leu Gln Ser Leu Leu
        370                 375                 380

Leu Arg Val Ala Asn Ala Val Ser Val Lys Gly Ile Tyr Lys Gln Met
385                 390                 395                 400

Pro Gly Cys Phe Asn Phe Leu Arg Lys Lys Leu Phe Phe Lys Thr Ser
                405                 410                 415

<210> SEQ ID NO 23
<211> LENGTH: 1533
<212> TYPE: DNA
<213> ORGANISM: Homo sapiens

<400> SEQUENCE: 23

| | | | | | |
|---|---|---|---|---|---|
| ttttgtggca | tgagatgtgg | catgaagggc | tggaagaagc | atcccgcctg | tatttcggcg | 60 |
| aacgaaatgt | gaagggcatg | tttgaggttc | tcgagccgct | gcacgcgatg | atggagaggg | 120 |
| gacctcaaac | tctgaaagag | acctccttca | atcaagctta | tggccgggat | ctgatggagg | 180 |
| ctcaggaatg | tgtgccgaaaa | tatatgaaga | gtggaaacgt | aaaagacctt | ctgcaggcct | 240 |
| gggatttgta | ctatcacgtt | ttccgacgaa | tctcaaagct | tgaatactca | ggtggaggca | 300 |
| gcttggaagg | tgtgcaagta | gaaacgatat | ctccaggcga | cggtcgcaca | ttccctaaga | 360 |
| ggggcaaac | atgcgtggta | cactatacag | ggatgcttga | agatggcaaa | aaatttgact | 420 |
| ctagtaggga | ccggaataaa | cccttcaagt | tcatgctcgg | caaacaagaa | gttataagag | 480 |
| ggtgggaaga | aggcgtcgca | cagatgtcag | tagggcaaag | agcaaagctc | actatatctc | 540 |
| ctgattatgc | atacggagcg | actggccacc | ctggcataat | accaccgcac | gcaaccctgg | 600 |
| tatttgatgt | tgagttgttg | aagttggaat | ccggcggggg | agggagtggg | ggcggagggt | 660 |
| ctggtggtgg | tggatcaggg | gtagatggtt | tcggggatgt | tggggcactg | gagtccttgc | 720 |
| gcgggaacgc | tgacctcgca | tatatcttga | gcatggagcc | ttgtggtcat | tgtctcatta | 780 |
| taaataatgt | taacttttgt | agagaaagcg | gtctccgaac | gagaacgggt | tctaatatag | 840 |
| actgcgaaaa | gcttaggcgg | agattttcta | gtctgcactt | tatggttgaa | gtcaagggag | 900 |
| atctcactgc | caaaaaaatg | gtgctcgcgc | tgctggagct | cgctcaacag | gatcatggcg | 960 |
| ccctcgactg | ctgcgttgtg | gtcatcctca | gtcacggatg | ccaggcatcc | catctccagt | 1020 |
| tccccggtgc | cgtctatggc | acggacgggt | gccctgtttc | agtcgagaag | attgtaaaca | 1080 |
| ttttttaatgg | tacgagttgt | ccaagccttg | ggggaaagcc | gaaactgttt | ttcatacagg | 1140 |
| catgcggcgg | ggaacaaaaa | gatcacgggt | tcgaagtagc | ttcaacttcc | ccggaggatg | 1200 |
| aatctccagg | aagcaacccc | gaaccggacg | cgacaccttt | tcaagaggga | ctccgaacat | 1260 |
| tcgaccaact | cgacgcaata | agtagcctgc | caactccgtc | cgacatcttt | gtatcttatt | 1320 |
| ctacgtttcc | gggttttgtc | tcctggcggg | accccaaatc | agggagttgg | tacgtagaga | 1380 |
| cactggatga | tattttcgaa | cagtgggctc | actctgaaga | ccttcagtcc | cttttgttga | 1440 |
| gagtcgccaa | tgcggtttca | gtgaaaggga | tttataaaca | gatgcctgga | tgcttcaatt | 1500 |
| tcctccgaaa | gaagcttttc | tttaaaacat | ctg | | | 1533 |

<210> SEQ ID NO 24
<211> LENGTH: 20
<212> TYPE: DNA

<213> ORGANISM: Artificial Sequence
<220> FEATURE:
<223> OTHER INFORMATION: Description of Artificial Sequence: Synthetic
      oligonucleotide

<400> SEQUENCE: 24
aggtcaagga ttgtacgccc                                           20

<210> SEQ ID NO 25
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 25
gaagtccctg caccacgacc                                           20

<210> SEQ ID NO 26
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 26
tttggttgtt ccgttgctgt                                           20

<210> SEQ ID NO 27
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 27
caggcaatgg acataatata                                           20

<210> SEQ ID NO 28
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 28
acagcatgtc agtgcaaacc                                           20

<210> SEQ ID NO 29
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 29
acacactcga tgtcactcca                                           20

<210> SEQ ID NO 30
<211> LENGTH: 20
<212> TYPE: DNA
<213> ORGANISM: Artificial Sequence

```
<220> FEATURE:
<223> OTHER INFORMATION: Description of Artificial Sequence: Synthetic
      oligonucleotide

<400> SEQUENCE: 30
ttccagagct cacaacgacc                                                      20

<210> SEQ ID NO 31
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 31
atagtcctgt ccatatttgc                                                      20

<210> SEQ ID NO 32
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 32
atagtcctgt ccatatttgc                                                      20

<210> SEQ ID NO 33
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 33
aggtcggtga ttgtacaccc                                                      20

<210> SEQ ID NO 34
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 34
ttctgtacct gaatcacacc                                                      20

<210> SEQ ID NO 35
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 35
acacattcga tgtcactcca                                                      20

<210> SEQ ID NO 36
<211> LENGTH: 20
<212> TYPE: DNA
<213> ORGANISM: Artificial Sequence
<220> FEATURE:
```

```
<223> OTHER INFORMATION: Description of Artificial Sequence: Synthetic
      oligonucleotide

<400> SEQUENCE: 36
taggagatct tcagtttcgg                                                    20

<210> SEQ ID NO 37
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 37
tccatgagct acaacttgct                                                    20

<210> SEQ ID NO 38
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 38
gcctcccatt caattgccac                                                    20

<210> SEQ ID NO 39
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 39
gactattgtt gagaacctcc                                                    20

<210> SEQ ID NO 40
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 40
ttccactctg actatggtcc                                                    20

<210> SEQ ID NO 41
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 41
tctgatgata gacattagcc                                                    20

<210> SEQ ID NO 42
<211> LENGTH: 20
<212> TYPE: DNA
```

```
<213> ORGANISM: Artificial Sequence
<220> FEATURE:
<223> OTHER INFORMATION: Description of Artificial Sequence: Synthetic
      oligonucleotide

<400> SEQUENCE: 42
ggcgtgtttc cagactgttt                                                  20

<210> SEQ ID NO 43
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 43
aacaggagcg atgagtctgt                                                  20

<210> SEQ ID NO 44
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 44
tcatttacac catttcgcaa                                                  20

<210> SEQ ID NO 45
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 45
gatctaatgt taaagactgg                                                  20

<210> SEQ ID NO 46
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 46
tagatgacaa ctttatcctg                                                  20

<210> SEQ ID NO 47
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 47
ctggagccac tgaacttgaa                                                  20

<210> SEQ ID NO 48
<211> LENGTH: 136
<212> TYPE: DNA
<213> ORGANISM: Mus sp.
```

<400> SEQUENCE: 48
cctcctgaga atatagacgt ctacattata gatgacaact acaccctaaa gtggagcagc      60
cacggagagt caatgggcag tgtgaccttt tcagcagaat atcgaacgta ggtgactgat     120
tggcttgctg aatga                                                      136

<210> SEQ ID NO 49
<211> LENGTH: 134
<212> TYPE: DNA
<213> ORGANISM: Artificial Sequence
<220> FEATURE:
<223> OTHER INFORMATION: Description of Artificial Sequence: Synthetic
      polynucleotide
<220> FEATURE:
<221> NAME/KEY: modified_base
<222> LOCATION: (92)..(92)
<223> OTHER INFORMATION: a, c, t, g, unknown or other

<400> SEQUENCE: 49
cctcctgaga atatagacgt ctacattata gatgacaact acaccctaaa gtggagcagc      60
cacggagtca atgggcagtg tgaccttttc ancagaatat cgaacgtagg tgactgattg     120
gcttgctgga atga                                                       134

<210> SEQ ID NO 50
<211> LENGTH: 90
<212> TYPE: DNA
<213> ORGANISM: Homo sapiens

<400> SEQUENCE: 50
acccagcaaa gtgtggggct cttccgcggg gaggattgaa ccacgaggcg ggggccgagg      60
agcgctccct acctccatgg gacagcacgg                                       90

<210> SEQ ID NO 51
<211> LENGTH: 90
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 51
acccagcaaa gtgtggggct cttccgcggg gaggattgaa ccacgaggcg ggggccgagg      60
agcgctccct acctccatgg gacagcacgg                                       90

<210> SEQ ID NO 52
<211> LENGTH: 89
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 52
acccagcaaa gtgtggggct cttccgcggg aggattgaac cacgaggcgg ggccgagga      60 gcgctcccta cctccatggg acagcacgg                                       89

<210> SEQ ID NO 53
<211> LENGTH: 80

```
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 53
acccagcaaa gtgtggggct cttccgcggg ccacgaggcg ggggccgagg agcgctccct      60
acctccatgg gacagcacgg                                                 80

<210> SEQ ID NO 54
<211> LENGTH: 90
<212> TYPE: DNA
<213> ORGANISM: Homo sapiens

<400> SEQUENCE: 54
gcgttcccta ccgccatgga acaacgggga cagaacgccc cggccgcttc ggggccgg       60 aaaaggcacg gcccaggacc cagggaggcg                                      90

<210> SEQ ID NO 55
<211> LENGTH: 90
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 55
gcgttcccta ccgccatgga acaacgggga cagaacgccc cggccgcttc ggggccgg       60 aaaaggcacg gcccaggacc cagggaggcg                                      90

<210> SEQ ID NO 56
<211> LENGTH: 90
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 56
gcgttcccta ccgccatgga acaaacgggg acagaacgcc ccggccgctt cggggggccg     60
gaaaaggcac ggcccaggac ccagggaggc                                      90

<210> SEQ ID NO 57
<211> LENGTH: 51
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 57
gcgttcccta ccgccatgga acaacgggga cagaacgccc cggggaggc g               51

<210> SEQ ID NO 58
<211> LENGTH: 52
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 58
ggggacaagt ttgtacaaaa aagcagggtc cgagggccta tttcccatga tt             52
```

<210> SEQ ID NO 59
<211> LENGTH: 51
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 59
ggggaccact tgtacaaga aagctgggtc tctagagcca tttgtctgca g            51

<210> SEQ ID NO 60
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 60
tcgtggttca atcctccccg cgg                                          23

<210> SEQ ID NO 61
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 61
tcttgtggac ccggagccga ggg                                          23

<210> SEQ ID NO 62
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 62
agaacgcccc ggccgcttcg ggg                                          23

<210> SEQ ID NO 63
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 63
cctaccgcca tggaacaacg ggg                                          23

<210> SEQ ID NO 64
<211> LENGTH: 22
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 64
tcagggttag ccaacaggag cc                                           22

<210> SEQ ID NO 65
<211> LENGTH: 22
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 65
ttcttcctcc gactccgacg ac                                              22

<210> SEQ ID NO 66
<211> LENGTH: 22
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 66
aggcagtgaa agtacagccg cg                                              22

<210> SEQ ID NO 67
<211> LENGTH: 22
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 67
attccctcct tgtcgccctc cc                                              22

<210> SEQ ID NO 68
<211> LENGTH: 90
<212> TYPE: DNA
<213> ORGANISM: Homo sapiens

<400> SEQUENCE: 68
ccgtgctgtc ccatggaggt agggagcgct cctcggcccc cgcctcgtgg ttcaatcctc     60
cccgcggaag agccccacac tttgctgggt                                      90

<210> SEQ ID NO 69
<211> LENGTH: 90
<212> TYPE: DNA
<213> ORGANISM: Homo sapiens

<400> SEQUENCE: 69
cgcctccctg ggtcctgggc cgtgcctttt ccgggccccc gaagcggccg gggcgttctg     60
tccccgttgt tccatggcgg tagggaacgc                                      90

<210> SEQ ID NO 70
<211> LENGTH: 62
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 70
acccagcaaa gtgtggggct cggggccga ggagcgctcc ctacctccat gggacagcac      60
gg                                                                    62

```
<210> SEQ ID NO 71
<211> LENGTH: 90
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 71
gcgttcccta ccgccatgga acaacgggga cagaacgccc cggccgcttt cggggggcccg    60 gaaaaggcac ggcccaggac ccagggaggc                                      90
```